(12) United States Patent
Ohama

(10) Patent No.: US 11,151,708 B2
(45) Date of Patent: Oct. 19, 2021

(54) PRINT QUALITY INSPECTION APPARATUS AND PRINT QUALITY INSPECTION METHOD

(71) Applicant: KOMORI CORPORATION, Tokyo (JP)

(72) Inventor: Kentaro Ohama, Tsukuba (JP)

(73) Assignee: KOMORI CORPORATION, Tokyo (JP)

( * ) Notice: Subject to any disclaimer, the term of this patent is extended or adjusted under 35 U.S.C. 154(b) by 0 days.

(21) Appl. No.: 16/335,141

(22) PCT Filed: Sep. 21, 2017

(86) PCT No.: PCT/JP2017/034022
§ 371 (c)(1),
(2) Date: Mar. 20, 2019

(87) PCT Pub. No.: WO2018/056341
PCT Pub. Date: Mar. 29, 2018

(65) Prior Publication Data
US 2019/0228521 A1    Jul. 25, 2019

(30) Foreign Application Priority Data

Sep. 21, 2016  (JP) .............................. JP2016-184428
Sep. 21, 2016  (JP) .............................. JP2016-184429

(51) Int. Cl.
*G06T 7/00* (2017.01)
*B41F 33/00* (2006.01)
(Continued)

(52) U.S. Cl.
CPC ........ *G06T 7/0004* (2013.01); *B41F 33/0036* (2013.01); *G01N 21/8851* (2013.01);
(Continued)

(58) Field of Classification Search
CPC ...... G01N 21/8851; G06K 9/18; G06K 15/07; G06T 7/0004; G06T 7/90;
(Continued)

(56) References Cited

U.S. PATENT DOCUMENTS 4,892,336 A    1/1990  Kaule et al.
7,969,565 B2 *  6/2011  Stober .................... G07D 7/121
                                              356/237.2
(Continued)

FOREIGN PATENT DOCUMENTS

JP       2001-129972 A      5/2001
JP            4019397   *  12/2007   ............. G01N 21/88
(Continued)

OTHER PUBLICATIONS

Extended European Search Report dated Apr. 3, 2020 issued in counterpart European Patent Application 17853110.9.
(Continued)

*Primary Examiner* — Thai Q Tran
*Assistant Examiner* — Stephen R Smith
(74) *Attorney, Agent, or Firm* — Birch, Stewart, Kolasch & Birch, LLP

(57) ABSTRACT

The present invention relates to a print quality inspection apparatus comprising: an illuminator (35 or 35A-35C) for irradiating light onto a printout (1) provided with a motion thread (1*b*); a camera (34 or 34A) for capturing an image of the printout; and a print quality inspection unit (10) for inspecting the print quality of the printout (1) on the basis of image data captured by the camera (34 or 34A). The camera (34) captures images of printouts (1) for each RGB color, and the print quality inspection unit (10) performs a print quality inspection having a scope that includes the motion thread (1*b*) on the basis of image data of a color of the same hue as the color of the motion thread (1*b*), or the illuminator
(Continued)

(35A-35C) emits a color of the same hue as the color of the motion thread (1b), and the monochrome camera (34A) captures a monochrome image.

12 Claims, 115 Drawing Sheets

(51) Int. Cl.
    *G06T 7/73*       (2017.01)
    *G06T 7/90*       (2017.01)
    *G01N 21/88*     (2006.01)
    *H04N 5/225*     (2006.01)
    *H04N 5/247*     (2006.01)
    *H04N 9/04*       (2006.01)
    *B42D 25/355*    (2014.01)

(52) U.S. Cl.
CPC .................. *G06T 7/73* (2017.01); *G06T 7/90* (2017.01); *H04N 5/2256* (2013.01); *H04N 5/247* (2013.01); *H04N 9/04* (2013.01); *B42D 25/355* (2014.10); *G06T 2207/10024* (2013.01); *G06T 2207/30144* (2013.01)

(58) Field of Classification Search
CPC . G06T 2207/10024; G06T 2207/30144; G06T 7/73; B41F 33/0036; H04N 5/2256; H04N 5/247; H04N 9/04; B42D 25/355
USPC ............ 348/92, 93; 358/1.18; 382/112, 137; 101/171
See application file for complete search history.

(56) References Cited

U.S. PATENT DOCUMENTS

| | | | |
|---|---|---|---|
| 2013/0016893 A1* | 1/2013 | Koretsune | G07D 7/005 382/137 |
| 2015/0040785 A1* | 2/2015 | Turke | G01J 3/501 101/171 |
| 2015/0243007 A1* | 8/2015 | Bless | B41F 11/02 382/112 |
| 2017/0010211 A1 | 1/2017 | Ohama | |

FOREIGN PATENT DOCUMENTS

| | | | | |
|---|---|---|---|---|
| JP | 4019397 B1 * | 12/2007 | | |
| JP | 2012-66430 A | 4/2012 | | |
| JP | 2014-059794 A | 4/2014 | | |
| JP | 2015-104832 A | 6/2015 | | |
| WO | WO 2015/079937 A1 | 6/2015 | | |
| WO | WO-2015079937 A1 * | 6/2015 | ........... | G01N 33/346 |

OTHER PUBLICATIONS

Office Action issued in Co-Pending U.S. Appl. No. 16/891,514 dated Dec. 3, 2020.
International Search Report, issued in PCT/JP2017/034022, dated Nov. 21, 2017.

* cited by examiner

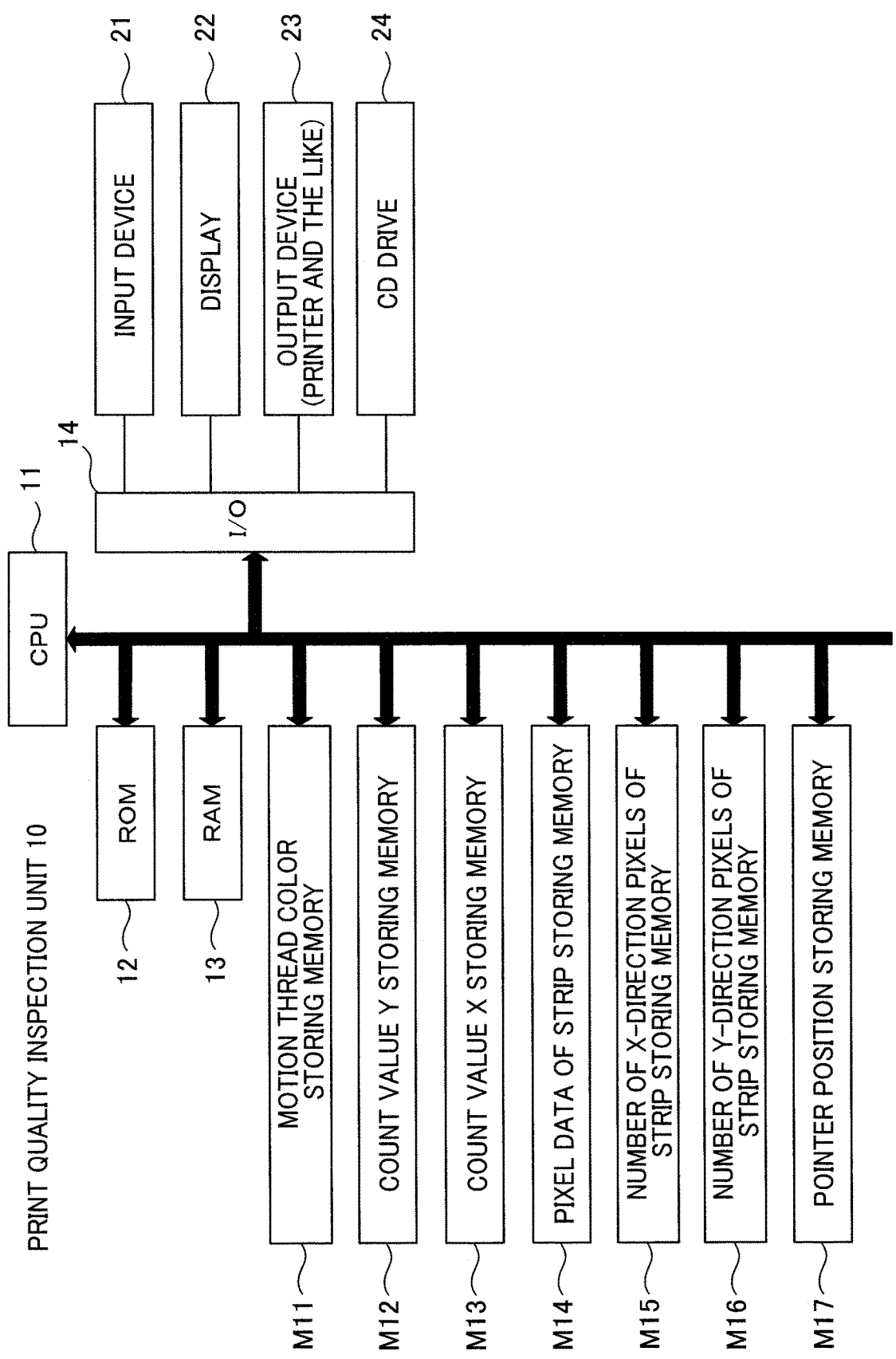

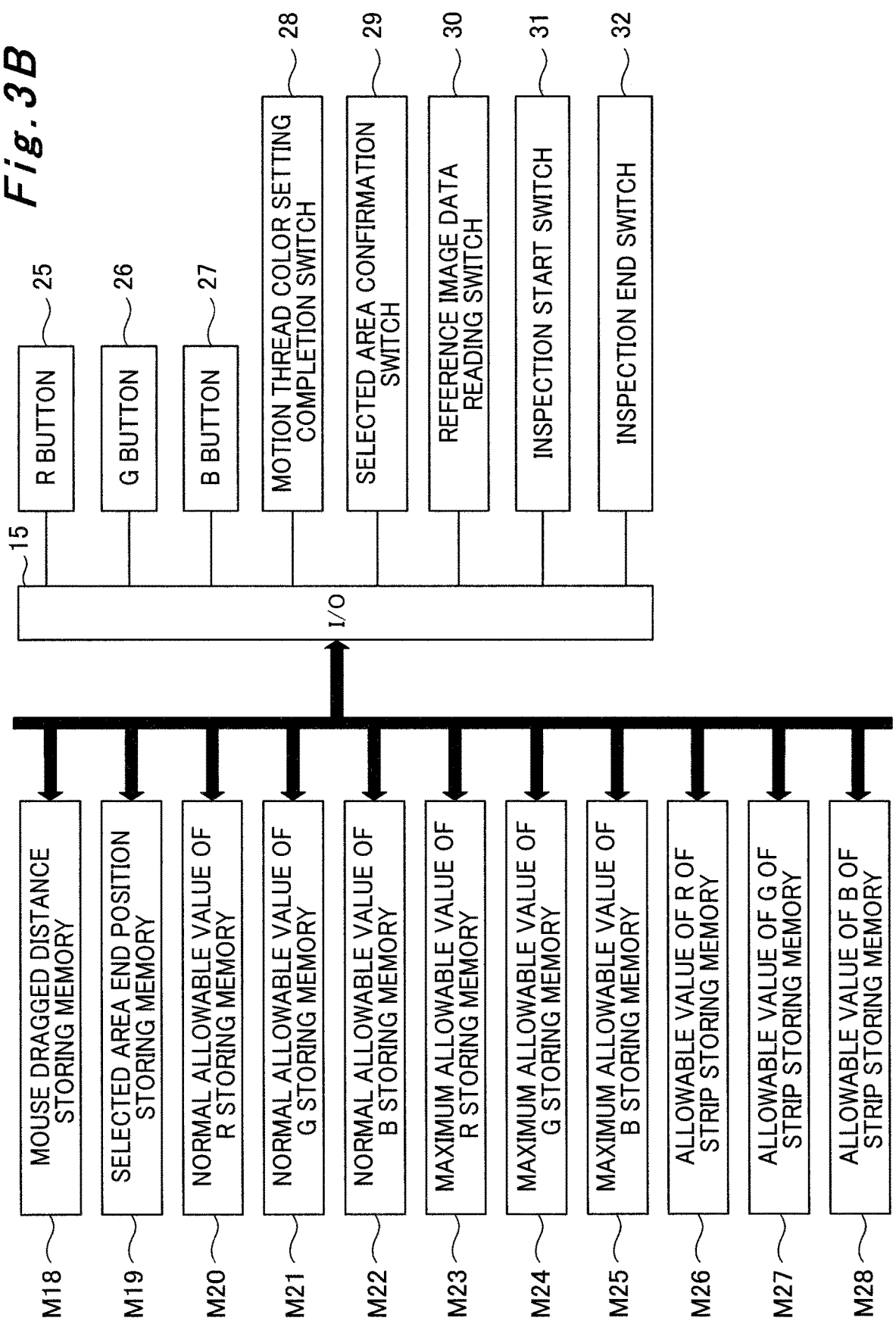

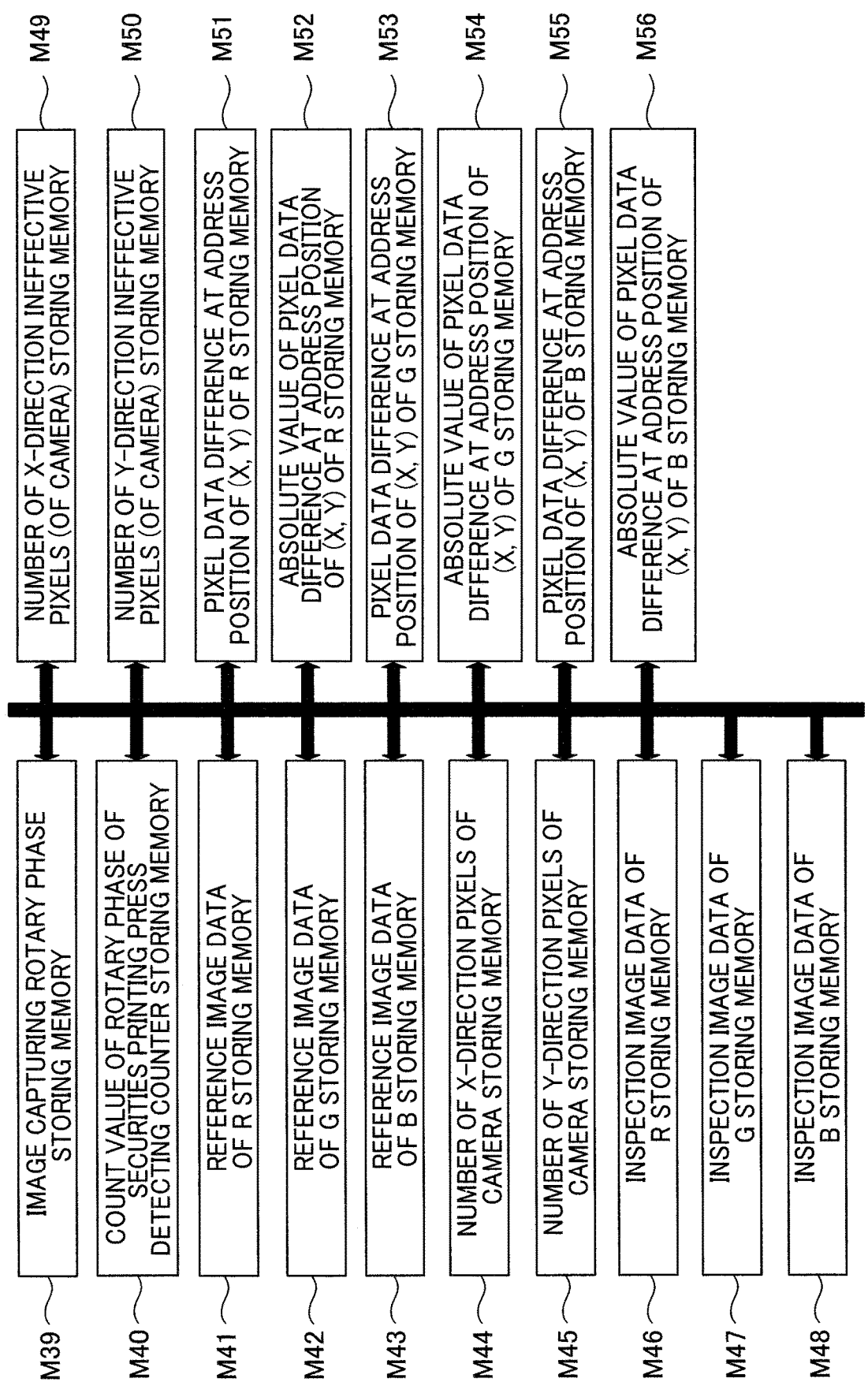

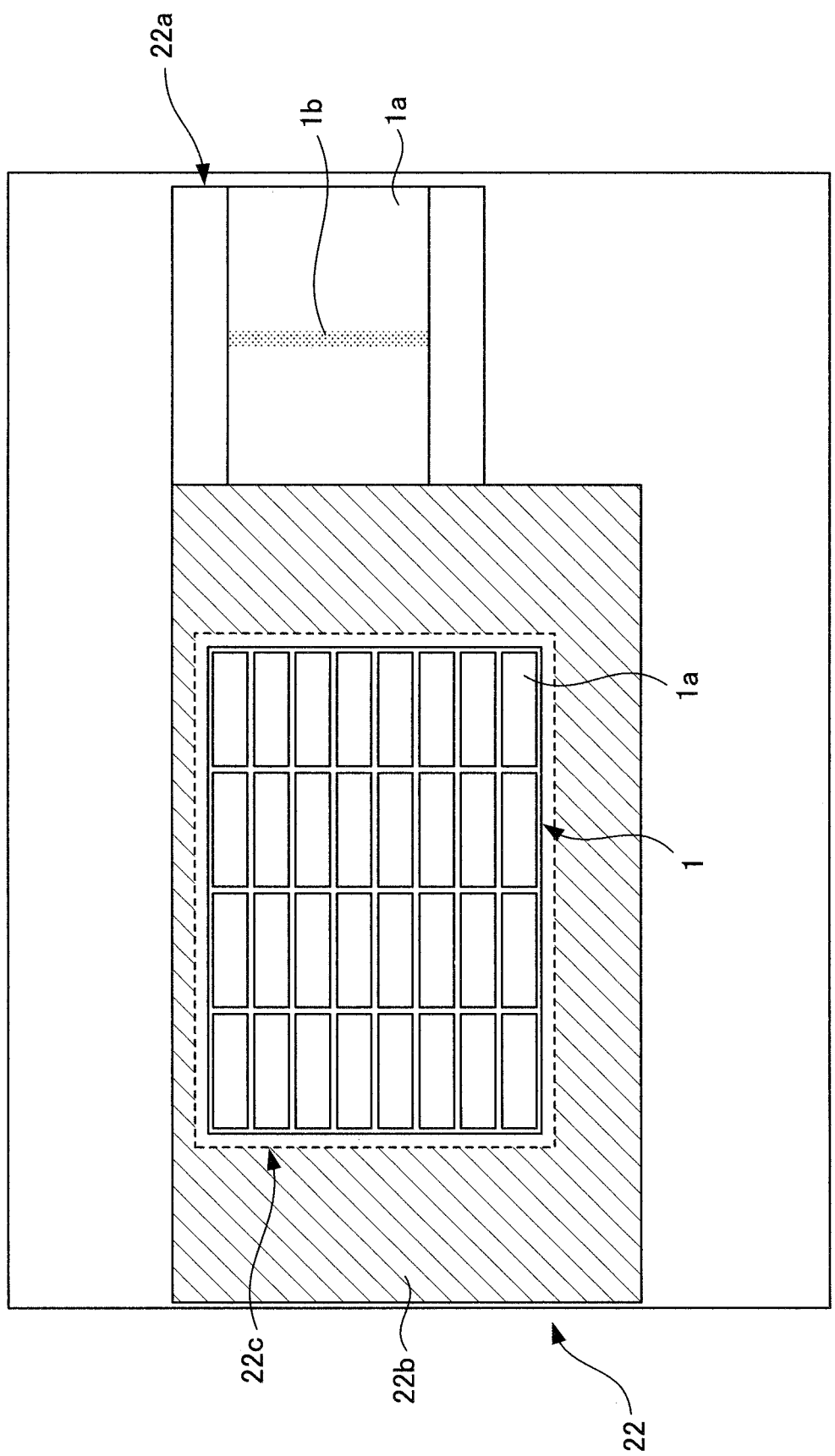

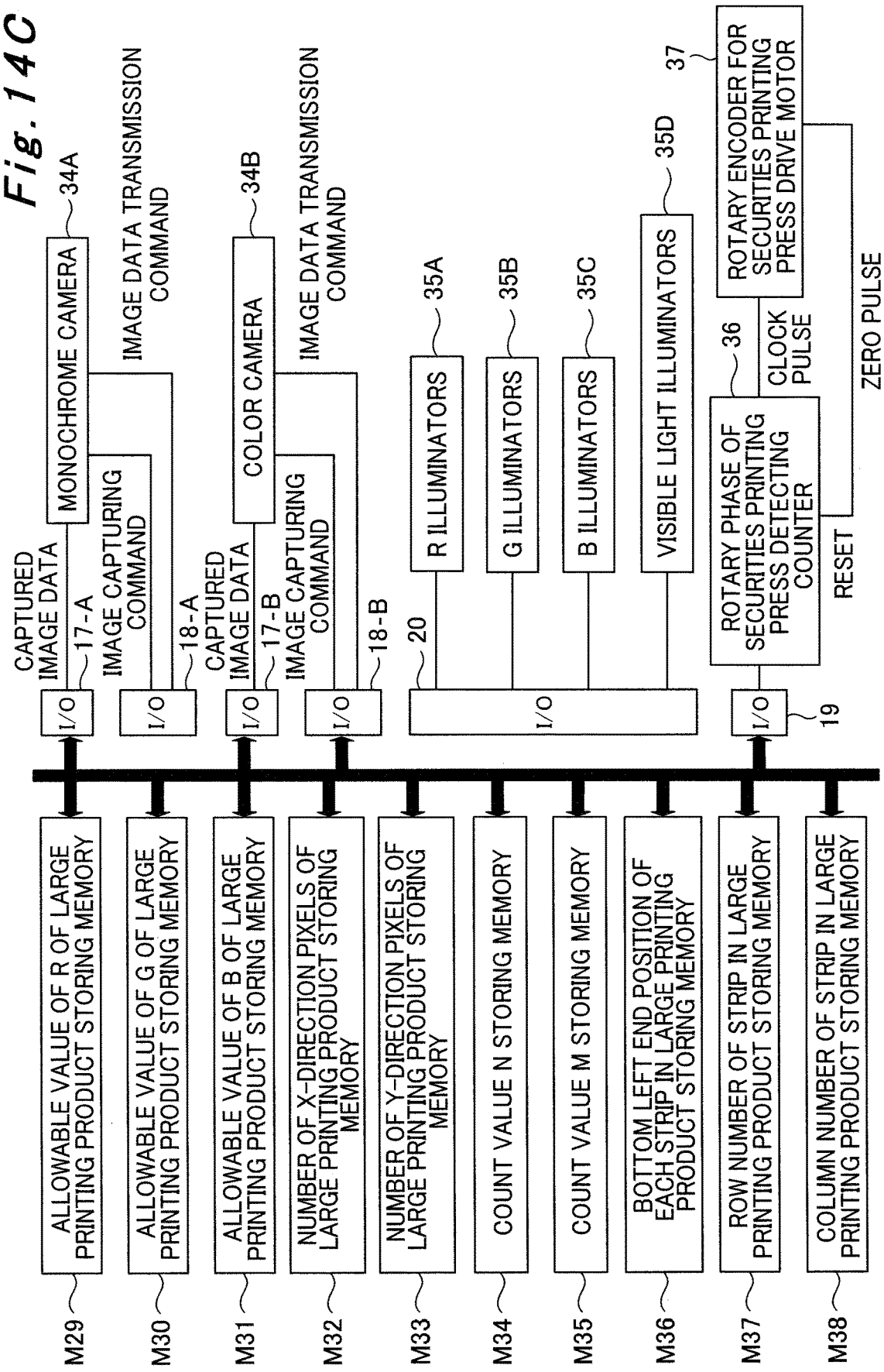

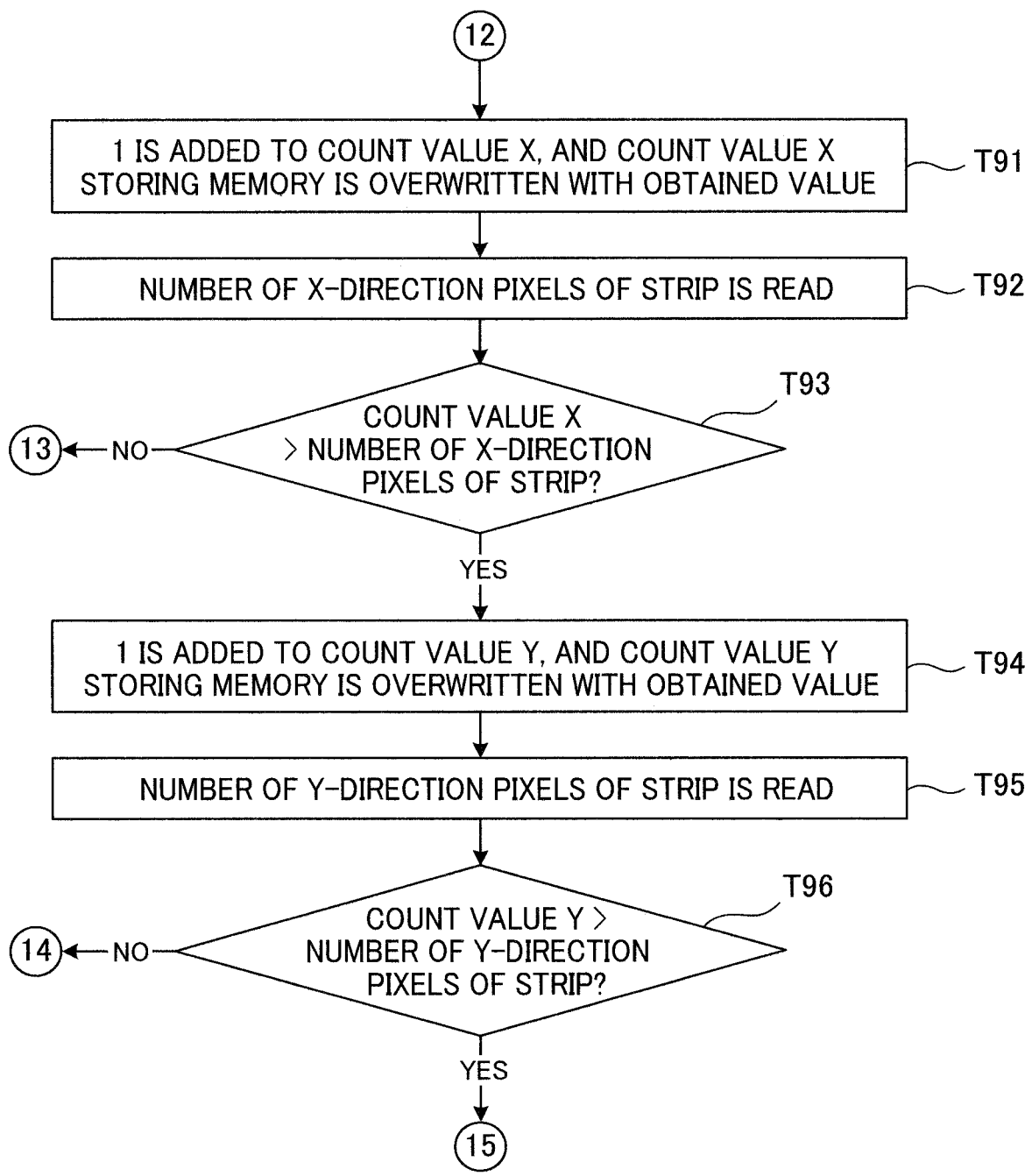

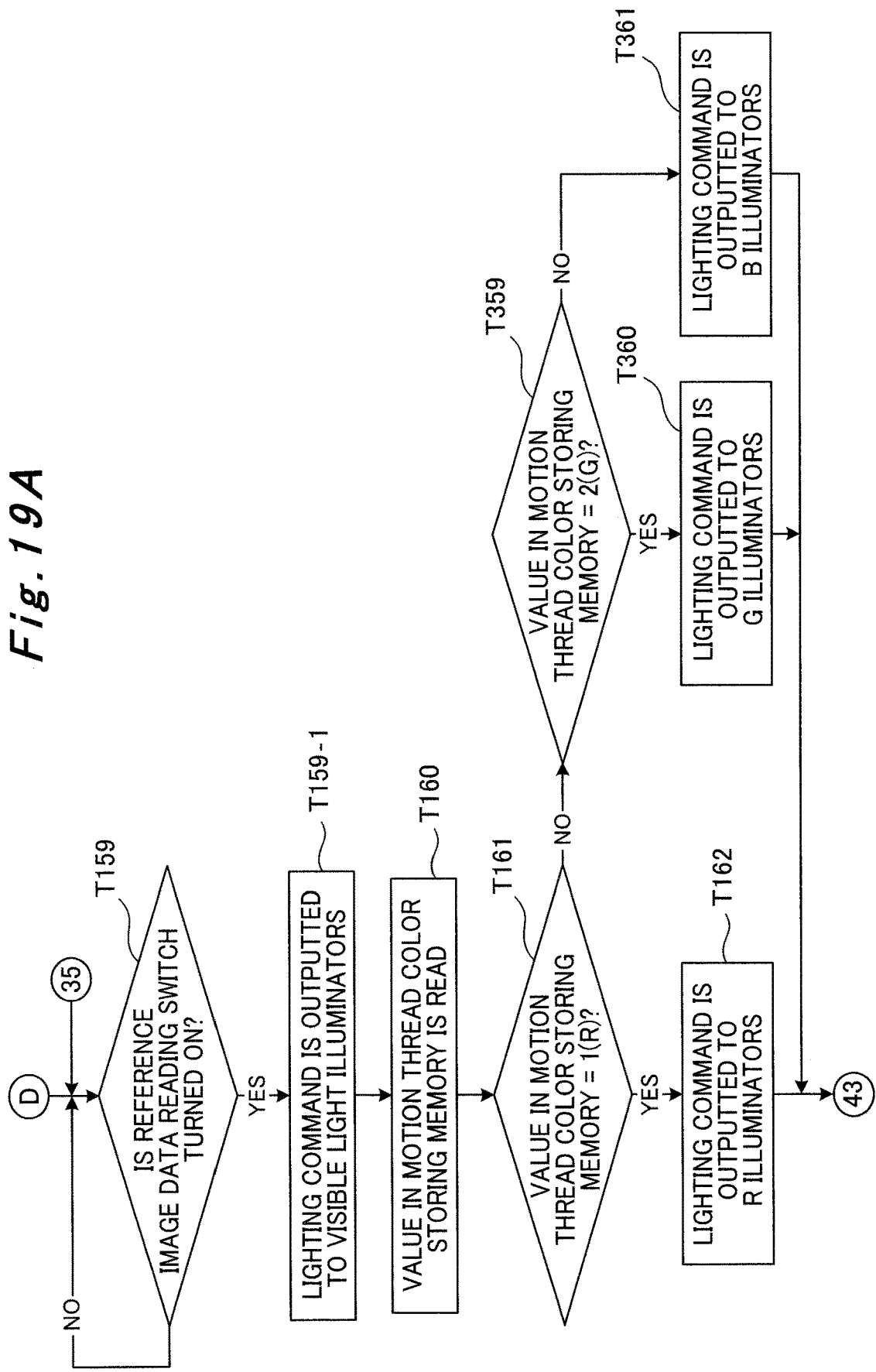

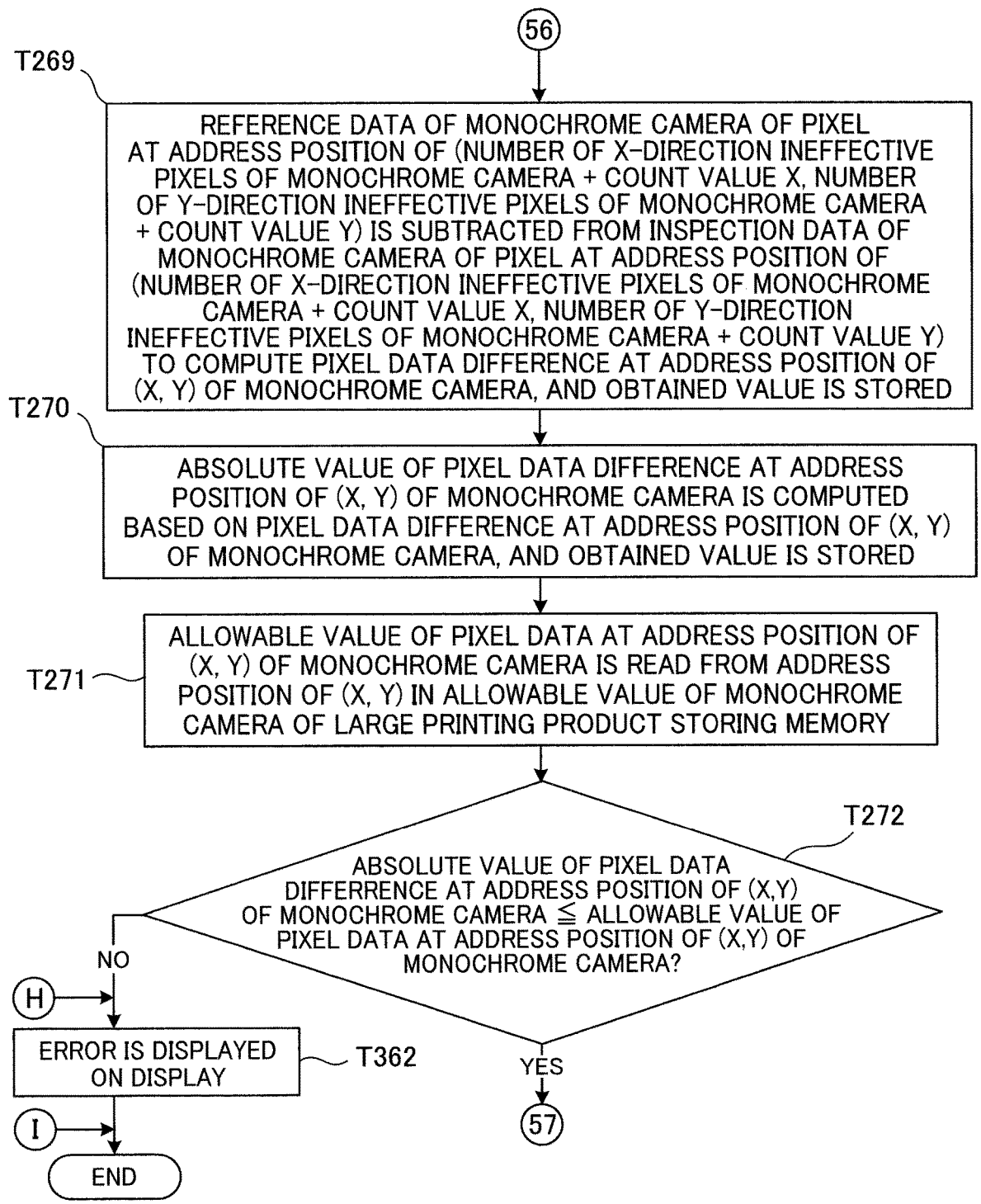

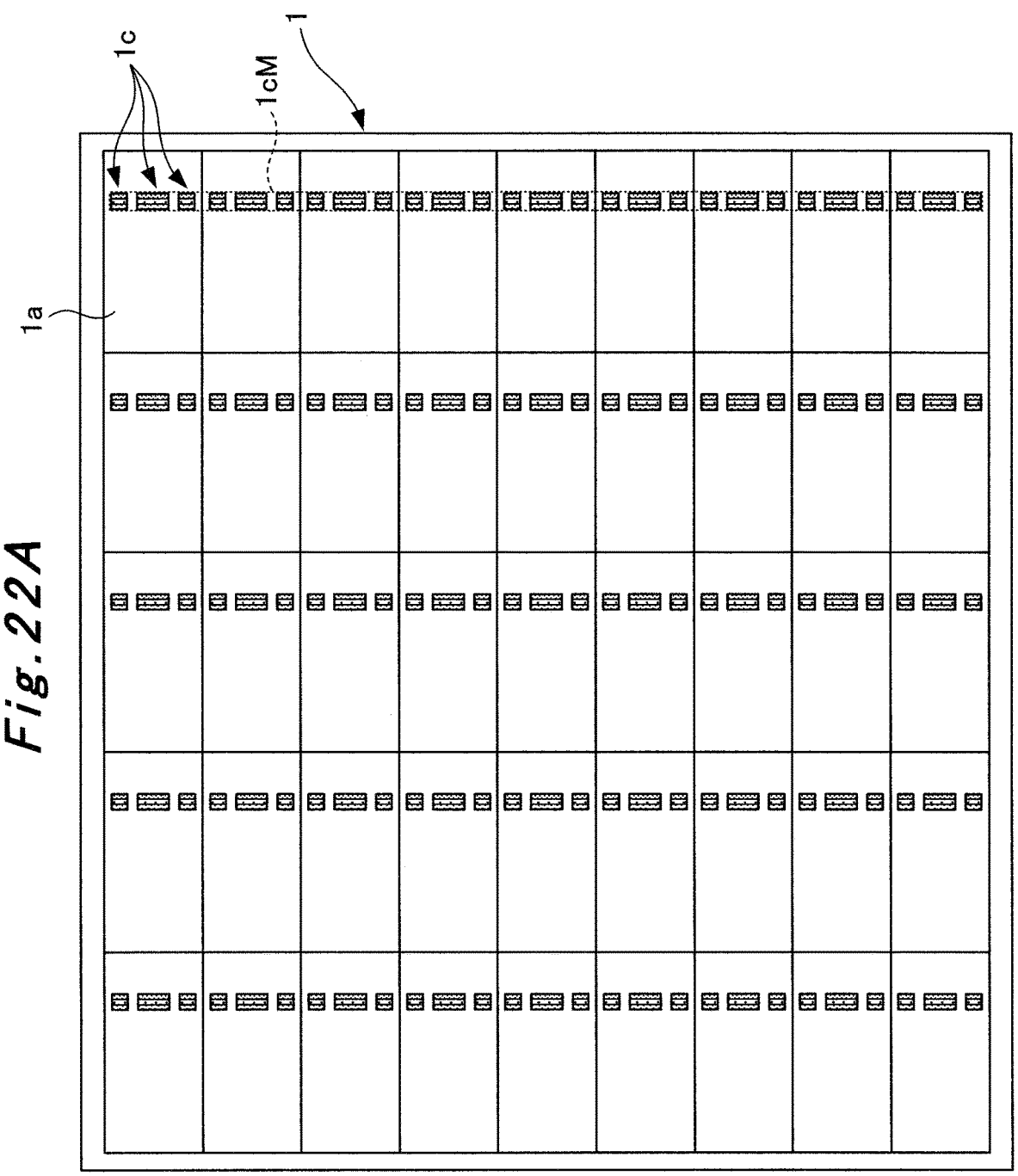

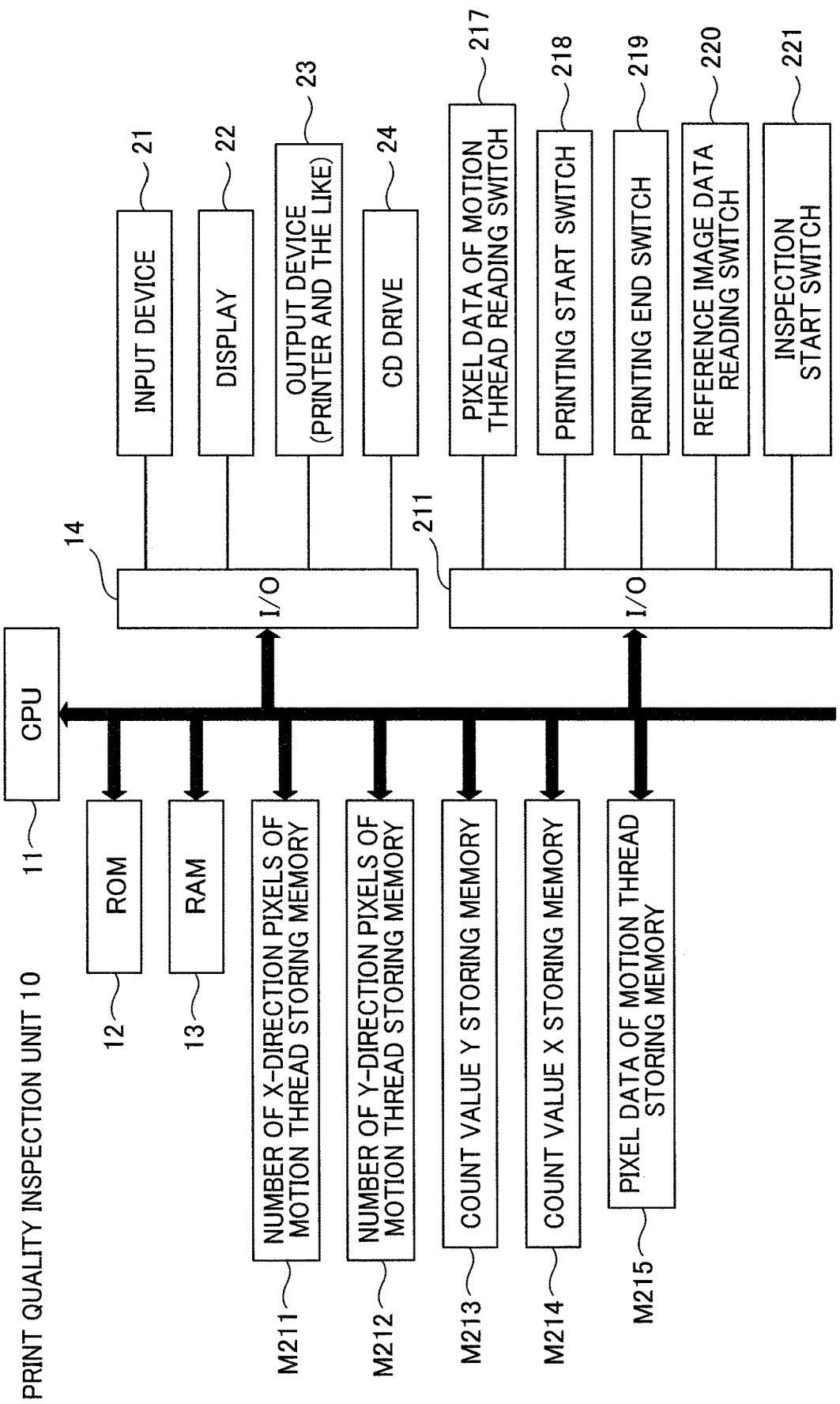

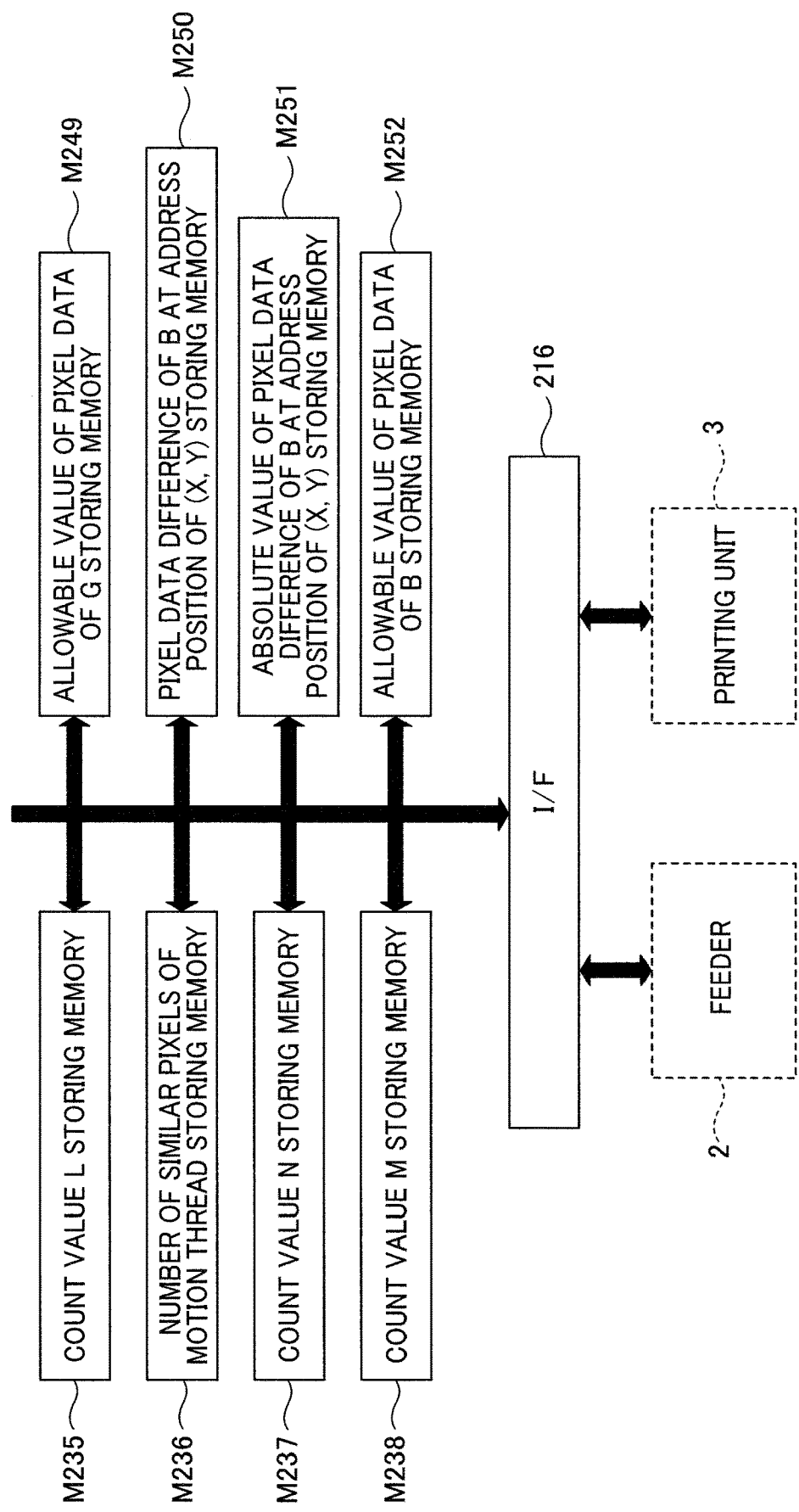

PRINT QUALITY INSPECTION APPARATUS AND PRINT QUALITY INSPECTION METHOD

TECHNICAL FIELD

The present invention relates to a print quality inspection apparatus and a print quality inspection method.

BACKGROUND ART

For forgery prevention, some of the recent security printing products such as banknotes have been partially provided with motion threads in which positions of patterns change depending on the angle of view (the motion thread is for adding depth and motion effects using parallax of the eyes to a printed image by providing a lenticular lens thereon, which is a dome-shaped convex lens that can provide a 3D appearance for the image).

This kind of security printing products are printed by the so-called step and repeat imposition printing, which allows for simultaneous printing of multiple security printing product patterns in, for example, four rows×eight columns on a single print paper sheet (large printing product) previously provided with motion threads.

The apparatus described in the following Patent Document 1 has been publicly known as a conventional print quality inspection apparatus for inspecting the print quality.

PRIOR ART DOCUMENT

Patent Document

Patent Document 1: Japanese Patent Application Publication No. 2012-66430

SUMMARY OF THE INVENTION

Problems to be Solved by the Invention

When an image of the print paper sheet provided with the motion threads printed by the step and repeat imposition printing is optically captured and inspection is made to check whether the prints of the security printing products are normal, since the patterns of the motion thread portions change with small angle variations, the conventional print quality inspection apparatus has a problem of a risk of falsely detecting the printing as abnormal even when there is no problem in print quality.

Thus, the present invention has an object to provide a print quality inspection apparatus and a print quality inspection method that can accurately perform quality inspection of prints on print paper sheets provided with motion threads.

Means for Solving the Problems

A print quality inspection apparatus according to a first aspect of the invention for solving the above problems comprises: an illuminator that emits light onto a printing product provided with a motion thread; an image capturing device that captures an image of the printing product; and a print quality inspection unit that inspects print quality of the printing product based on image data captured by the image capturing device, characterized in that the image capturing device captures RGB images of the printing product and the print quality inspection unit performs inspection of print quality of an area including the motion thread based on image data of a color of the same hue as a color of the motion thread, or the illuminator emits light of the color of the same hue as the color of the motion thread and the image capturing device captures a monochrome image.

A print quality inspection apparatus according to a second aspect of the invention for solving the above problems is characterized in that in the first aspect of the invention, when the image capturing device captures the RGB images of the printing product and the print quality inspection unit performs inspection of print quality of the area including the motion thread based on the image data of the color of the same hue as the color of the motion thread, the print quality inspection unit uses data of all the RGB images to perform inspection of print quality of a region outside the area including the motion thread.

A print quality inspection apparatus according to a third aspect of the invention for solving the above problems is characterized in that in the second aspect of the invention, when inspecting print quality of the area including the motion thread, the print quality inspection unit carries out inspection using image data of a color of different hue from the color of the motion thread while setting an allowable value for determining whether a print is normal as a value for inhibiting the inspection.

A print quality inspection apparatus according to a fourth aspect of the invention for solving the above problems in the first aspect of the invention is characterized in that the print quality inspection apparatus further comprises: a second image capturing device that captures RGB images of the printing product, in which when the illuminator emits the color of the same hue as the color of the motion thread and the image capturing device captures the monochrome image, the print quality inspection unit performs inspection of print quality of a region outside the area including the motion thread based on image data of a color of different hue from the color of the motion thread out of data of all the RGB images captured by the second image capturing device.

A print quality inspection apparatus according to a fifth aspect of the invention for solving the above problems is characterized in that in the fourth aspect of the invention, when inspecting print quality of the area including the motion thread based on the image data obtained by the second image capturing device, the print quality inspection unit carries out the inspection while setting an allowable value for determining whether a print is normal as a value for inhibiting the inspection.

A print quality inspection apparatus according to a sixth aspect of the invention for solving the above problems is characterized in that in any one of the first to third aspects of the invention, when the image capturing device captures the RGB images of the printing product and the print quality inspection unit performs inspection of print quality of the area including the motion thread based on the image data of the color of the same hue as the color of the motion thread, the print quality inspection unit obtains a position of the motion thread based on data of all the RGB images captured by the image capturing device.

A print quality inspection apparatus according to a seventh aspect of the invention for solving the above problems is characterized in that in the sixth aspect of the invention, the print quality inspection unit obtains the position of the motion thread by pattern matching between the data of all the RGB images captured by the image capturing device and the image data of the motion thread obtained in advance.

A print quality inspection method according to an eighth aspect of the invention for solving the above problems comprises: emitting light by an illuminator onto a printing product provided with a motion thread; capturing an image of the printing product provided with the motion thread by an image capturing device; and inspecting print quality of the printing product by a print quality inspection unit based on image data captured by the image capturing device, characterized in that the image capturing device captures RGB images of the printing product and the print quality inspection unit performs inspection of print quality of an area including the motion thread based on image data of a color of the same hue as a color of the motion thread, or the illuminator emits light of the color of the same hue as the color of the motion thread and the image capturing device captures a monochrome image.

A print quality inspection method according to a ninth aspect of the invention for solving the above problems is characterized in that in the eighth aspect of the invention, when the image capturing device captures the RGB images of the printing product and the print quality inspection unit performs inspection of print quality of the area including the motion thread based on the image data of the color of the same hue as the color of the motion thread, the print quality inspection unit uses data of all the RGB images to perform inspection of print quality of a region outside the area including the motion thread.

A print quality inspection method according to a tenth aspect of the invention for solving the above problems is characterized in that in the ninth aspect of the invention, when inspecting print quality of the area including the motion thread, the print quality inspection unit carries out inspection using image data of a color of different hue from the color of the motion thread while setting an allowable value for determining whether a print is normal as a value for inhibiting the inspection.

A print quality inspection method according to an eleventh aspect of the invention for solving the above problems is characterized in that in the eighth aspect of the invention, when the illuminator emits the color of the same hue as the color of the motion thread and the image capturing device captures the monochrome image, RGB images of the printing product are captured by a second image capturing device, and the print quality inspection unit performs inspection of print quality of a region outside the area including the motion thread based on image data of a color of different hue from the color of the motion thread out of data of all the RGB images captured by the second image capturing device.

A print quality inspection method according to a twelfth aspect of the invention for solving the above problems is characterized in that in the eleventh aspect of the invention, when inspecting print quality of the area including the motion thread based on the image data obtained by the second image capturing device, the print quality inspection unit carries out the inspection while setting an allowable value for determining whether a print is normal as a value for inhibiting the inspection.

A print quality inspection method according to a thirteenth aspect of the invention for solving the above problems is characterized in that in any one of the eighth to tenth aspects of the invention, when the image capturing device captures the RGB images of the printing product and the print quality inspection unit performs inspection of print quality of the area including the motion thread based on the image data of the color of the same hue as the color of the motion thread, the print quality inspection unit obtains a position of the motion thread based on data of all the RGB images captured by the image capturing device.

A print quality inspection method according to a fourteenth aspect of the invention for solving the above problems is characterized in that in the thirteenth aspect of the invention, the print quality inspection unit obtains the position of the motion thread by pattern matching between the data of all the RGB images captured by the image capturing device and the image data of the motion thread obtained in advance.

Effect of the Invention

According to the print quality inspection apparatus and the print quality inspection method of the present invention, it is possible to accurately perform quality inspection of prints on print paper sheets provided with motion threads.

BRIEF DESCRIPTION OF THE DRAWINGS

FIG. 3A is a block diagram that illustrates a configuration of the print quality inspection apparatus according to the first embodiment of the present invention.

FIG. 3B is a block diagram that illustrates the configuration of the print quality inspection apparatus according to the first embodiment of the present invention.

FIG. 3D is a block diagram that illustrates the configuration of the print quality inspection apparatus according to the first embodiment of the present invention.

FIG. 12 is a schematic diagram that illustrates an example of a display.

FIG. 14C is a block diagram that illustrates the configuration of the print quality inspection apparatus according to the second embodiment of the present invention.

FIG. 17F is a flowchart that illustrates the operations of the print quality inspection apparatus according to the second embodiment of the present invention.

FIG. 17I is a flowchart that illustrates the operations of the print quality inspection apparatus according to the second embodiment of the present invention.

FIG. 18I is a flowchart that illustrates the operations of the print quality inspection apparatus according to the second embodiment of the present invention.

FIG. 19A is a flowchart that illustrates the operations of the print quality inspection apparatus according to the second embodiment of the present invention.

FIG. 21C is a flowchart that illustrates the operations of the print quality inspection apparatus according to the second embodiment of the present invention.

FIG. 22A is a schematic diagram that illustrates an example of a large printing product provided with multicolor motion threads.

FIG. 23A is a block diagram that illustrates a configuration of a print quality inspection apparatus according to a third embodiment of the present invention.

FIG. 23D is a block diagram that illustrates the configuration of the print quality inspection apparatus according to the third embodiment of the present invention.

MODE FOR CARRYING OUT THE INVENTION

First Embodiment

Hereinafter, a print quality inspection apparatus according to a first embodiment of the present invention is described with reference to FIGS. 1 to 12.

Figure 1:
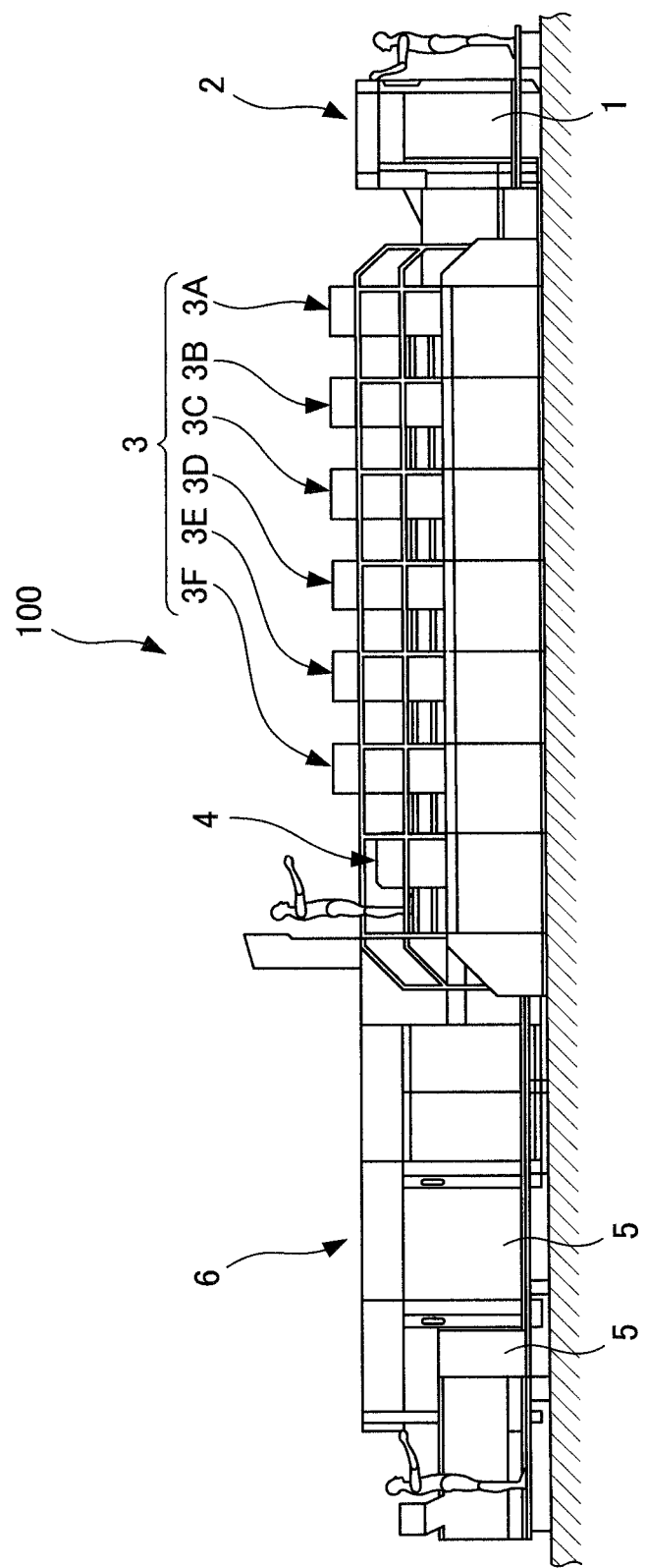
FIG. 1 is a side view of a securities printing press in which a print quality inspection apparatus according to the present invention is applied.

The entirety of a securities printing press is denoted by a reference numeral 100 in FIG. 1, and the securities printing press generally includes a feeder 2 that feeds each sheet of stacked large printing products (printed member) 1, a printing unit 3 that includes six pairs of printing units 3A to 3F for providing six colors prints on the fed large printing product 1, a coating unit 4 that coats a printed surface of the large printing product 1 with varnish, and a delivery device 6 that dries the coated large printing product 1 and delivers it to a delivery pile 5.

The position of the large printing product 1 fed into a feeder board by a sucker of the feeder 2 is adjusted in the vertical direction and the width direction by a lay and side-lay device and supplied into the printing unit 3A through a swing arm shaft pregripper. After the first color is printed by the printing unit 3A, the second to sixth colors are subsequently printed by the printing units 3B to 3F, and after the printed surface is coated with the varnish by the coating unit 4, the large printing product 1 is transported by a delivery chain and is fallen on the delivery pile 5 to be stacked thereon.

In this case, the securities printing press 100 in this embodiment simultaneously prints multiple security printing product patterns in, for example, four rows×eight columns on the large printing product 1 previously provided with single color motion threads 1b (see FIG. 10) by the so-called step and repeat imposition printing. Hereinafter, each portion on which the security printing product pattern is printed is called a strip 1a.

Figure 2:
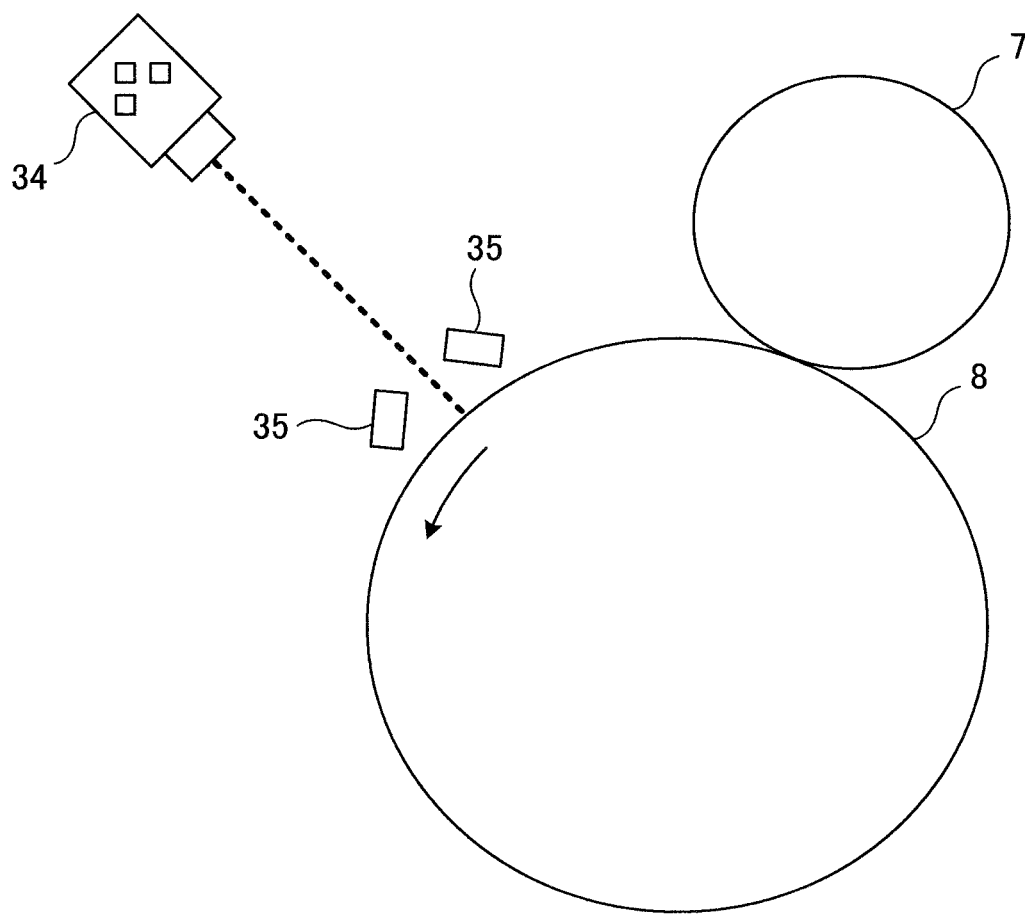
FIG. 2 is a side view that illustrates a print quality inspection apparatus according to a first embodiment of the present invention.
Figure 3C:
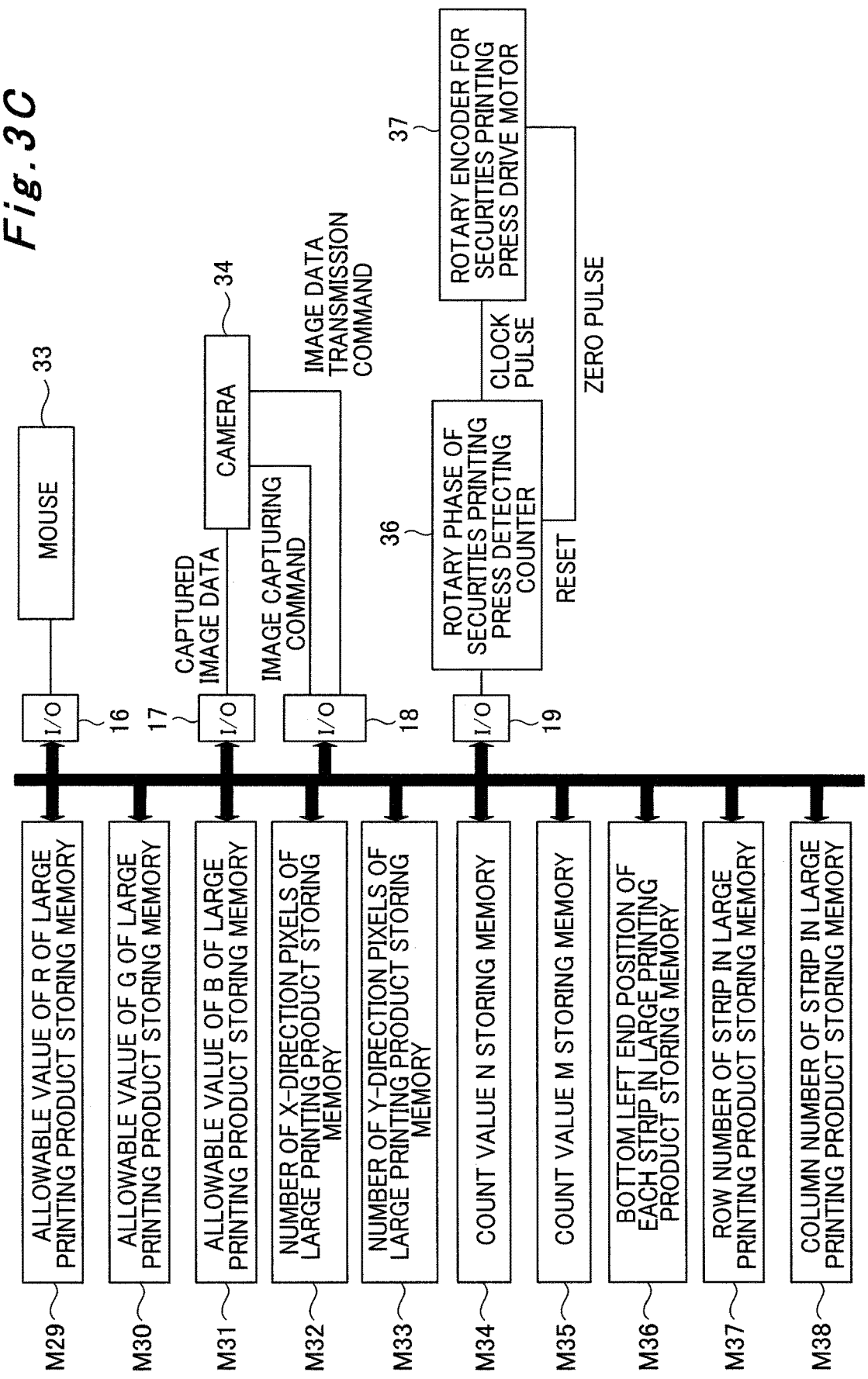
FIG. 3C is a block diagram that illustrates the configuration of the print quality inspection apparatus according to the first embodiment of the present invention.
Figure 4A:
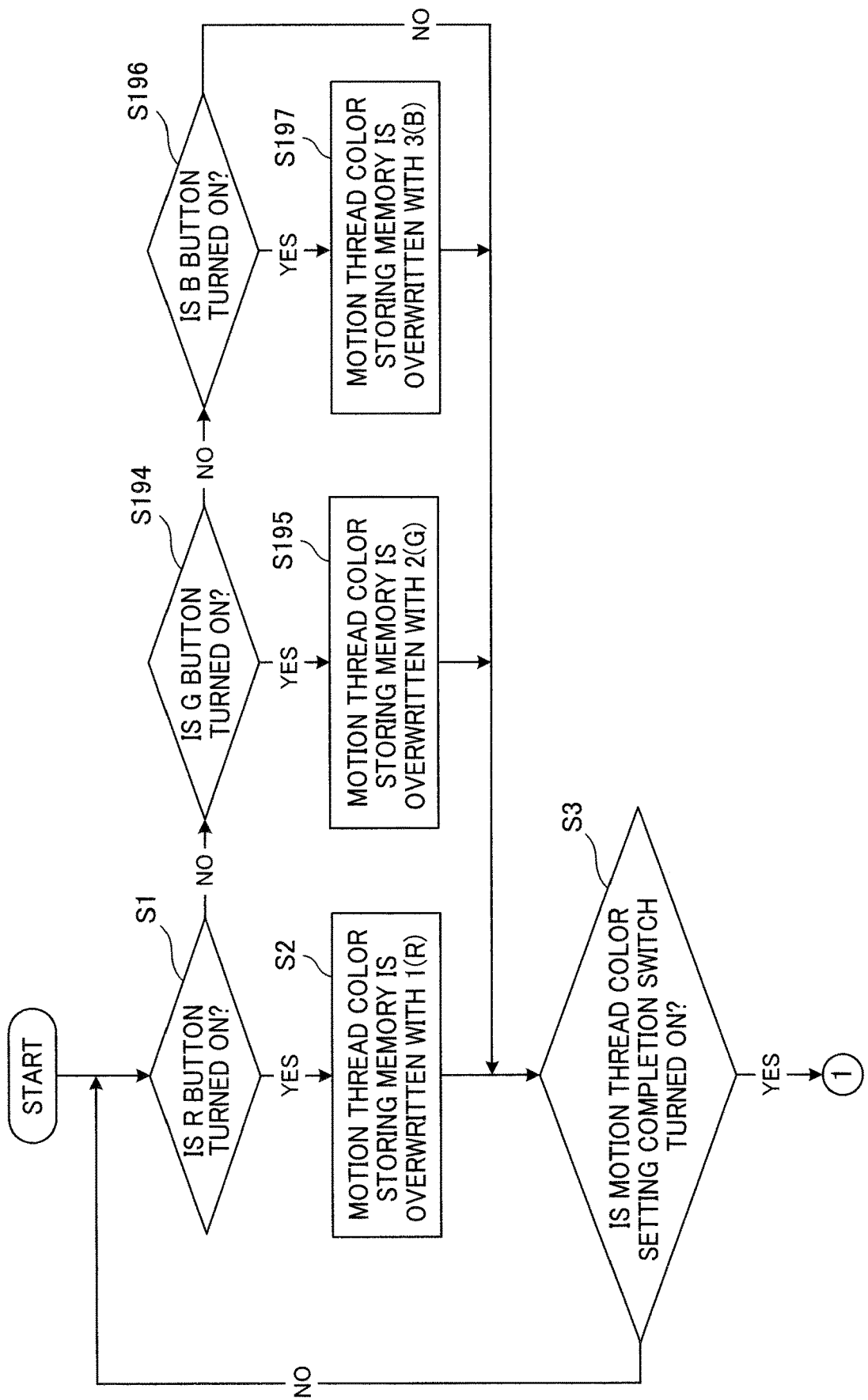
FIG. 4A is a flowchart that illustrates operations of the print quality inspection apparatus according to the first embodiment of the present invention.
Figure 4B:
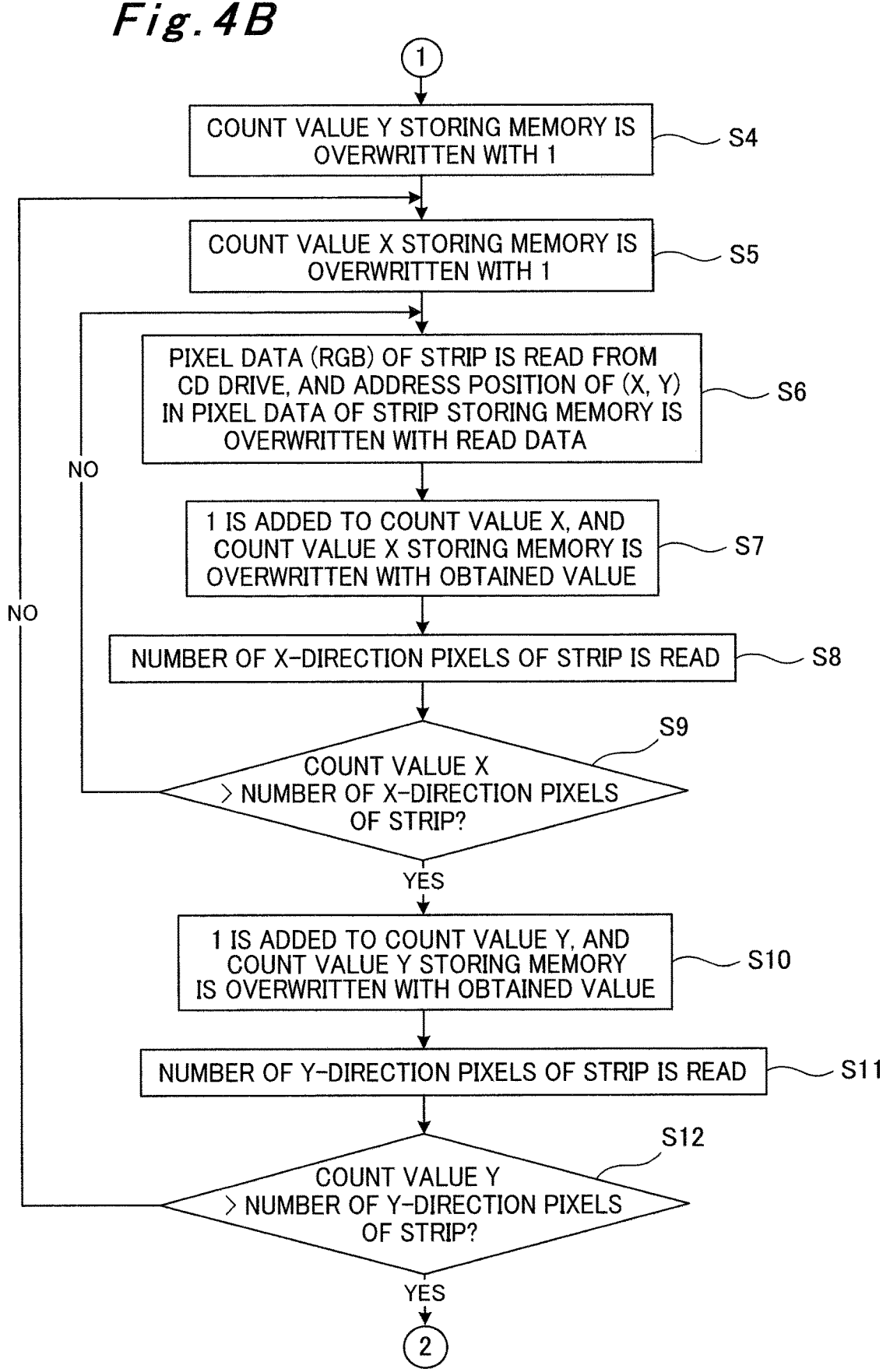
FIG. 4B is a flowchart that illustrates the operations of the print quality inspection apparatus according to the first embodiment of the present invention.
Figure 4C:
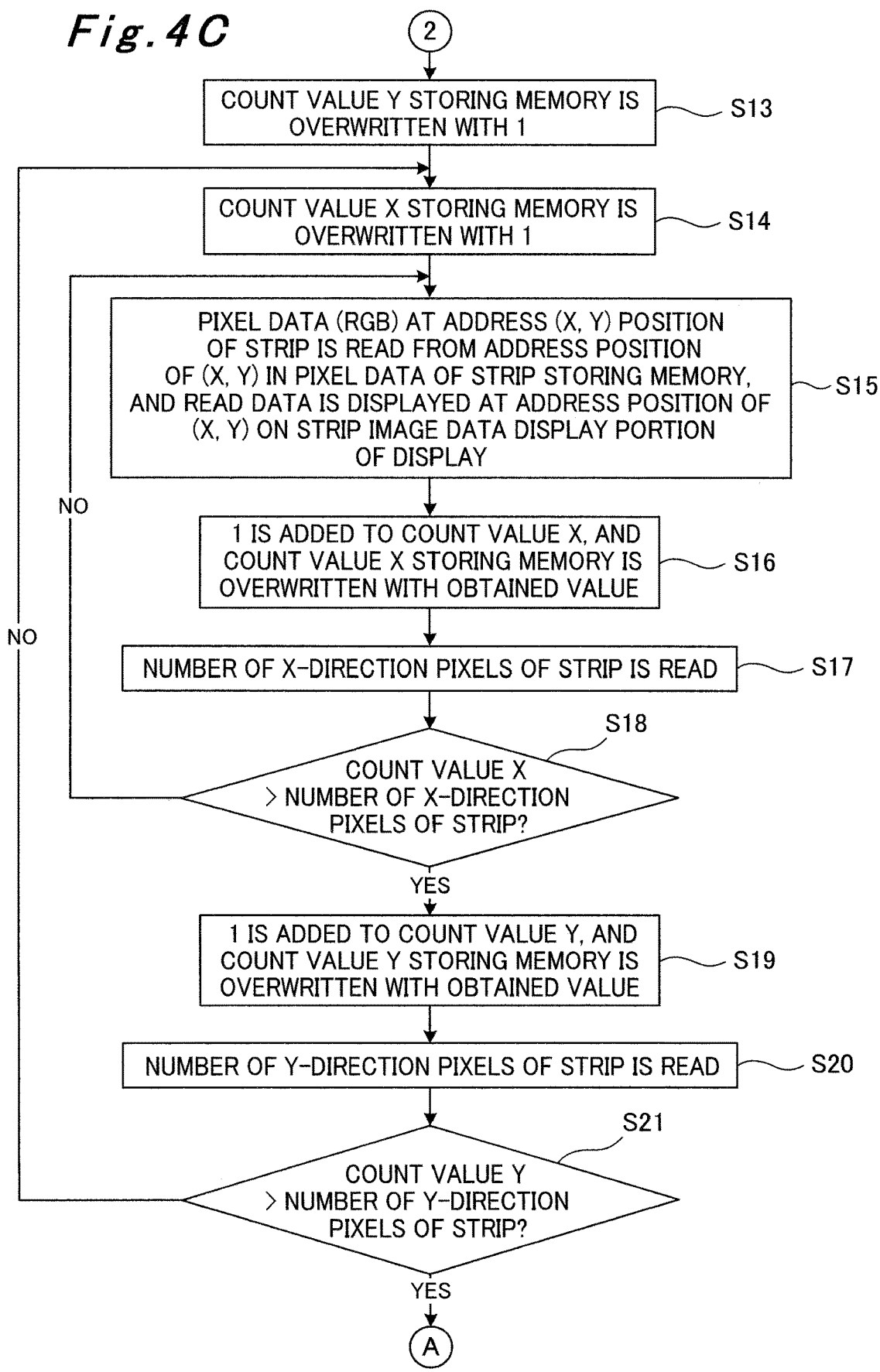
FIG. 4C is a flowchart that illustrates the operations of the print quality inspection apparatus according to the first embodiment of the present invention.
Figure 5A:
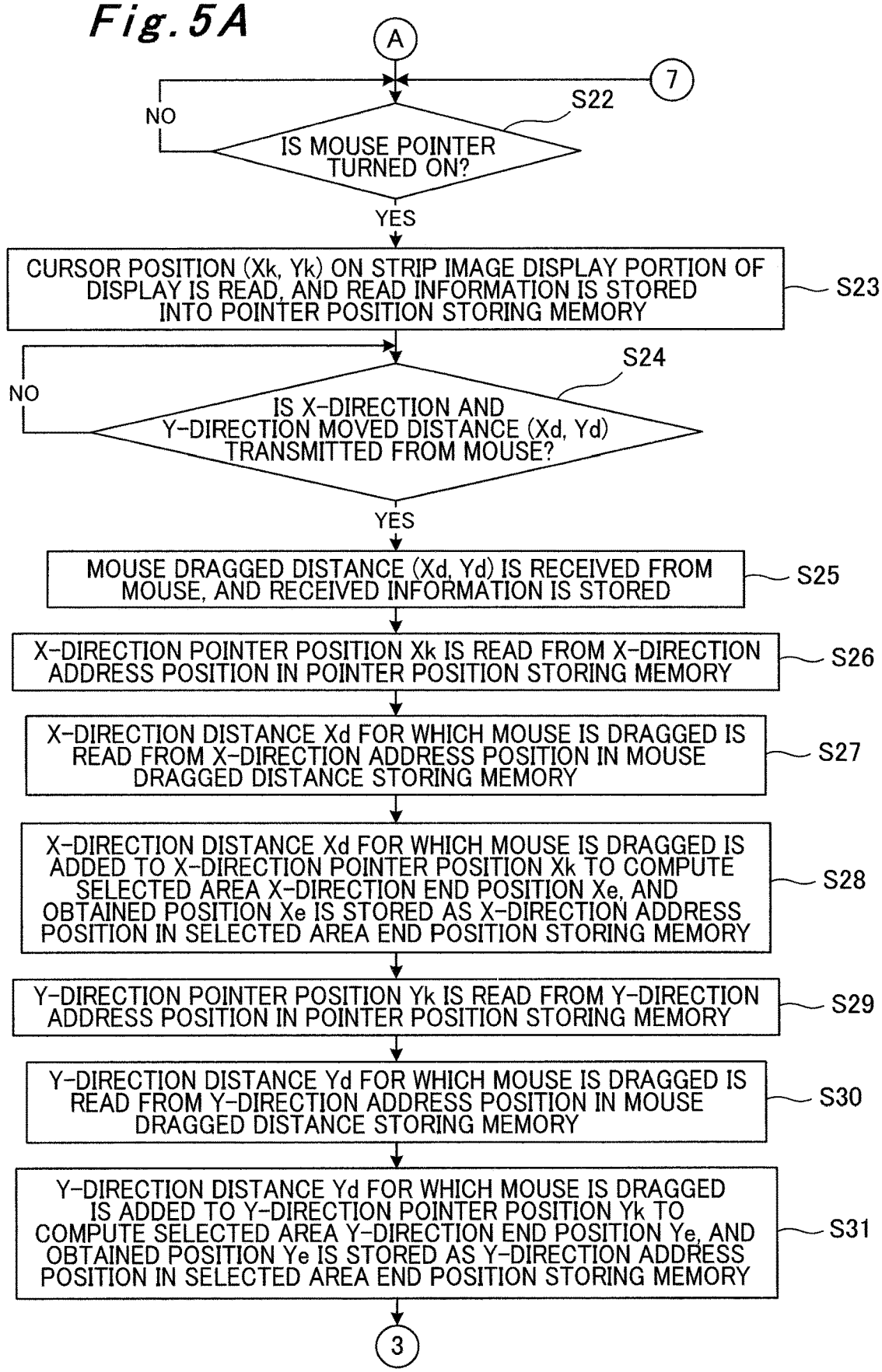
FIG. 5A is a flowchart that illustrates the operations of the print quality inspection apparatus according to the first embodiment of the present invention.
Figure 5B:
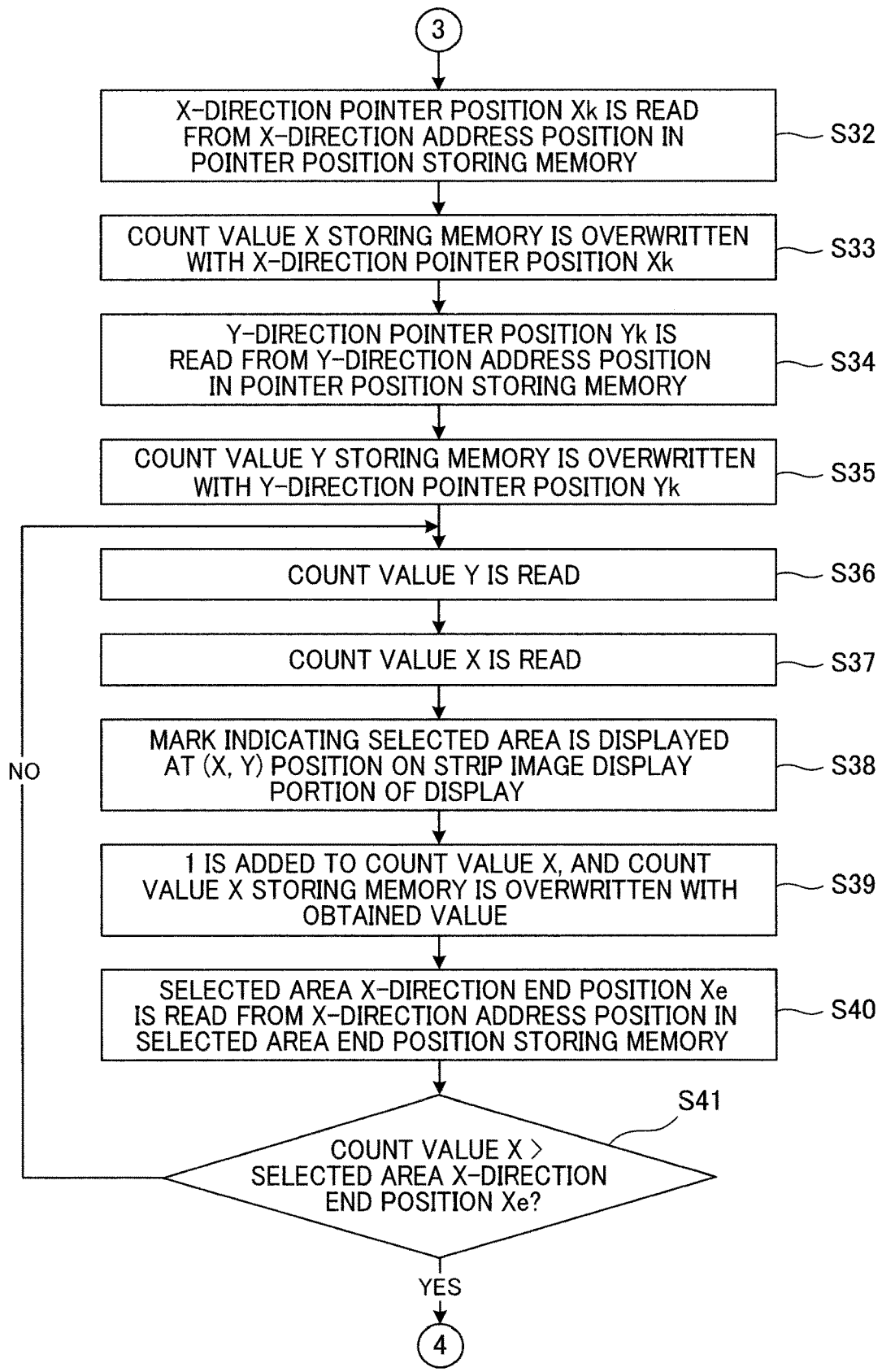
FIG. 5B is a flowchart that illustrates the operations of the print quality inspection apparatus according to the first embodiment of the present invention.
Figure 5C:
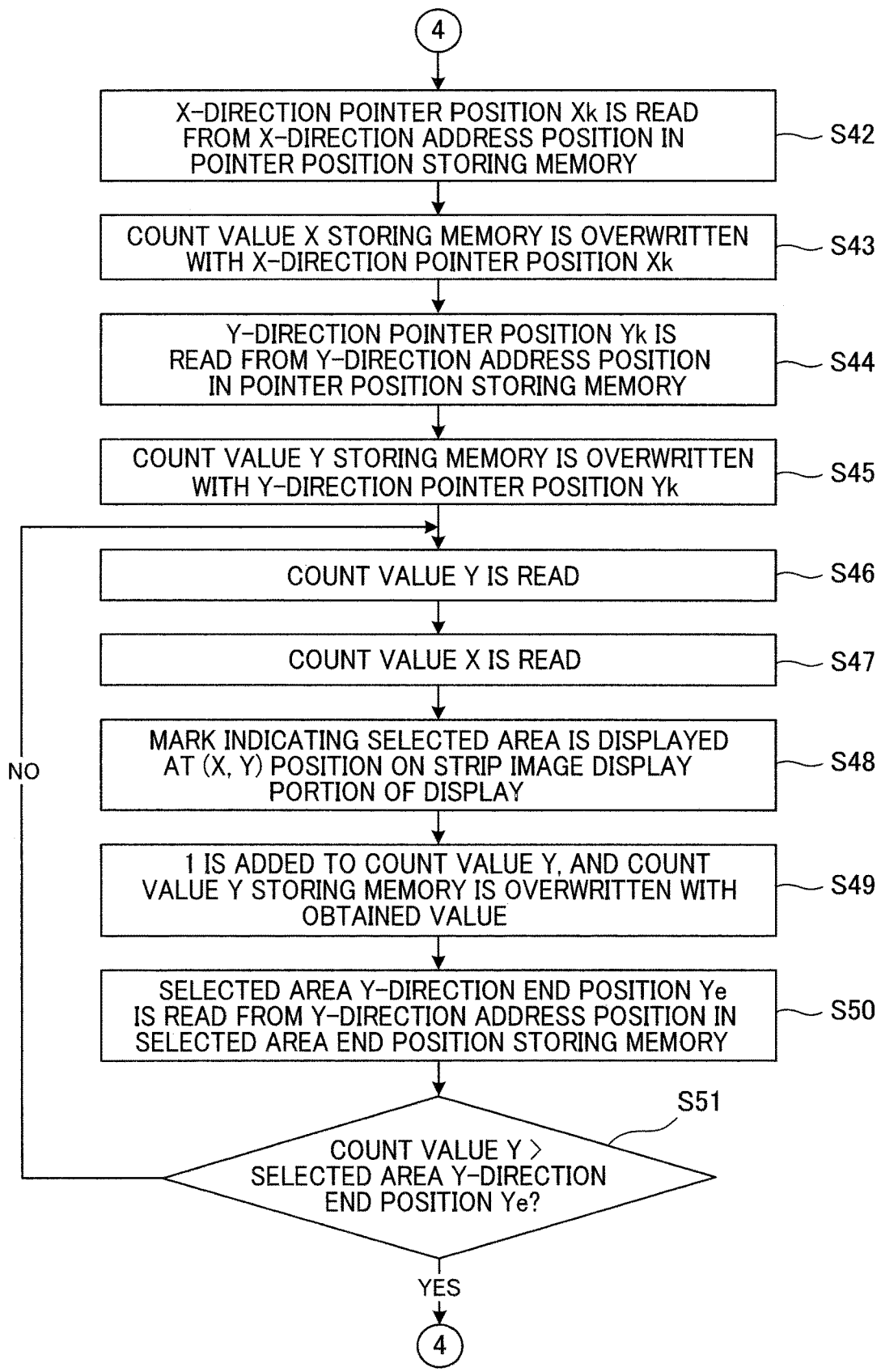
FIG. 5C is a flowchart that illustrates the operations of the print quality inspection apparatus according to the first embodiment of the present invention.
Figure 5D:
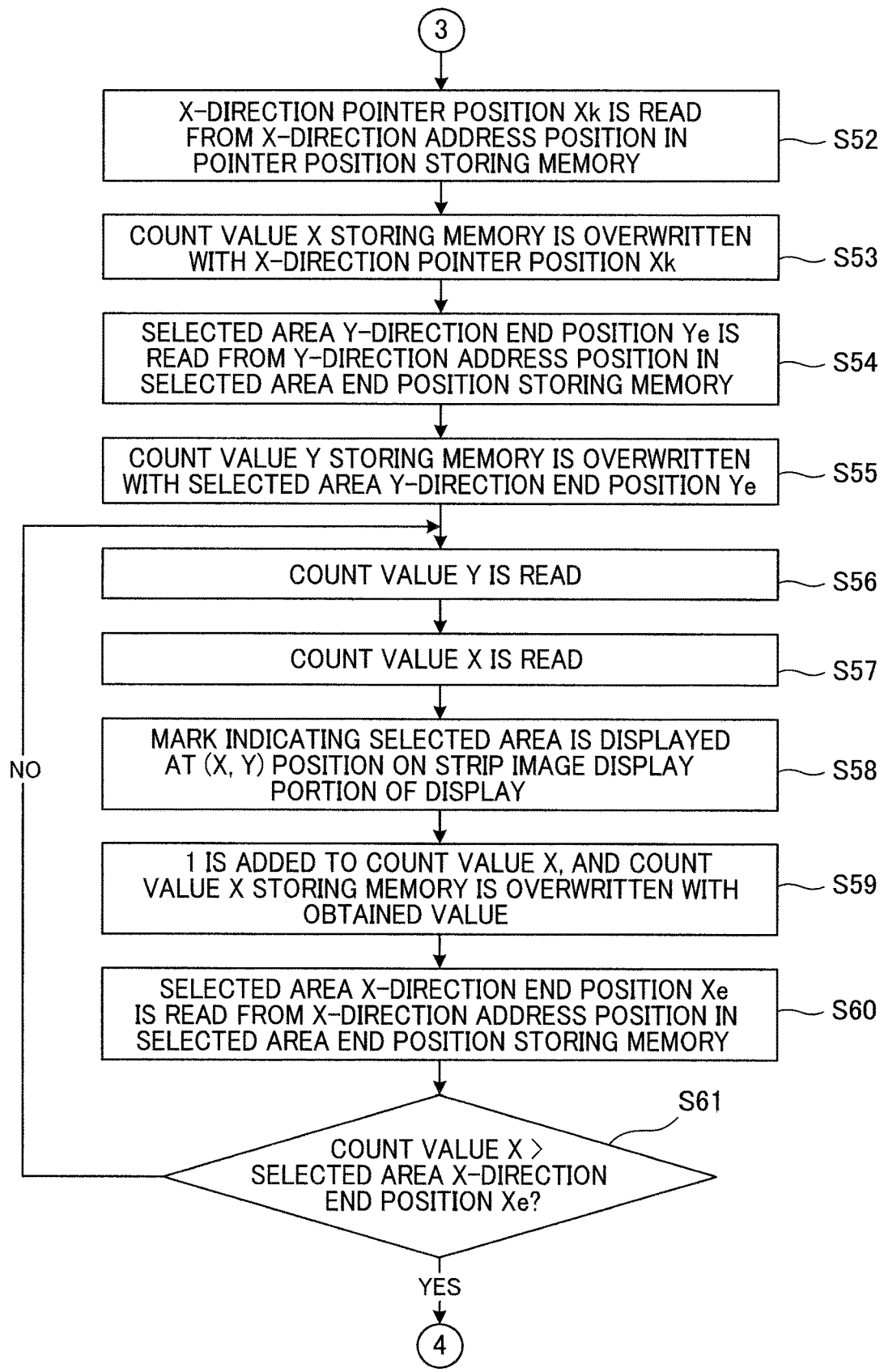
FIG. 5D is a flowchart that illustrates the operations of the print quality inspection apparatus according to the first embodiment of the present invention.
Figure 5E:
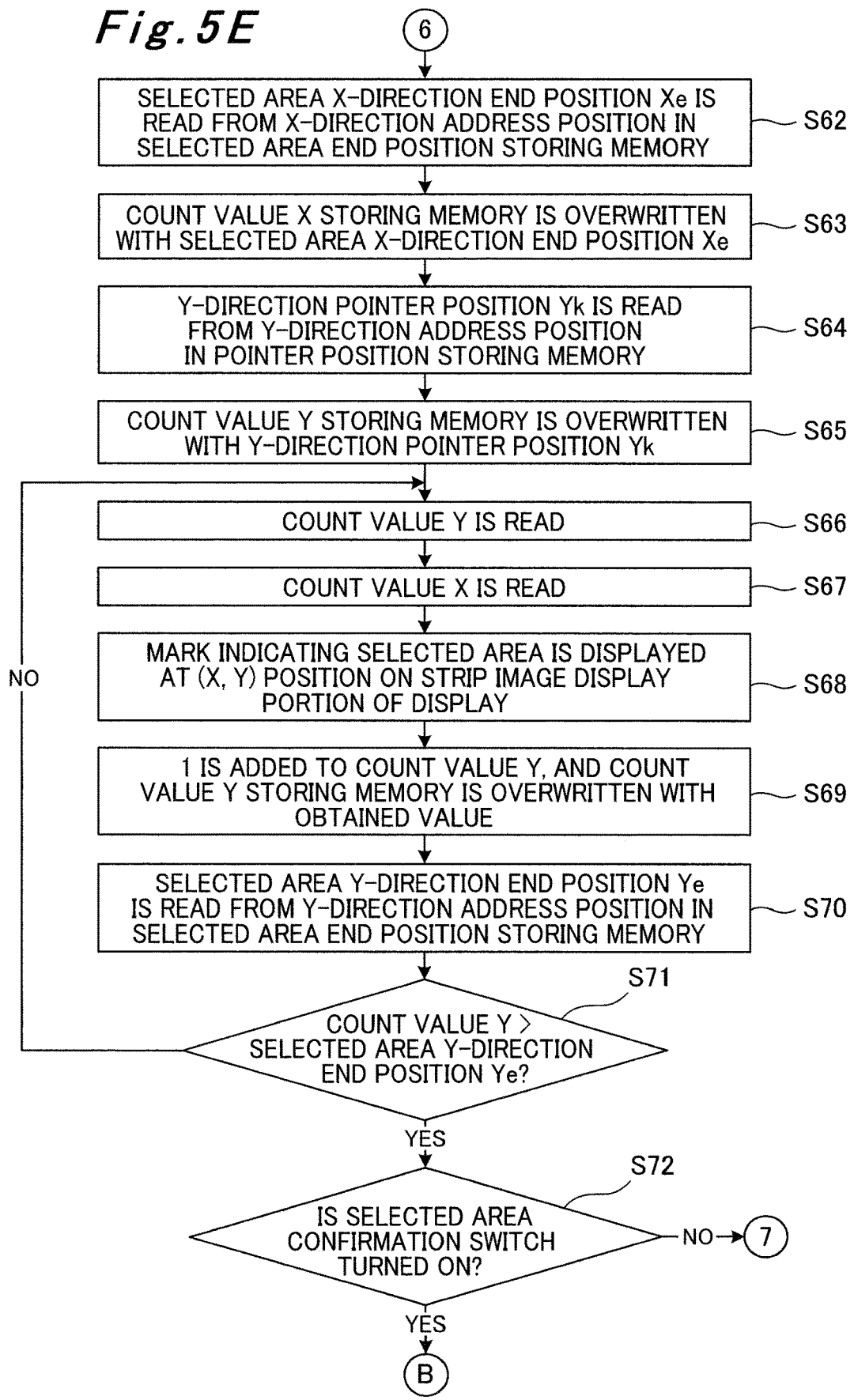
FIG. 5E is a flowchart that illustrates the operations of the print quality inspection apparatus according to the first embodiment of the present invention.
Figure 6A:
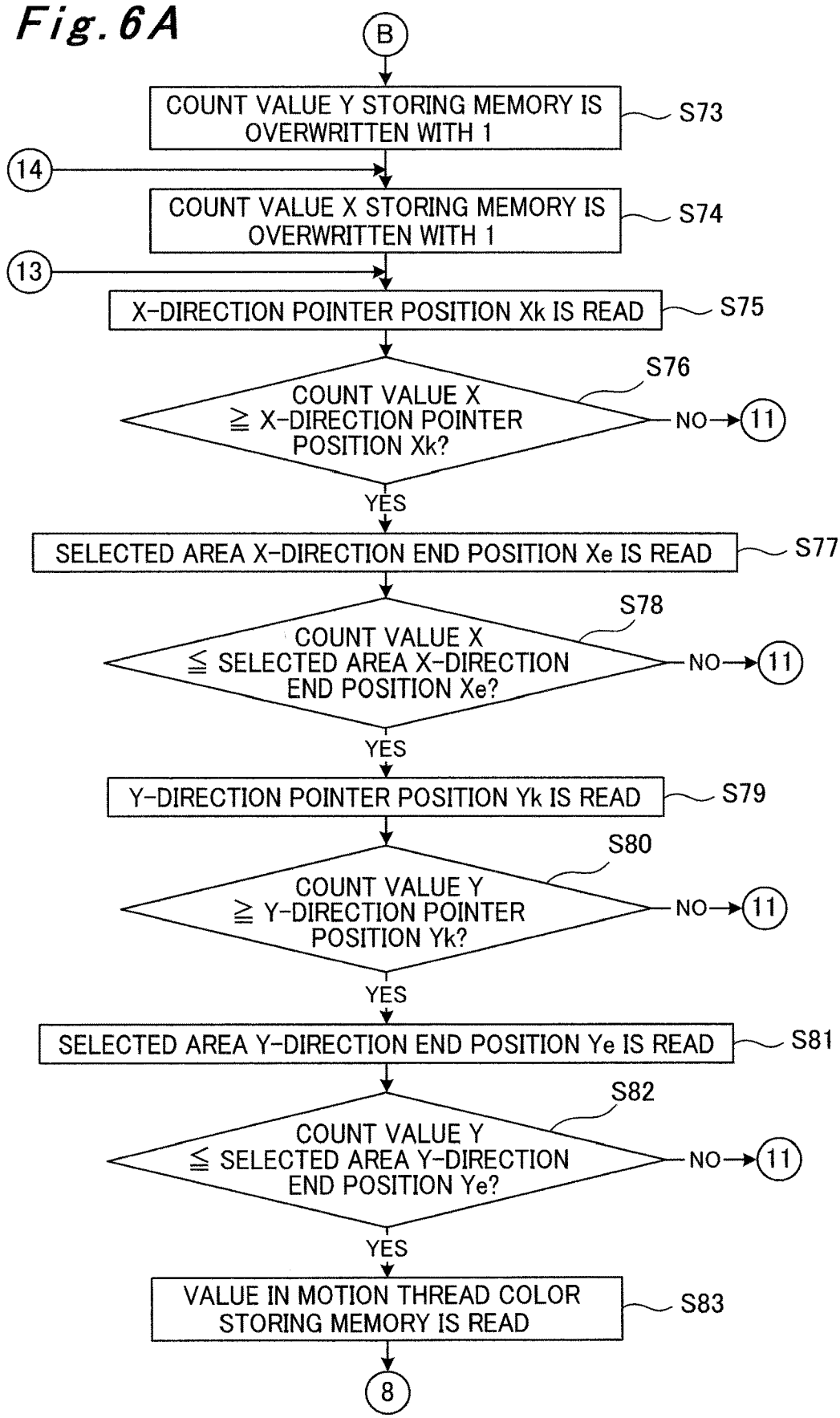
FIG. 6A is a flowchart that illustrates the operations of the print quality inspection apparatus according to the first embodiment of the present invention.
Figure 6B:
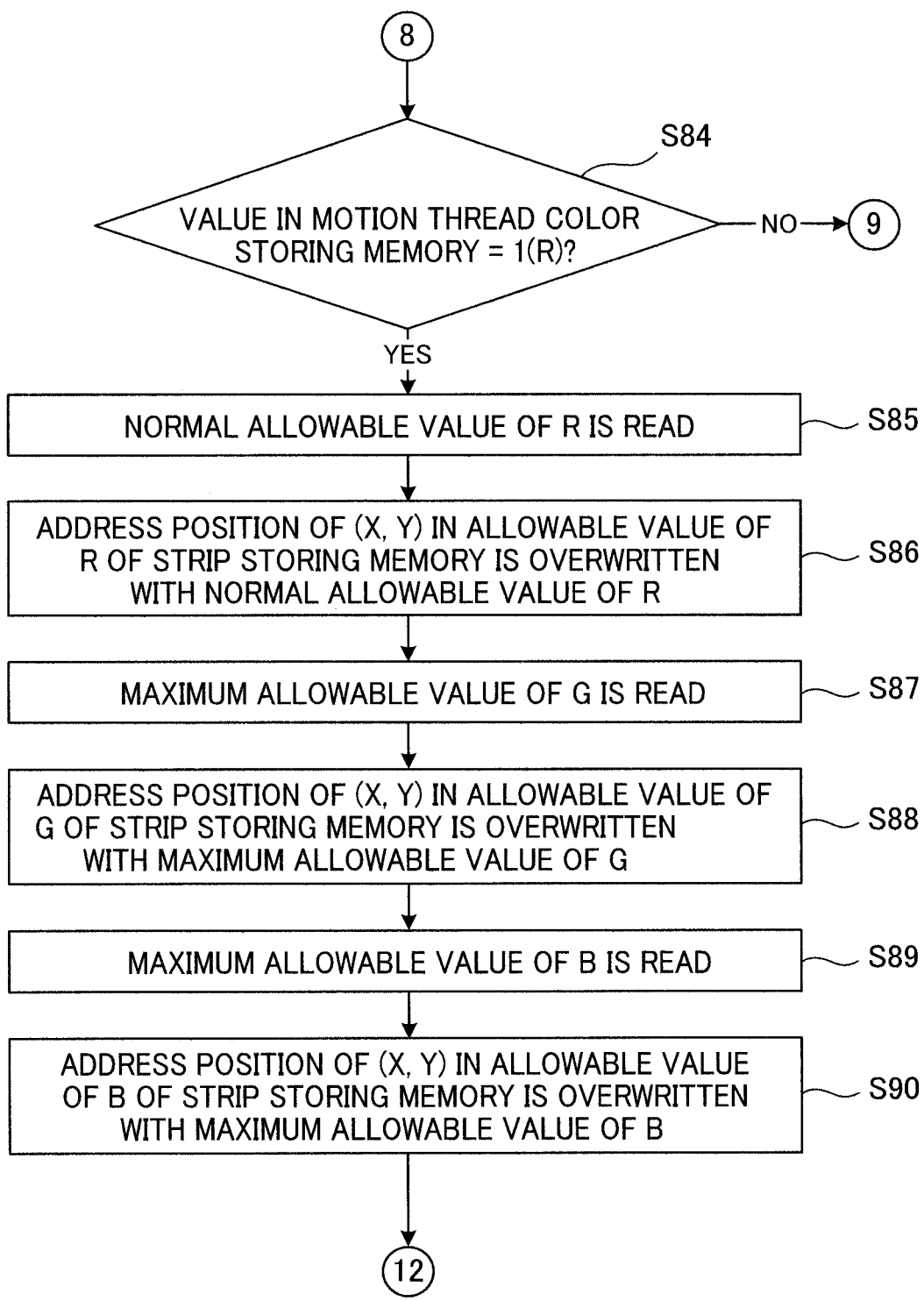
FIG. 6B is a flowchart that illustrates the operations of the print quality inspection apparatus according to the first embodiment of the present invention.
Figure 6C:
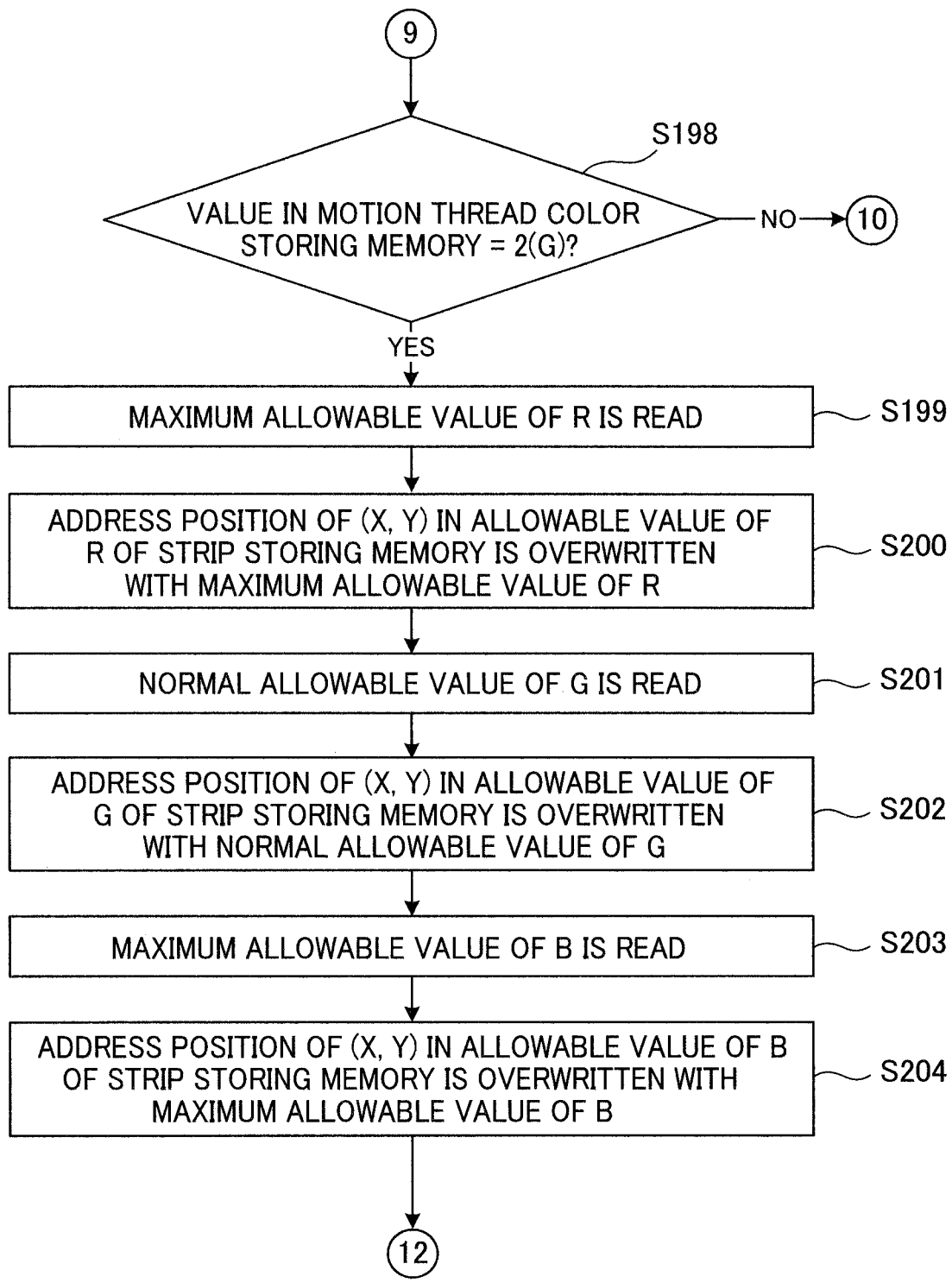
FIG. 6C is a flowchart that illustrates the operations of the print quality inspection apparatus according to the first embodiment of the present invention.
Figure 6D:
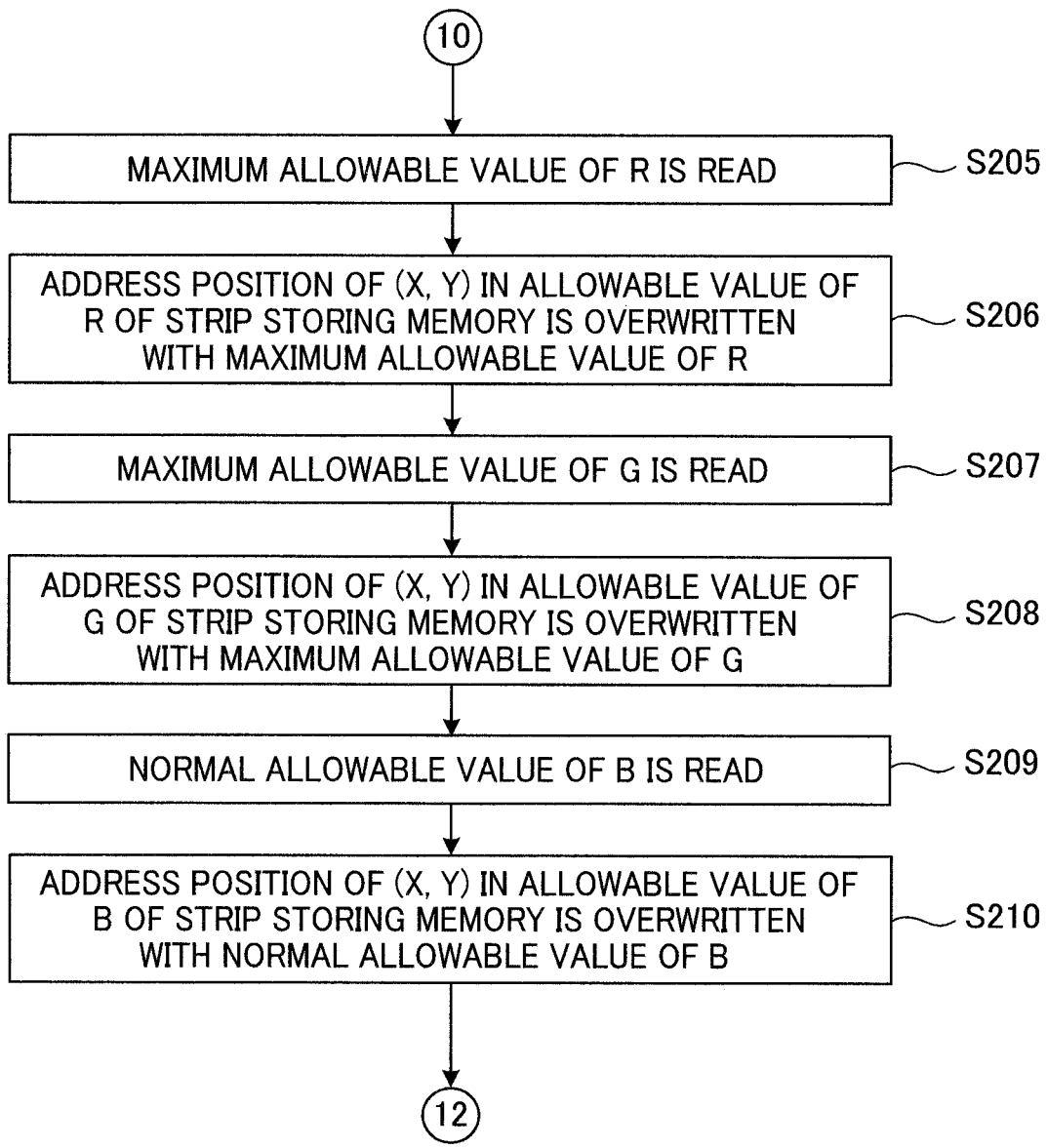
FIG. 6D is a flowchart that illustrates the operations of the print quality inspection apparatus according to the first embodiment of the present invention.
Figure 6E:
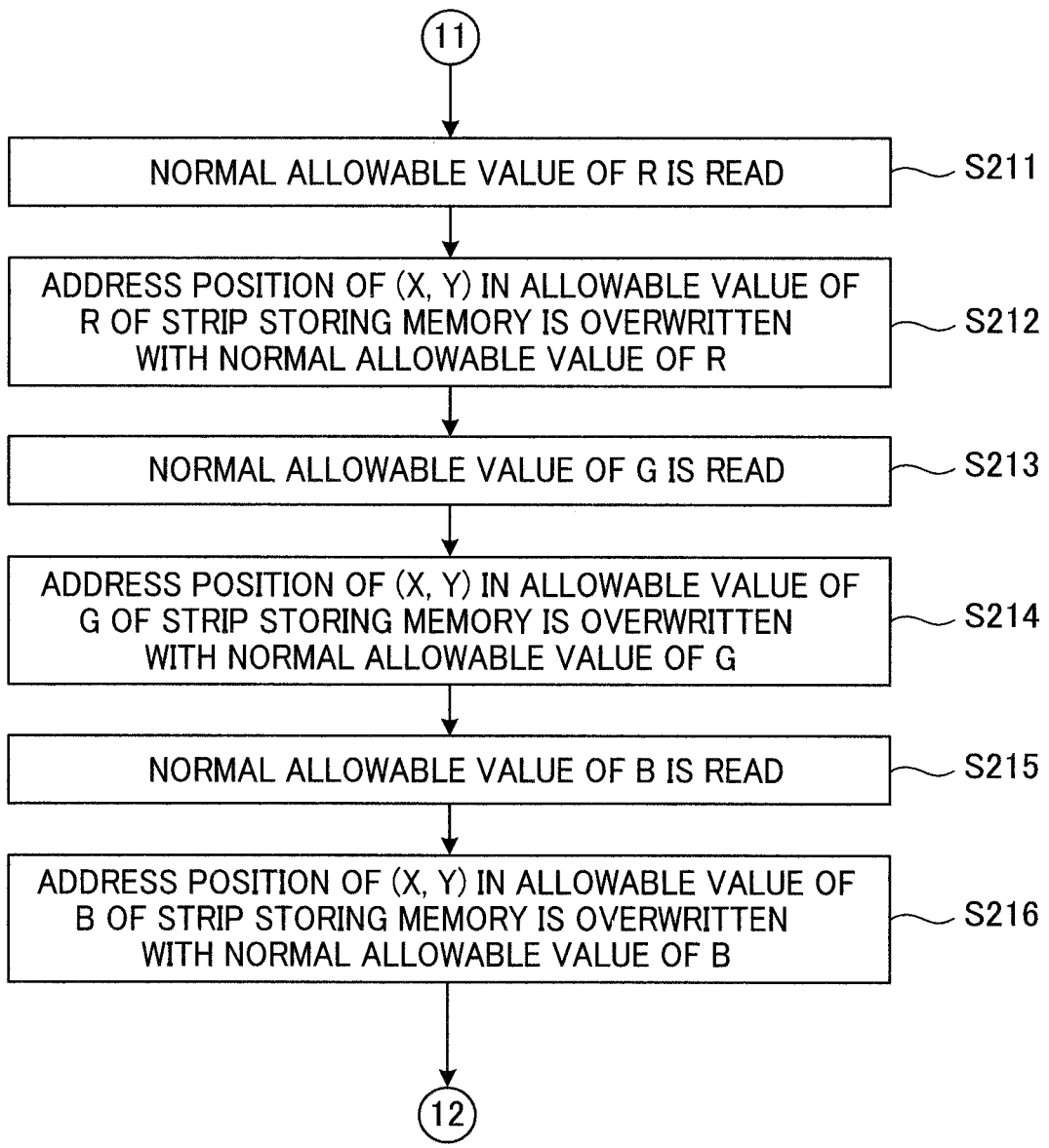
FIG. 6E is a flowchart that illustrates the operations of the print quality inspection apparatus according to the first embodiment of the present invention.
Figure 6F:
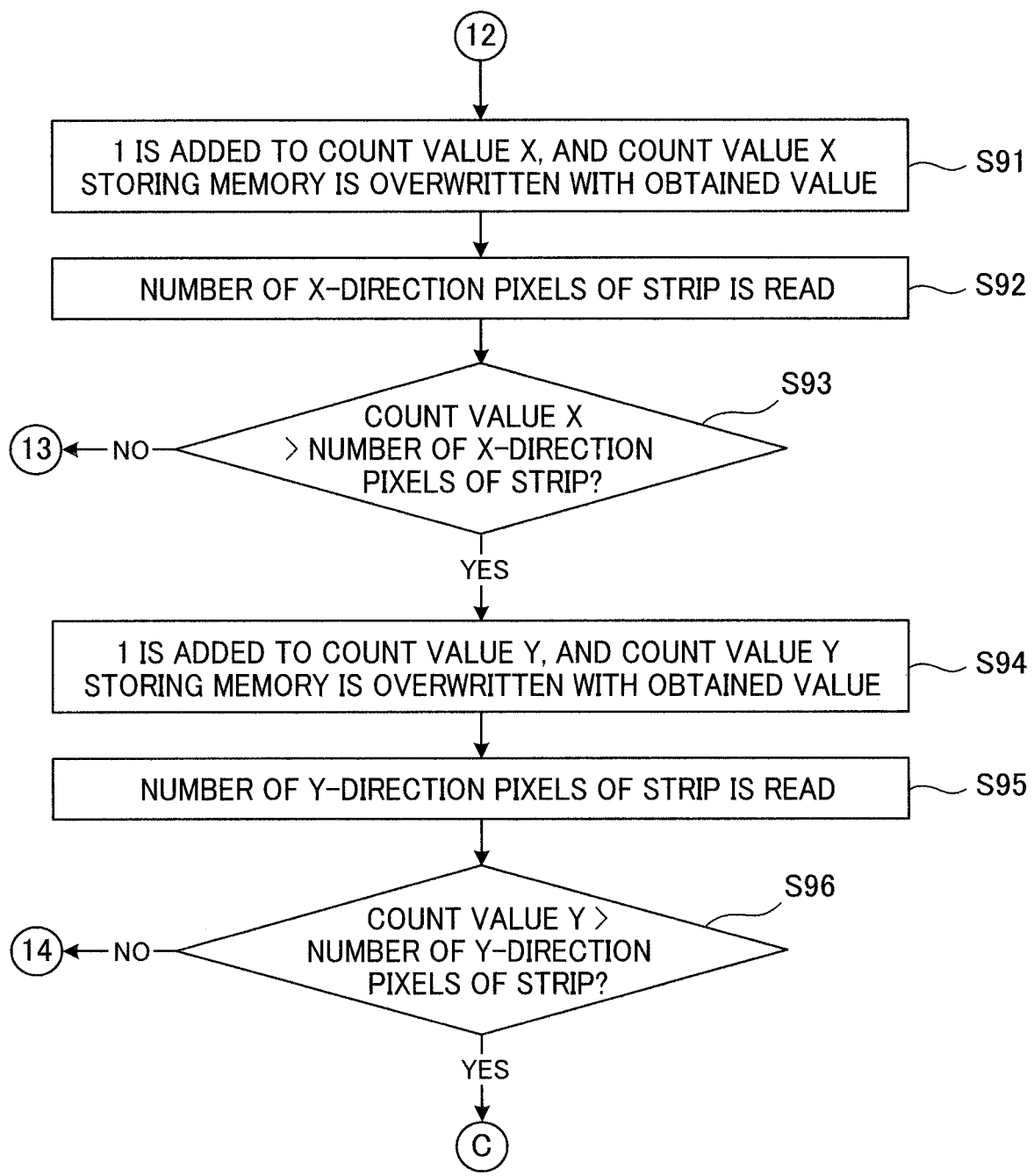
FIG. 6F is a flowchart that illustrates the operations of the print quality inspection apparatus according to the first embodiment of the present invention.
Figure 7A:
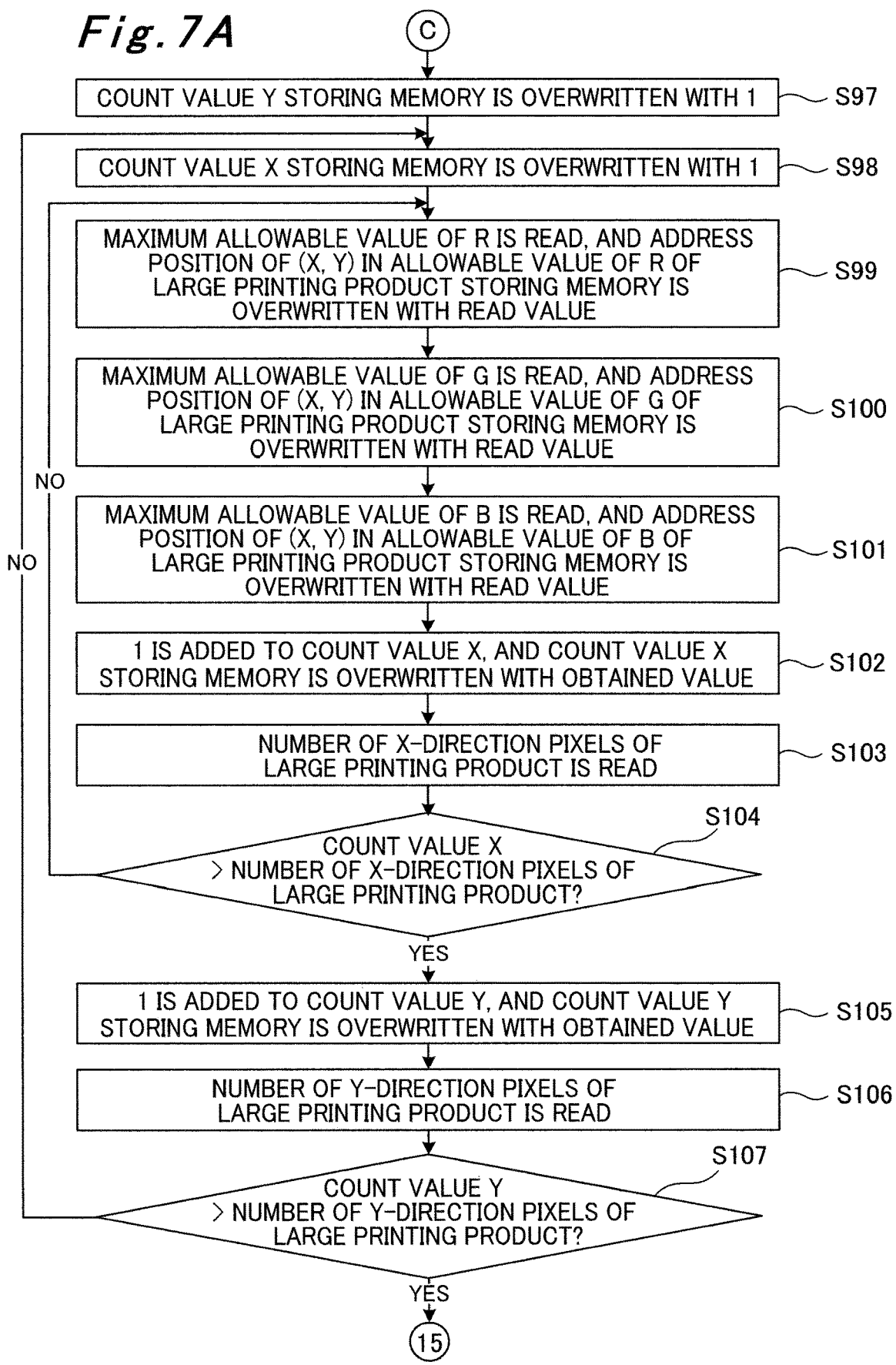
FIG. 7A is a flowchart that illustrates the operations of the print quality inspection apparatus according to the first embodiment of the present invention.
Figure 7B:
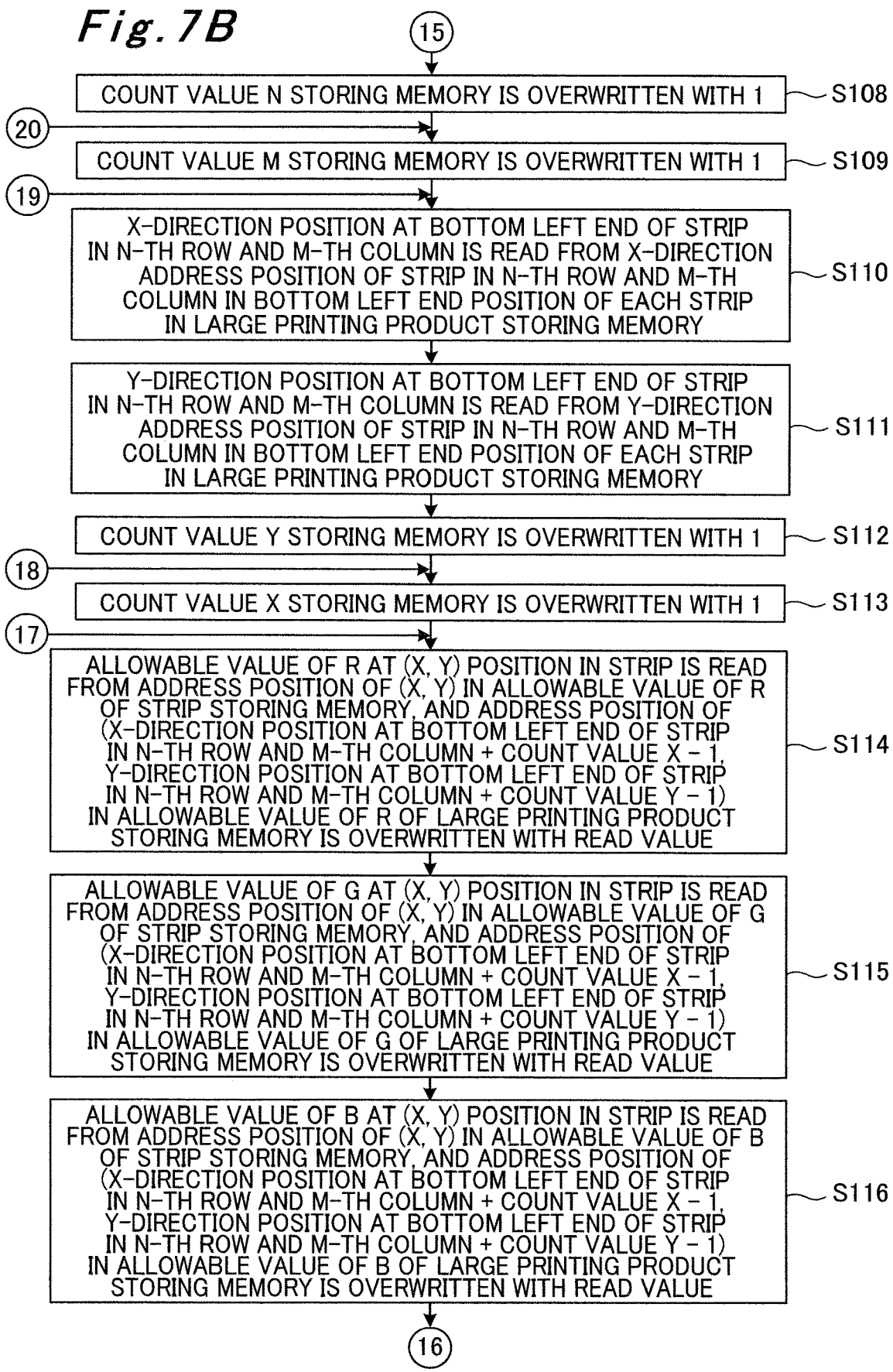
FIG. 7B is a flowchart that illustrates the operations of the print quality inspection apparatus according to the first embodiment of the present invention.
Figure 7C:
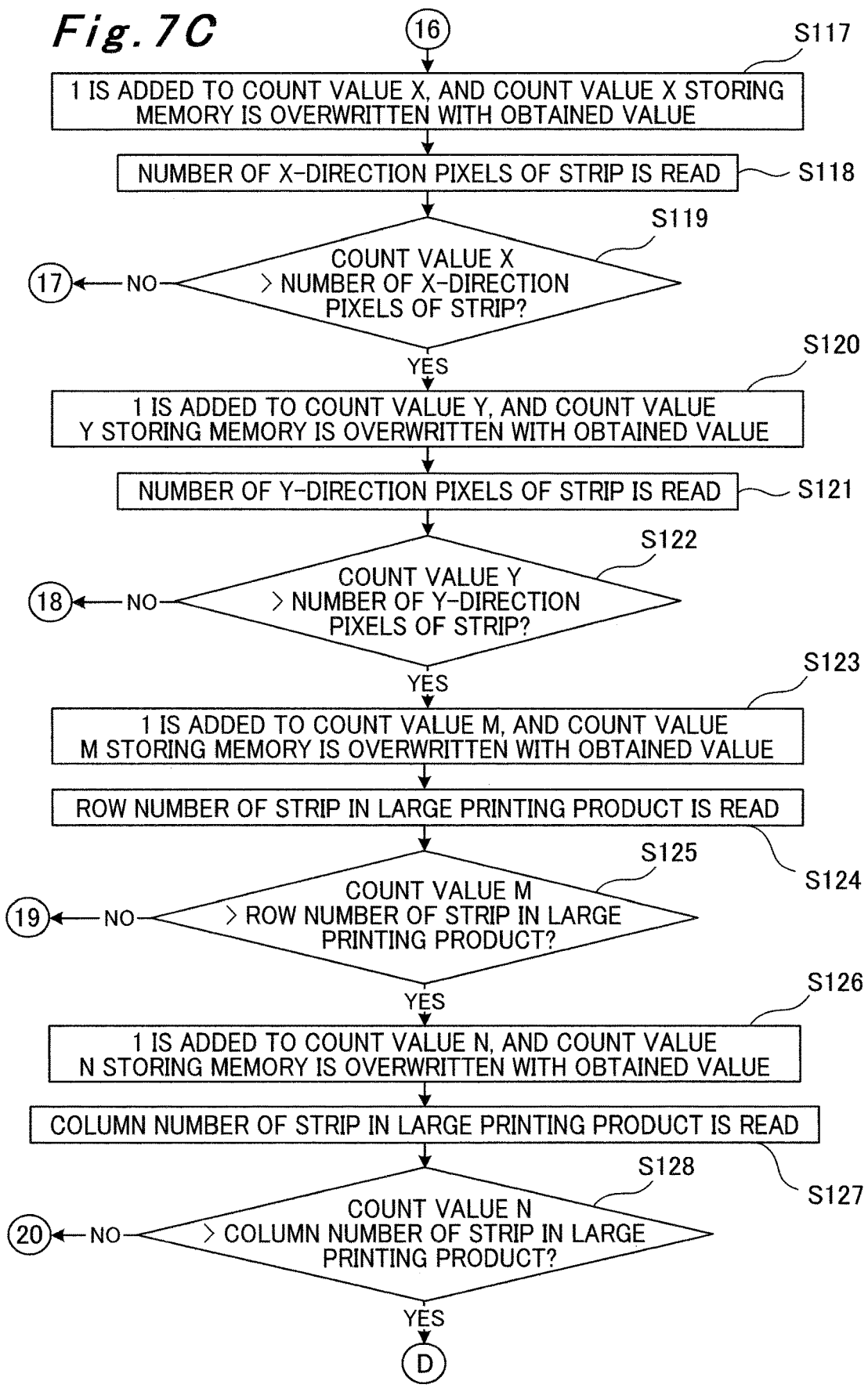
FIG. 7C is a flowchart that illustrates the operations of the print quality inspection apparatus according to the first embodiment of the present invention.
Figure 8A:
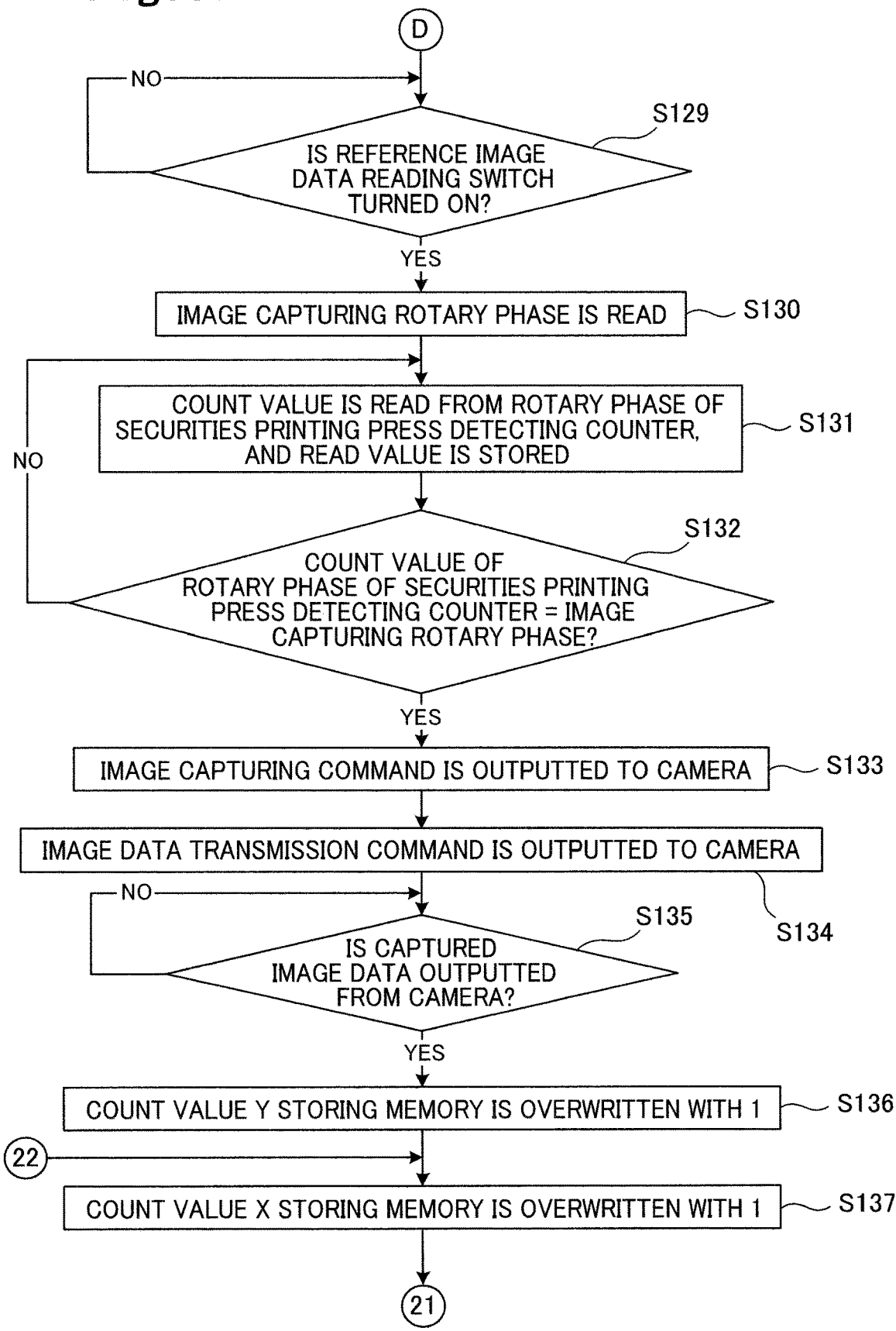
FIG. 8A is a flowchart that illustrates the operations of the print quality inspection apparatus according to the first embodiment of the present invention.
Figure 8B:
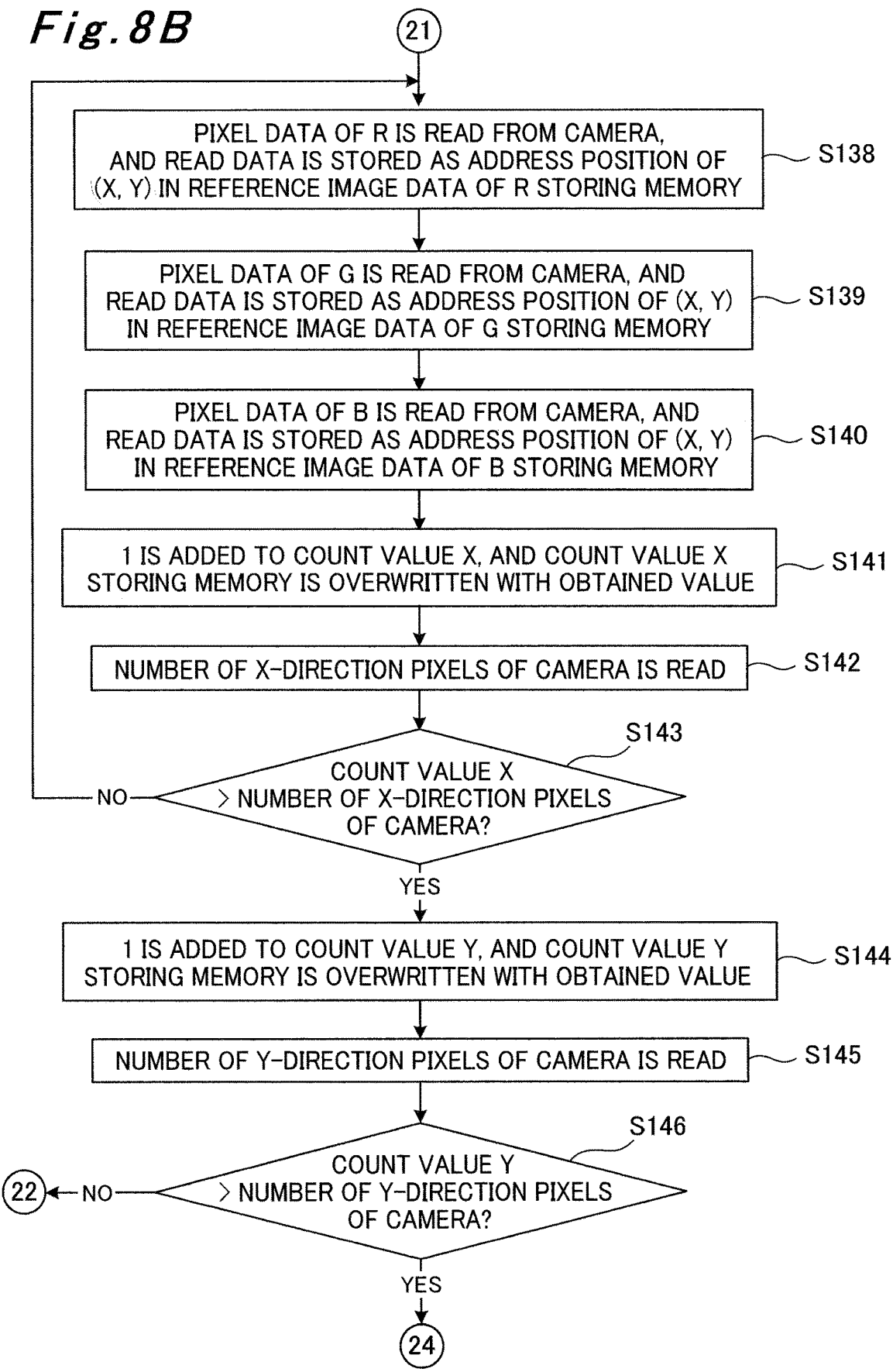
FIG. 8B is a flowchart that illustrates the operations of the print quality inspection apparatus according to the first embodiment of the present invention.
Figure 8C:
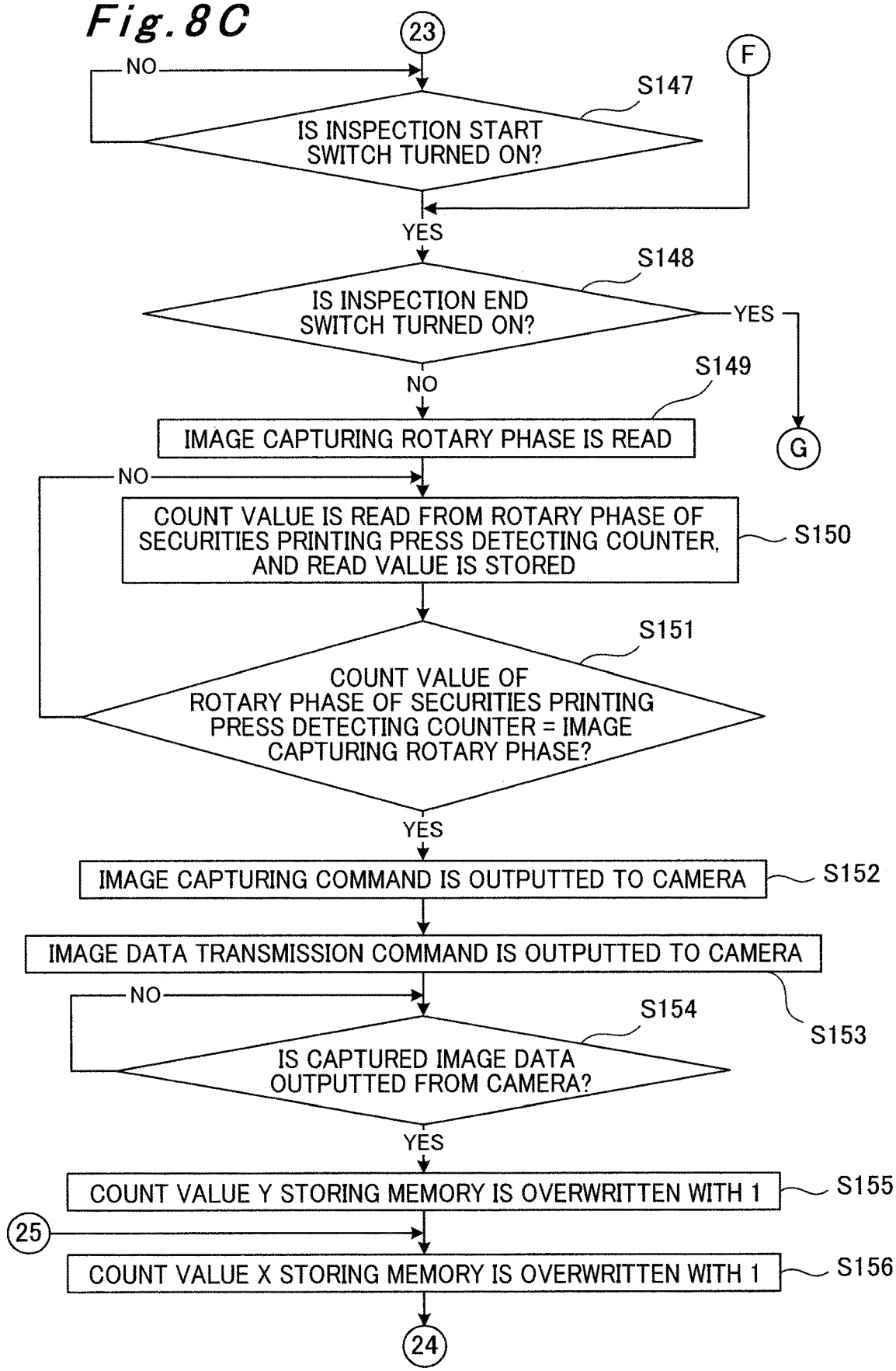
FIG. 8C is a flowchart that illustrates the operations of the print quality inspection apparatus according to the first embodiment of the present invention.
Figure 8D:
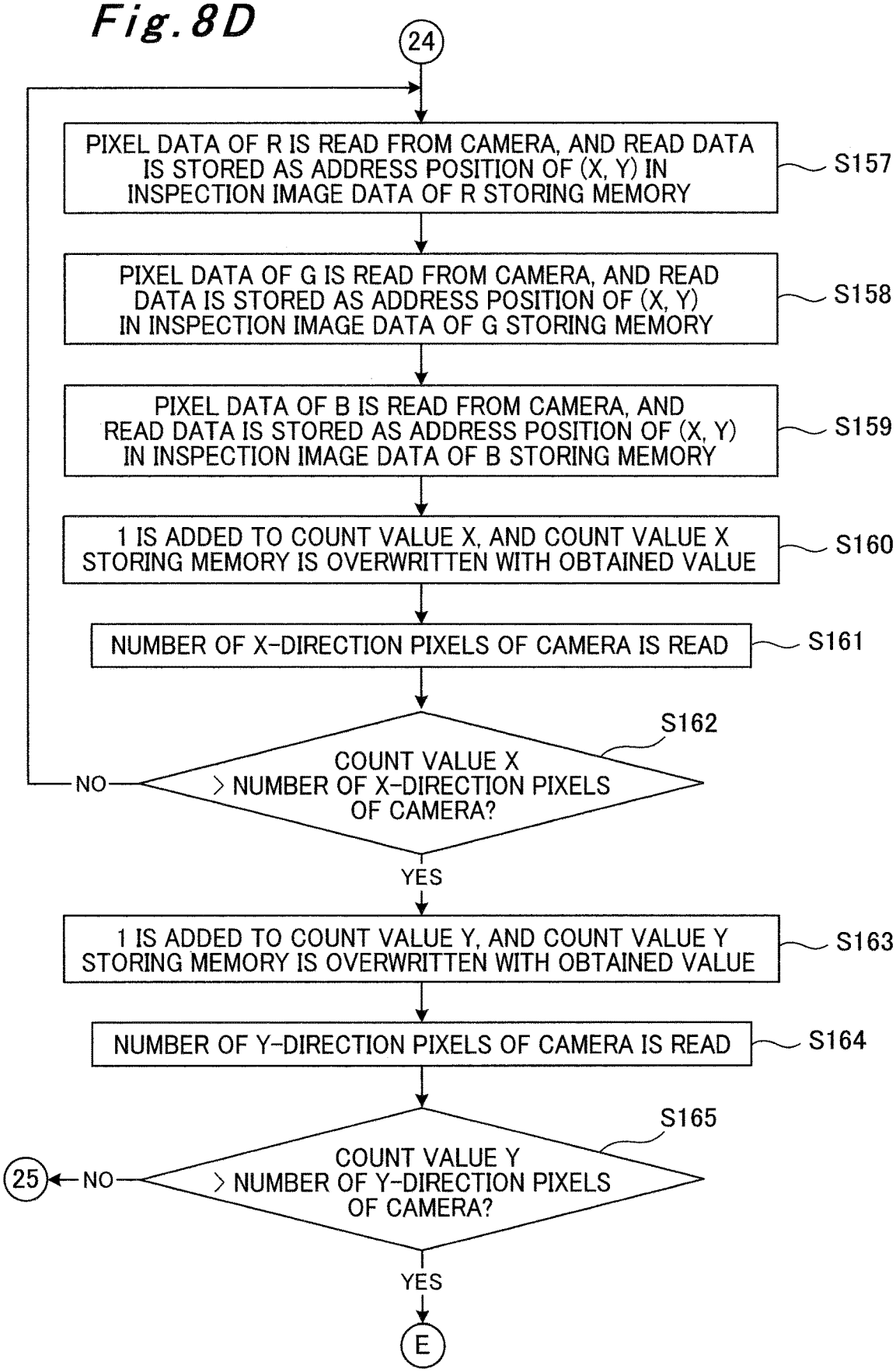
FIG. 8D is a flowchart that illustrates the operations of the print quality inspection apparatus according to the first embodiment of the present invention.
Figure 9A:
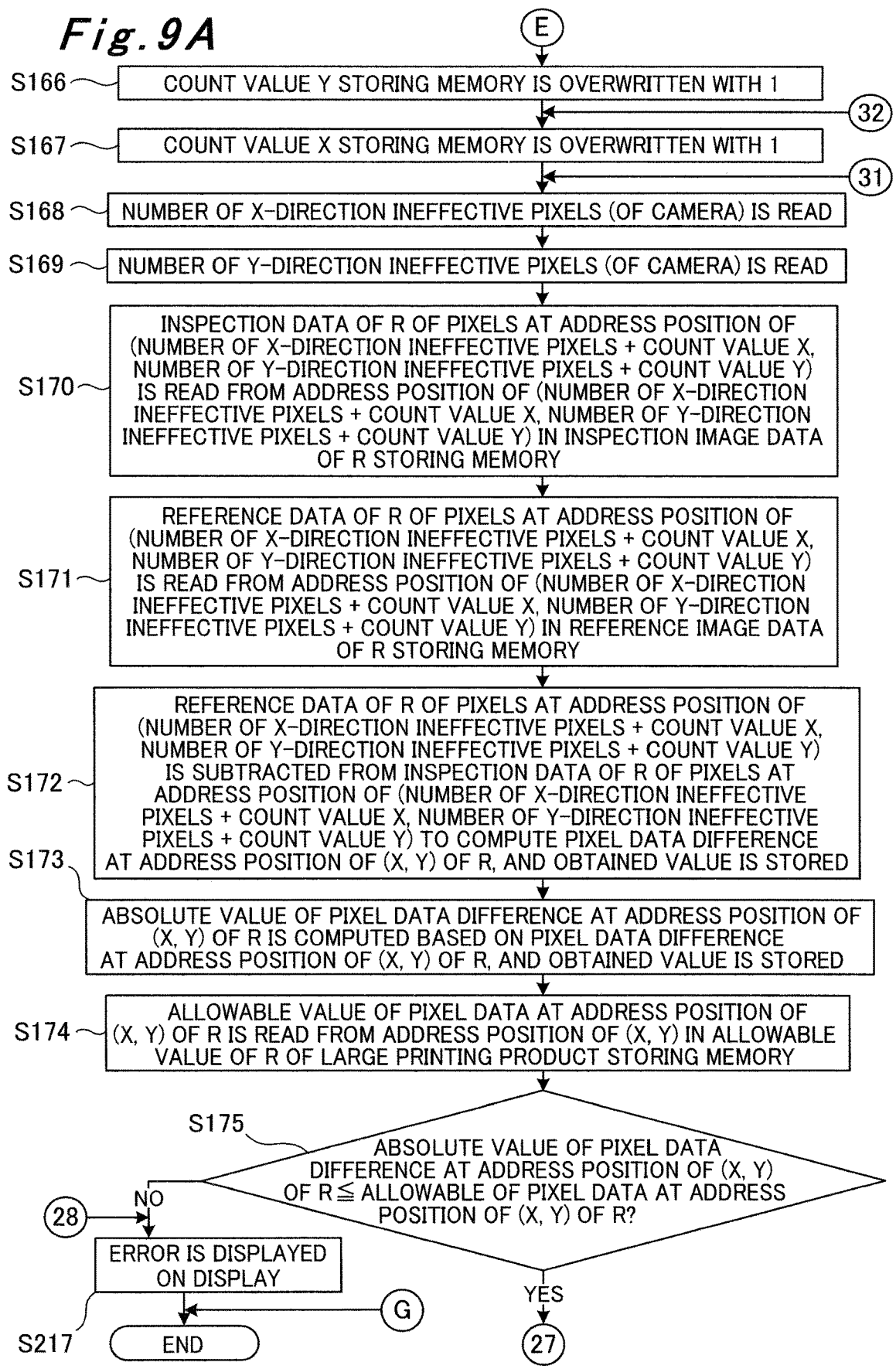
FIG. 9A is a flowchart that illustrates the operations of the print quality inspection apparatus according to the first embodiment of the present invention.
Figure 9B:
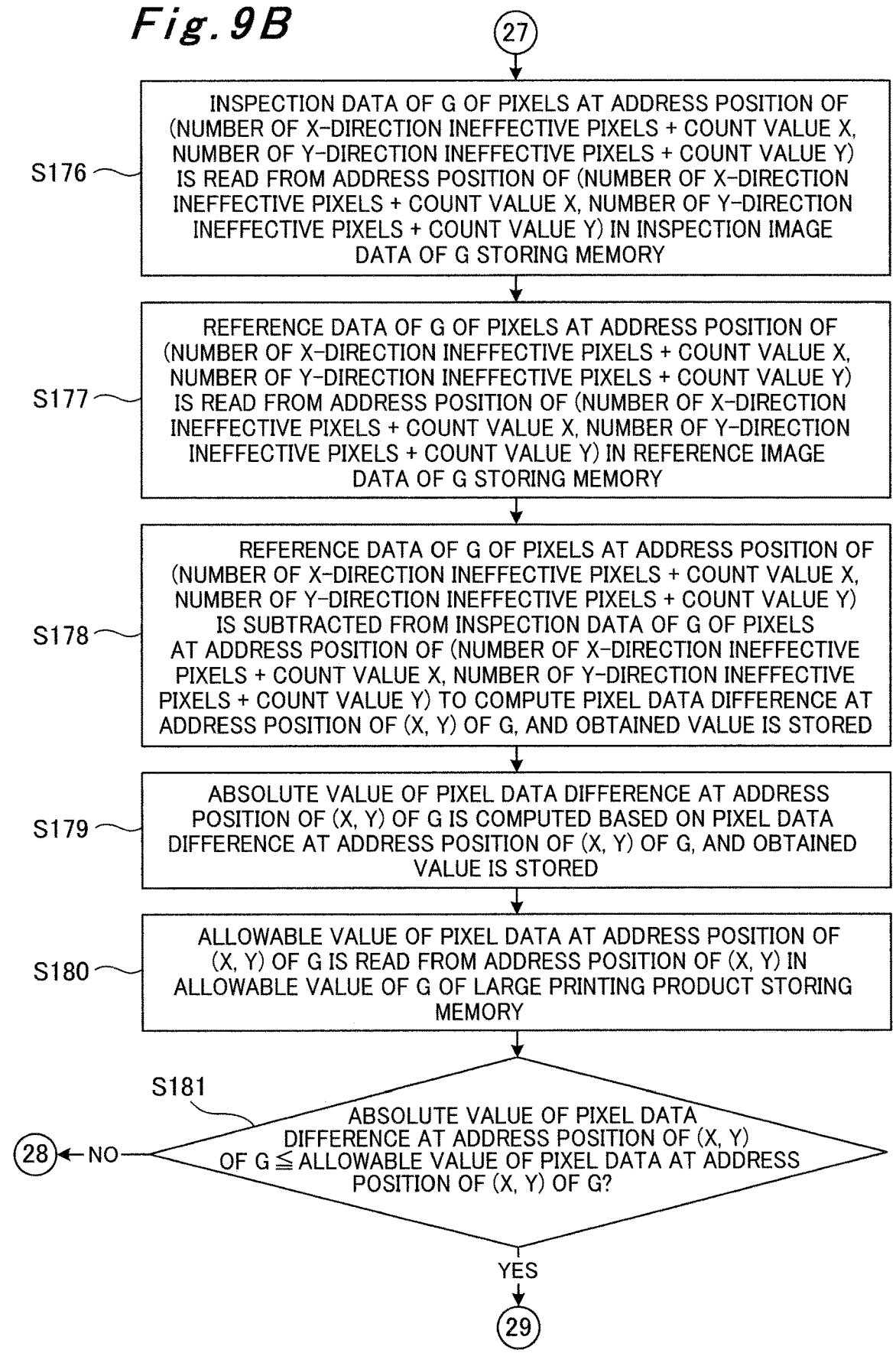
FIG. 9B is a flowchart that illustrates the operations of the print quality inspection apparatus according to the first embodiment of the present invention.
Figure 9C:
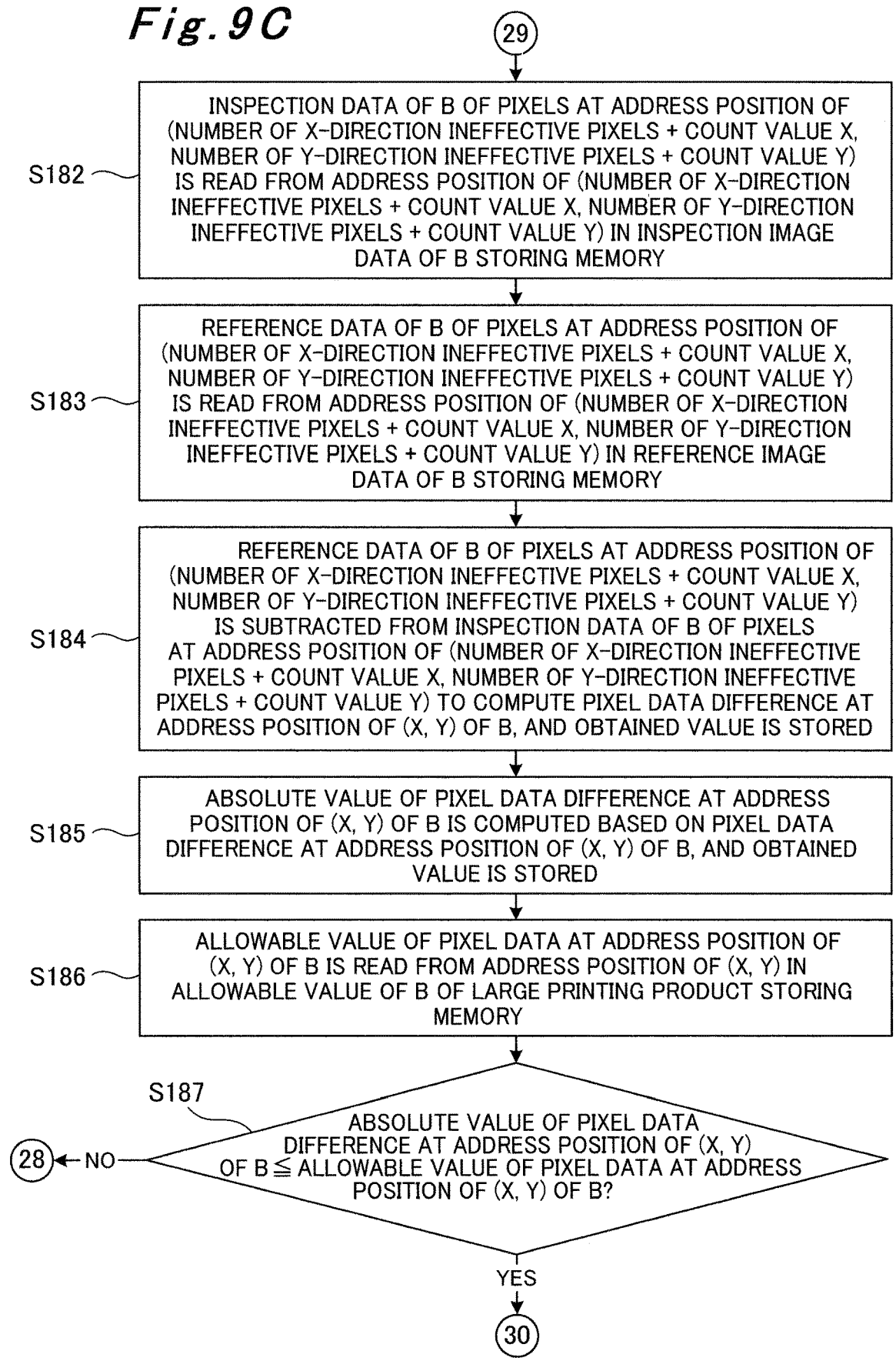
FIG. 9C is a flowchart that illustrates the operations of the print quality inspection apparatus according to the first embodiment of the present invention.
Figure 9D:
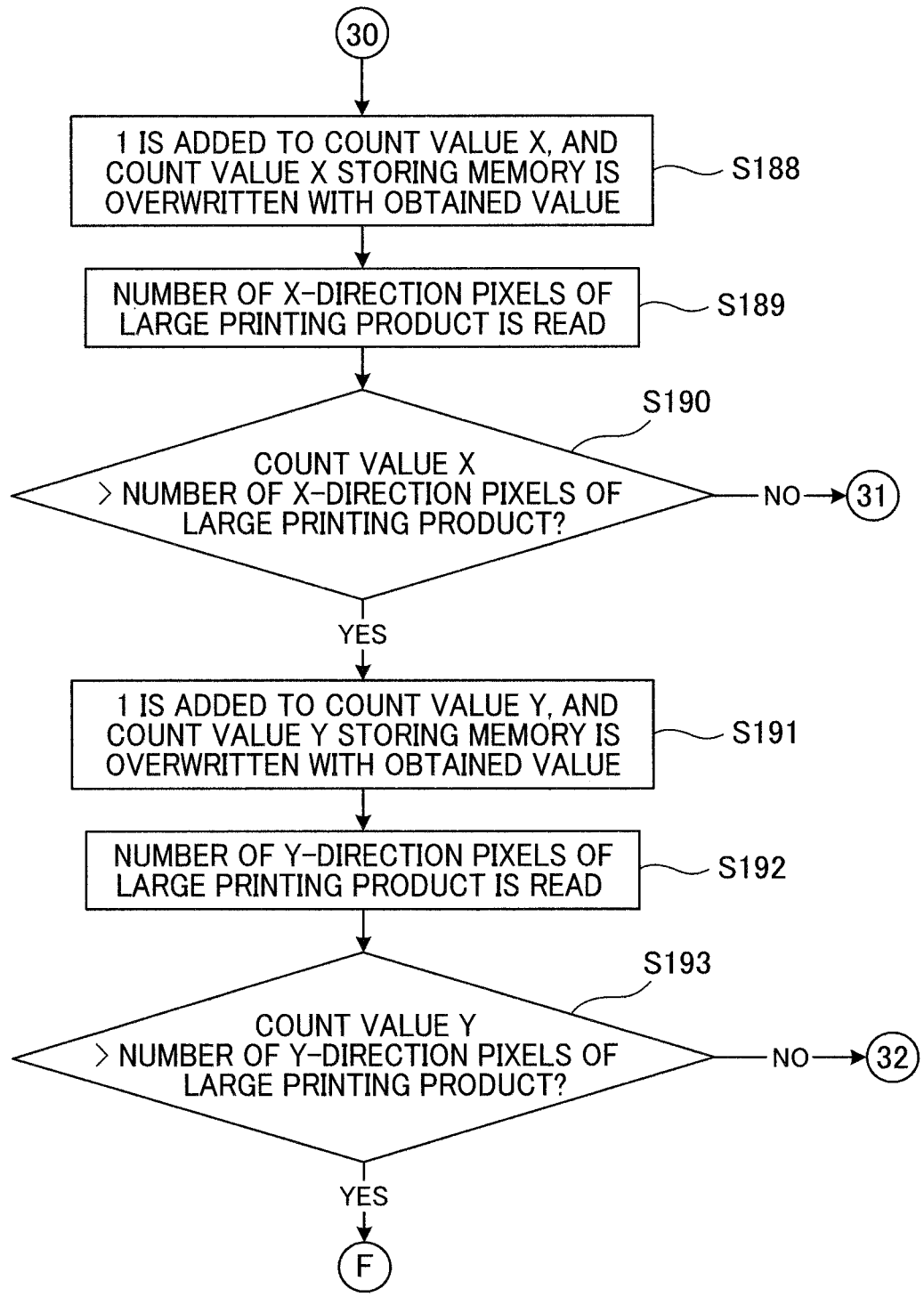
FIG. 9D is a flowchart that illustrates the operations of the print quality inspection apparatus according to the first embodiment of the present invention.

As illustrated in FIG. 2, above an impression cylinder 8 facing a coater cylinder 7 in the coating unit 4 and on a downstream side in a transporting direction of a contact point of the coater cylinder 7 and the impression cylinder 8, a color camera (hereinafter, camera) 34 as an image capturing device for capturing an RGB (Red, Green, and Blue) image of the large printing product 1 held by the impression cylinder 8, and multiple illuminators 35 that emit visible light onto the region where an image thereof is captured by the camera 34 are arranged. In this embodiment, the illuminators 35 are respectively provided on an upstream side and the downstream side in the transporting direction of an optical axis of the camera 34.

The image captured by the camera 34 is transmitted to a print quality inspection unit 10 illustrated in FIGS. 3A to 3D.

As illustrated in FIGS. 3A to 3D, the print quality inspection unit 10 includes a CPU 11, a ROM 12, a RAM 13, and input/output devices 14 to 19 connected with each other by a BUS line.

A motion thread color storing memory M11, a count value Y storing memory M12, a count value X storing memory M13, a pixel data of strip storing memory M14, a number of X-direction pixels of strip storing memory M15, a number of Y-direction pixels of strip storing memory M16, and a pointer position storing memory M17 are connected to the BUS line.

In addition, a mouse dragged distance storing memory M18, a selected area end position storing memory M19, a normal allowable value of R storing memory M20, a normal allowable value of G storing memory M21, a normal allowable value of B storing memory M22, a maximum allowable value of R storing memory M23, a maximum allowable value of G storing memory M24, a maximum allowable value of B storing memory M25, an allowable value of R of strip storing memory M26, an allowable value of G of strip storing memory M27, and an allowable value of B of strip storing memory M28 are connected to the BUS line.

Moreover, an allowable value of R of large printing product storing memory M29, an allowable value of G of large printing product storing memory M30, an allowable value of B of large printing product storing memory M31, a number of X-direction pixels of large printing product storing memory M32, a number of Y-direction pixels of large printing product storing memory M33, a count value N storing memory M34, a count value M storing memory M35, a bottom left end position of each strip in large printing product storing memory M36, a row number of strip in large printing product storing memory M37, and a column number of strip in large printing product storing memory M38 are connected to the BUS line.

Furthermore, an image capturing rotary phase storing memory M39, a count value of rotary phase of securities printing press detecting counter storing memory M40, a reference image data of R storing memory M41, a reference image data of G storing memory M42, a reference image data of B storing memory M43, a number of X-direction pixels of camera storing memory M44, a number of Y-direction pixels of camera storing memory M45, an inspection image data of R storing memory M46, an inspection image data of G storing memory M47, and an inspection image data of B storing memory M48 are connected to the BUS line.

In addition, a number of X-direction ineffective pixels (of camera) storing memory M49, a number of Y-direction ineffective pixels (of camera) storing memory M50, a pixel data difference at address position of (X, Y) of R storing memory M51, an absolute value of pixel data difference at address position of (X, Y) of R storing memory M52, a pixel data difference at address position of (X, Y) of G storing memory M53, an absolute value of pixel data difference at address position of (X, Y) of G storing memory M54, a pixel data difference at address position of (X, Y) of B storing memory M55, and an absolute value of pixel data difference at address position of (X, Y) of B storing memory M56 are connected to the BUS line.

Moreover, an input device 21 such as a keyboard and any kind of switch or button, a display 22 such as a CRT and a lamp, an output device 23 such as a printer, and a CD drive 24 are connected to the input/output device 14. As illustrated in FIG. 12, the display 22 includes a strip image display portion 22a for displaying an image of the strip read from the CD drive 24 and an image of the strip captured by the camera 34, and a large printing product display portion 22b for displaying an image of the large printing product 1 captured by the camera 34.

Furthermore, an R button 25, a G button 26, a B button 27, a motion thread color setting completion switch 28, a selected area confirmation switch 29, a reference image data reading switch 30, an inspection start switch 31, and an inspection end switch 32 are connected to the input/output device 15.

The R button 25, the G button 26, and the B button 27 are buttons for respectively setting the hue (red, green, blue) of the color of the motion thread 1b. That is, the R button 25 is turned on when the color of the motion thread 1b is the red hue, the G button 26 is turned on when the color of the motion thread 1b is the green hue, and the B button 27 is turned on when the color of the motion thread 1b is the blue hue. In conjunction with turning on any one of the buttons, the other two buttons are turned off.

The motion thread color setting completion switch 28 is a switch for inputting completion of color setting of the motion thread 1b done by manipulating the R button 25, the G button 26, or the B button 27. The selected area confirmation switch 29 is a switch for inputting confirmation of the later-described motion thread area A. The reference image data reading switch is a switch for inputting start of reading of the later-described reference image data. The inspection start switch 31 and the inspection end switch 32 are switches for inputting start and end of the print quality inspection, respectively.

A mouse 33 is connected to the input/output device 16.

In addition, the camera 34 is connected to the input/output devices 17 and 18. The input/output device 18 transmits an image capturing command and an image data transmission command to the camera 34, and the captured image data captured by the camera 34 is outputted to the input/output device 17.

A rotary phase of securities printing press detecting counter 36 is connected to the input/output device 19, and this rotary phase of securities printing press detecting counter 36 is connected to a rotary encoder for securities printing press drive motor 37. In this case, the rotary encoder for securities printing press drive motor 37 is, for example, directly attached on a rear end portion of an output shaft of the unillustrated securities printing press drive motor, so as to make one revolution every time the printing units 3A to 3F perform printing on the single large printing product 1, output a zero pulse in every revolution to reset the rotary phase of securities printing press detecting counter 36, and output a clock pulse to the rotary phase of securities printing press detecting counter 36 every time the securities printing press drive motor revolves at a predetermined angle.

Hereinafter, processing by the print quality inspection unit 10 is described in accordance with operation flows illustrated in FIGS. 4A to 4C, FIGS. 5A to 5E, FIGS. 6A to 6F, FIGS. 7A to 7C, FIGS. 8A to 8D, and FIGS. 9A to 9D.

Figure 10:
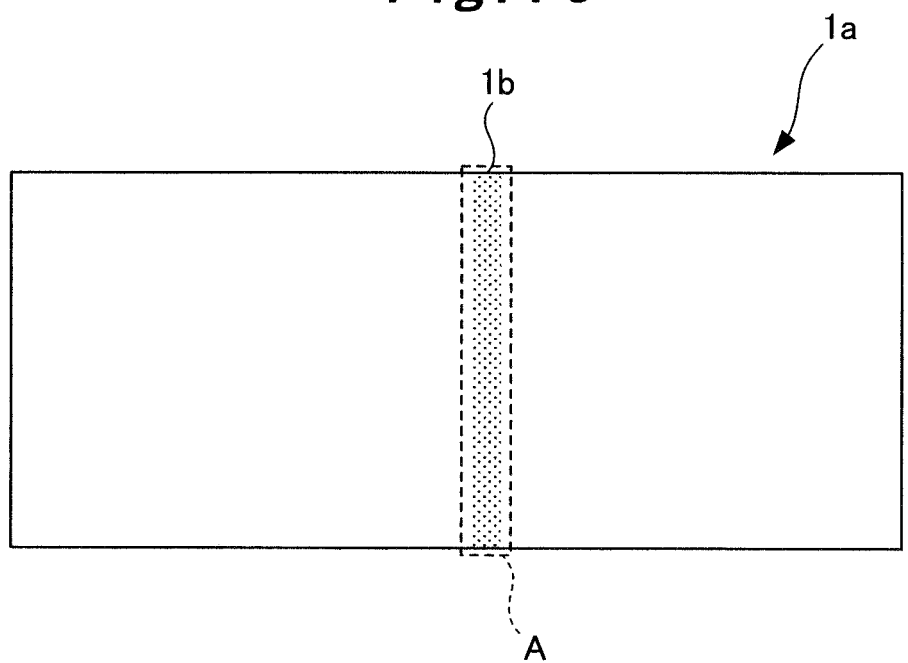
FIG. 10 is a schematic diagram that illustrates an example of a strip provided with a lenticular lens.

The processing by the print quality inspection unit 10 in this embodiment is simply described. In the print quality inspection unit 10, in a first process, the hue of the color of the motion thread 1b (color of pattern under lenticular lens) provided on the strip 1a as illustrated in FIG. 10 is firstly inputted (steps S1 to S3 and S194 to S197). In this embodiment, 1 (R) is inputted when the color of the motion thread 1b is the red hue, 2 (G) is inputted when the color of the motion thread 1b is the green hue, and 3 (B) is inputted when the color of the motion thread 1b is the blue hue.

Next, in a second process, an image of the normally printed strip 1a obtained in advance is inputted and stored to be displayed on the display 22 (steps S4 to S21).

Next, in a third process, on the image of the strip 1a that is displayed on the display 22 in the second process, the area A surrounding the motion thread 1b (that is an area surrounded by a broken line in FIG. 10; hereinafter, referred to as a motion thread area) is specified by clicking and dragging the mouse 33, and a mark (line) indicating the motion thread area A is displayed on the display 22 (steps S22 to S72). A line indicating the periphery of the motion thread area A is thus displayed.

Next, in a fourth process, based on the color of the motion thread 1b inputted in the first process and the motion thread area A on the strip 1a specified in the third process, allowable values regarding the print quality inspection of each of the RGB of each pixel in the strip 1a (allowable values for determining whether a print is normal (OK) or abnormal (NG)) are set (steps S73 to S96 and S198 to S216).

Next, in a fifth process, the allowable values regarding the print quality inspection of the RGB of the pixels in the strip 1a set in the fourth process are extended for each strip 1a in the large printing product 1, and allowable values of each of the RGB of each pixel in the large printing product 1 are set (steps S97 to S128). Since arrangement of the strips 1a in the large printing product 1 is already known, this is used for setting allowable values that respectively correspond to the motion thread area A and an area outside the motion thread area A in each strip 1a. Once the allowable values of the RGB of the pixels in the large printing product 1 are set, the reference image data reading switch 30 is turned on by the worker.

Next, in a sixth process, an image of the large printing product 1 printed by the securities printing press 100 is captured by the camera 34, and the image of the normally printed large printing product 1 is stored as a reference image (steps S129 to S146). Once the reference image is stored, the inspection start switch 31 is turned on by the worker.

Next, in a seventh process, an image of the large printing product 1 printed by the securities printing press 100 is captured by the camera 34, and the obtained image is stored as an inspection image (steps S147 to S165).

Next, in an eighth process, the image data of each of the RGB of the pixels of the inspection image captured in the seventh process and the image data of each of the RGB of the corresponding pixels of the reference image stored in the sixth process are compared, and differences of the RGB of the pixels between the inspection image and the reference image are obtained. In a ninth process, the differences of the RGB of the pixels between the inspection image and the reference image obtained in the eighth process and the allowable values of the RGB of the pixels in the large printing product set in the fifth process are compared, and OK/NG is determined (steps S166 to S193 and S217).

The abovementioned processes are described in detail below. First, in step S1, when the R button 25 is turned on (YES), the motion thread color storing memory M11 is overwritten with 1 (R) in step S2 and the process proceeds to step S3, and when the R button 25 is turned off (NO), the process proceeds to step S194. In step S194, when the G button 26 is turned on (YES), the motion thread color storing memory M11 is overwritten with 2 (G) in step S195 and the process proceeds to step S3, and when the G button 26 is turned off (NO), the process proceeds to step S196. In step S196, when the B button 27 is turned on (YES), the motion thread color storing memory M11 is overwritten with 3 (B) in step S197 and the process proceeds to step S3, and when the B button is turned off (NO), the process proceeds to step S3.

In step S3, when the motion thread color setting completion switch 28 is turned off (NO), the process returns to step S1, and when the motion thread color setting completion switch 28 is turned on (YES), the process proceeds to step S4.

In step S4, the count value Y storing memory M12 is overwritten with 1. Subsequently, in step S5, the count value X storing memory M13 is overwritten with 1. In step S6, pixel data (RGB) at an address position of (X, Y) of the strip 1a is read from the CD drive 24, and the address position of (X, Y) in the pixel data of strip storing memory M14 is overwritten with the read data.

Subsequently, in step S7, 1 is added to a count value X, and the count value X storing memory M13 is overwritten with the obtained value. In step S8, the number of X-direction pixels of the strip 1a is read from the memory M15. In step S9, when the count value X is equal to or smaller than the number of the X-direction pixels of the strip 1a (NO), the process returns to step S6, and when the count value X is greater than the number of the X-direction pixels of the strip 1a (YES), 1 is added to a count value Y and the count value Y storing memory M12 is overwritten with the obtained value in step S10.

Following step S10, the number of Y-direction pixels of the strip 1a is read from the memory M16 in step S11. In step S12, when the count value Y is equal to or smaller than the number of the Y-direction pixels of the strip 1a (NO), the process returns to step S5, and when the count value Y is greater than the number of the Y-direction pixels of the strip 1a (YES), the process proceeds to step S13.

In step S13, the count value Y storing memory M12 is overwritten with 1. Subsequently, in step S14, the count value X storing memory M13 is overwritten with 1. In step S15, the pixel data (RGB) at the address (X, Y) position of the strip 1a is read from the address position of (X, Y) in the pixel data of strip storing memory M14, and the read data is displayed at the address position of (X, Y) on the strip image display portion 22a of the display 22. Subsequently, in step S16, 1 is added to the count value X, and the count value X storing memory M13 is overwritten with the obtained value. In step S17, the number of the X-direction pixels of the strip 1a is read from the memory M15.

Subsequently, in step S18, when the count value X is equal to or smaller than the number of the X-direction pixels of the strip 1a (NO), the process returns to step S15, and when the count value X is greater than the number of the X-direction pixels of the strip 1a (YES), 1 is added to the count value Y and the count value Y storing memory M12 is overwritten with the obtained value in step S19. In step S20, the number of the Y-direction pixels of the strip 1a is read from the memory M16.

Subsequently, in step S21, when the count value Y is equal to or smaller than the number of the Y-direction pixels of the strip 1a (NO), the process returns to step S14, and when the count value Y is greater than the number of the Y-direction pixels of the strip 1a (YES), the process proceeds to step S22.

In step S22, whether a mouse pointer is turned on is determined. When the mouse pointer is turned off (NO), the processing of step S22 is repeated. When the mouse pointer is turned on (YES), the process proceeds to step S23.

In step S23, a cursor position (Xk, Yk) on the strip image display portion 22a of the display 22 is read, and the read information is stored into the pointer position storing memory M17. Subsequently, in step S24, whether X-direction and Y-direction moved distance (Xd, Yd) is transmitted from the mouse 33 is determined. When the X-direction and Y-direction moved distance (Xd, Yd) is not transmitted from the mouse 33 (NO), the processing of step S24 is repeated. When the X-direction and Y-direction moved distance (Xd, Yd) is transmitted from the mouse 33 (YES), the process proceeds to step S25.

In step S25, mouse 33 dragged distance (Xd, Yd) is received from the mouse 33, and the received information is stored into the memory M18. Subsequently, in step S26, an X-direction pointer position Xk is read from the X-direction address position in the pointer position storing memory M17.

Subsequently, in step S27, the X-direction distance Xd for which the mouse 33 is dragged is read from the X-direction address position in the mouse 33 dragged distance storing memory M18. In step S28, the X-direction distance Xd for which the mouse 33 is dragged is added to the X-direction pointer position Xk to compute a selected area X-direction end position Xe, and the obtained position Xe is stored as the X-direction address position in the selected area end position storing memory M19.

Subsequently, in step S29, the Y-direction pointer position Yk is read from the Y-direction address position in the pointer position storing memory M17. In step S30, the Y-direction distance Yd for which the mouse 33 is dragged is read from the Y-direction address position in the mouse dragged distance storing memory M18.

Subsequently, in step S31, the Y-direction distance Yd for which the mouse 33 is dragged is added to the Y-direction pointer position Yk to compute a selected area Y-direction end position Ye, and the obtained position Ye is stored as the Y-direction address position in the selected area end position storing memory M19.

Following step S31, the X-direction pointer position Xk is read from the X-direction address position in the pointer position storing memory M17 in step S32. In step S33, the count value X storing memory M13 is overwritten with the X-direction pointer position Xk.

Subsequently, in step S34, the Y-direction pointer position Yk is read from the Y-direction address position in the pointer position storing memory M17. In step S35, the count value Y storing memory M12 is overwritten with the Y-direction pointer position Yk.

Subsequently, in step S36, the count value Y is read from the memory M12. In step S37, the count value X is read from the memory M13. In step S38, the mark indicating the selected area is displayed at the (X, Y) position on the strip image display portion 22a of the display 22.

Subsequently, in step S39, 1 is added to the count value X, and the count value X storing memory M13 is overwritten with the obtained value. In step S40, the selected area X-direction end position Xe is read from the X-direction address position in the selected area end position storing memory M19.

Subsequently, in step S41, when the count value X is equal to or smaller than the selected area X-direction end position Xe (NO), the process returns to step S36, and when the count value X is greater than the selected area X-direction end position Xe (YES), the process proceeds to step S42.

In step S42, the X-direction pointer position Xk is read from the X-direction address position in the pointer position storing memory M17. Subsequently, in step S43, the count value X storing memory M13 is overwritten with the X-direction pointer position Xk.

Subsequently, in step S44, the Y-direction pointer position Yk is read from the Y-direction address position in the pointer position storing memory M17. In step S45, the count value Y storing memory M12 is overwritten with the Y-direction pointer position Yk.

Subsequently, in step S46, the count value Y is read from the memory M12. In step S47, the count value X is read from the memory M13. In step S48, the mark indicating the selected area is displayed at the (X, Y) position on the strip image display portion 22a of the display 22.

Subsequently, in step S49, 1 is added to the count value Y, and the count value Y storing memory M12 is overwritten with the obtained value. In step S50, the selected area Y-direction end position Ye is read from the Y-direction address position in the selected area end position storing memory M19.

Subsequently, in step S51, when the count value Y is equal to or smaller than the selected area Y-direction end position Ye (NO), the process returns to step S46, and when the count value Y is greater than the selected area Y-direction end position Ye (YES), the process proceeds to step S52.

In step S52, the X-direction pointer position Xk is read from the X-direction address position in the pointer position storing memory M17. Subsequently, in step S53, the count value X storing memory M13 is overwritten with the X-direction pointer position Xk.

Subsequently, in step S54, the selected area Y-direction end position Ye is read from the Y-direction address position in the selected area end position storing memory M19. In step S55, the count value Y storing memory M12 is overwritten with the selected area Y-direction end position Ye.

Subsequently, in step S56, the count value Y is read from the memory M12. In step S57, the count value X is read from the memory M13. In step S58, the mark indicating the selected area is displayed at the (X, Y) position on the strip image display portion 22a of the display 22.

Subsequently, in step S59, 1 is added to the count value X, and the count value X storing memory M13 is overwritten with the obtained value. In step S60, the selected area X-direction end position Xe is read from the X-direction address position in the selected area end position storing memory M19.

Subsequently, in step S61, when the count value X is equal to or smaller than the selected area X-direction end position Xe (NO), the process returns to step S56, and when the count value X is greater than the selected area X-direction end position Xe (YES), the process proceeds to step S62.

In step S62, the selected area X-direction end position Xe is read from the X-direction address position in the selected area end position storing memory M19. Subsequently, in step S63, the count value X storing memory M13 is overwritten with the selected area X-direction end position Xe.

Subsequently, in step S64, the Y-direction pointer position Yk is read from the Y-direction address position in the pointer position storing memory M17. In step S65, the count value Y storing memory M12 is overwritten with the Y-direction pointer position Yk.

Subsequently, in step S66, the count value Y is read from the memory M12. In step S67, the count value X is read from the memory M13. In step S68, the mark indicating the selected area is displayed at the (X, Y) position on the strip image display portion 22a of the display 22.

Subsequently, in step S69, 1 is added to the count value Y, and the count value Y storing memory M12 is overwritten with the obtained value. In step S70, the selected area Y-direction end position Ye is read from the Y-direction address position in the selected area end position storing memory M19.

Subsequently, in step S71, when the count value Y is equal to or smaller than the selected area Y-direction end position Ye (NO), the process returns to step S66, and when the count value Y is greater than the selected area Y-direction end position Ye (YES), the process proceeds to step S72.

In step S72, whether the selected area confirmation switch 29 is turned on is determined. When the selected area confirmation switch 29 is not turned on (NO), the process returns to step S22. When the selected area confirmation switch 29 is turned on (YES), the process proceeds to step S73.

In step S73, the count value Y storing memory M12 is overwritten with 1. Subsequently, in step S74, the count value X storing memory M13 is overwritten with 1. In step S75, the X-direction pointer position Xk is read from the X-direction address position in the pointer position storing memory M17.

Subsequently, in step S76, when the count value X is smaller than the X-direction pointer position Xk (NO), the address position of (X, Y) is determined as a position outside the motion thread area A, and the process proceeds to the later-described step S211, and when the count value X is equal to or greater than the X-direction pointer position Xk (YES), the selected area X-direction end position Xe is read from the X-direction address position in the selected area end position storing memory M19 in step S77, and the process proceeds to step S78.

In step S78, when the count value X is greater than the selected area X-direction end position Xe (NO), the address position of (X, Y) is determined as a position outside the motion thread area A, and the process proceeds to the later-described step S211, and when the count value X is equal to or smaller than the selected area X-direction end position Xe (YES), the Y-direction pointer position Yk is read from the Y-direction address position in the pointer position storing memory M17 in step S79, and the process proceeds to step S80.

In step S80, when the count value Y is smaller than the Y-direction pointer position Yk (NO), the address position of (X, Y) is determined as a position outside the motion thread area A, and the process proceeds to the later-described step S211, and when the count value Y is equal to or greater than the Y-direction pointer position Yk (YES), the selected area Y-direction end position Ye is read from the Y-direction address position in the selected area end position storing memory M19 in step S81, and the process proceeds to step S82.

In step S82, when the count value Y is greater than the selected area Y-direction end position Ye (NO), the address position of (X, Y) is determined as a position outside the motion thread area A and the process proceeds to the later-described step S211, and when the count value Y is equal to or smaller than the selected area Y-direction end position Ye (YES), the address position of (X, Y) is determined as a position within the motion thread area A and the value in the motion thread color storing memory M11 is read in step S83.

Following step S83, in step S84, when the value in the motion thread color storing memory M11 is different from 1 (R) (NO), the process proceeds to the later-described step S198, and when the value in the motion thread color storing memory M11 is 1 (R) (YES), the process proceeds to step S85.

In step S85, a normal allowable value of R is read from the memory M20. Subsequently, in step S86, the address position of (X, Y) in the allowable value of R of strip storing memory M26 is overwritten with the normal allowable value of R. In step S87, the maximum allowable value of G is read from the memory M24. In step S88, the address position of (X, Y) in the allowable value of G of strip storing memory M27 is overwritten with the maximum allowable value of G. In step S89, the maximum allowable value of B is read from the memory M25. In step S90, the address position of (X, Y) in the allowable value of B of strip storing memory M28 is overwritten with the maximum allowable value of B, and the process proceeds to the later-described step S91.

In this embodiment, the normal allowable value is an allowable value for determining whether the print is normally provided, and the maximum allowable value is an allowable value for inhibiting the determination on whether the print is normally provided. That is, since the allowable values of G and B for the motion thread area A are set to the maximum when the value in the motion thread color storing memory M11 is 1 (R), the inspection using image data of G and B of the motion thread 1b is not performed, substantially.

In a case where the process proceeds from the abovementioned step S84 to step S198, when the value in the motion thread color storing memory M11 is different from 2 (G) in step S198 (NO), the process proceeds to the later-described step S205, and when the value in the motion thread color storing memory M11 is 2 (G) (YES), the process proceeds to step S199.

In step S199, the maximum allowable value of R is read from the memory M23. Subsequently, in step S200, the address position of (X, Y) in the allowable value of R of strip storing memory M26 is overwritten with the maximum allowable value of R. In step S201, a normal allowable value of G is read from the memory M21. In step S202, the address position of (X, Y) in the allowable value of G of strip storing memory M27 is overwritten with the normal allowable value of G. In step S203, the maximum allowable value of B is read from the memory M25. In step S204, the address position of (X, Y) in the allowable value of B of strip storing memory M28 is overwritten with the maximum allowable value of B, and the process proceeds to the later-described step S91. As a result, when the value in the motion thread color storing memory M11 is 2 (G), the allowable values of R and B for the motion thread area A are set to the maximum, and thus the inspection using image data of R and B of the motion thread 1b is inhibited.

In a case where the process proceeds from the abovementioned step S198 to step S205, the maximum allowable value of R is read from the memory M23 in step S205. Subsequently, in step S206, the address position of (X, Y) in the allowable value of R of strip storing memory M26 is overwritten with the maximum allowable value of R. In step S207, the maximum allowable value of G is read from the memory M24. In step S208, the address position of (X, Y) in the allowable value of G of strip storing memory M27 is overwritten with the maximum allowable value of G. In step S209, a normal allowable value of B is read from the memory M22. In step S210, the address position of (X, Y) in the allowable value of B of strip storing memory M28 is overwritten with the normal allowable value of B, and the process proceeds to the later-described step S91. As a result, when the value in the motion thread color storing memory M11 is 3 (B), the allowable values of R and G for the motion thread area A are set to the maximum, and thus the inspection using the image data of R and G of the motion thread 1b is inhibited.

In a case where the process proceeds from the abovementioned steps S76, S78, S80, and S82 to step S211, the normal allowable value of R is read from the memory M20 in step S211. In step S212, the address position of (X, Y) in the allowable value of R of strip storing memory M26 is overwritten with the normal allowable value of R. In step S213, the normal allowable value of G is read from the memory M21. In step S214, the address position of (X, Y) in the allowable value of G of strip storing memory M27 is overwritten with the normal allowable value of G. In step S215, the normal allowable value of B is read from the memory M22. In step S216, the address position of (X, Y) in the allowable value of B of strip storing memory M28 is overwritten with the normal allowable value of B, and the process proceeds to the later-described step S91. As a result, the allowable values for the inspection using data of all the RGB images of a portion outside the motion thread area A are set to the normal values.

In step S91, 1 is added to the count value X, and the count value X storing memory M13 is overwritten with the obtained value. In step S92, the number of the X-direction pixels of the strip 1a is read from the memory M15.

Subsequently, in step S93, when the count value X is equal to or smaller than the number of the X-direction pixels of the strip 1a (NO), the process returns to step S75, and when the count value X is greater than the number of the X-direction pixels of the strip 1a (YES), the process proceeds to step S94.

In step S94, 1 is added to the count value Y, and the count value Y storing memory M12 is overwritten with the obtained value. In step S95, the number of the Y-direction pixels of the strip 1a is read from the memory M16.

Subsequently, in step S96, when the count value Y is equal to or smaller than the number of the Y-direction pixels of the strip 1a (NO), the process returns to step S74, and when the count value Y is greater than the number of the Y-direction pixels of the strip 1a (YES), the process proceeds to the later-described step S97.

In step S97, the count value Y storing memory M12 is overwritten with 1. Subsequently, in step S98, the count value X storing memory M13 is overwritten with 1.

Subsequently, in step S99, the maximum allowable value of R is read from the memory M23, and the address position of (X, Y) in the allowable value of R of large printing product storing memory M29 is overwritten with the read value. In step S100, the maximum allowable value of G is read from the memory M24, and the address position of (X, Y) in the allowable value of G of large printing product storing memory M30 is overwritten with the read value. In step S101, the maximum allowable value of B is read from the memory M25, and the address position of (X, Y) in the allowable value of B of large printing product storing memory M31 is overwritten with the read value.

Subsequently, in step S102, 1 is added to the count value X, and the count value X storing memory M13 is overwritten with the obtained value. In step S103, the number of the X-direction pixels of the large printing product 1 is read from the memory M32.

Subsequently, in step S104, when the count value X is equal to or smaller than the number of the X-direction pixels of the large printing product 1 (NO), the process returns to step S99, and when the count value X is greater than the number of the X-direction pixels of the large printing product 1 (YES), the process proceeds to step S105.

In step S105, 1 is added to the count value Y, and the count value Y storing memory M12 is overwritten with the obtained value. Subsequently, in step S106, the number of the Y-direction pixels of the large printing product 1 is read from the memory M33.

Subsequently, in step S107, when the count value Y is equal to or smaller than the number of the Y-direction pixels of the large printing product 1 (NO), the process returns to step S98, and when the count value Y is greater than the number of the Y-direction pixels of the large printing product 1 (YES), the process proceeds to step S108.

In step S108, the count value N storing memory M34 is overwritten with 1. Subsequently, in step S109, the count value M storing memory M35 is overwritten with 1.

Subsequently, in step S110, an X-direction position at the bottom left end of the strip 1a in the N-th row and the M-th column is read from the X-direction address position of the strip 1a in the N-th row and the M-th column in the bottom left end position of each strip in large printing product storing memory M36. In step S111, a Y-direction position at the bottom left end of the strip 1a in the N-th row and the M-th column is read from the Y-direction address position of the strip 1a in the N-th row and the M-th column in the bottom left end position of each strip in large printing product storing memory M36.

Subsequently, in step S112, the count value Y storing memory M12 is overwritten with 1. In step S113, the count value X storing memory M13 is overwritten with 1.

Subsequently, in step S114, the allowable value of R at the (X, Y) position in the strip 1a is read from the address position of (X, Y) in the allowable value of R of strip storing memory M26, and an address position of (X-direction position at bottom left end of strip in N-th row and M-th column+count value X−1, Y-direction position at bottom left end of strip in N-th row and M-th column+count value Y−1) in the allowable value of R of large printing product storing memory M29 is overwritten with the read value.

Subsequently, in step S115, the allowable value of G at the (X, Y) position in the strip 1a is read from the address position of (X, Y) in the allowable value of G of strip storing memory M27, and the address position of (X-direction position at bottom left end of strip in N-th row and M-th column+count value X−1, Y-direction position at bottom left end of strip in N-th row and M-th column+count value Y−1) in the allowable value of G of large printing product storing memory M30 is overwritten with the read value.

Subsequently, in step S116, the allowable value of B at the (X, Y) position in the strip 1a is read from the address position of (X, Y) in the allowable value of B of strip storing memory M28, and the address position of (X-direction position at bottom left end of strip in N-th row and M-th column+count value X−1, Y-direction position at bottom left end of strip in N-th row and M-th column+count value Y−1) in the allowable value of B of large printing product storing memory M31 is overwritten with the read value.

Following step S116, 1 is added to the count value X and the count value X storing memory M13 is overwritten with the obtained value in step S117. In step S118, the number of the X-direction pixels of the strip 1a is read from the memory M15.

Subsequently, in step S119, when the count value X is equal to or smaller than the number of the X-direction pixels of the strip 1a (NO), the process returns to step S114, and when the count value X is greater than the number of the X-direction pixels of the strip 1a (YES), the process proceeds to step S120.

In step S120, 1 is added to the count value Y, and the count value Y storing memory M12 is overwritten with the obtained value. Subsequently, in step S121, the number of the Y-direction pixels of the strip 1a is read from the memory M16.

Subsequently, in step S122, when the count value Y is equal to or smaller than the number of the Y-direction pixels of the strip 1a (NO), the process returns to step S113, and when the count value Y is greater than the number of the Y-direction pixels of the strip 1a (YES), the process proceeds to step S123.

In step S123, 1 is added to a count value M, and the count value M storing memory M35 is overwritten with the obtained value. Subsequently, in step S124, the row number of the strip 1a in the large printing product 1 is read from the memory M37.

Subsequently, in step S125, when the count value M is equal to or smaller than the row number of the strip 1a in the large printing product 1 (NO), the process returns to step S110, and when the count value M is greater than the row number of the strip 1a in the large printing product 1 (YES), the process proceeds to step S126.

In step S126, 1 is added to the count value N, and the count value N storing memory M34 is overwritten with the obtained value. Subsequently, in step S127, the column number of the strip 1a in the large printing product 1 is read from the memory M38.

Subsequently, in step S128, when the count value N is equal to or smaller than the column number of the strip 1a in the large printing product 1 (NO), the process returns to step S109, and when the count value N is greater than the column number of the strip 1a in the large printing product 1 (YES), the process proceeds to step S129.

In step S129, whether the reference image data reading switch 30 is turned on is determined. When the reference image data reading switch 30 is turned off (NO), the processing of step S129 is repeated. When the reference image data reading switch 30 is turned on (YES), the process proceeds to step S130.

In step S130, an image capturing rotary phase is read from the memory M39. Subsequently, in step S131, a count value is read from the rotary phase of securities printing press detecting counter 36, and the read value is stored into the memory M40.

Subsequently, in step S132, when the count value in the rotary phase of securities printing press detecting counter 36 does not match the image capturing rotary phase (NO), the process returns to step S131, and when the count value in the rotary phase of securities printing press detecting counter 36 matches the image capturing rotary phase (YES), the input/output device 18 outputs the image capturing command to the camera 34 in step S133, and the input/output device 18 outputs the image data transmission command to the camera 34 in step S134.

Subsequently, in step S135, whether the captured image data is outputted from the camera 34 to the input/output device 17 is determined. When the captured image data is not outputted (NO), the processing of step S135 is repeated. When the captured image data is outputted (YES), the count value Y storing memory M12 is overwritten with 1 in step S136, and the count value X storing memory M13 is overwritten with 1 in step S137.

Following step S137, the pixel data of R is read from the camera 34 and the read data is stored as the address position of (X, Y) in the reference image data of R storing memory M41 in step S138. In step S139, the pixel data of G is read from the camera 34 and the read data is stored as the address position of (X, Y) in the reference image data of G storing memory M42. In step S140, the pixel data of B is read from the camera 34 and the read data is stored as the address position of (X, Y) in the reference image data of B storing memory M43.

Subsequently, in step S141, 1 is added to the count value X, and the count value X storing memory M13 is overwritten with the obtained value. In step S142, the number of the X-direction pixels of the camera 34 is read from the memory M44.

Subsequently, in step S143, when the count value X is equal to or smaller than the number of the X-direction pixels of the camera 34 (NO), the process returns to step S138, and when the count value X is greater than the number of the X-direction pixels of the camera 34 (YES), 1 is added to the count value Y and the count value Y storing memory M12 is overwritten with the obtained value in step S144, and the number of the Y-direction pixels of the camera 34 is read from the memory M45 in step S145.

Subsequently, in step S146, when the count value Y is equal to or smaller than the number of the Y-direction pixels of the camera 34 (NO), the process returns to step S137, and when the count value Y is greater than the number of the Y-direction pixels of the camera 34 (YES), the process proceeds to step S147.

In step S147, whether the inspection start switch 31 is turned on is determined. When the inspection start switch 31 is turned off (NO), the processing of step S147 is repeated. When the inspection start switch 31 is turned on (YES), the process proceeds to step S148.

In step S148, whether the inspection end switch 32 is turned on is determined. When the inspection end switch 32 is turned off (NO), the process proceeds to step S149. When the inspection end switch 32 is turned on (YES), the processing by the print quality inspection unit 10 ends.

In step S149, the image capturing rotary phase is read from the memory M39. Subsequently, in step S150, the count value is read from the rotary phase of securities printing press detecting counter 36, and the read value is stored into the memory M40.

Subsequently, in step S151, when the count value in the rotary phase of securities printing press detecting counter 36 does not match the image capturing rotary phase (NO), the process returns to step S150, and when the count value in the rotary phase of securities printing press detecting counter 36 matches the image capturing rotary phase (YES), the input/output device 18 outputs the image capturing command to the camera 34 in step S152, and the input/output device 18 outputs the image data transmission command to the camera 34 in step S153.

Subsequently, in step S154, whether the captured image data is outputted from the camera 34 to the input/output device 17 is determined. When the captured image data is not outputted (NO), the processing of step S154 is repeated. When the captured image data is outputted (YES), the count value Y storing memory M12 is overwritten with 1 in step S155, and the count value X storing memory M13 is overwritten with 1 in step S156.

Following step S156, the pixel data of R is read from the camera 34, and the read data is stored as the address position of (X, Y) in the inspection image data of R storing memory M46 in step S157. In step S158, the pixel data of G is read from the camera 34, and the read data is stored as the address position of (X, Y) in the inspection image data of G storing memory M47. In step S159, the pixel data of B is read from the camera 34, and the read data is stored as the address position of (X, Y) in the inspection image data of B storing memory M48.

Subsequently, in step S160, 1 is added to the count value X, and the count value X storing memory M13 is overwritten with the obtained value. In step S161, the number of the X-direction pixels of the camera 34 is read from the memory M44.

Subsequently, in step S162, when the count value X is equal to or smaller than the number of the X-direction pixels of the camera 34 (NO), the process returns to step S157, and when the count value X is greater than the number of the X-direction pixels of the camera 34 (YES), 1 is added to the count value Y and the count value Y storing memory M12 is overwritten with the obtained value in step S163, and the number of the Y-direction pixels of the camera 34 is read from the memory M45 in step S164.

Subsequently, in step S165, when the count value Y is equal to or smaller than the number of the Y-direction pixels of the camera 34 (NO), the process returns to step S156, and when the count value Y is greater than the number of the Y-direction pixels of the camera 34 (YES), the process proceeds to step S166.

In step S166, the count value Y storing memory M12 is overwritten with 1. Subsequently, in step S167, the count value X storing memory M13 is overwritten with 1. In step S168, the number of the X-direction ineffective pixels (of camera) is read from the memory M49. In step S169, the number of the Y-direction ineffective pixels (of camera) is read from the memory M50. In this embodiment, in the image data captured by the camera 34, the ineffective pixels are the pixels in a portion corresponding to a region 22c (illustrated as hatched region in FIG. 12) other than the portion in which the image of the large printing product 1 is captured.

Subsequently, in step S170, inspection data of R of the pixels at an address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the inspection image data of R storing memory M46.

Subsequently, in step S171, reference data of R of the pixels at the address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the reference image data of R storing memory M41.

Subsequently, in step S172, the reference data of R of the pixels at the address position of (number of X-direction ineffective pixels+count value X, number of Y-direction ineffective pixels+count value Y) is subtracted from the inspection data of R of the pixels at the address position of (number of X-direction ineffective pixels+count value X, number of Y-direction ineffective pixels+count value Y) to compute a pixel data difference at the address position of (X, Y) of R, and the obtained value is stored into the memory M51.

Following step S172, an absolute value of the pixel data difference at the address position of (X, Y) of R is computed based on the pixel data difference at the address position of (X, Y) of R and the obtained value is stored into the memory M52 in step S173. In step S174, the allowable value of the pixel data at the address position of (X, Y) of R is read from the address position of (X, Y) in the allowable value of R of large printing product storing memory M29.

Subsequently, in step S175, when the absolute value of the pixel data difference at the address position of (X, Y) of R is greater than the allowable value of the pixel data at the address position of (X, Y) of R (NO), the process proceeds to step S217 to display error on the display 22 and end the inspection, and when the absolute value of the pixel data difference at the address position of (X, Y) of R is equal to or smaller than the allowable value of the pixel data at the address position of (X, Y) of R (YES), the process proceeds to step S176.

In step S176, inspection data of G of the pixels at the address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the inspection image data of G storing memory M47.

Subsequently, in step S177, reference data of G of the pixels at the address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the reference image data of G storing memory M42.

Subsequently, in step S178, the reference data of G of the pixels at the address position of (number of X-direction ineffective pixels+count value X, number of Y-direction ineffective pixels+count value Y) is subtracted from the inspection data of G of the pixels at the address position of (number of X-direction ineffective pixels+count value X, number of Y-direction ineffective pixels+count value Y) to compute a pixel data difference at the address position of (X, Y) of G, and the obtained value is stored into the memory M53.

Subsequently, in step S179, an absolute value of the pixel data difference at the address position of (X, Y) of G is computed based on the pixel data difference at the address position of (X, Y) of G, and the obtained value is stored into the memory M54. In step S180, the allowable value of the pixel data at the address position of (X, Y) of G is read from the address position of (X, Y) in the allowable value of G of large printing product storing memory M30.

Subsequently, in step S181, when the absolute value of the pixel data difference at the address position of (X, Y) of G is greater than the allowable value of the pixel data at the address position of (X, Y) of G (NO), the process proceeds to the abovementioned step S217 to display error on the display 22 and end the inspection, and when the absolute value of the pixel data difference at the address position of (X, Y) of G is equal to or smaller than the allowable value of the pixel data at the address position of (X, Y) of G (YES), the process proceeds to step S182.

In step S182, inspection data of B of the pixels at the address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the inspection image data of B storing memory M48.

Subsequently, in step S183, reference data of B of the pixels at the address position of (number of X-direction ineffective pixels+count value X, number of Y-direction ineffective pixels+count value Y) is read from the address position of (number of X-direction ineffective pixels+count value X, number of Y-direction ineffective pixels+count value Y) in the reference image data of B storing memory M43.

Subsequently, in step S184, the reference data of B of the pixels at the address position of (number of X-direction ineffective pixels+count value X, number of Y-direction ineffective pixels+count value Y) is subtracted from the inspection data of B of the pixels at the address position of (number of X-direction ineffective pixels+count value X, number of Y-direction ineffective pixels+count value Y) to compute a pixel data difference at the address position of (X, Y) of B, and the obtained value is stored into the memory M55.

Subsequently, in step S185, an absolute value of the pixel data difference at the address position of (X, Y) of B is computed based on the pixel data difference at the address position of (X, Y) of B, and the obtained value is stored into the memory M56. In step S186, the allowable value of the pixel data at the address position of (X, Y) of B is read from the address position of (X, Y) in the allowable value of B of large printing product storing memory M31.

Subsequently, in step S187, when the absolute value of the pixel data difference at the address position of (X, Y) of B is greater than the allowable value of the pixel data at the address position of (X, Y) of B (NO), the process proceeds to the abovementioned step S217 to display error on the display 22 and end the inspection, and when the absolute value of the pixel data difference at the address position of (X, Y) of B is equal to or smaller than the allowable value of the pixel data at the address position of (X, Y) of B (YES), the process proceeds to step S188.

In step S188, 1 is added to the count value X and the count value X storing memory M13 is overwritten with the obtained value. Subsequently, in step S189, the number of the X-direction pixels of the large printing product is read from the memory M32.

Subsequently, in step S190, when the count value X is equal to or smaller than the number of the X-direction pixels of the large printing product (NO), the process returns to step S168, and when the count value X is greater than the number of the X-direction pixels of the large printing product (YES), the process proceeds to step S191.

In step S191, 1 is added to the count value Y and the count value Y storing memory M12 is overwritten with the obtained value. In step S192, the number of the Y-direction pixels of the large printing product is read from the memory M33.

Subsequently, in step S193, when the count value Y is equal to or smaller than the number of the Y-direction pixels of the large printing product (NO), the process returns to step S167, and when the count value Y is greater than the number of the Y-direction pixels of the large printing product (YES), the process returns to the abovementioned step S148.

In the abovementioned print quality inspection apparatus and print quality inspection method according to this embodiment, the inspection of the print quality of the motion thread area A is performed using only the image data of the color of the same hue as the color of the motion thread 1b out of the image data of R, G, and B captured by the camera 34, while the inspection of the print quality of the portion outside the motion thread area A is performed using the data of all the RGB images.

Figure 11A:
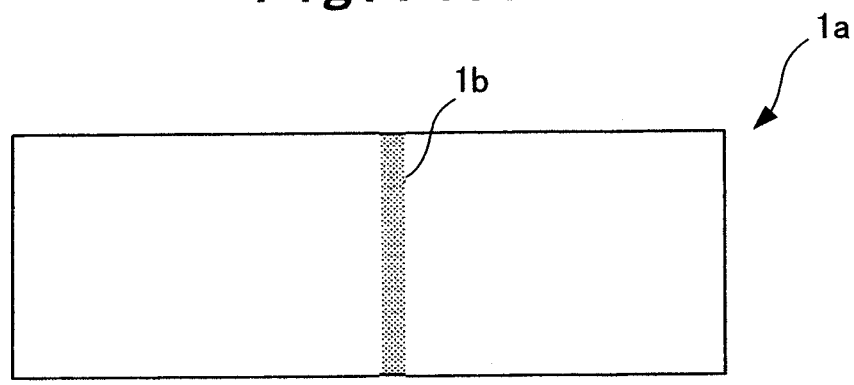
FIG. 11A is a schematic diagram that illustrates an example of image data of a color of the same hue as a color of a motion thread.
Figure 11B:
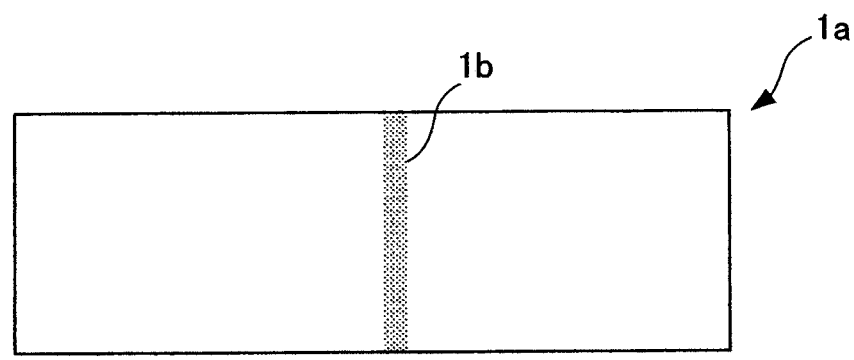
FIG. 11B is a schematic diagram that illustrates an example of image data of a color of different hue from the color of the motion thread.
Figure 11C:
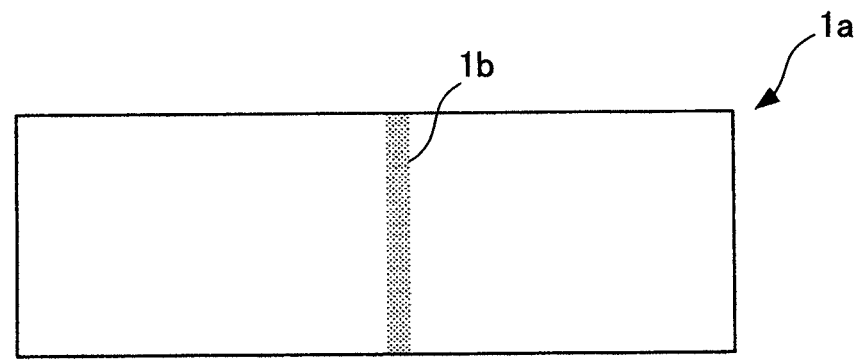
FIG. 11C is another schematic diagram that illustrates an example of image data of the color of different hue from the color of the motion thread.

Here, an example of the image data of the color of the same hue as the color of the motion thread 1b is illustrated in FIG. 11A, and examples of the image data of the color of different hue from the color of the motion thread 1b are illustrated in FIGS. 11B and 11C.

As illustrated in FIGS. 11B and 11C, since the motion thread 1b is expressed in a dark color in the image data of the color of different hue from the color of the motion thread 1b, when the allowable values are the normal values and the pattern of the motion thread 1b changes with small angle variations, the determination may be made as NG. Thus, when the inspection is performed with the image data of the color of different hue from the color of the motion thread 1b, the allowable values used for the determination of OK/NG of the motion thread area A are set to the maximum to inhibit the substantial inspection.

On the other hand, as illustrated in FIG. 11A, since the motion thread 1b has no color or is expressed in a pale color in the image data of the color of the same hue as the color of the motion thread 1b, it is possible to substantially ignore the motion thread 1b in the inspection using the normal allowable values. Thus, when the inspection is performed with the image data of the color of the same hue as the color of the motion thread 1b, the allowable values used for the determination of OK/NG of the motion thread area A are also set to the normal values, and usual inspection is carried out.

As a result, in this embodiment, it is possible to prevent the variation of the pattern of the motion thread 1b from affecting the print quality inspection and to perform the print quality inspection without being affected by the pattern of the motion thread 1b, and the quality of the print provided on the large printing product 1 provided with the motion thread 1b can be accurately inspected.

Second Embodiment

Hereinafter, a print quality inspection apparatus according to a second embodiment of the present invention is described with reference to FIG. 1 and FIGS. 10 to 21D.

In this embodiment, the configurations of the camera and the illuminators and the configuration of the print quality inspection unit 10 and the processing by the print quality inspection unit 10 are different from those of the abovementioned first embodiment. Other configurations are almost same as those described in the first embodiment, and, hereinafter, the members that make the similar effects as the abovementioned members illustrated in FIGS. 1 to 12 are denoted by the same reference numerals, and the duplicated descriptions are properly omitted.

Figure 13:
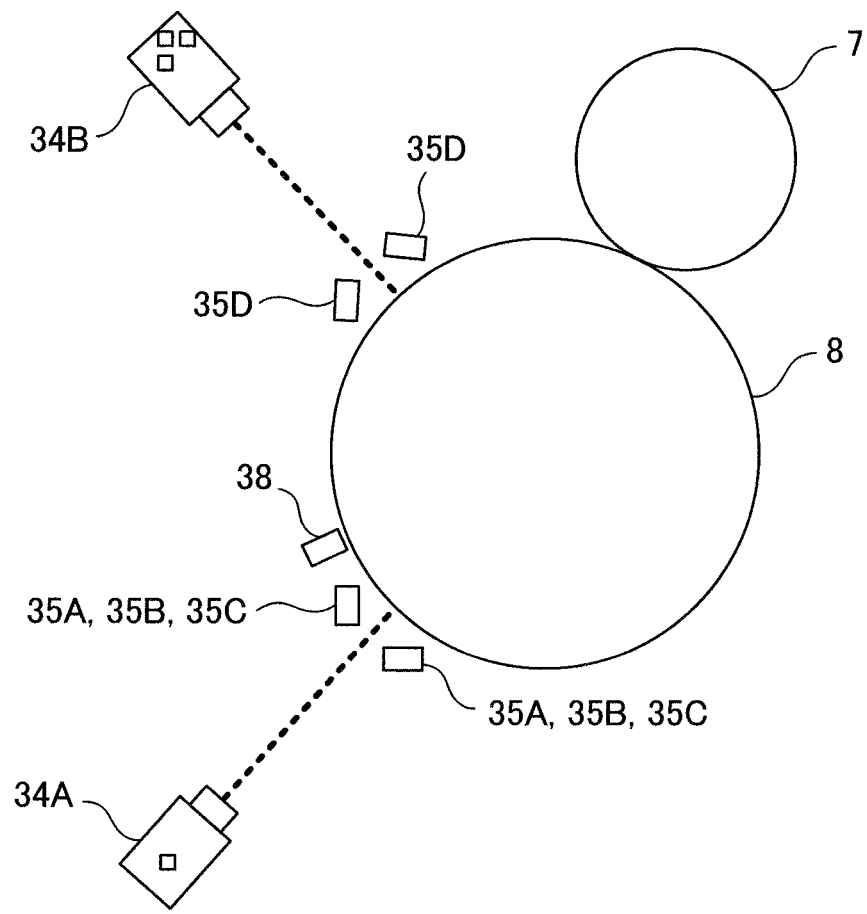
FIG. 13 is a side view that illustrates a print quality inspection apparatus according to a second embodiment of the present invention.
Figure 14A:
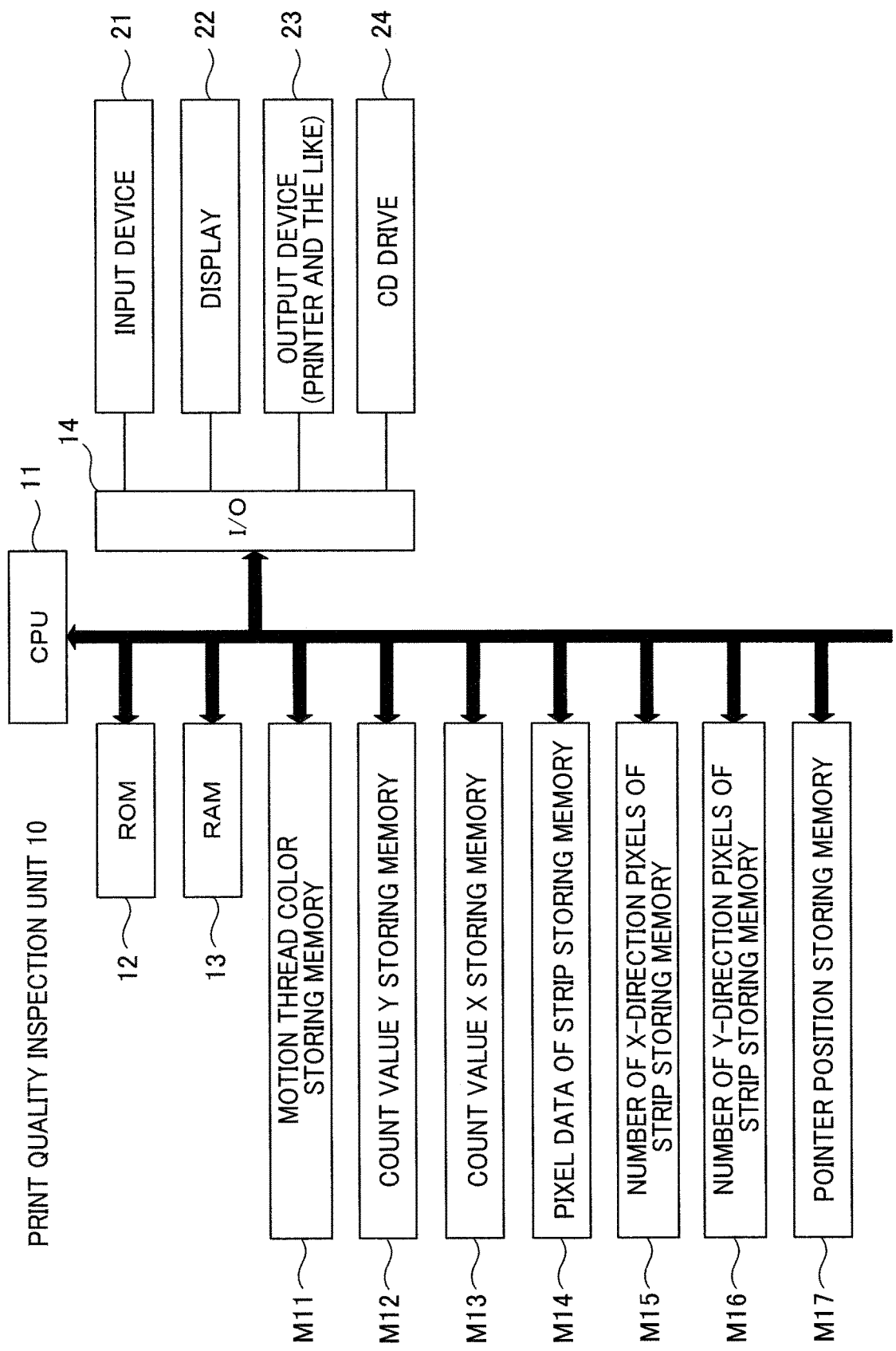
FIG. 14A is a block diagram that illustrates a configuration of the print quality inspection apparatus according to the second embodiment of the present invention.
Figure 14B:
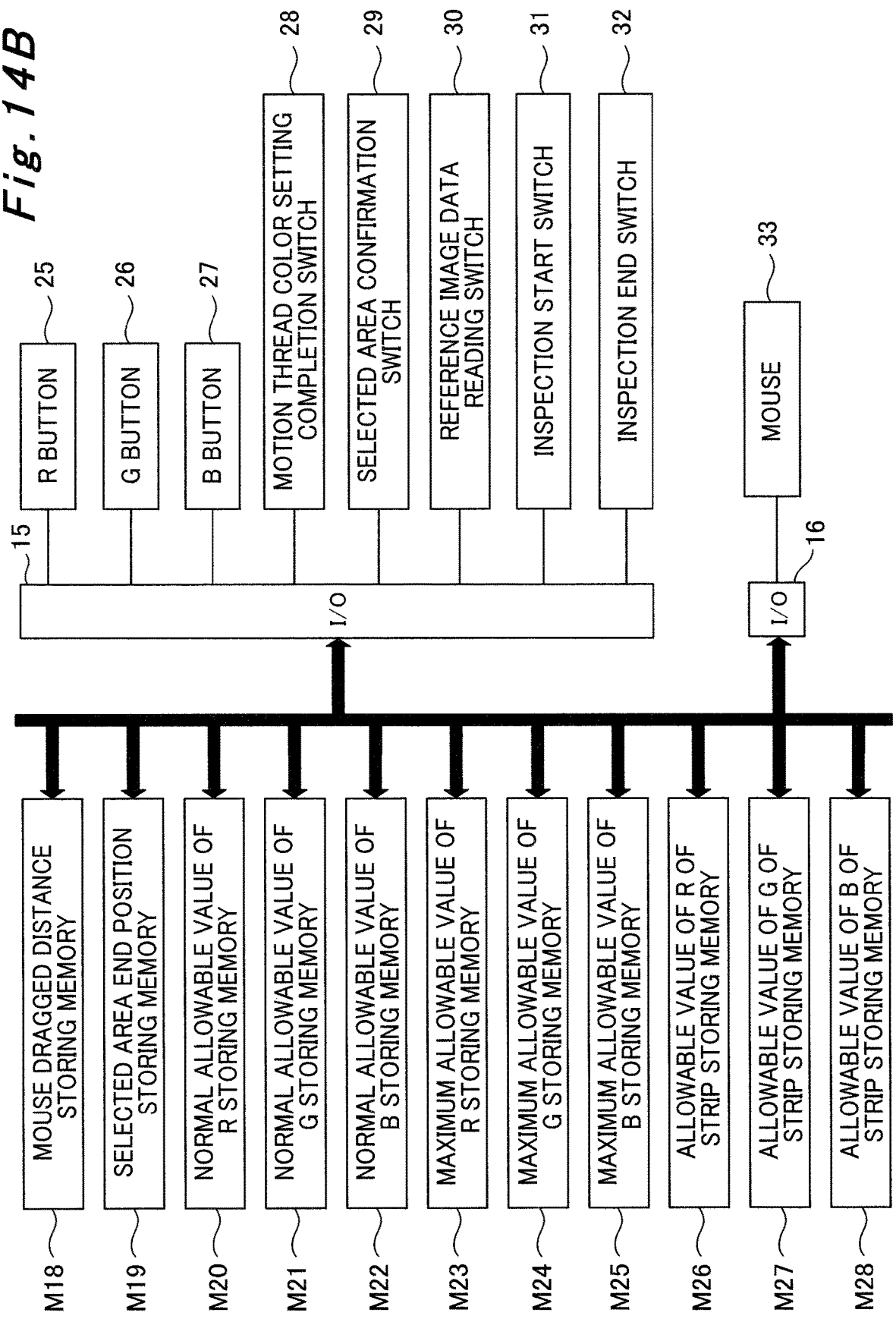
FIG. 14B is a block diagram that illustrates the configuration of the print quality inspection apparatus according to the second embodiment of the present invention.
Figure 14D:
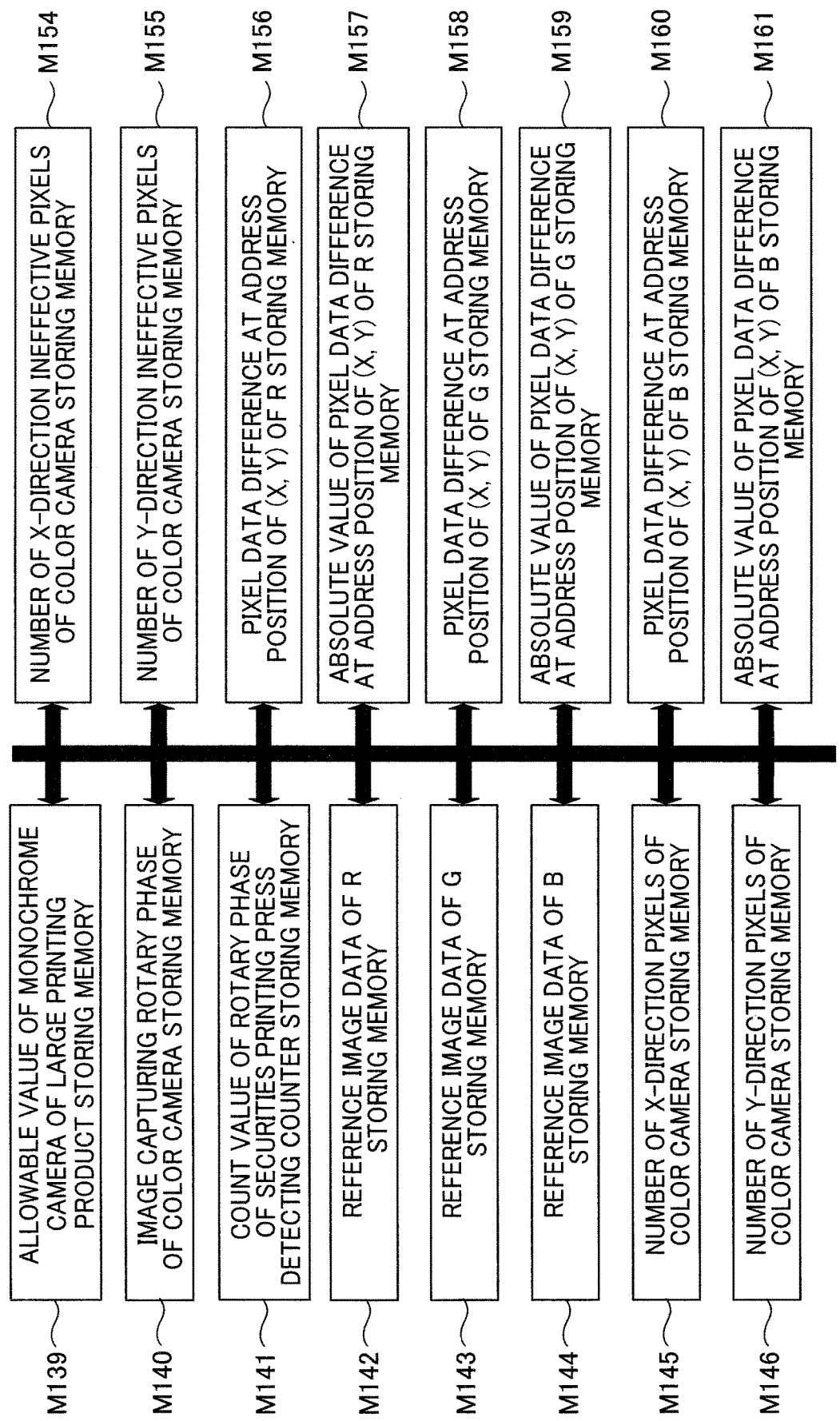
FIG. 14D is a block diagram that illustrates the configuration of the print quality inspection apparatus according to the second embodiment of the present invention.
Figure 14E:
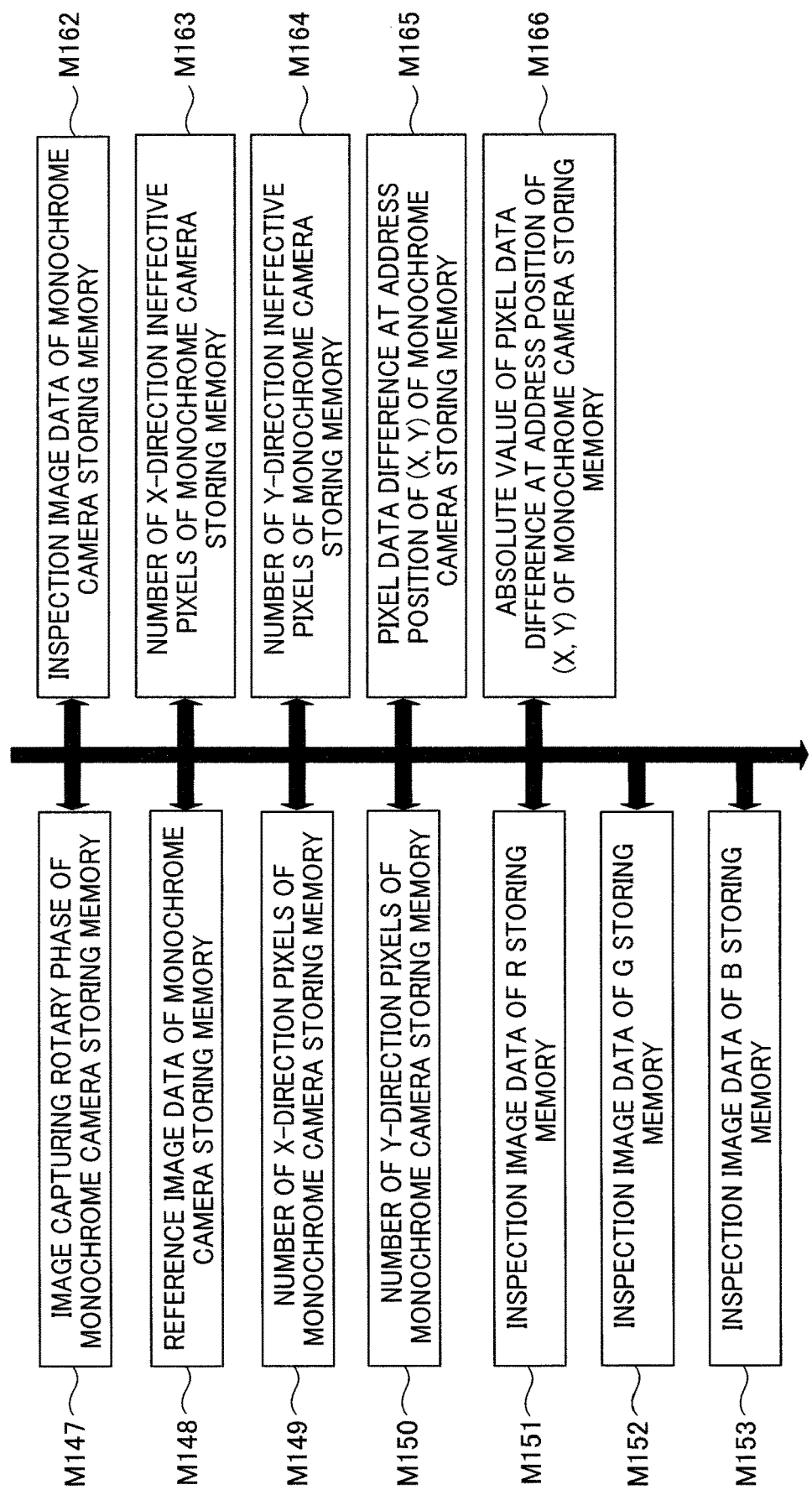
FIG. 14E is a block diagram that illustrates the configuration of the print quality inspection apparatus according to the second embodiment of the present invention.
Figure 15A:
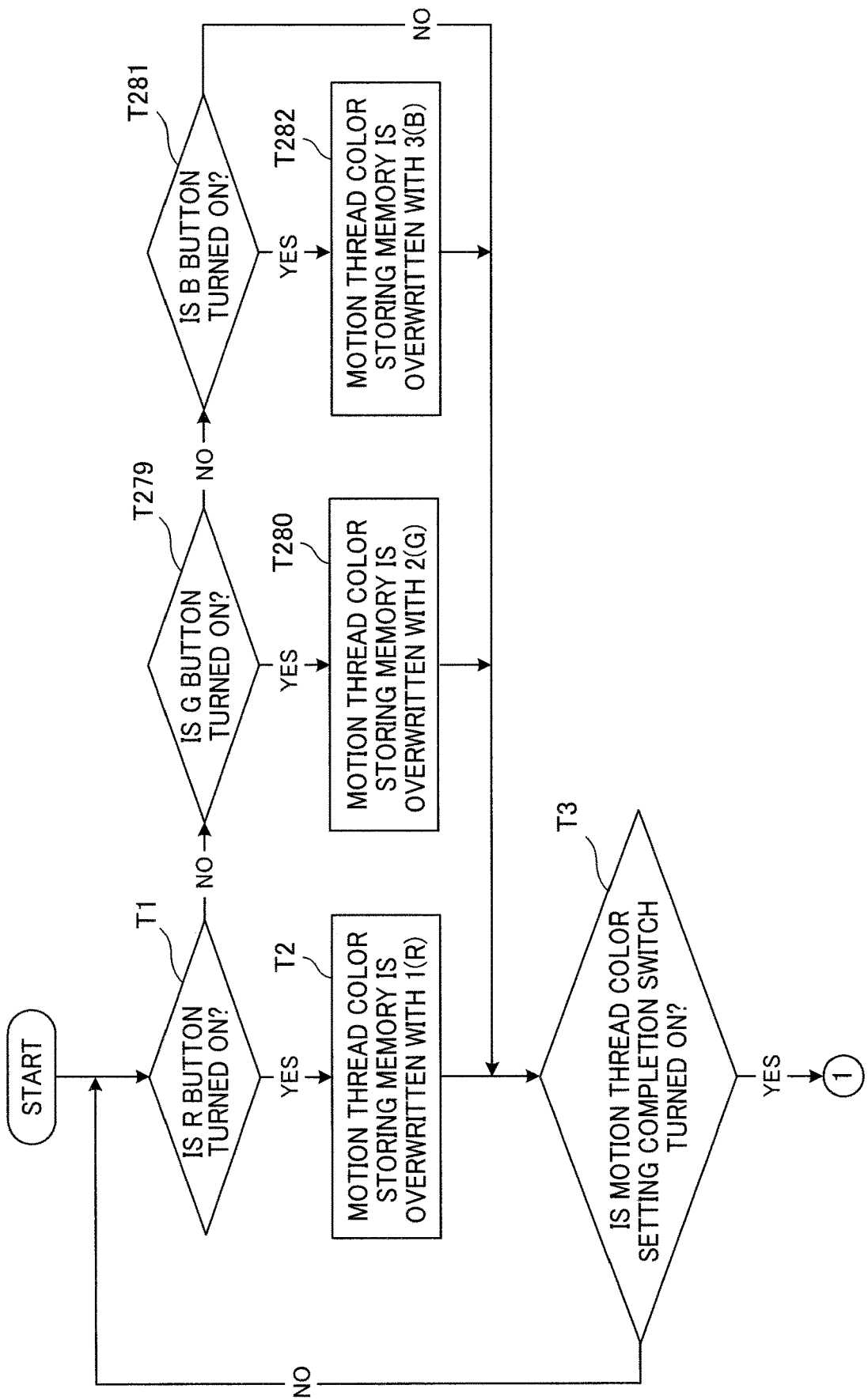
FIG. 15A is a flowchart that illustrates operations of the print quality inspection apparatus according to the second embodiment of the present invention.
Figure 15B:
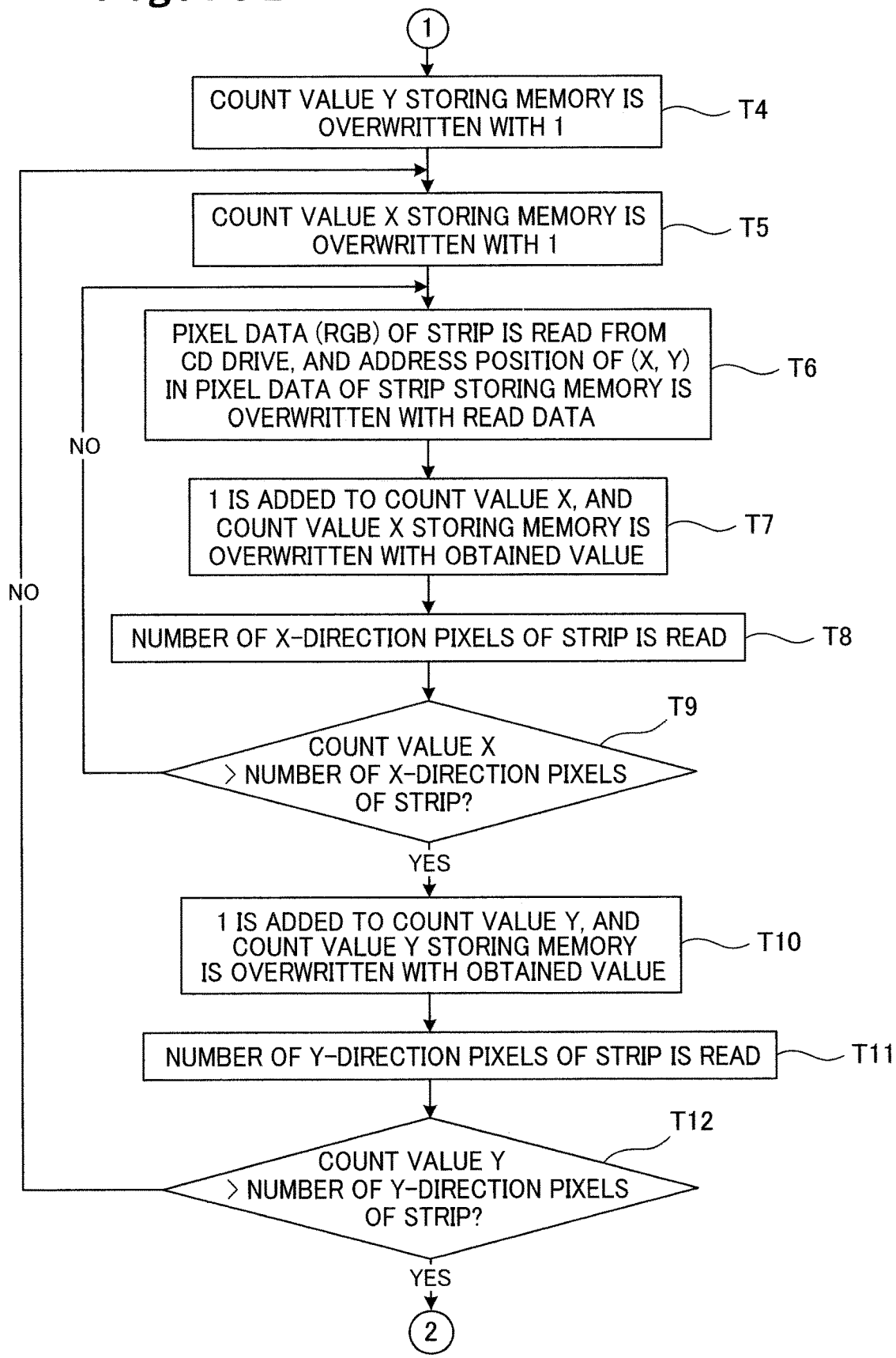
FIG. 15B is a flowchart that illustrates the operations of the print quality inspection apparatus according to the second embodiment of the present invention.
Figure 15C:
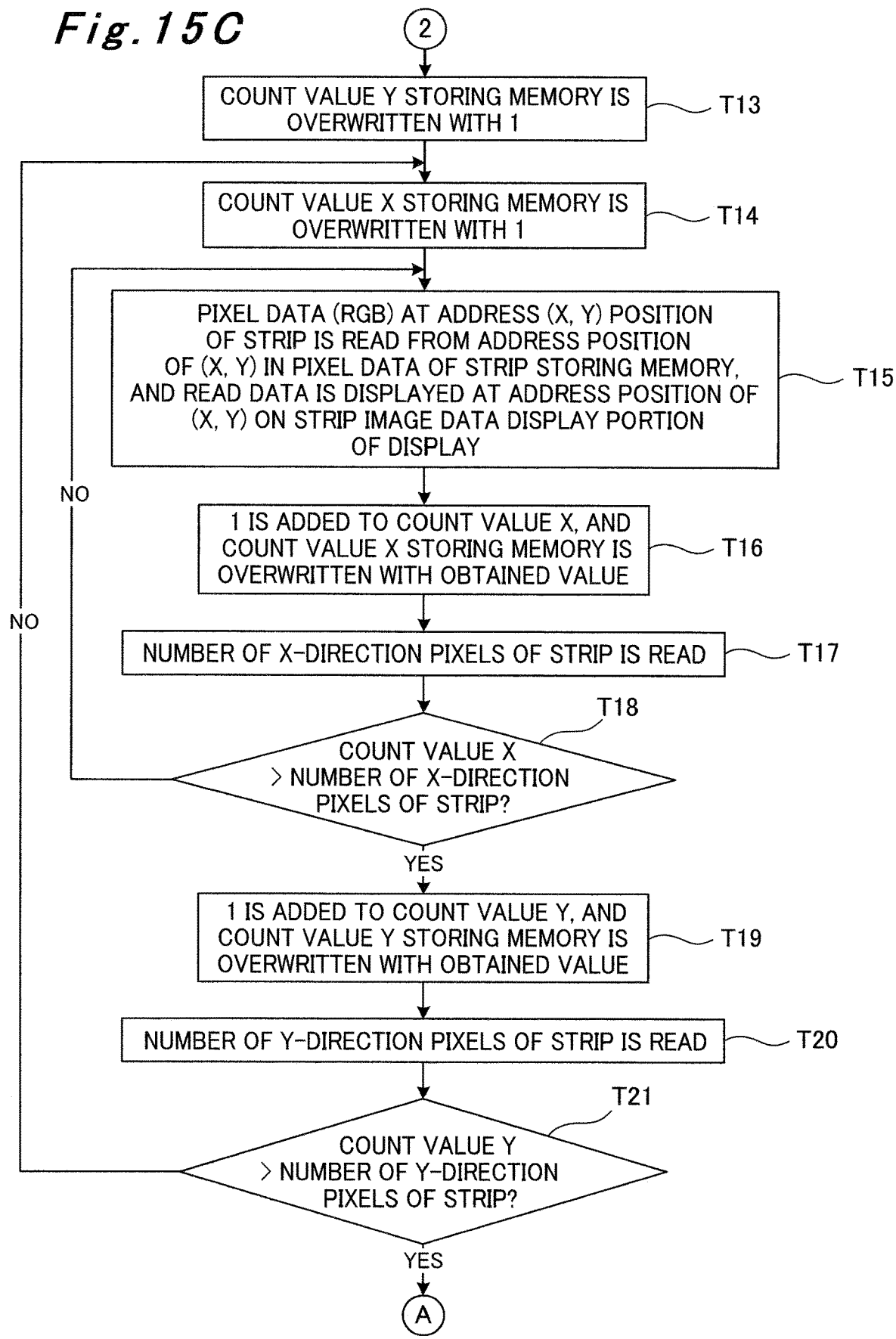
FIG. 15C is a flowchart that illustrates the operations of the print quality inspection apparatus according to the second embodiment of the present invention.
Figure 16A:
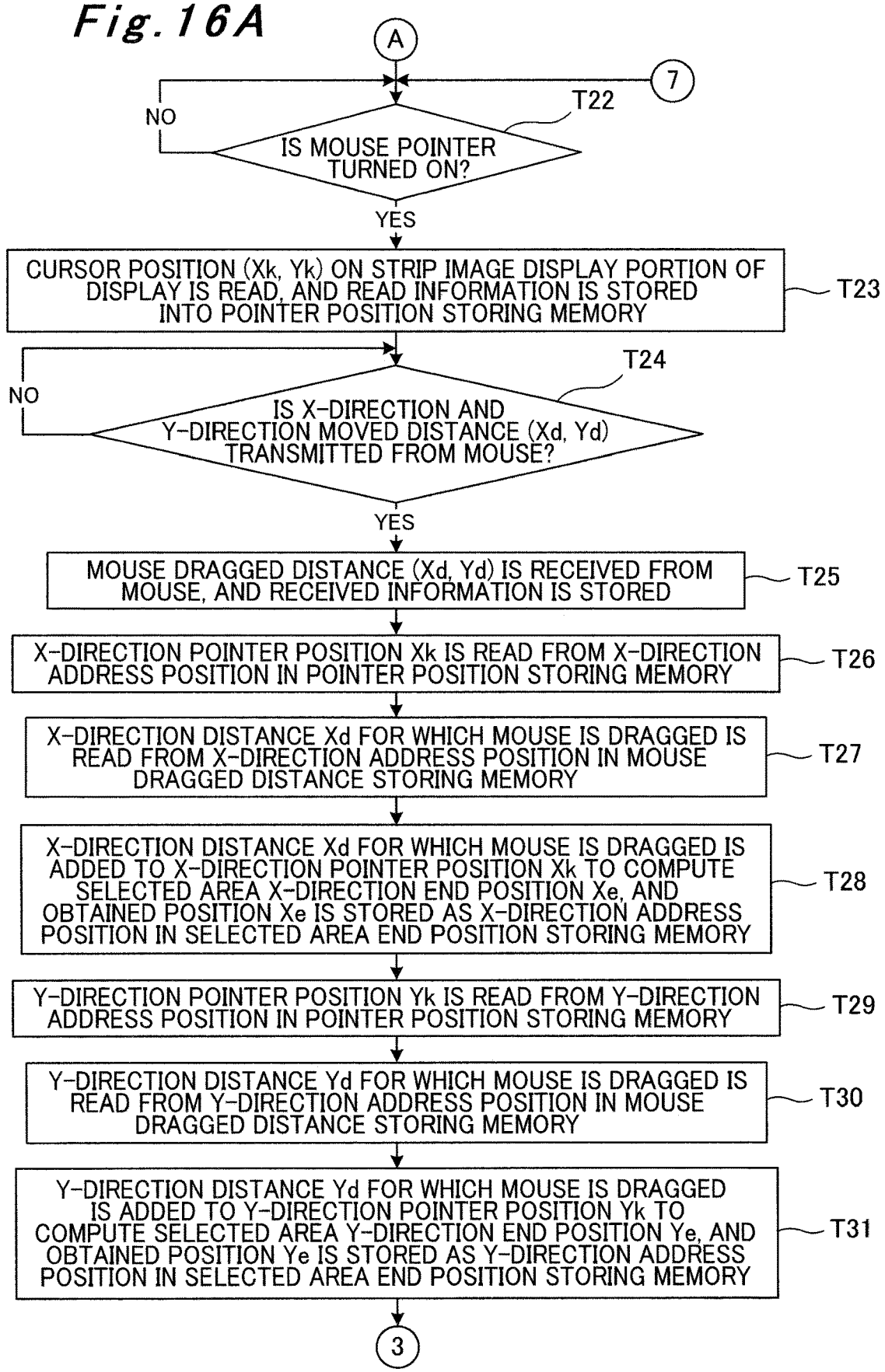
FIG. 16A is a flowchart that illustrates the operations of the print quality inspection apparatus according to the second embodiment of the present invention.
Figure 16B:
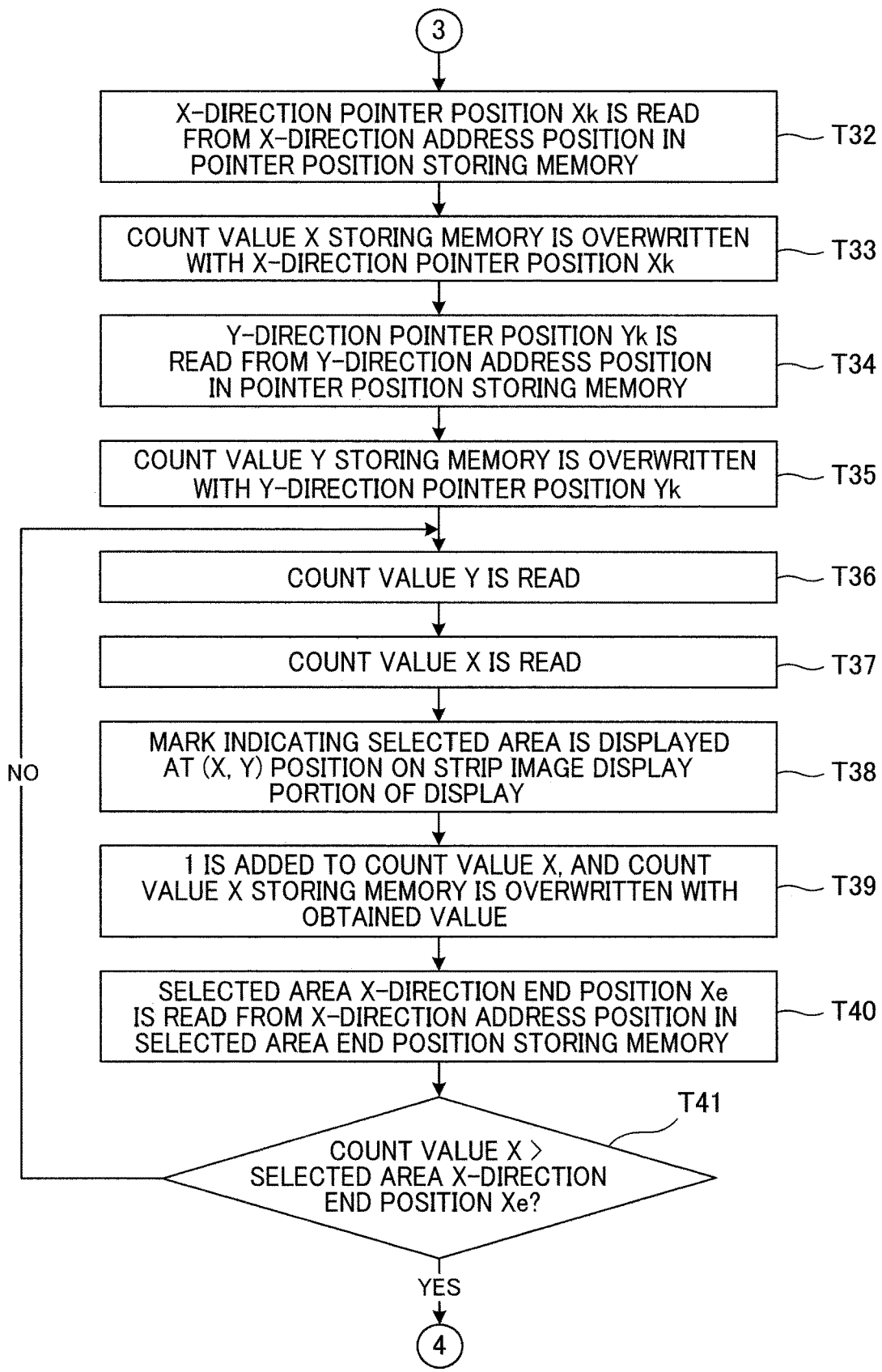
FIG. 16B is a flowchart that illustrates the operations of the print quality inspection apparatus according to the second embodiment of the present invention.
Figure 16C:
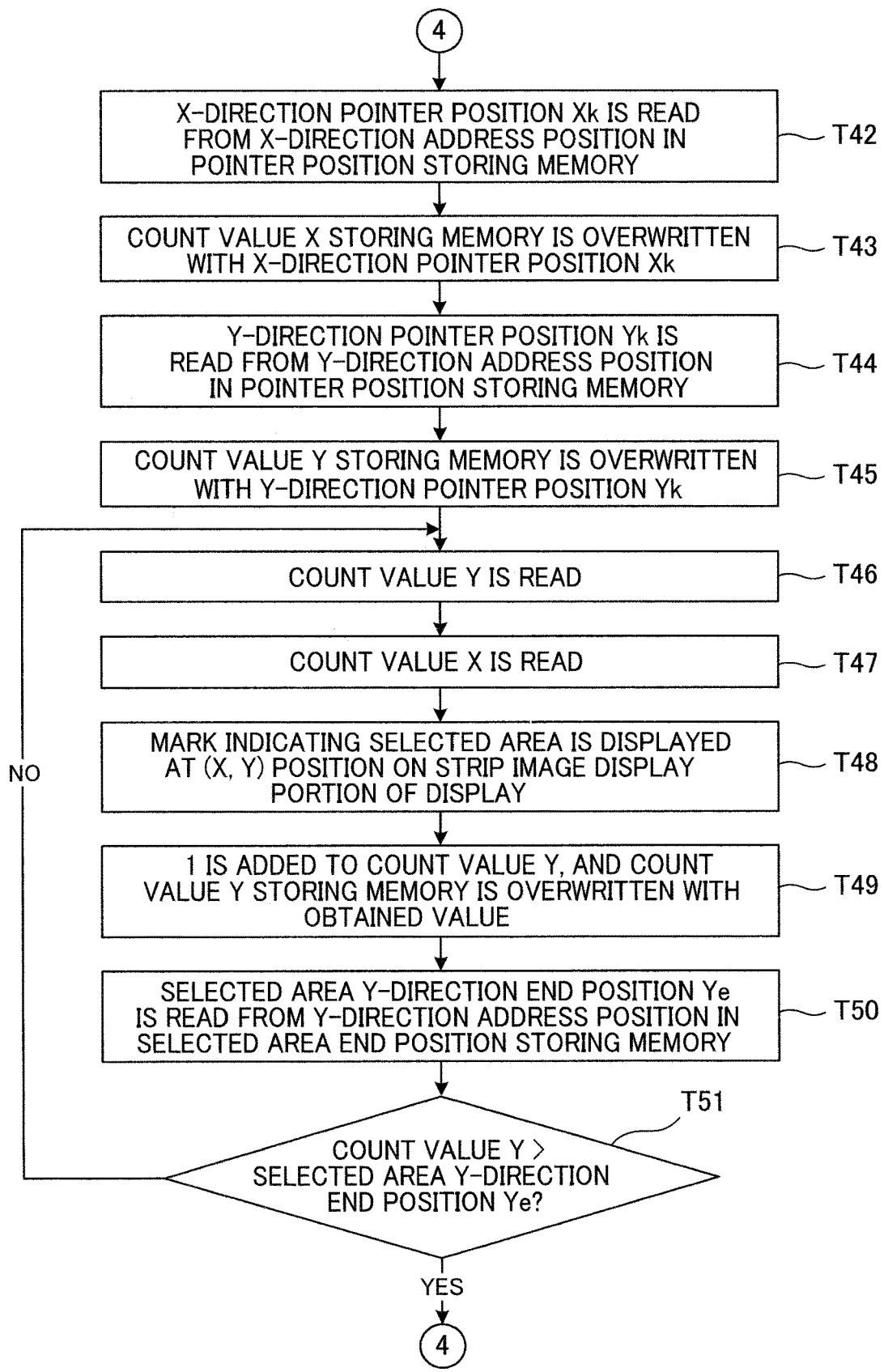
FIG. 16C is a flowchart that illustrates the operations of the print quality inspection apparatus according to the second embodiment of the present invention.
Figure 16D:
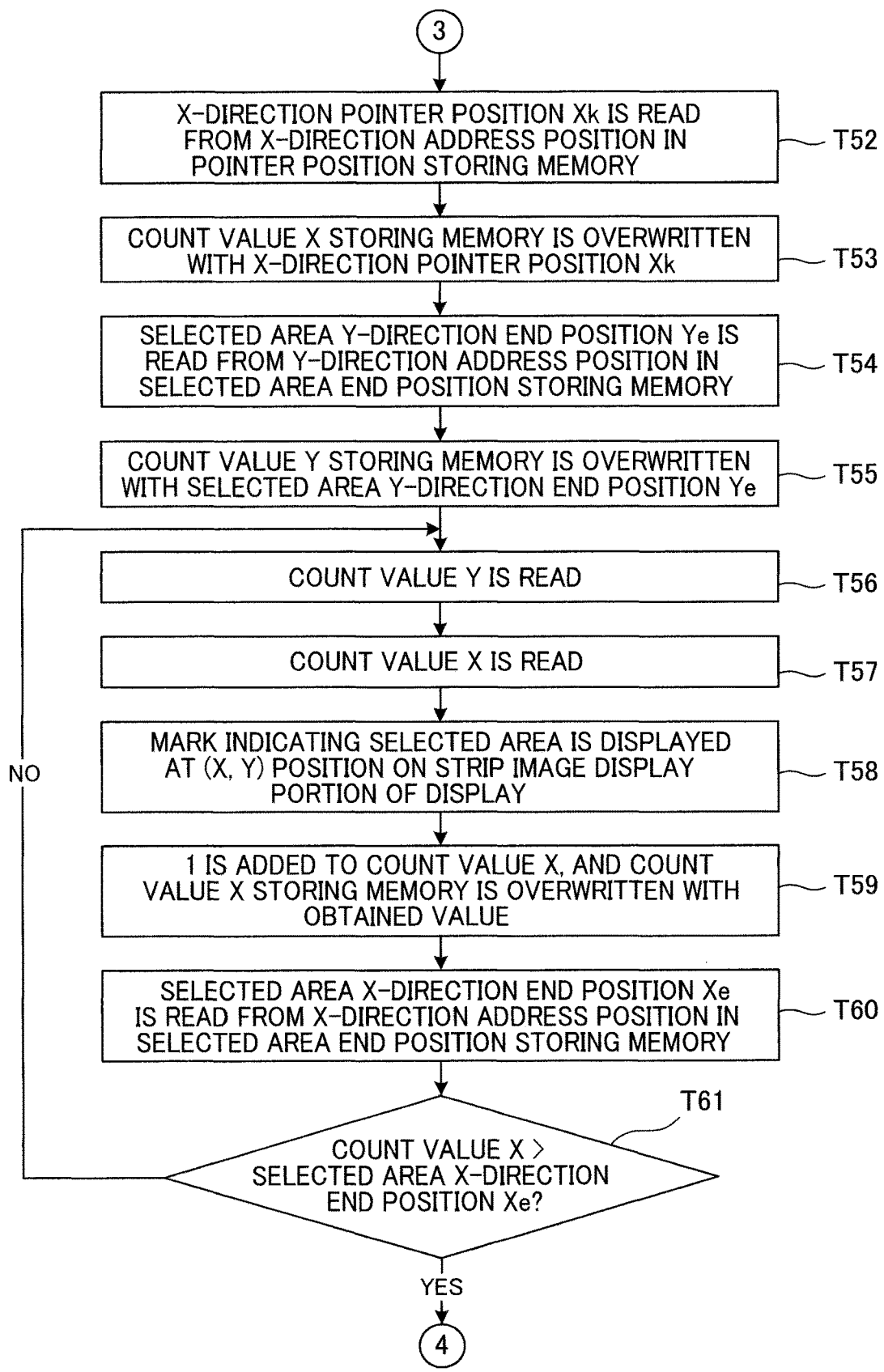
FIG. 16D is a flowchart that illustrates the operations of the print quality inspection apparatus according to the second embodiment of the present invention.
Figure 16E:
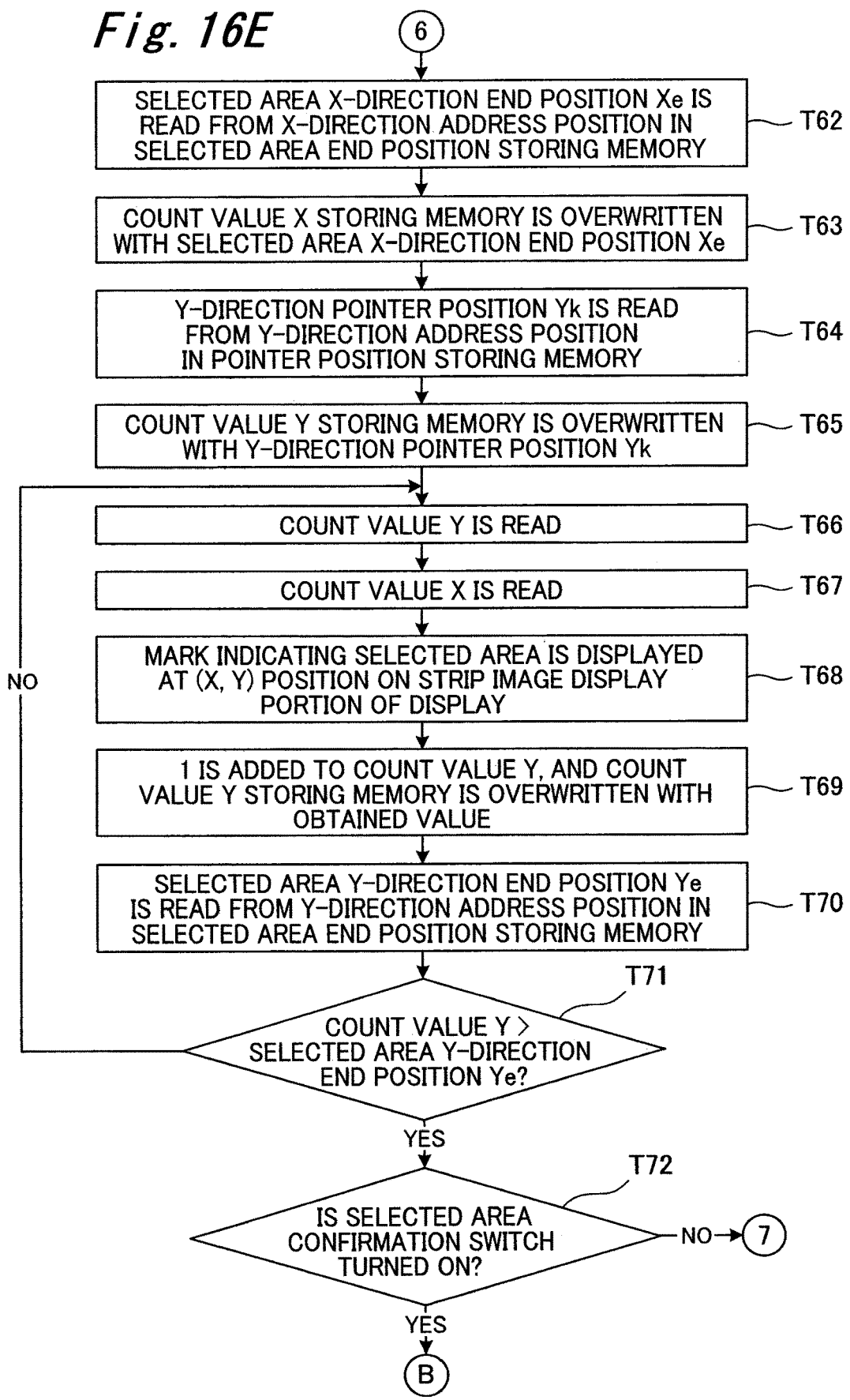
FIG. 16E is a flowchart that illustrates the operations of the print quality inspection apparatus according to the second embodiment of the present invention.
Figure 17A:
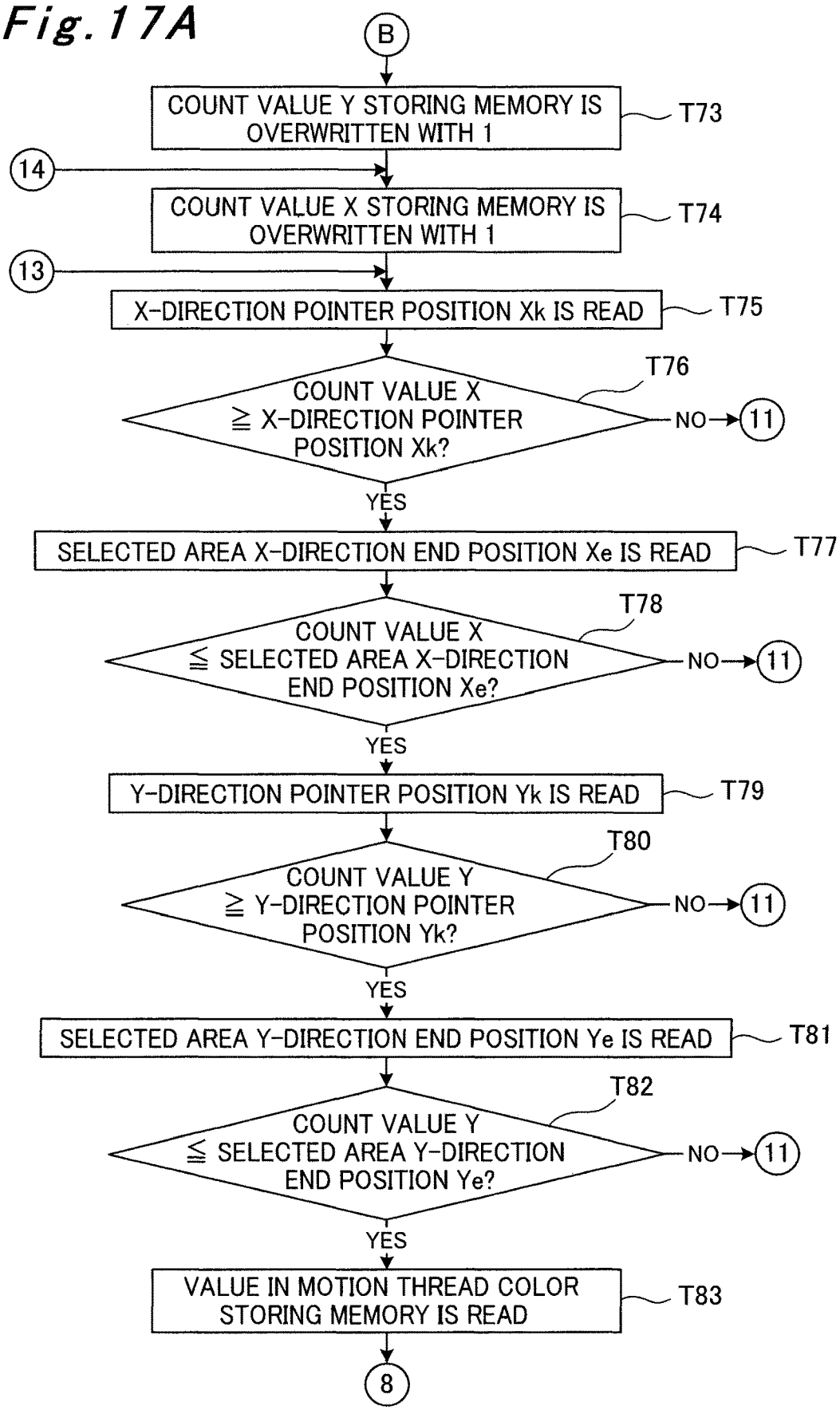
FIG. 17A is a flowchart that illustrates the operations of the print quality inspection apparatus according to the second embodiment of the present invention.
Figure 17B:
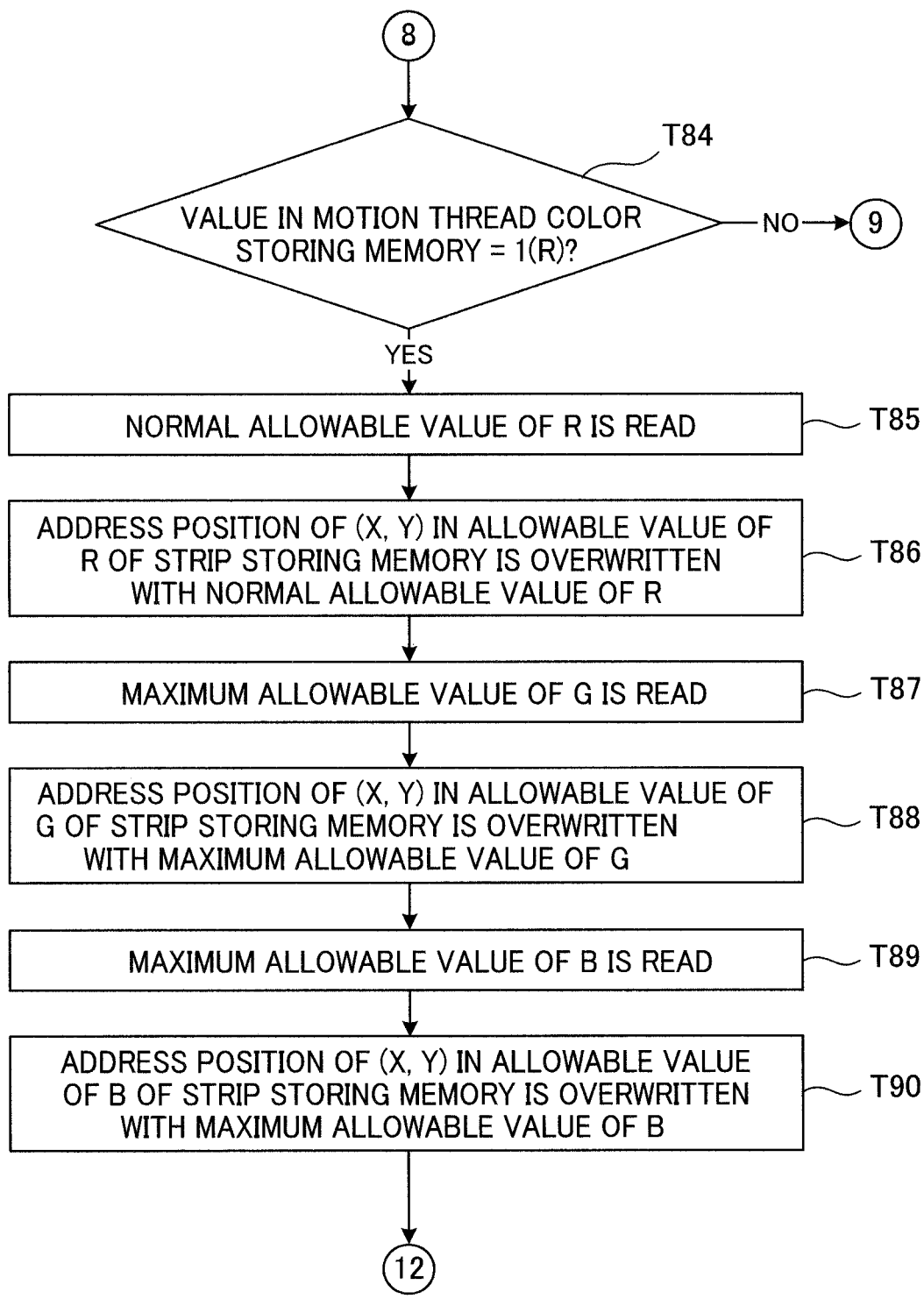
FIG. 17B is a flowchart that illustrates the operations of the print quality inspection apparatus according to the second embodiment of the present invention.
Figure 17C:
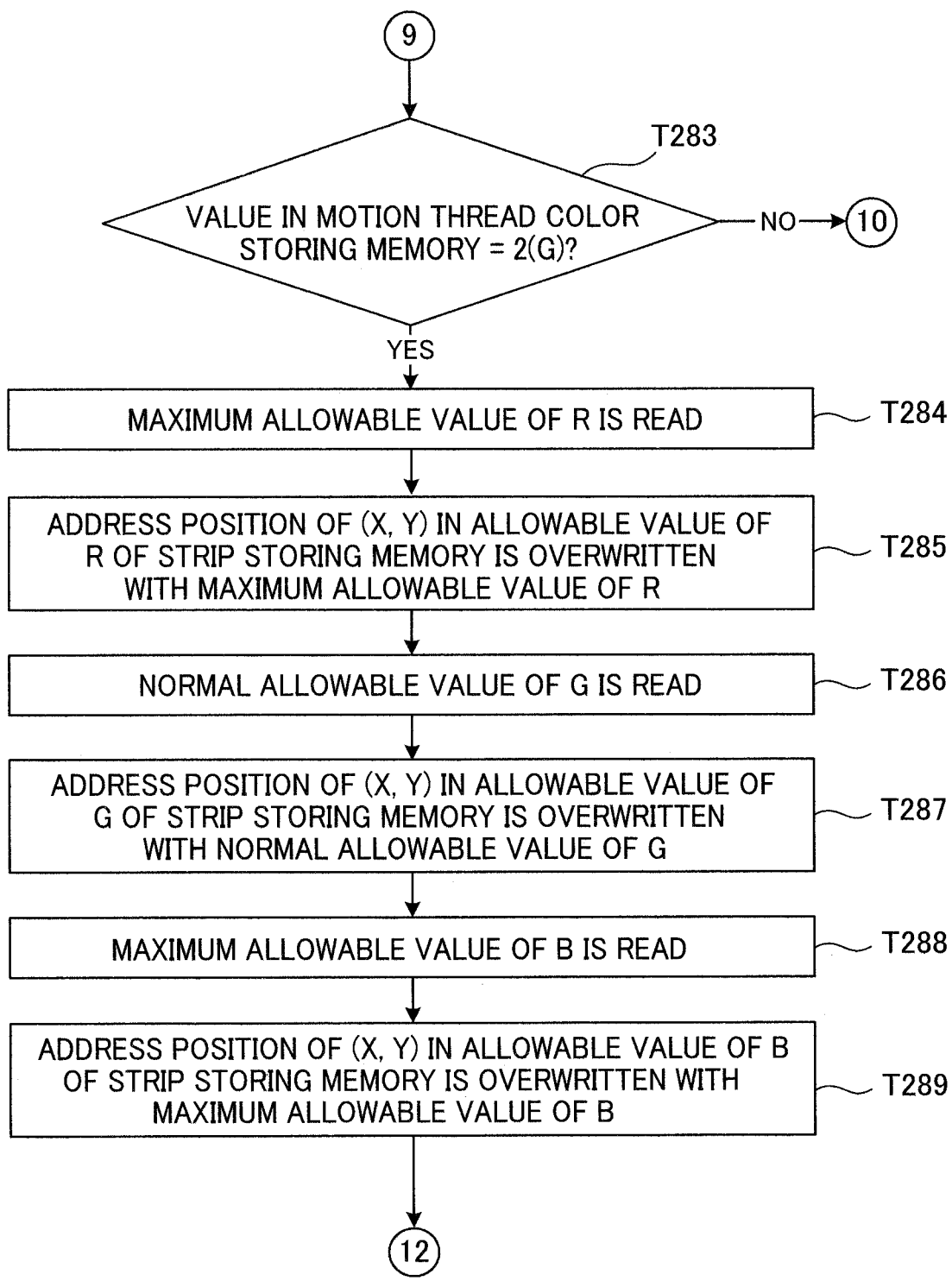
FIG. 17C is a flowchart that illustrates the operations of the print quality inspection apparatus according to the second embodiment of the present invention.
Figure 17D:
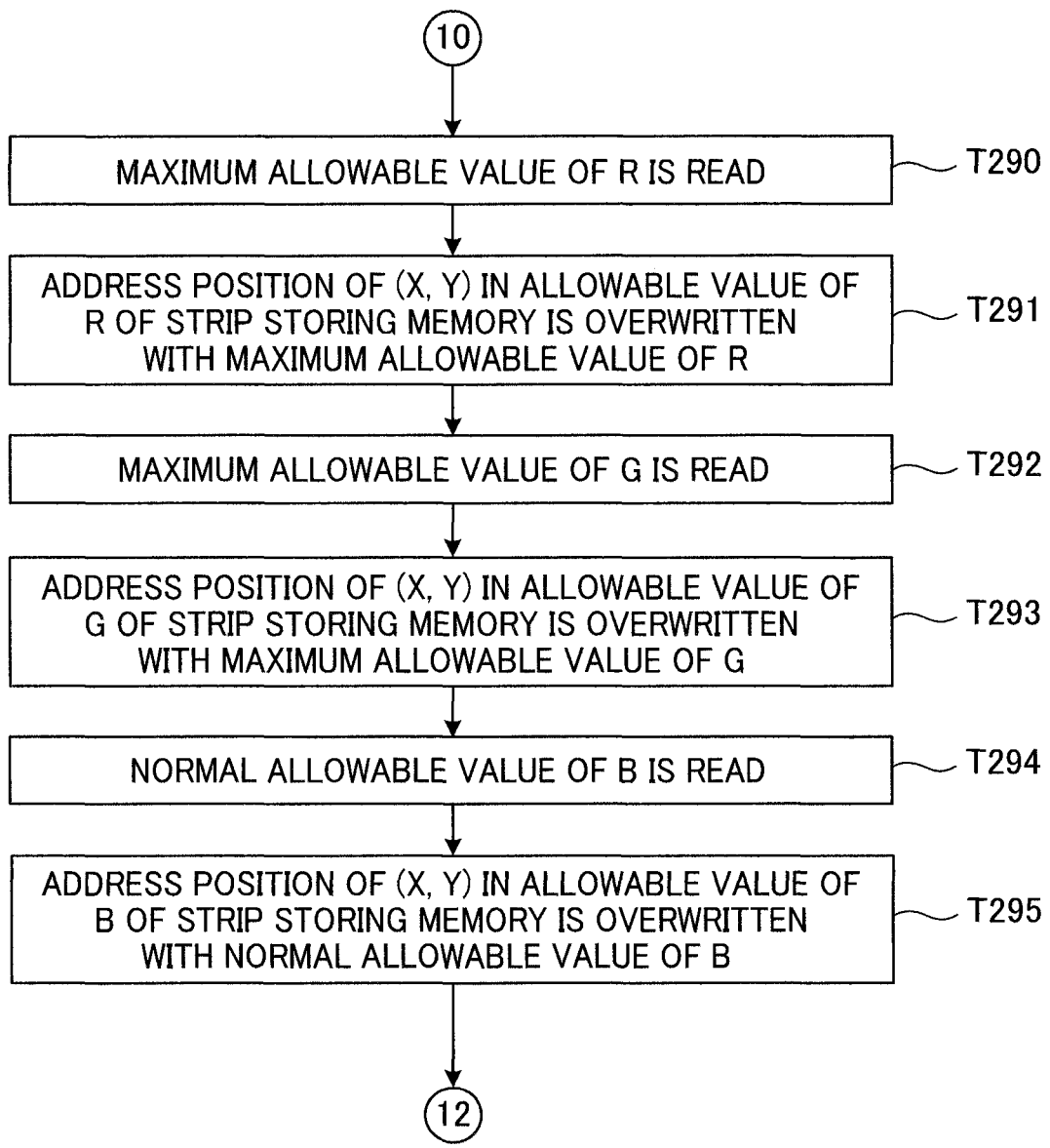
FIG. 17D is a flowchart that illustrates the operations of the print quality inspection apparatus according to the second embodiment of the present invention.
Figure 17E:
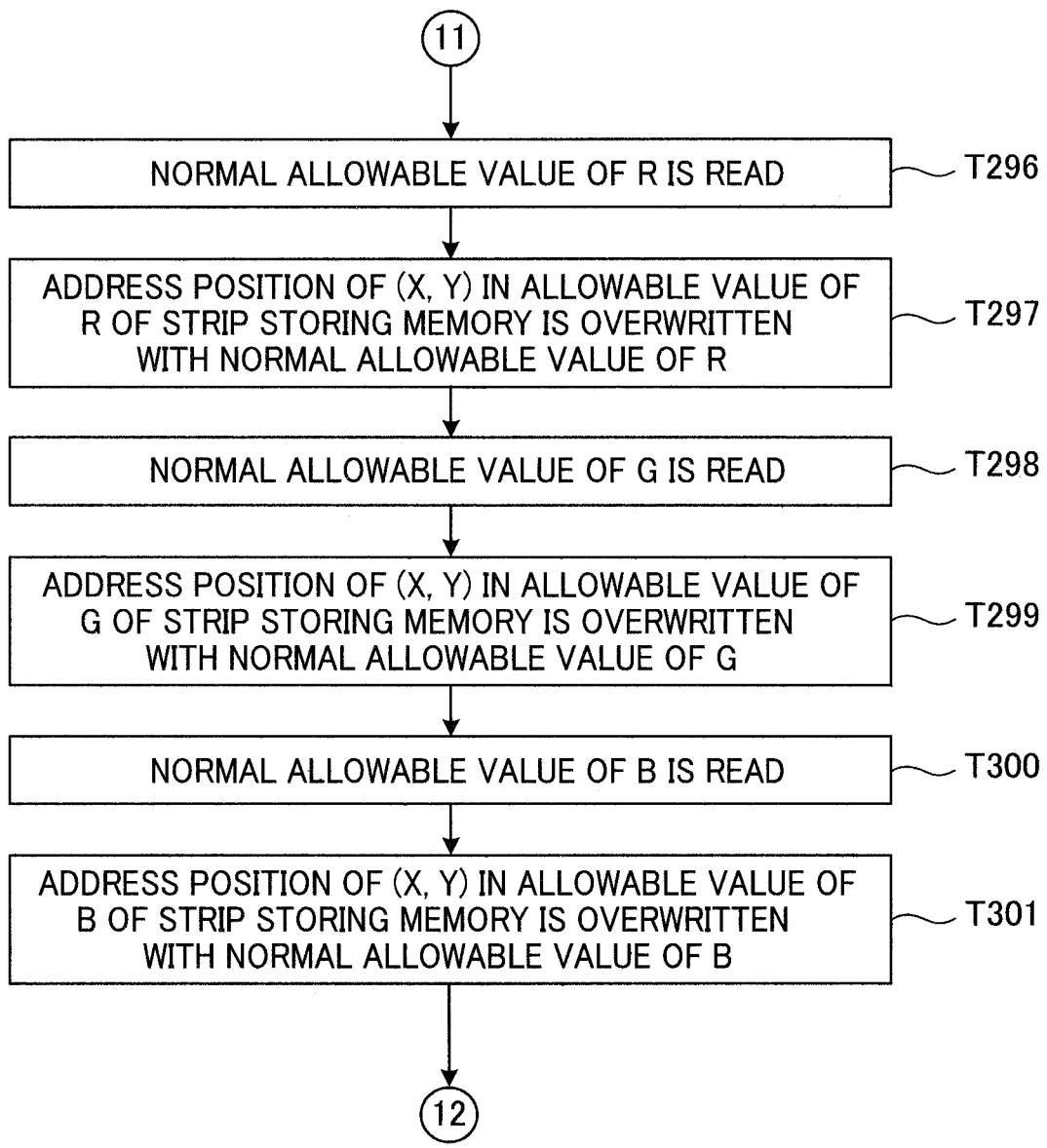
FIG. 17E is a flowchart that illustrates the operations of the print quality inspection apparatus according to the second embodiment of the present invention.
Figure 17G:
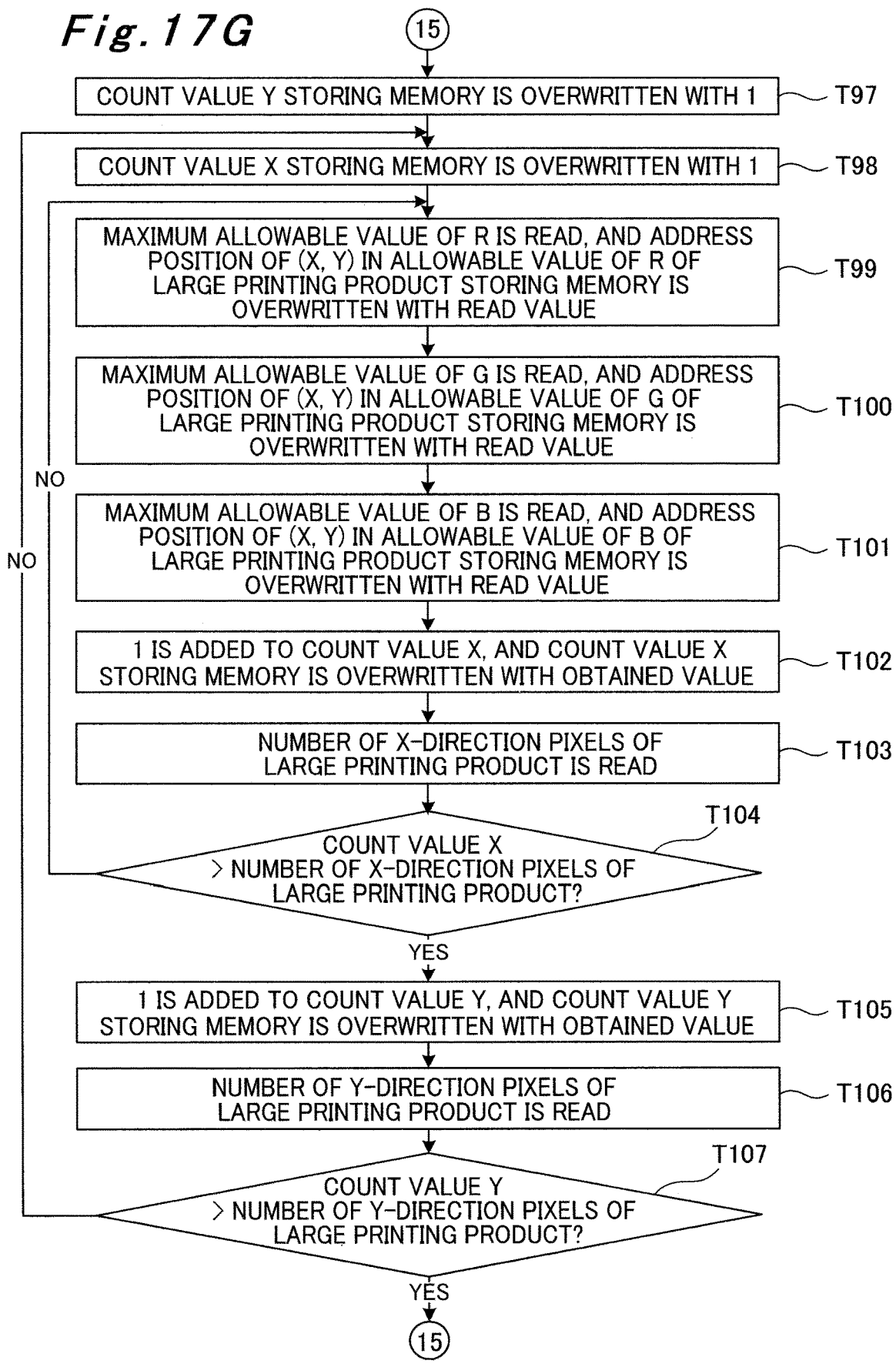
FIG. 17G is a flowchart that illustrates the operations of the print quality inspection apparatus according to the second embodiment of the present invention.
Figure 17H:
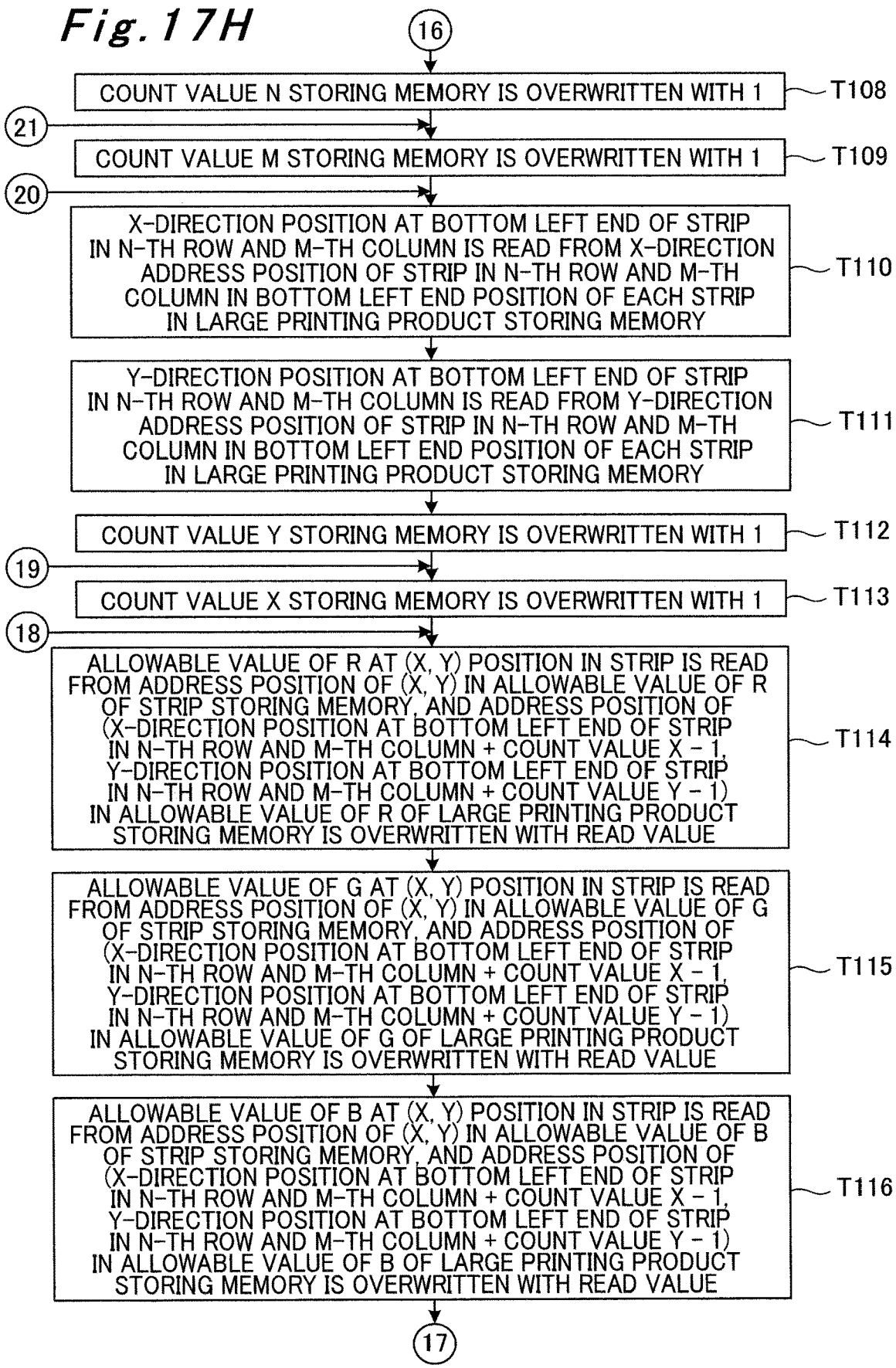
FIG. 17H is a flowchart that illustrates the operations of the print quality inspection apparatus according to the second embodiment of the present invention.
Figure 171:
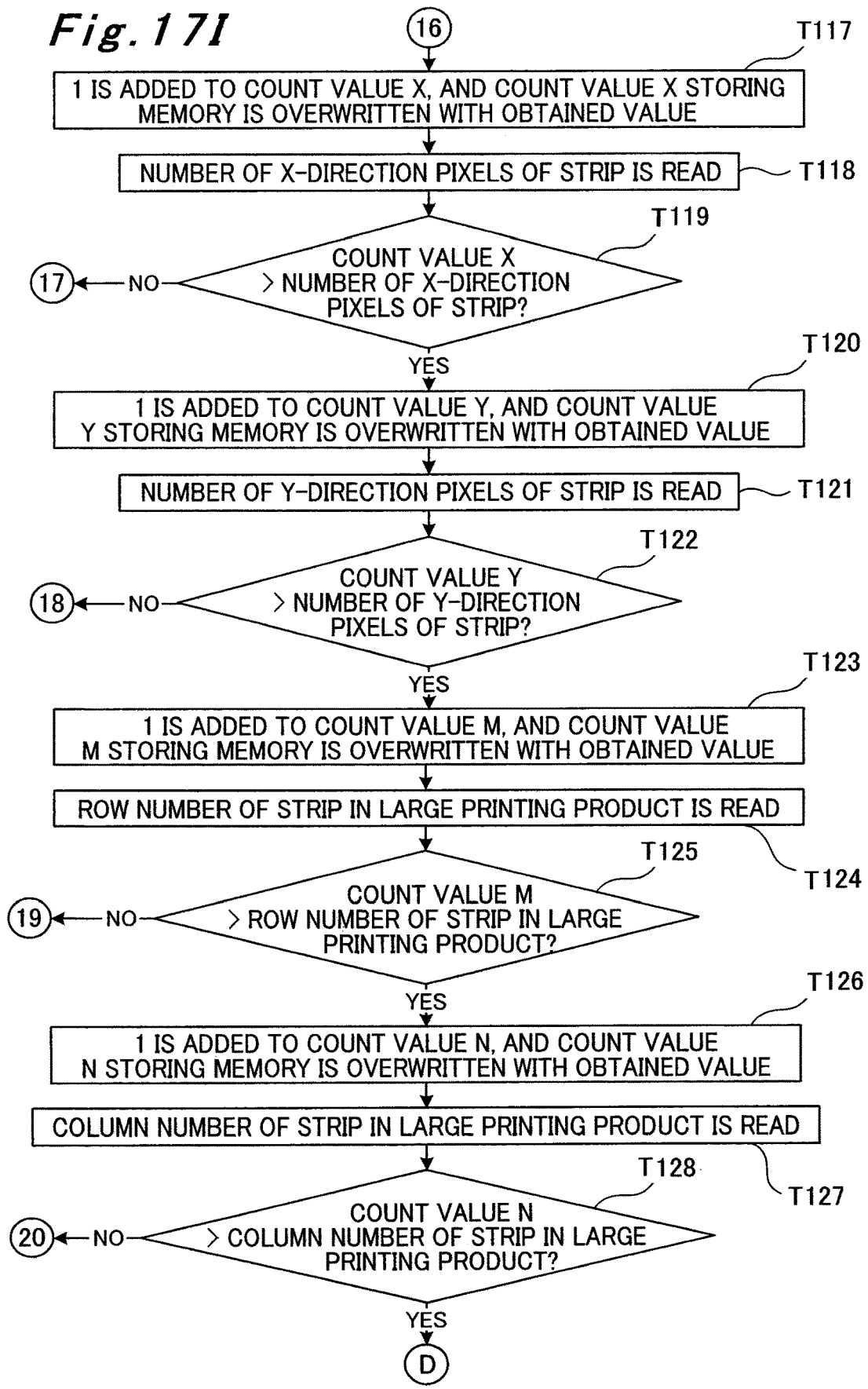
Figure 18A:
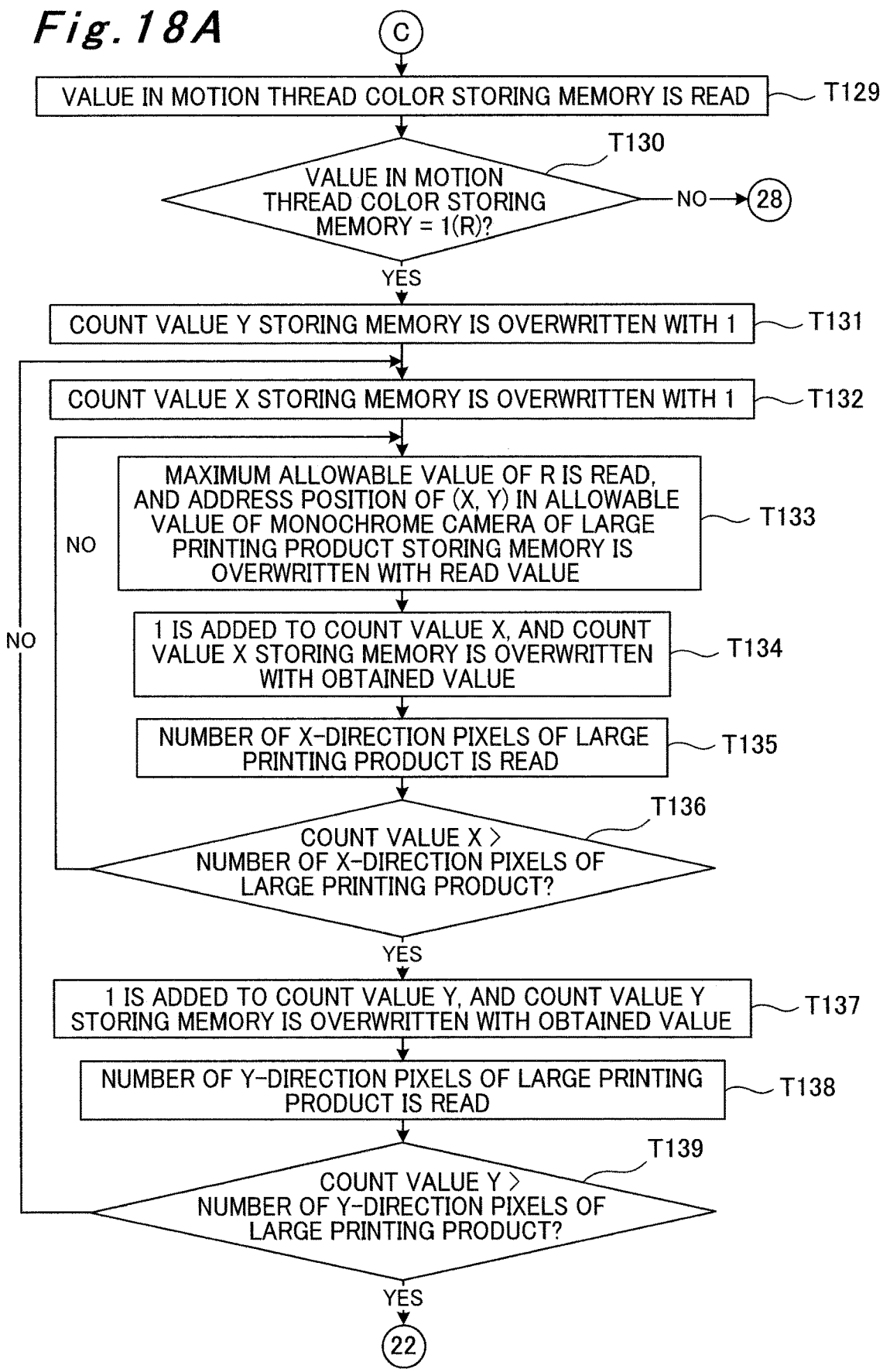
FIG. 18A is a flowchart that illustrates the operations of the print quality inspection apparatus according to the second embodiment of the present invention.
Figure 18B:
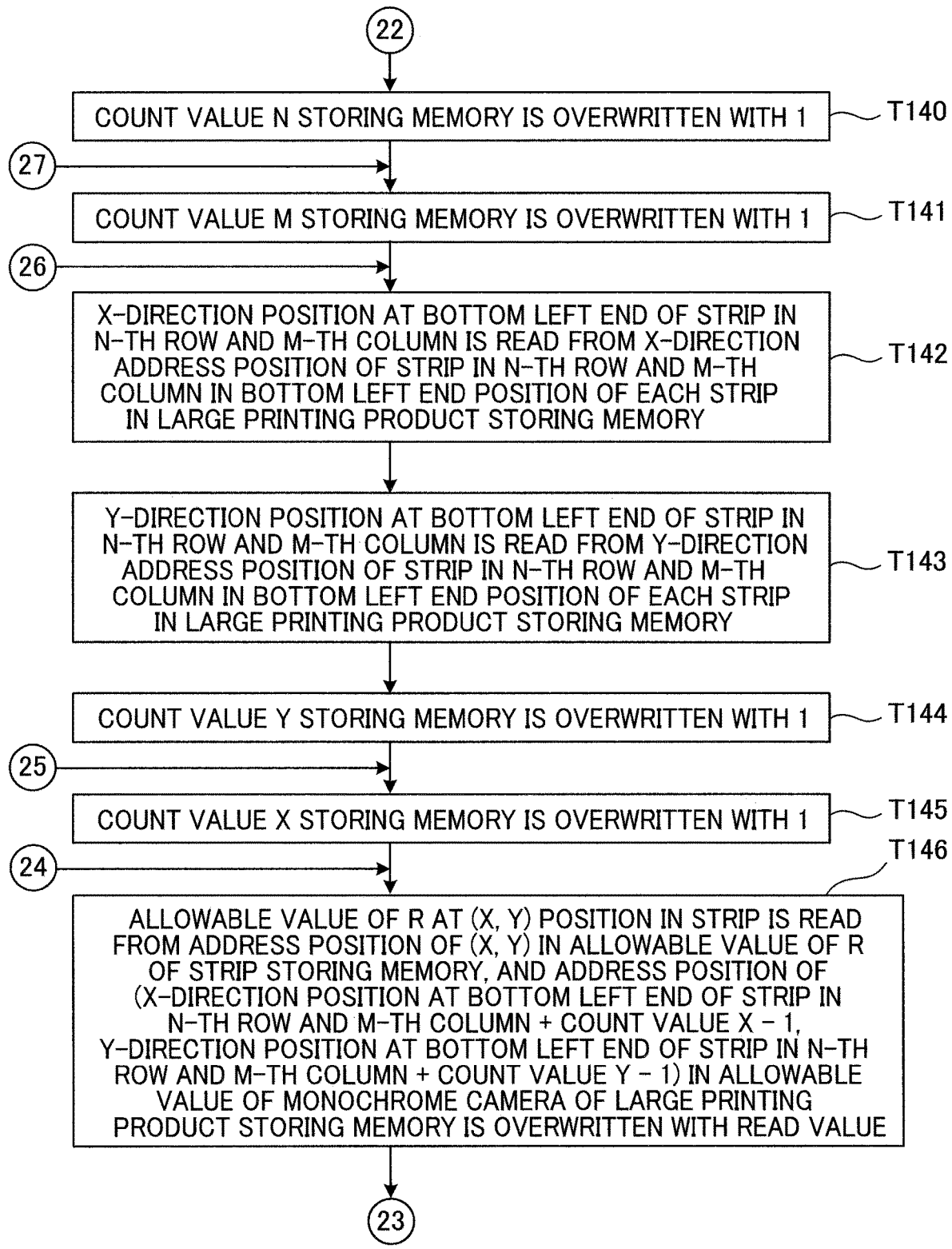
FIG. 18B is a flowchart that illustrates the operations of the print quality inspection apparatus according to the second embodiment of the present invention.
Figure 18C:
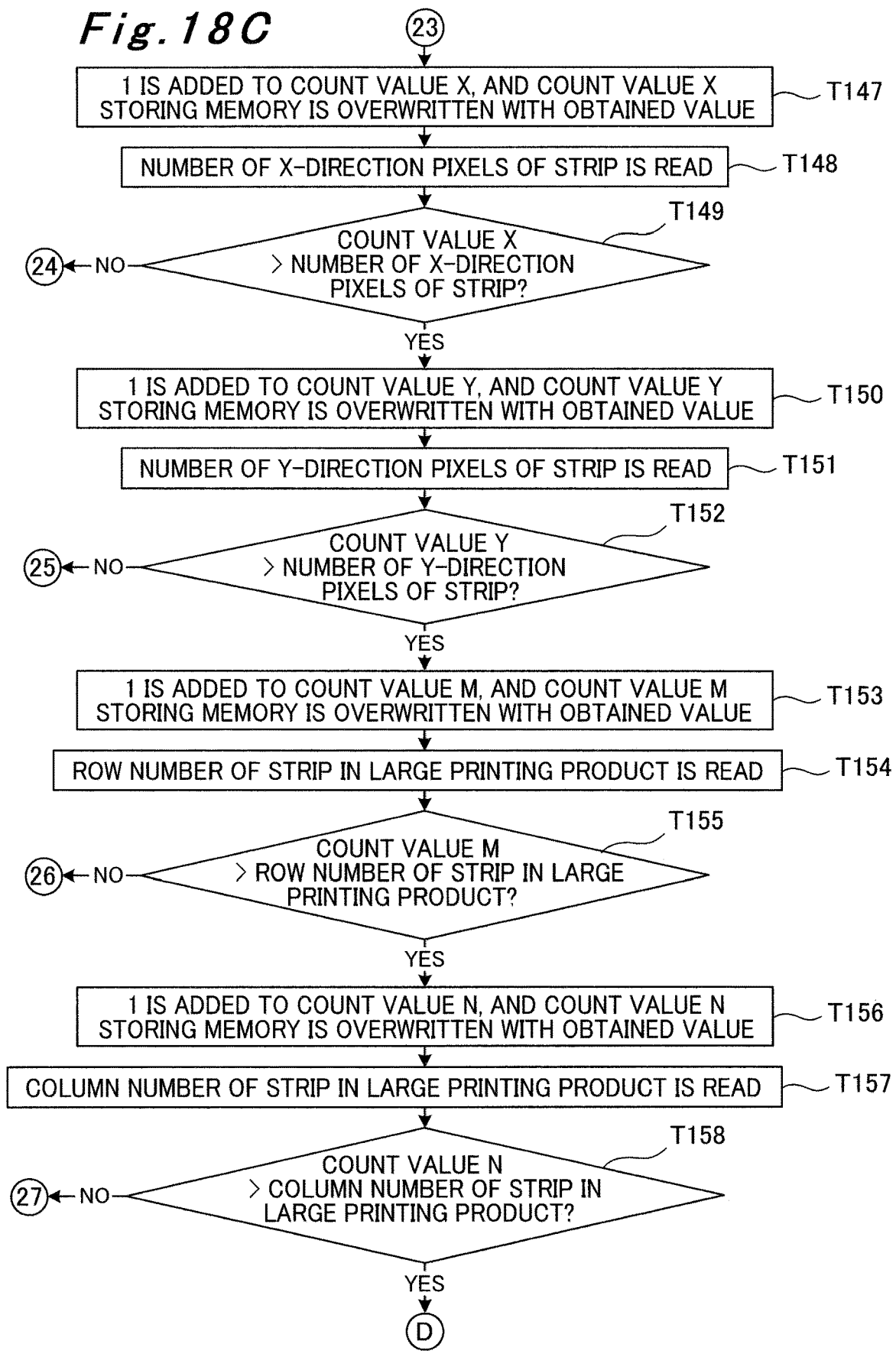
FIG. 18C is a flowchart that illustrates the operations of the print quality inspection apparatus according to the second embodiment of the present invention.
Figure 18D:
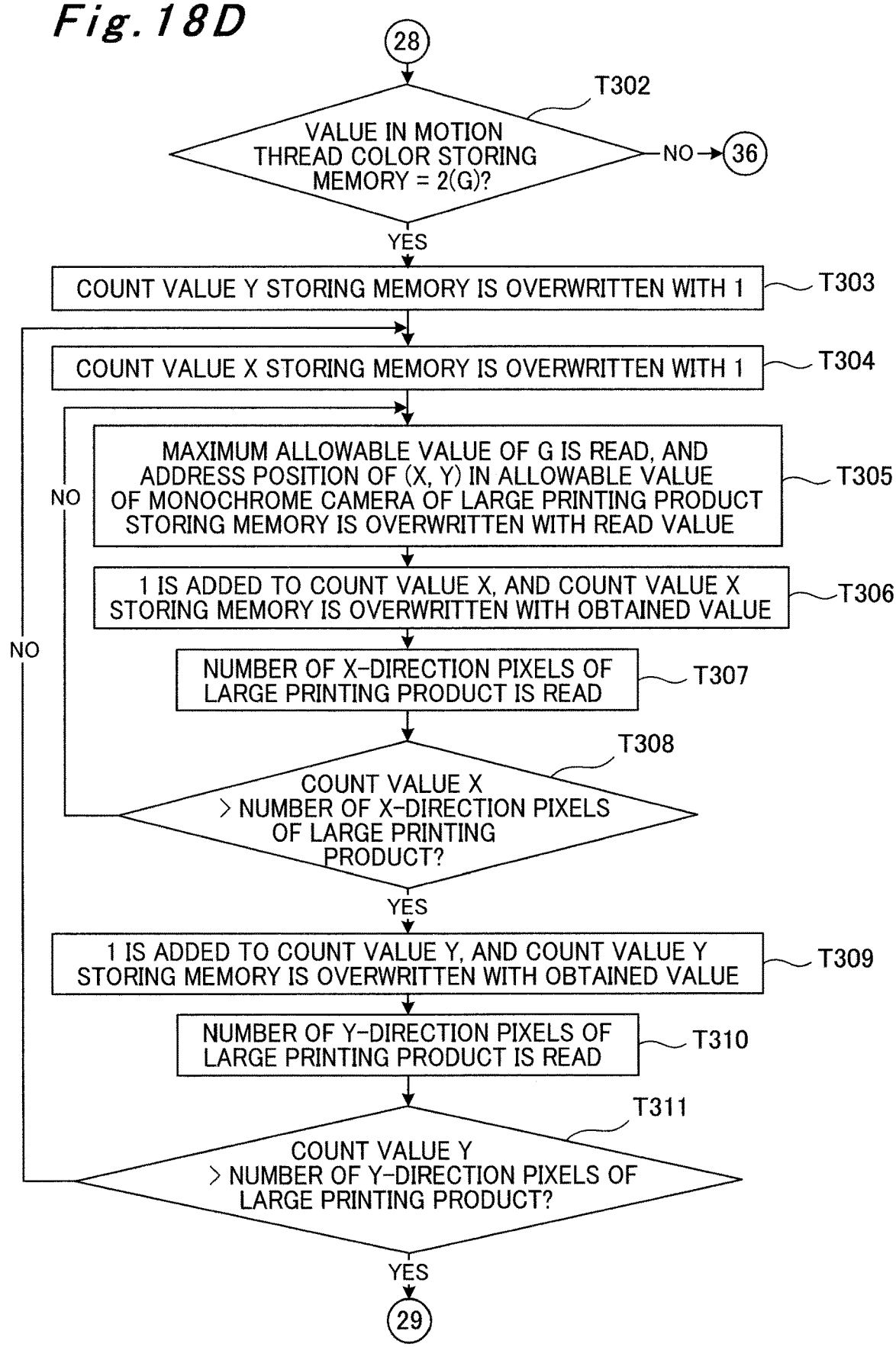
FIG. 18D is a flowchart that illustrates the operations of the print quality inspection apparatus according to the second embodiment of the present invention.
Figure 18E:
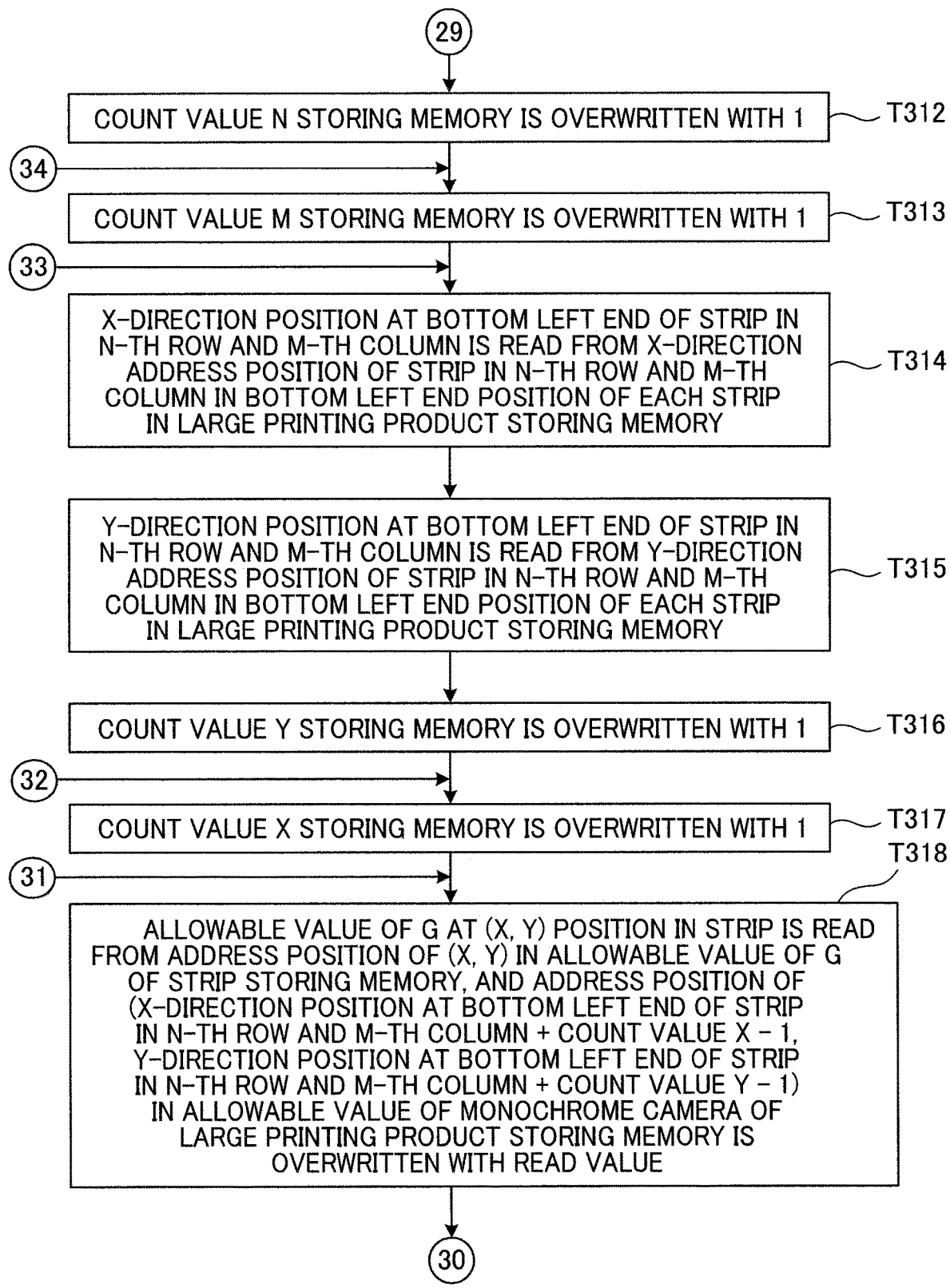
FIG. 18E is a flowchart that illustrates the operations of the print quality inspection apparatus according to the second embodiment of the present invention.
Figure 18F:
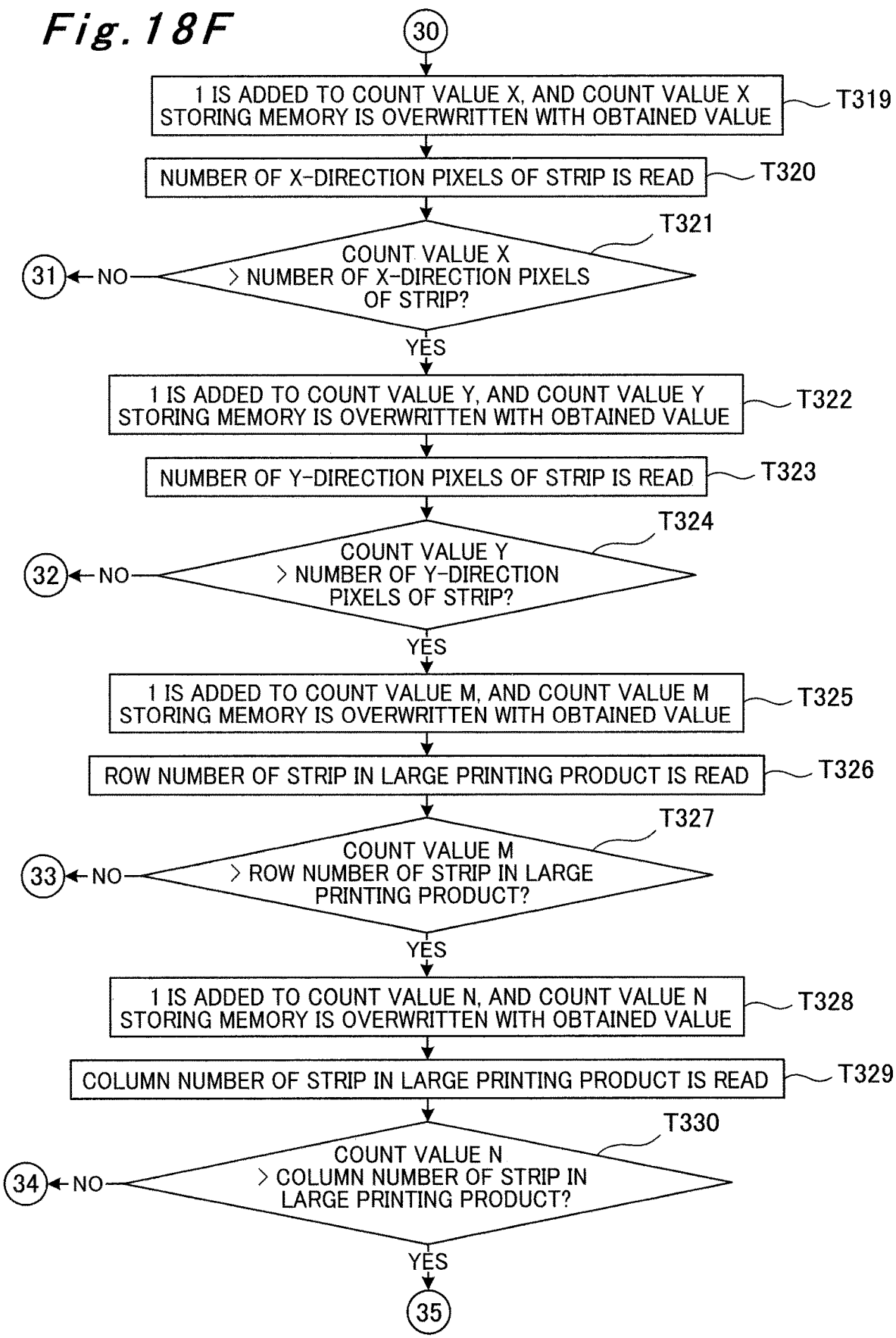
FIG. 18F is a flowchart that illustrates the operations of the print quality inspection apparatus according to the second embodiment of the present invention.
Figure 18G:
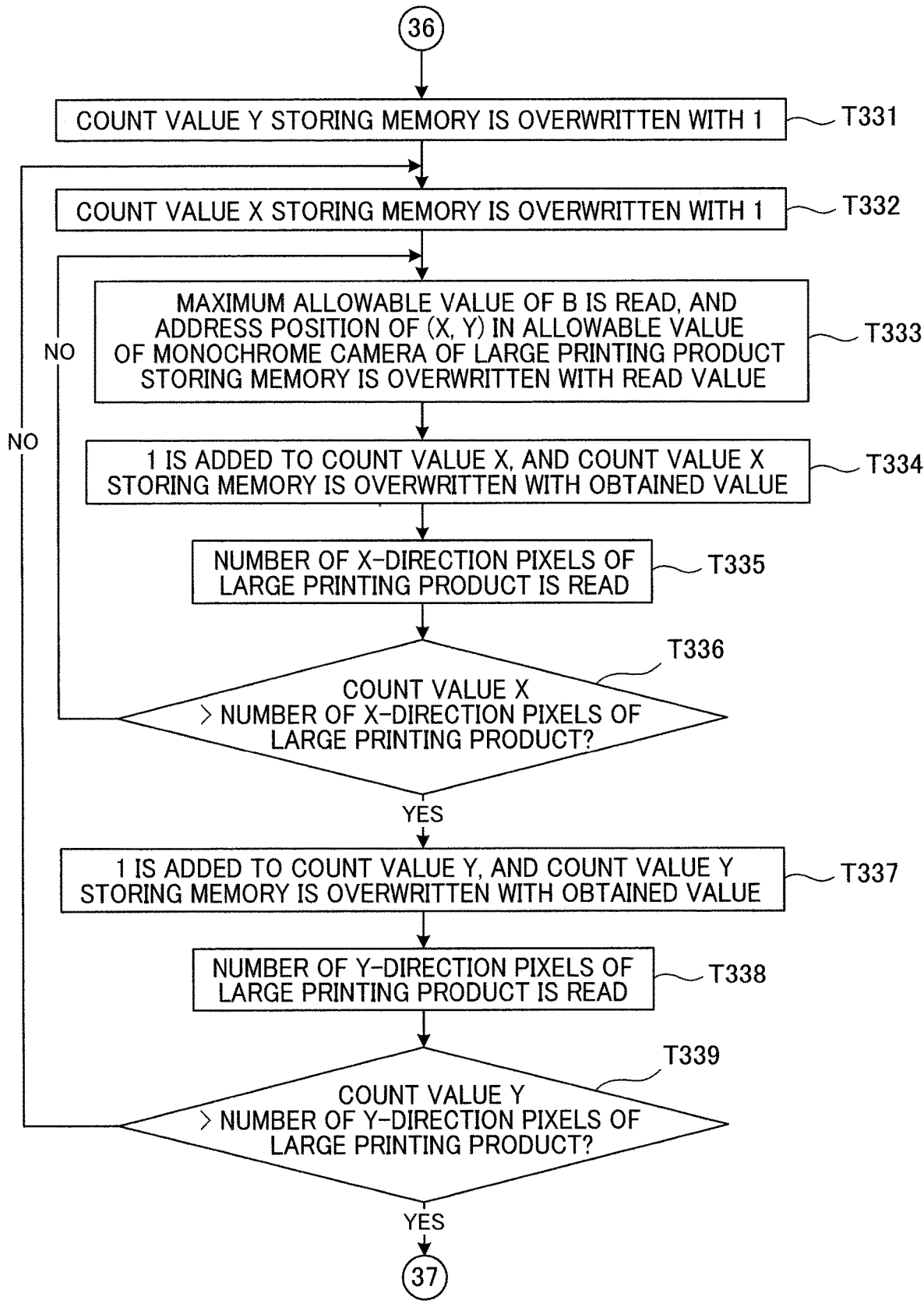
FIG. 18G is a flowchart that illustrates the operations of the print quality inspection apparatus according to the second embodiment of the present invention.
Figure 18H:
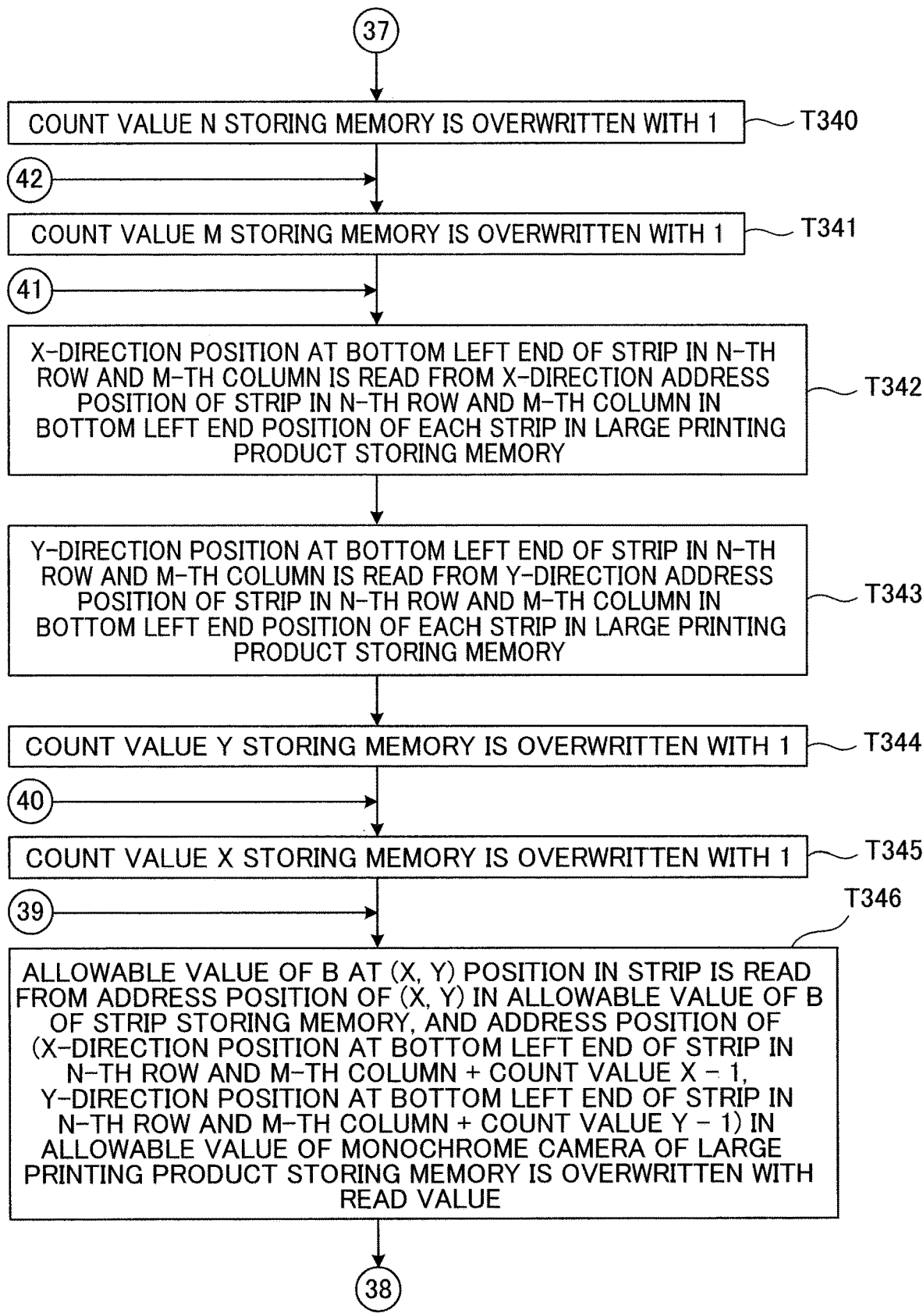
FIG. 18H is a flowchart that illustrates the operations of the print quality inspection apparatus according to the second embodiment of the present invention.
Figure 181:
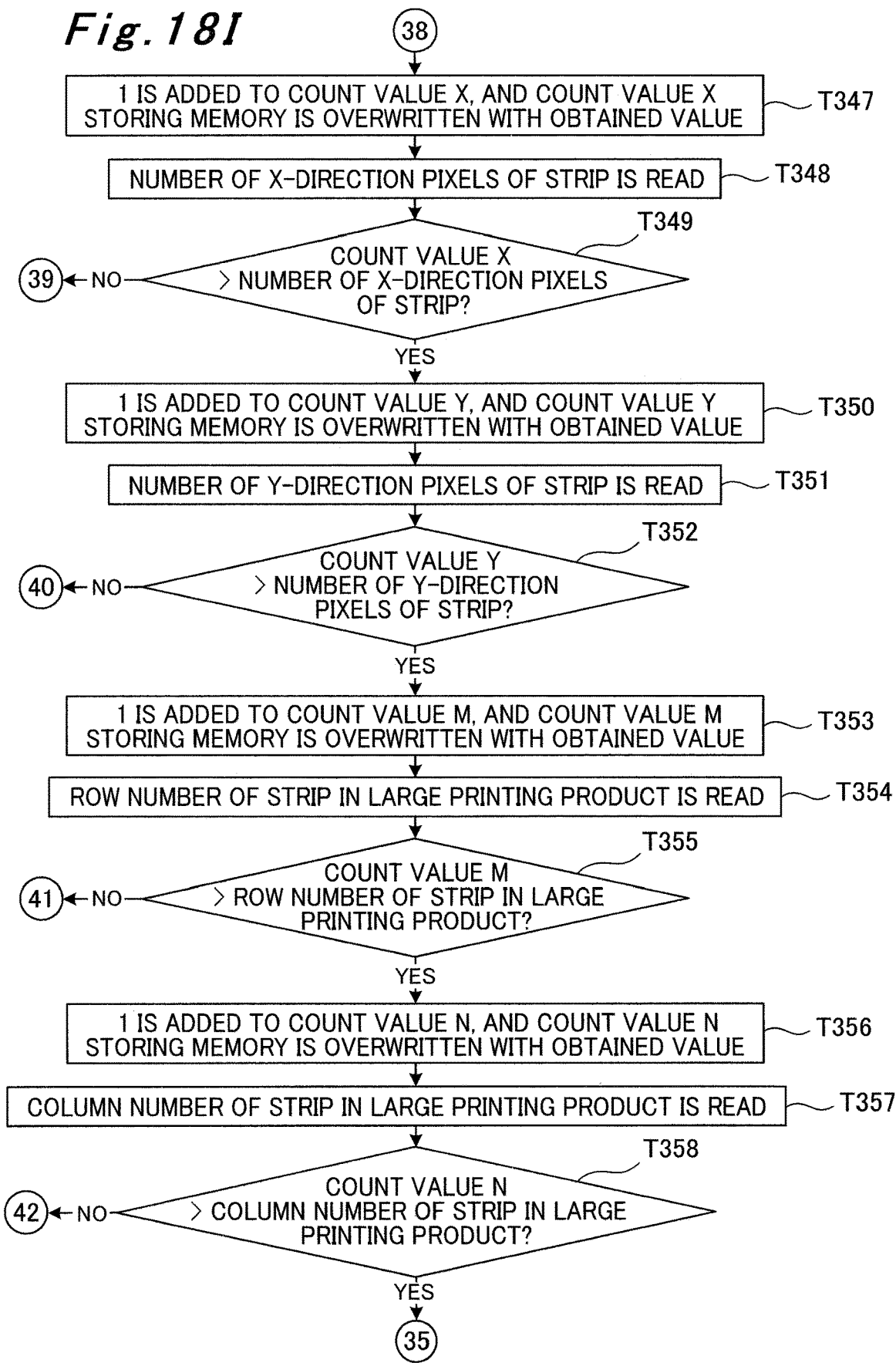
Figure 19B:
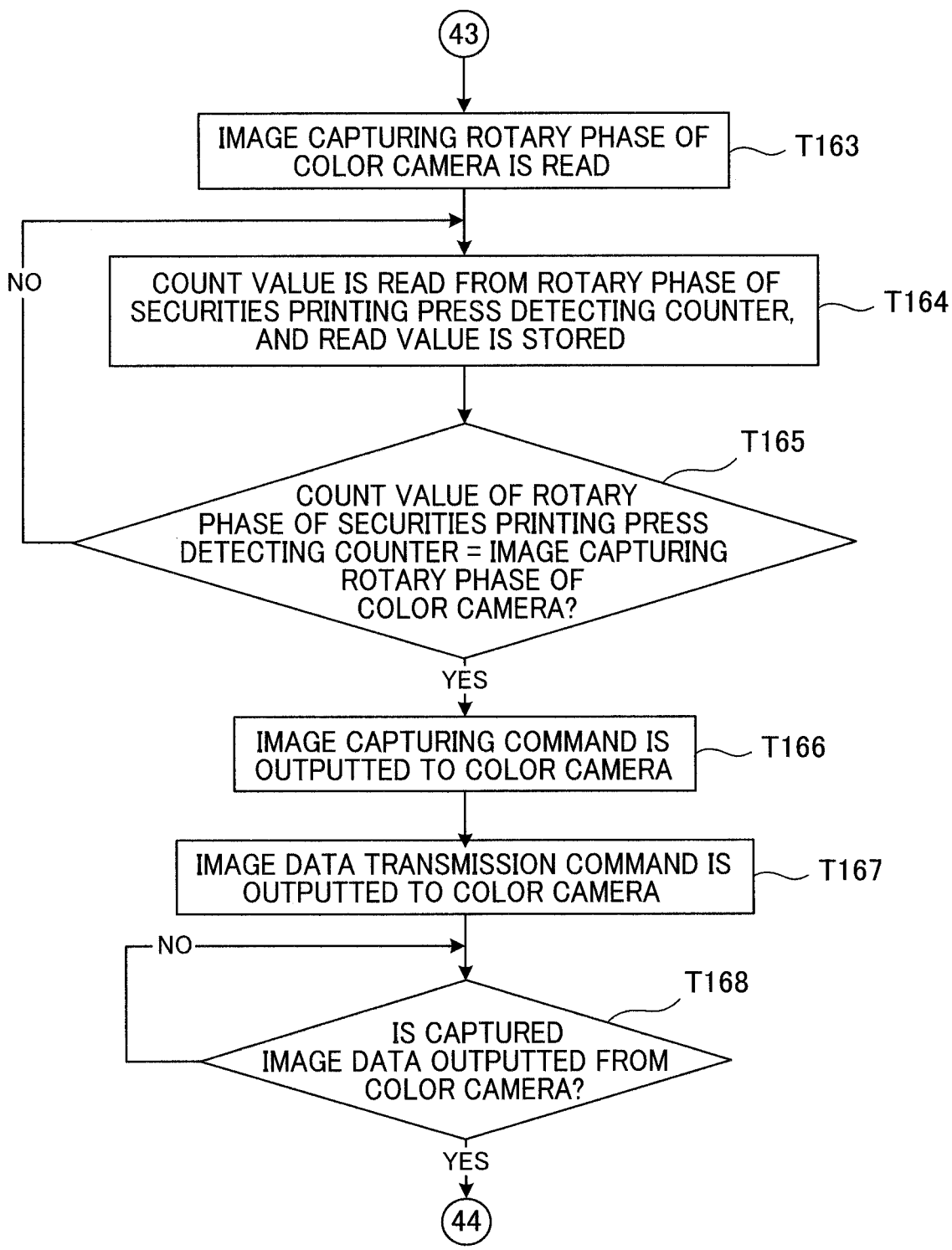
FIG. 19B is a flowchart that illustrates the operations of the print quality inspection apparatus according to the second embodiment of the present invention.
Figure 19C:
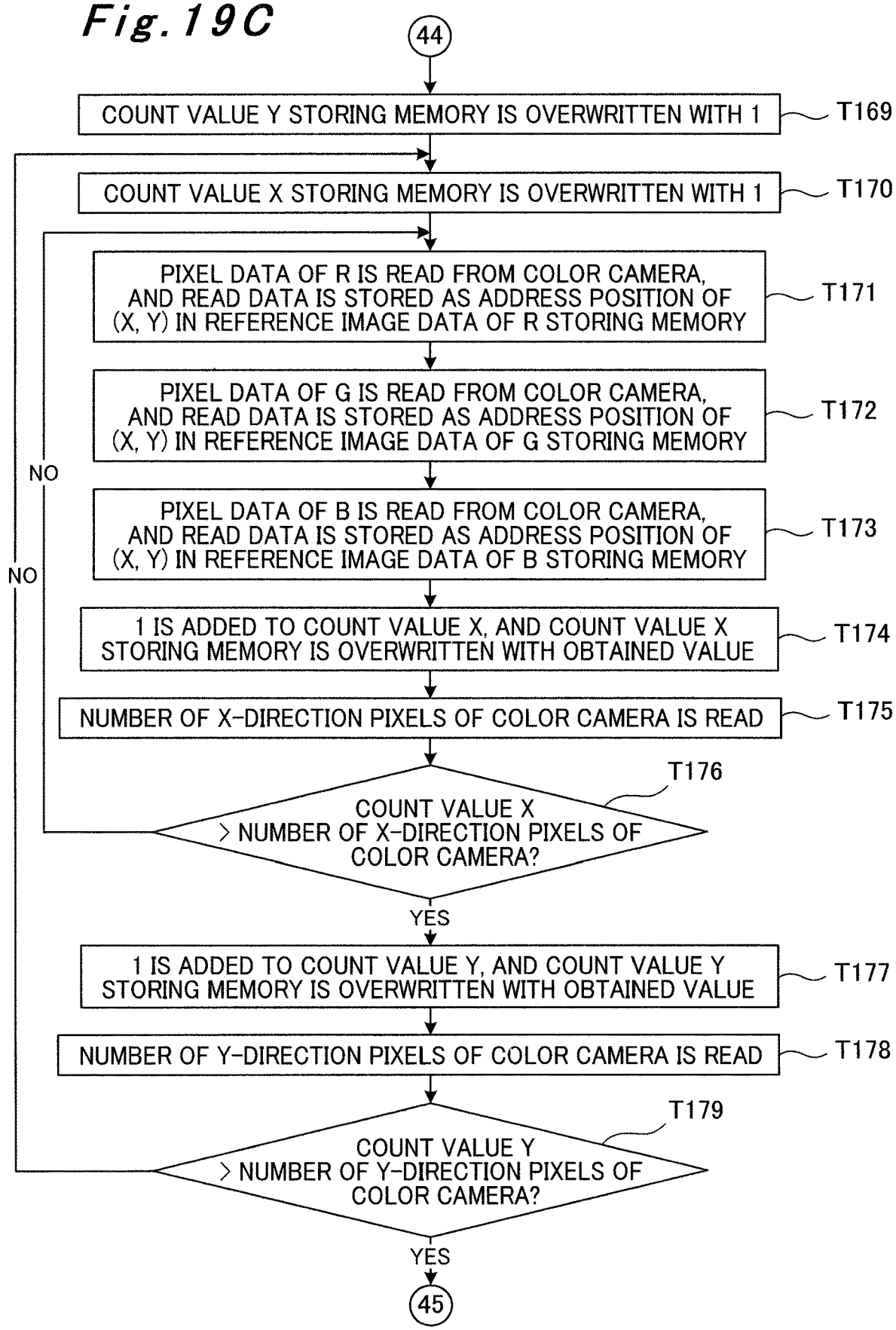
FIG. 19C is a flowchart that illustrates the operations of the print quality inspection apparatus according to the second embodiment of the present invention.
Figure 19D:
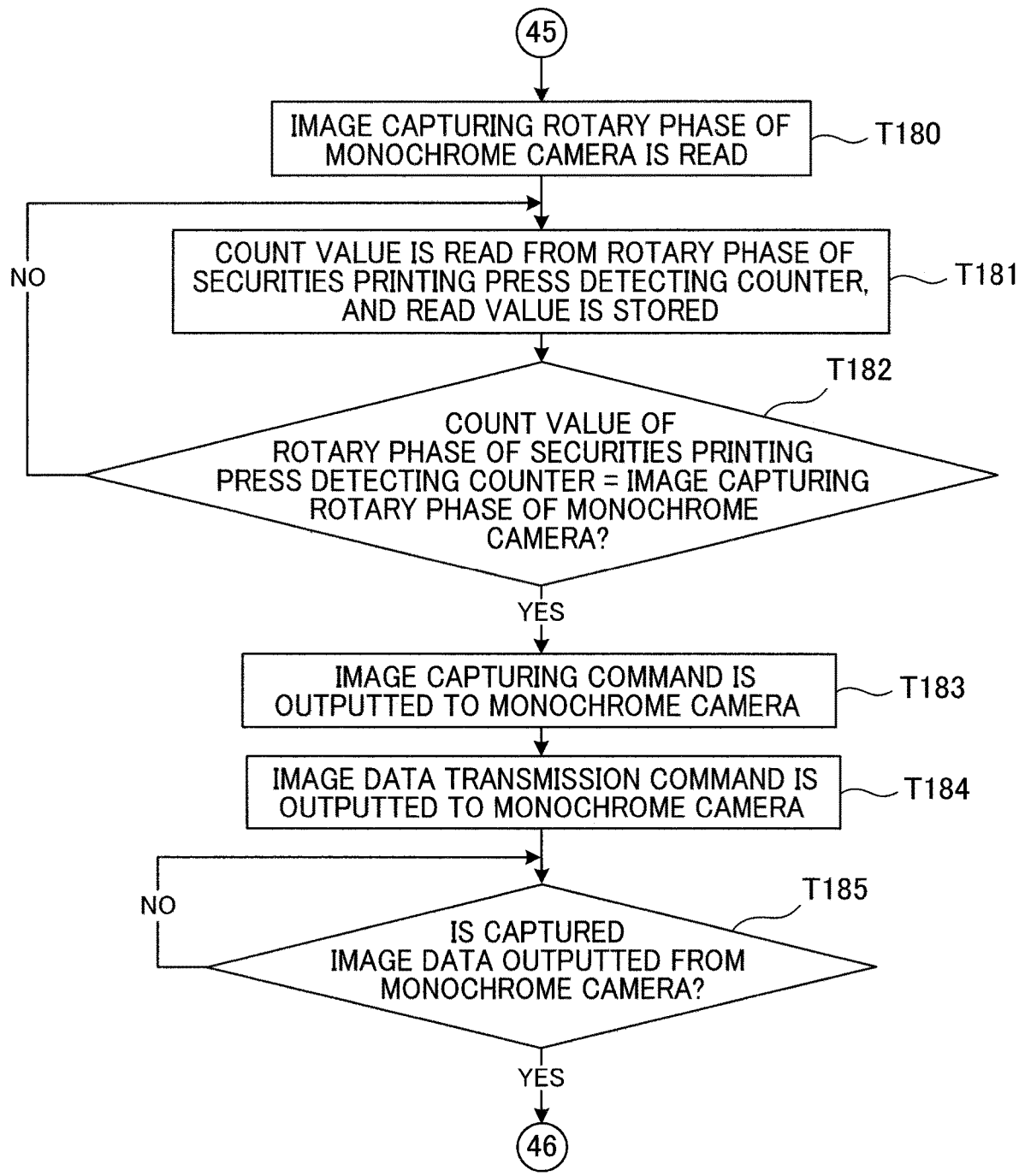
FIG. 19D is a flowchart that illustrates the operations of the print quality inspection apparatus according to the second embodiment of the present invention.
Figure 19E:
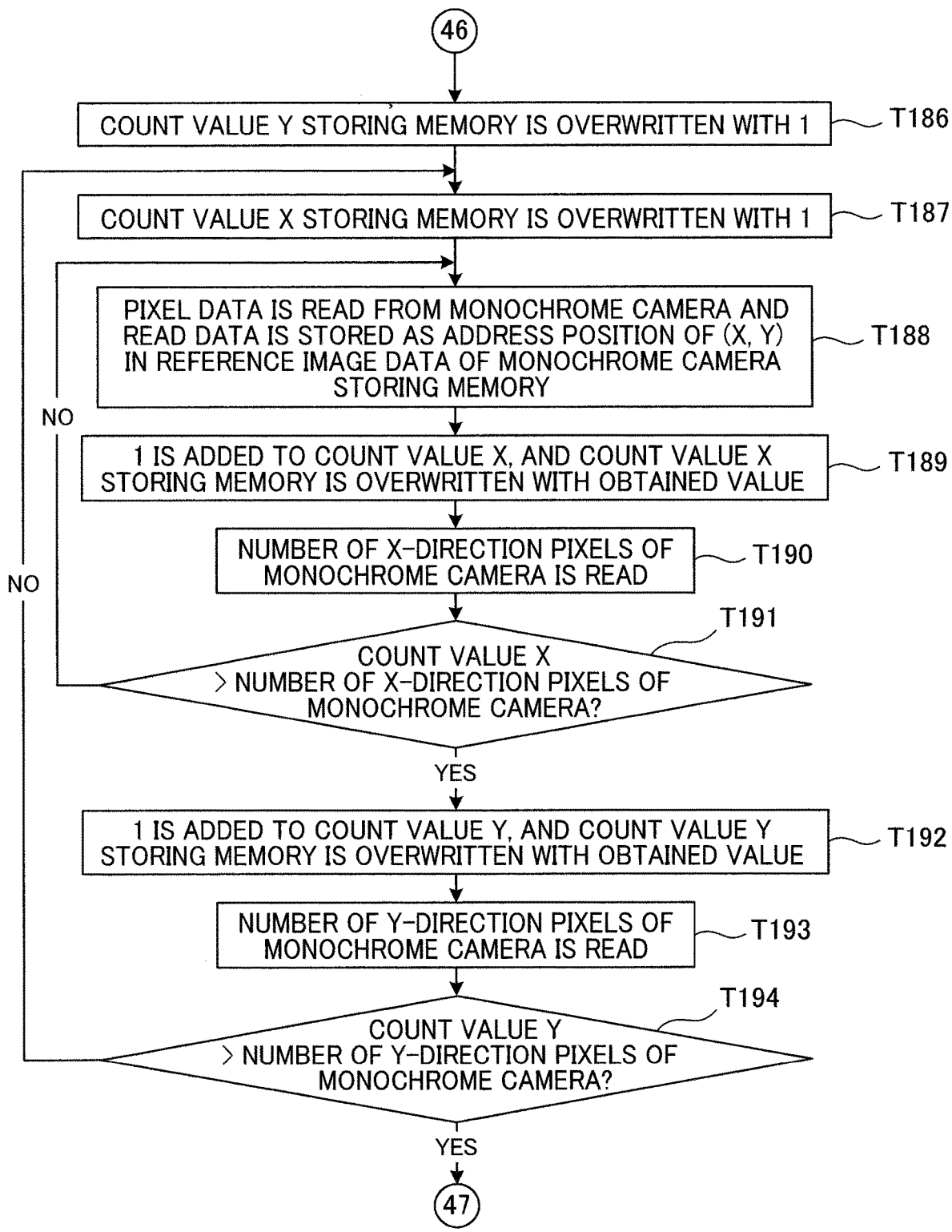
FIG. 19E is a flowchart that illustrates the operations of the print quality inspection apparatus according to the second embodiment of the present invention.
Figure 19F:
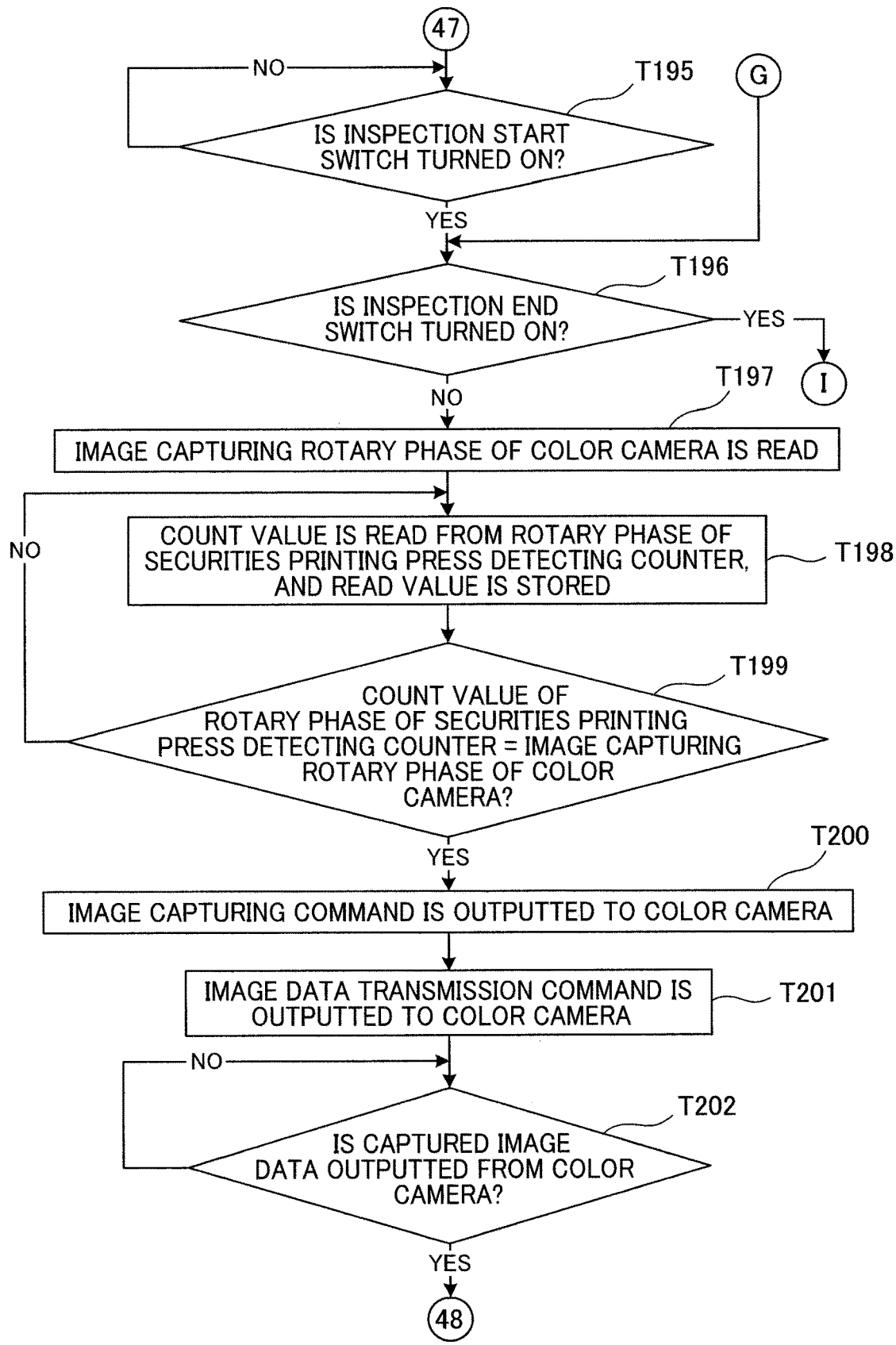
FIG. 19F is a flowchart that illustrates the operations of the print quality inspection apparatus according to the second embodiment of the present invention.
Figure 19G:
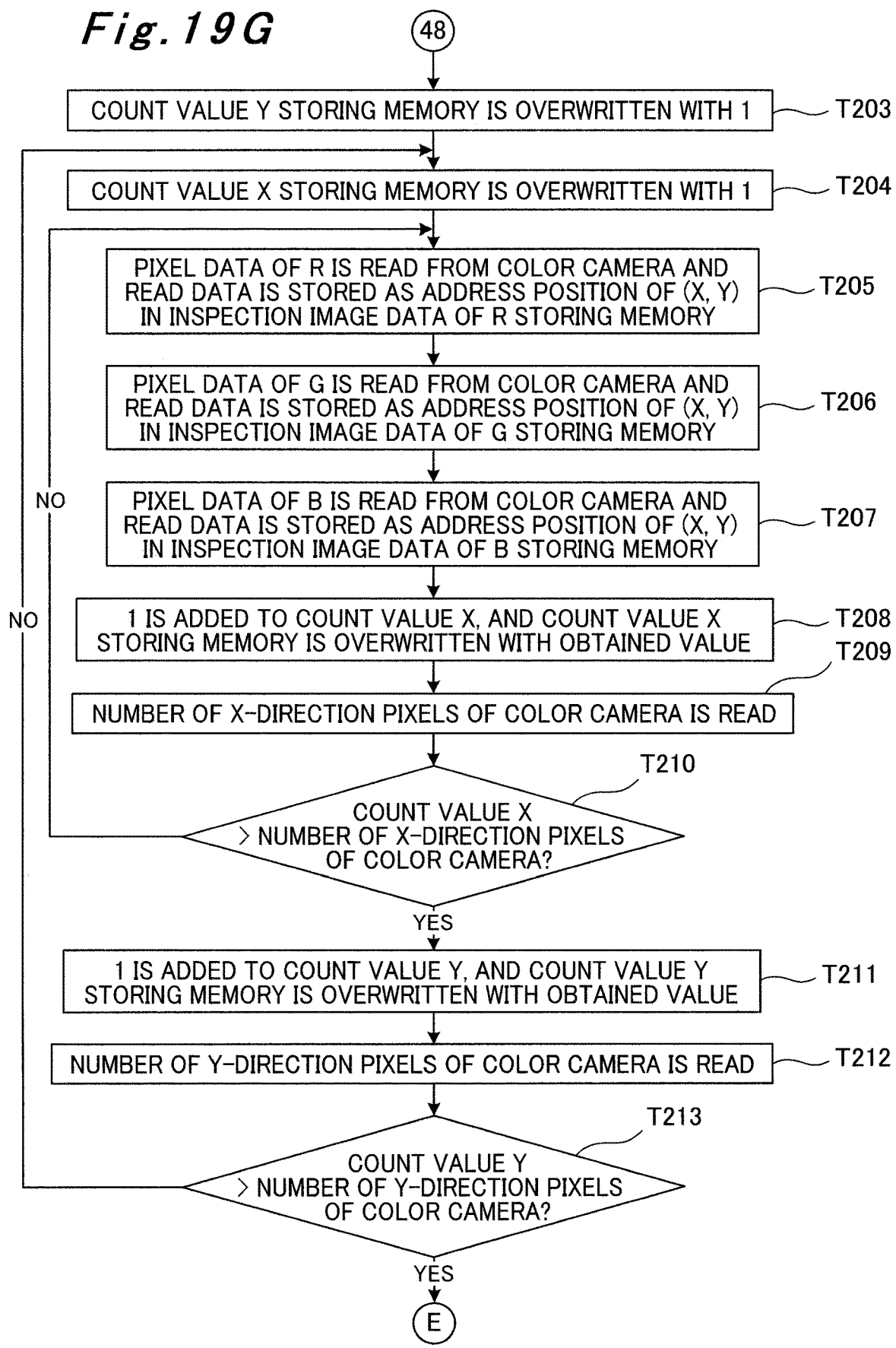
FIG. 19G is a flowchart that illustrates the operations of the print quality inspection apparatus according to the second embodiment of the present invention.
Figure 20A:
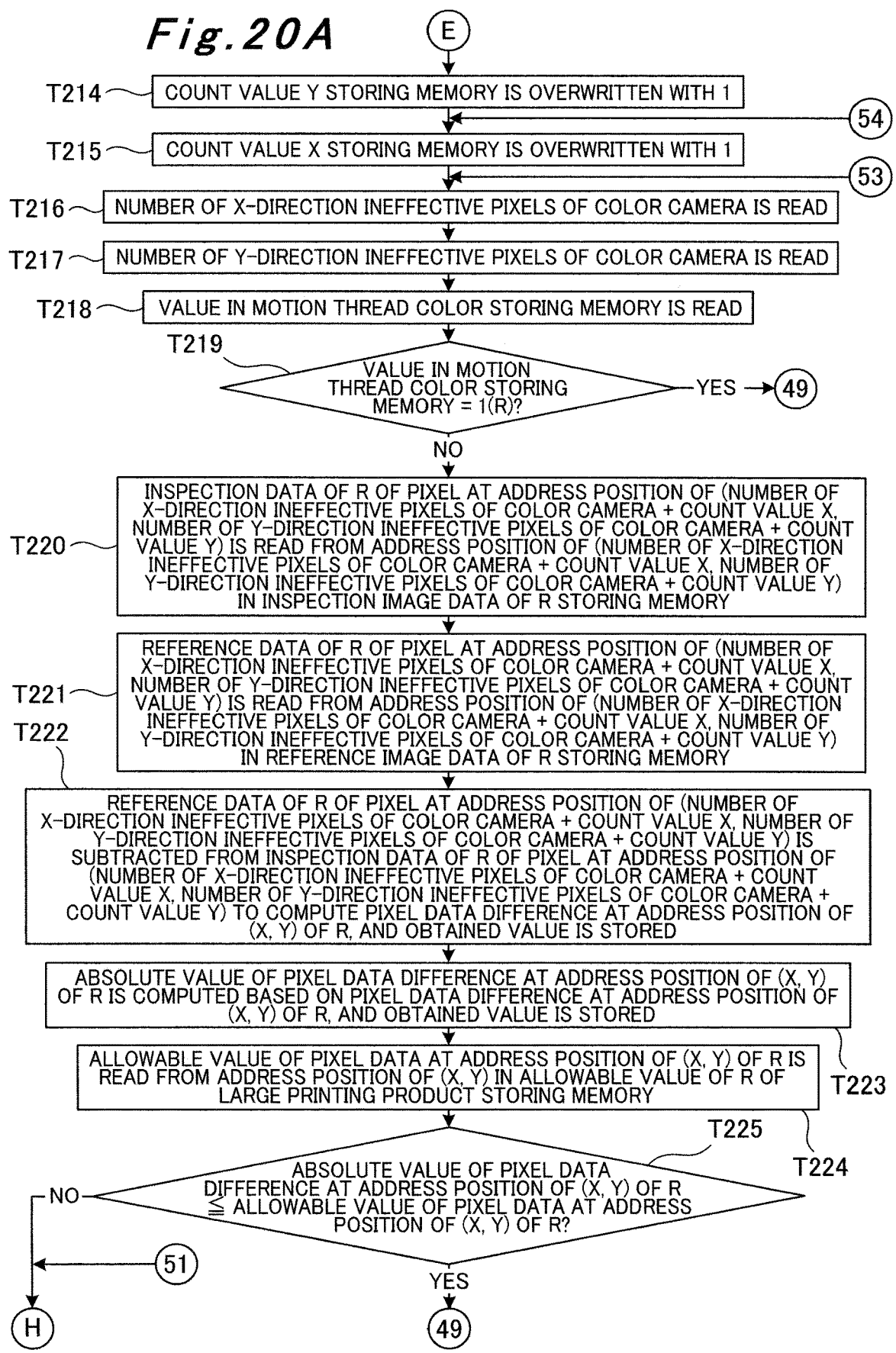
FIG. 20A is a flowchart that illustrates the operations of the print quality inspection apparatus according to the second embodiment of the present invention.
Figure 20B:
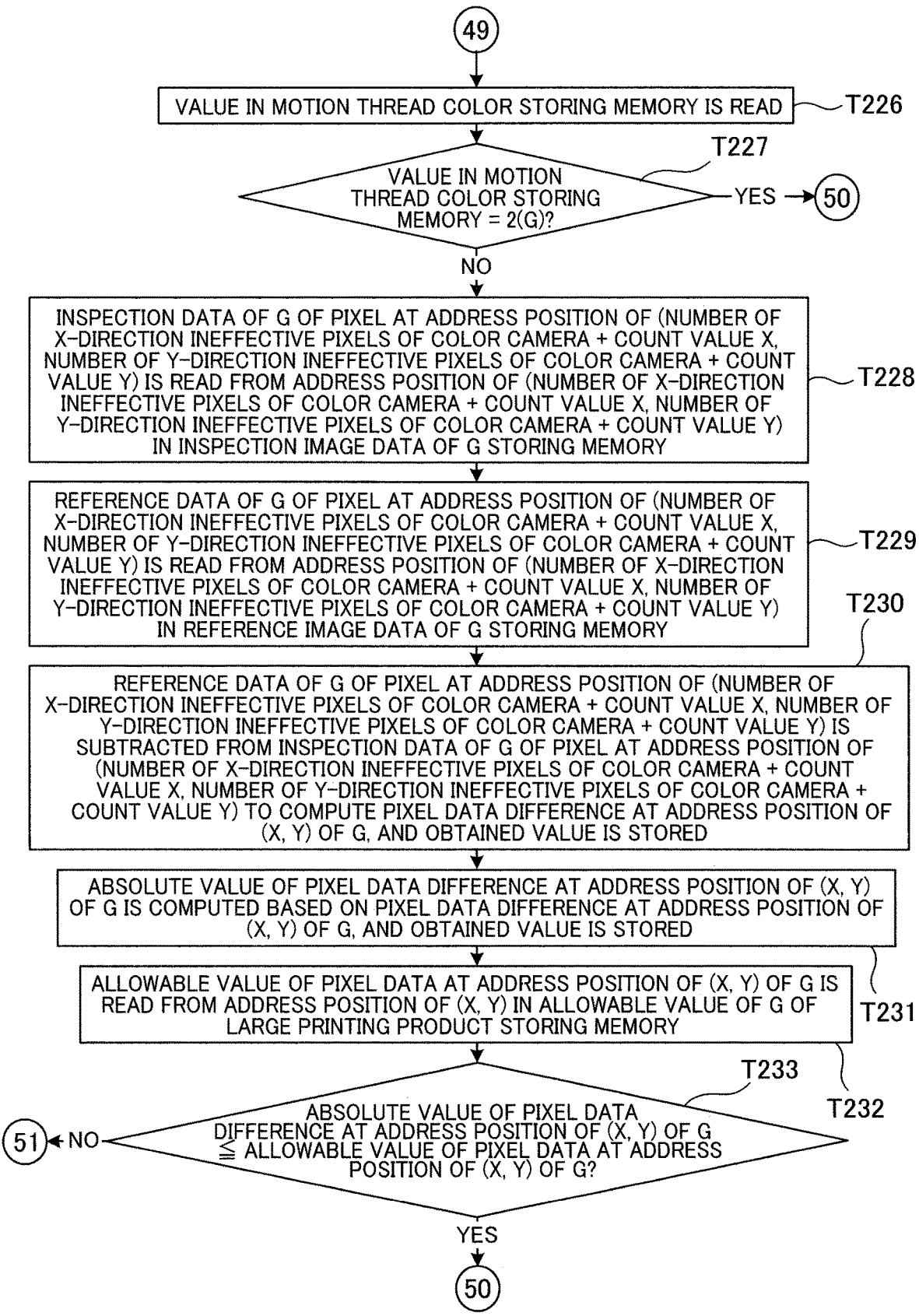
FIG. 20B is a flowchart that illustrates the operations of the print quality inspection apparatus according to the second embodiment of the present invention.
Figure 20C:
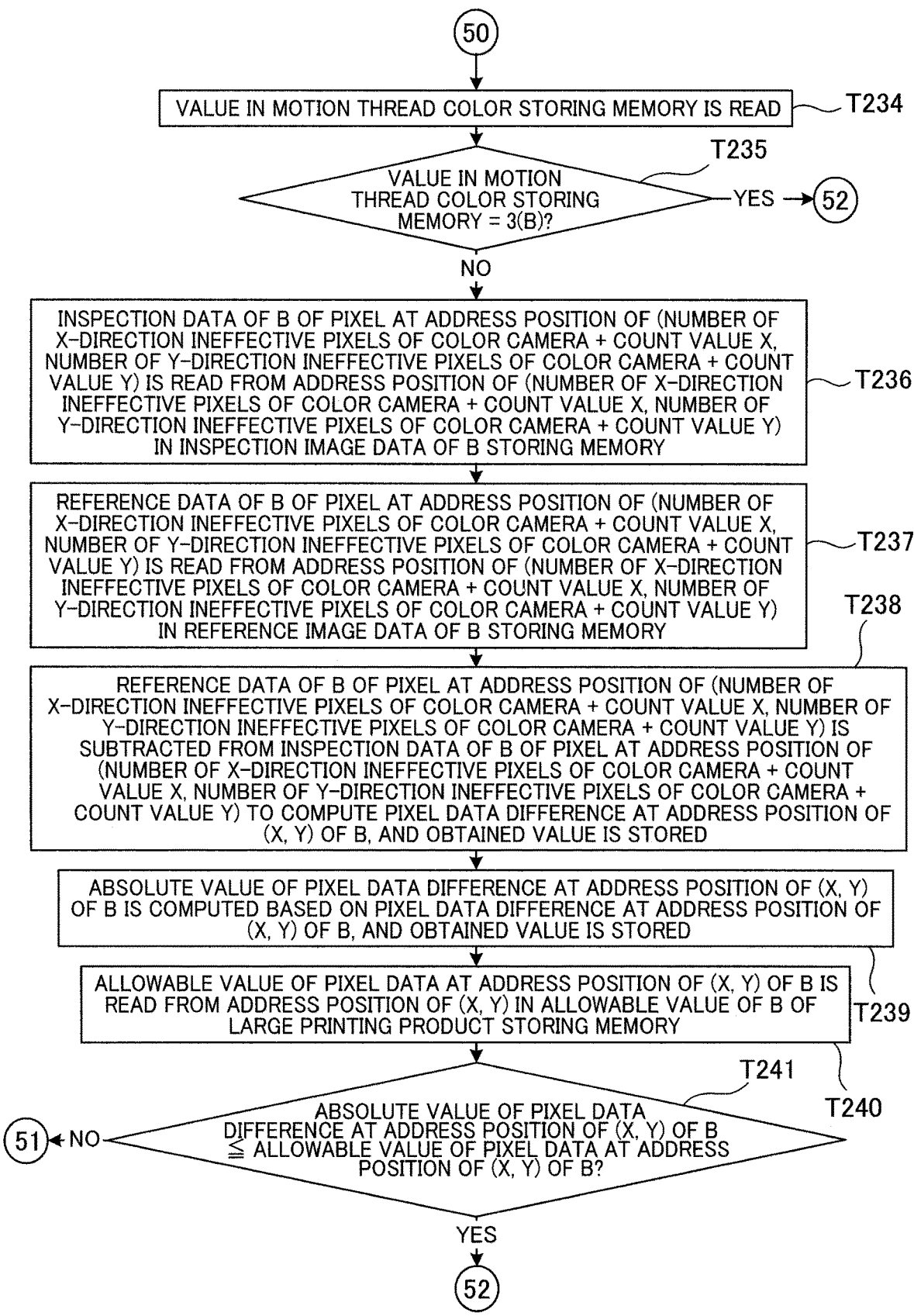
FIG. 20C is a flowchart that illustrates the operations of the print quality inspection apparatus according to the second embodiment of the present invention.
Figure 20D:
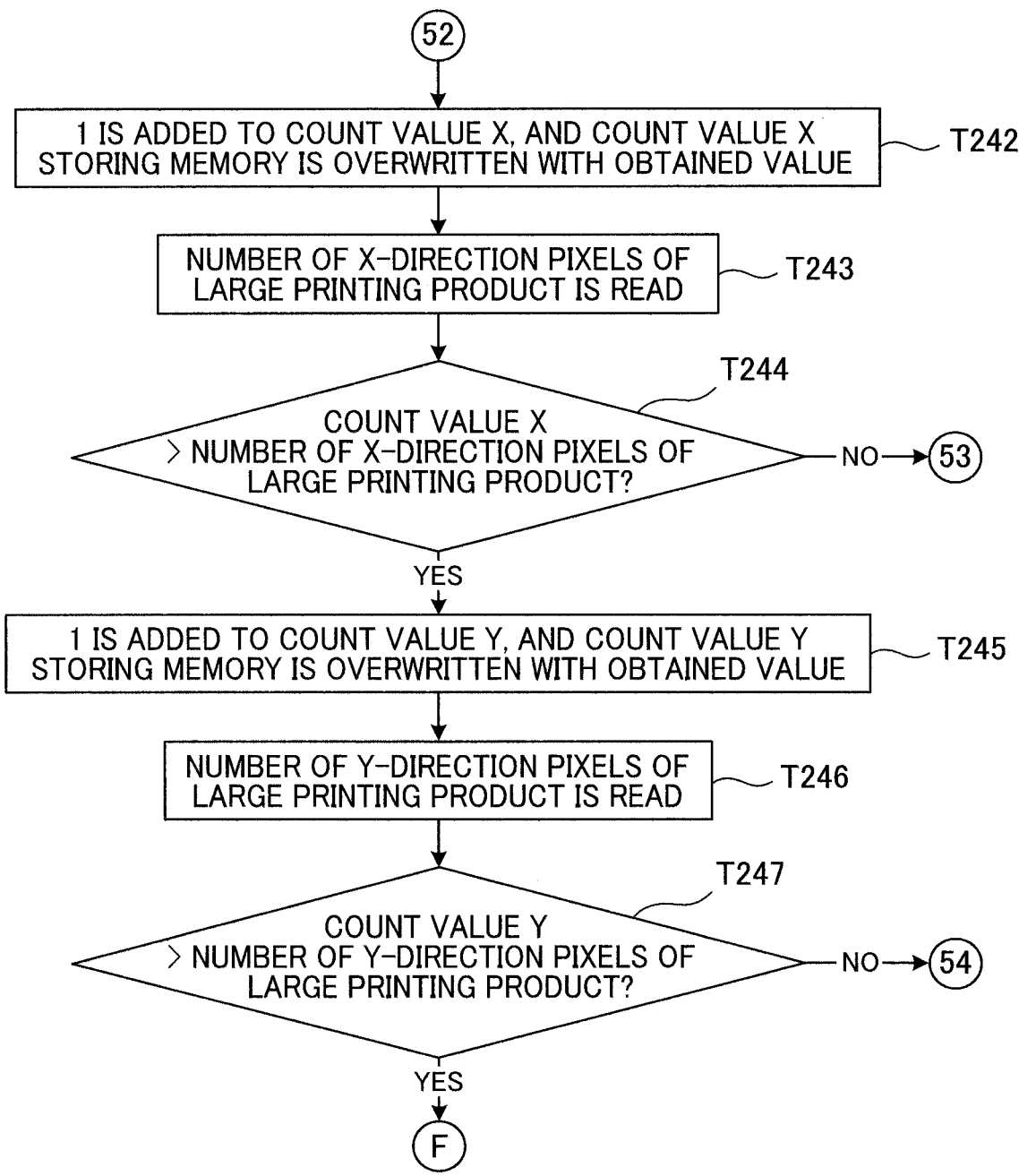
FIG. 20D is a flowchart that illustrates the operations of the print quality inspection apparatus according to the second embodiment of the present invention.
Figure 21A:
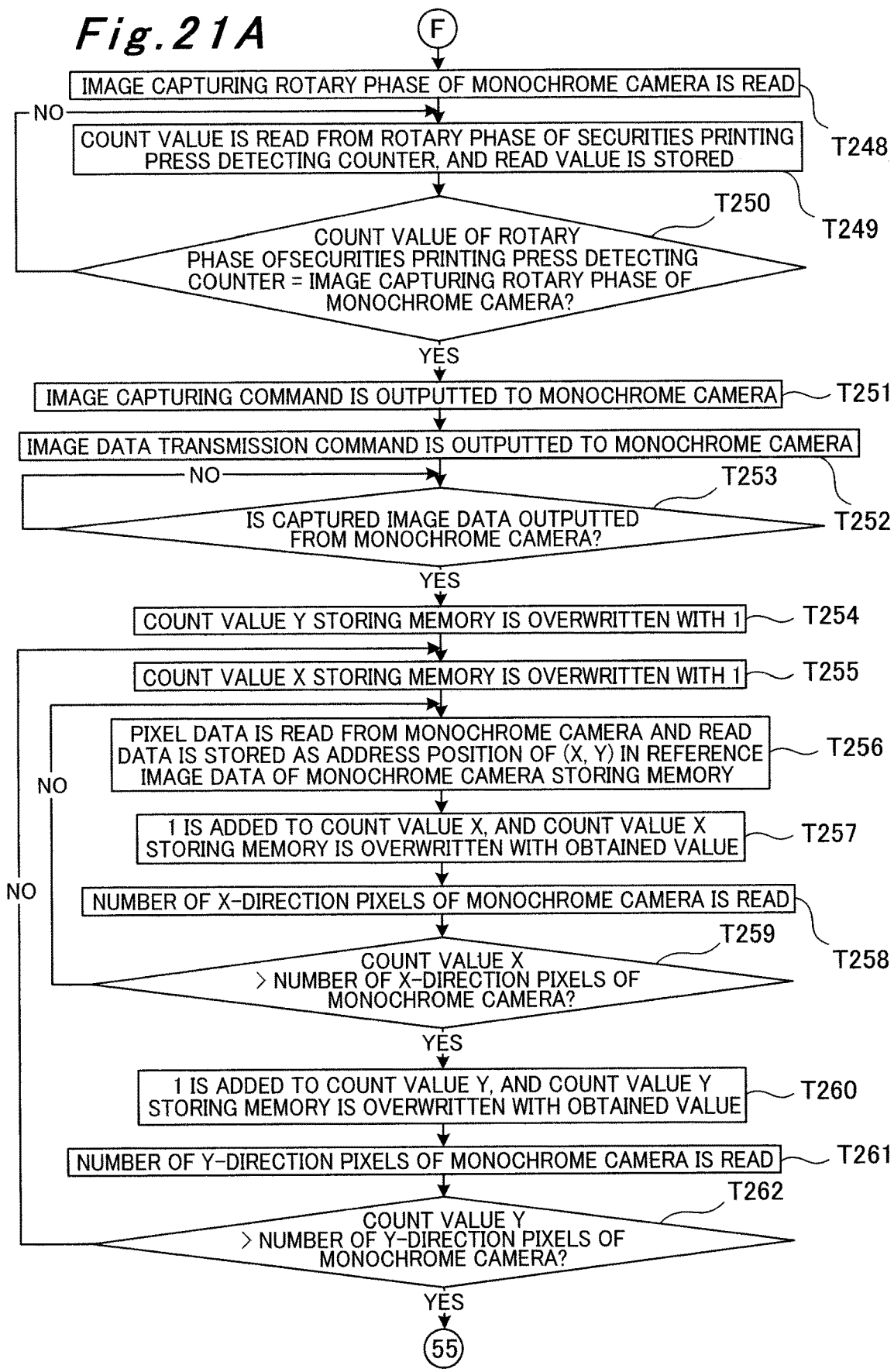
FIG. 21A is a flowchart that illustrates the operations of the print quality inspection apparatus according to the second embodiment of the present invention.
Figure 21B:
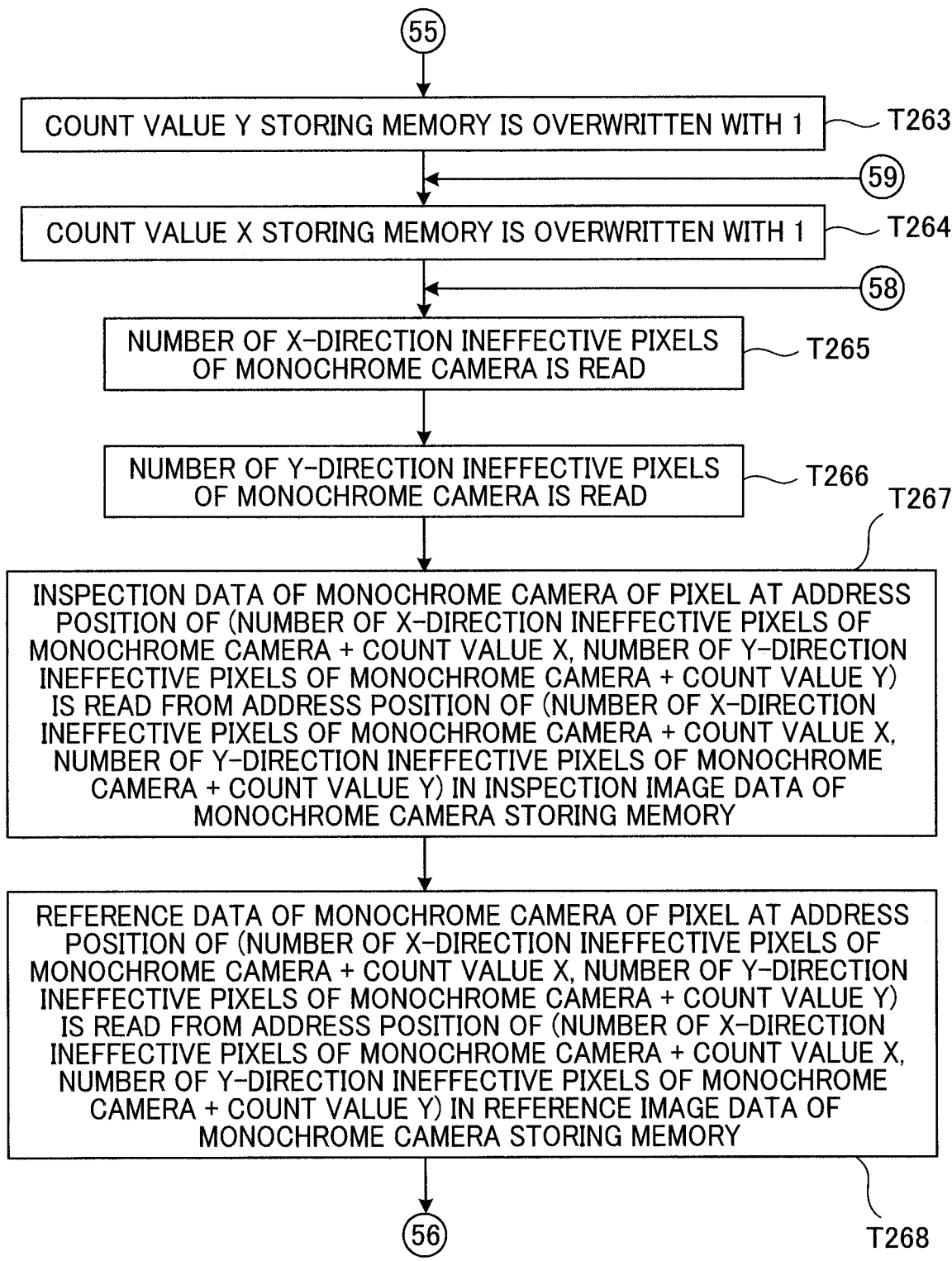
FIG. 21B is a flowchart that illustrates the operations of the print quality inspection apparatus according to the second embodiment of the present invention.
Figure 21D:
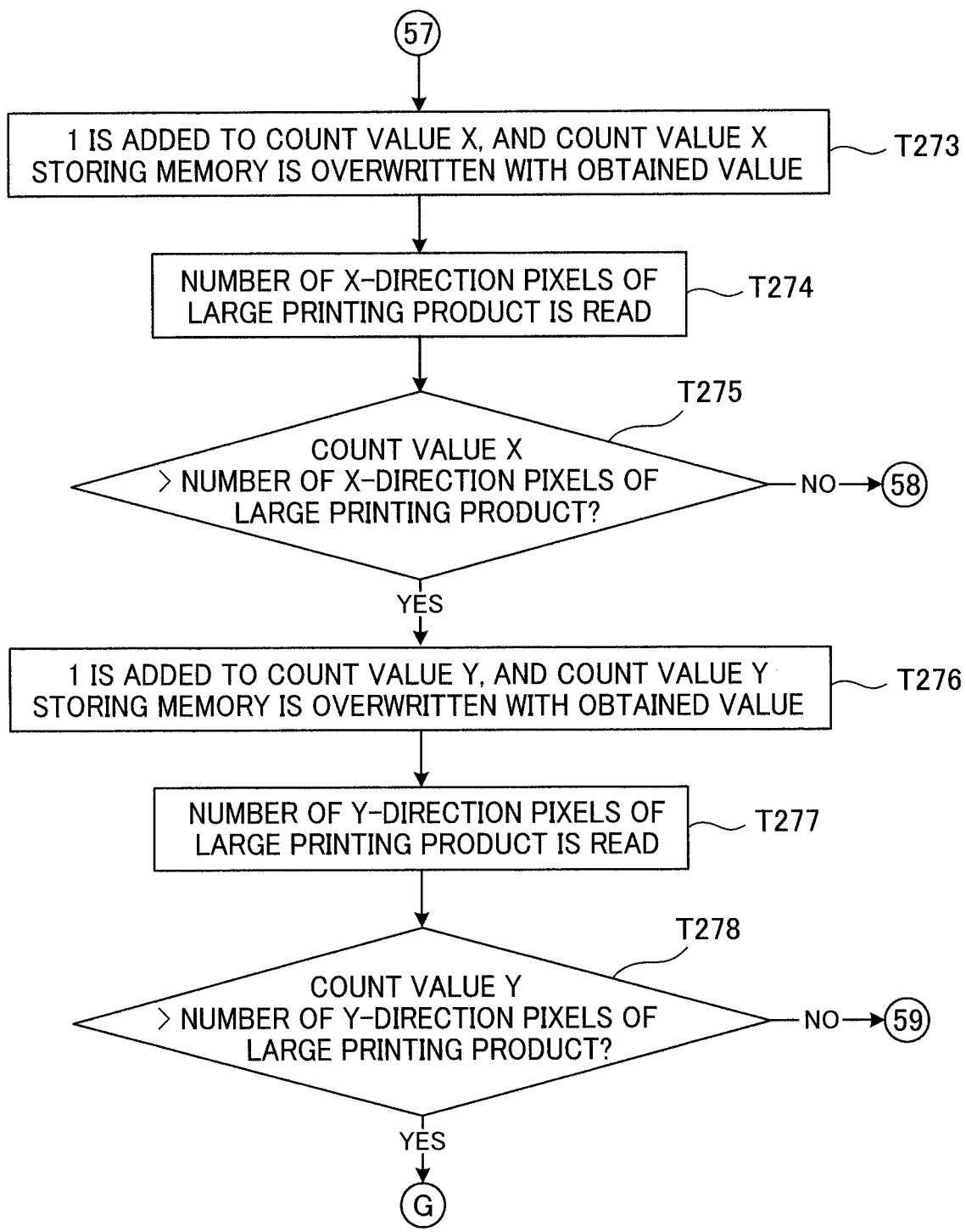
FIG. 21D is a flowchart that illustrates the operations of the print quality inspection apparatus according to the second embodiment of the present invention.

As illustrated in FIG. 13, in this embodiment, above the impression cylinder 8 facing the coater cylinder 7 in the coating unit 4 and on the downstream side in the transporting direction of the coater cylinder 7, a monochrome camera 34A that captures a single color image of the large printing product 1 held by the impression cylinder 8, and R illuminators (e.g., Red LEDs) 35A, G illuminators (e.g., Green LEDs) 35B, and B illuminators (e.g., Blue LEDs) 35C that respectively emit red, green, and blue light onto the region where an image thereof is captured by the monochrome camera 34A are arranged. The illuminators 35A, 35B, and 35C are provided on the upstream side and the downstream side in the transporting direction of an optical axis of the monochrome camera 34A.

In addition, above the impression cylinder 8, on the downstream side in the transporting direction of the coater cylinder 7 and on the upstream side in the transporting direction of the monochrome camera 34A, a color camera 34B that captures the RGB (Red, Green, and Blue) image of the large printing product 1 held by the impression cylinder 8, and multiple visible light illuminators (e.g., white LEDs) 35D that emit visible light onto the region where an image thereof is captured by the color camera 34B are arranged. The visible light illuminators 35D are provided on the upstream side and the downstream side in the transporting direction of an optical axis of the color camera 34B.

A light blocking plate 38 for preventing the effects of the interacting ambient light is arranged between the illuminators 35A, 35B, and 35C and the visible light illuminators 35D.

The images captured by the monochrome camera 34A and the color camera 34B are transmitted to the print quality inspection unit 10 illustrated in FIGS. 14A to 14E.

As illustrated in FIGS. 14A to 14E, the print quality inspection unit 10 includes the CPU 11, the ROM 12, the RAM 13, and the input/output devices 14 to 20 connected with each other by the BUS line.

The motion thread color storing memory M11, the count value Y storing memory M12, the count value X storing memory M13, the pixel data of strip storing memory M14, the number of X-direction pixels of strip storing memory M15, the number of Y-direction pixels of strip storing memory M16, and the pointer position storing memory M17 are connected to the BUS line.

In addition, the mouse dragged distance storing memory M18, the selected area end position storing memory M19, the normal allowable value of R storing memory M20, the normal allowable value of G storing memory M21, the normal allowable value of B storing memory M22, the maximum allowable value of R storing memory M23, the maximum allowable value of G storing memory M24, the maximum allowable value of B storing memory M25, the allowable value of R of strip storing memory M26, the allowable value of G of strip storing memory M27, and the allowable value of B of strip storing memory M28 are connected to the BUS line.

Moreover, the allowable value of R of large printing product storing memory M29, the allowable value of G of large printing product storing memory M30, the allowable value of B of large printing product storing memory M31, the number of X-direction pixels of large printing product storing memory M32, the number of Y-direction pixels of large printing product storing memory M33, the count value N storing memory M34, the count value M storing memory M35, the bottom left end position of each strip in large printing product storing memory M36, the row number of strip in large printing product storing memory M37, and a column number of strip in large printing product storing memory M38 are connected to the BUS line.

Furthermore, an allowable value of monochrome camera of large printing product storing memory M139, an image capturing rotary phase of color camera storing memory M140, a count value of rotary phase of securities printing press detecting counter storing memory M141, a reference image data of R storing memory M142, a reference image data of G storing memory M143, a reference image data of B storing memory M144, a number of X-direction pixels of color camera storing memory M145, and a number of Y-direction pixels of color camera storing memory M146 are connected to the BUS line.

In addition, an image capturing rotary phase of monochrome camera storing memory M147, a reference image data of monochrome camera storing memory M148, a number of X-direction pixels of monochrome camera storing memory M149, a number of Y-direction pixels of monochrome camera storing memory M150, an inspection image data of R storing memory M151, an inspection image data of G storing memory M152, and an inspection image data of B storing memory M153 are connected to the BUS line.

Moreover, a number of X-direction ineffective pixels of color camera storing memory M154, a number of Y-direction ineffective pixels of color camera storing memory M155, a pixel data difference at address position of (X, Y) of R storing memory M156, an absolute value of pixel data difference at address position of (X, Y) of R storing memory M157, a pixel data difference at address position of (X, Y) of G storing memory M158, an absolute value of pixel data difference at address position of (X, Y) of G storing memory M159, a pixel data difference at address position of (X, Y) of B storing memory M160, and an absolute value of pixel data difference at address position of (X, Y) of B storing memory M161 are connected to the BUS line.

Furthermore, an inspection image data of monochrome camera storing memory M162, a number of X-direction ineffective pixels of monochrome camera storing memory M163, a number of Y-direction ineffective pixels of monochrome camera storing memory M164, a pixel data difference at address position of (X, Y) of monochrome camera storing memory M165, and an absolute value of pixel data difference at address position of (X, Y) of monochrome camera storing memory M166 are connected to the BUS line.

In addition, the input device 21 such as a keyboard and any kind of switch or button, the display 22 such as a CRT and a lamp, the output device 23 such as a printer, and the CD drive 24 are connected to the input/output device 14. In this embodiment, the strip image display portion 22a displays an image of the strip read from the CD drive 24 and images of the strip captured by the monochrome camera 34A and the color camera 34B, and the large printing product display portion 22b displays images of the large printing product 1 captured by the monochrome camera 34A and the color camera 34B.

Moreover, the R button 25, the G button 26, the B button 27, the motion thread color setting completion switch 28, the selected area confirmation switch 29, the reference image data reading switch 30, the inspection start switch 31, and the inspection end switch 32 are connected to the input/output device 15.

The R button 25, the G button 26, and the B button 27 are buttons for respectively setting the hue (red, green, blue) of the color of the motion thread 1b. That is, the R button 25 is turned on when the color of the motion thread 1b is the red hue, the G button 26 is turned on when the color of the motion thread 1b is the green hue, and the B button 27 is turned on when the color of the motion thread 1b is the blue hue. In conjunction with turning on any one of the buttons, the other two buttons are turned off.

The motion thread color setting completion switch 28 is a switch for inputting completion of color setting of the motion thread 1b done by manipulating the R button 25, the G button 26, or the B button 27. The selected area confirmation switch 29 is a switch for inputting confirmation of the later-described motion thread area A. The reference image data reading switch is a switch for inputting start of reading of the later-described reference image data. The inspection start switch 31 and the inspection end switch 32 are switches for inputting start and end of the print quality inspection, respectively.

The mouse 33 is connected to the input/output device 16.

The monochrome camera 34A is connected to input/output devices 17-A and 18-A. The input/output device 18-A transmits the image capturing command and the image data transmission command to the monochrome camera 34A, and the captured image data captured by the monochrome camera 34A is outputted to the input/output device 17-A.

The color camera 34B is connected to the input/output devices 17-B and 18-B. The input/output device 18-B transmits the image capturing command and the image data transmission command to the color camera 34B, and the captured image data captured by the color camera 34B is outputted to the input/output device 17-B.

The R illuminators 35A, the G illuminators 35B, the B illuminators 35C, and the visible light illuminators 35D are connected to the input/output device 20.

The rotary phase of securities printing press detecting counter 36 is connected to the input/output device 19, and this rotary phase of securities printing press detecting counter 36 is connected to the rotary encoder for securities printing press drive motor 37. In this case, the rotary encoder for securities printing press drive motor 37 is, for example, directly attached on the rear end portion of the output shaft of the unillustrated securities printing press drive motor, so as to make one revolution every time the printing units 3A to 3F perform printing on the single large printing product 1, output the zero pulse in every revolution to reset the rotary phase of securities printing press detecting counter 36, and output the clock pulse to the rotary phase of securities printing press detecting counter 36 every time the securities printing press drive motor revolves at a predetermined angle.

Hereinafter, processing by the print quality inspection unit 10 is described in detail in accordance with operation flows illustrated in FIGS. 15A to 15C, FIGS. 16A to 16E, FIGS. 17A to 17I, FIGS. 18A to 18I, FIGS. 19A to 19G, FIGS. 20A to 20D, and FIGS. 21A to 21D.

The processing by the print quality inspection unit 10 in this embodiment is simply described. In the print quality inspection unit 10, in a first process, the hue of the color of the motion thread 1b (color of pattern under lenticular lens) provided on the strip 1a as illustrated in FIG. 10 is firstly inputted (steps T1 to T3 and T279 to T282). In this embodiment, 1 (R) is inputted when the color of the motion thread 1b is the red hue, 2 (G) is inputted when the color of the motion thread 1b is the green hue, and 3 (B) is inputted when the color of the motion thread 1b is the blue hue.

Next, in a second process, an image of the normally printed strip 1a obtained in advance is inputted and stored to be displayed on the display 22 (steps T4 to T21).

Next, in a third process, on the image of the strip 1a that is displayed on the display 22 in the second process, the area A surrounding the motion thread 1b (that is an area surrounded by a broken line in FIG. 10; hereinafter, referred to as a motion thread area) is specified by clicking and dragging the mouse 33, and the mark (line) indicating the motion thread area A is displayed on the display 22 (steps T22 to T72). The line indicating the periphery of the motion thread area A is thus displayed.

Next, in a fourth process, based on the color of the motion thread 1b inputted in the first process and the motion thread area A on the strip 1a specified in the third process, the allowable values regarding the print quality inspection of each of the RGB of each pixel in the strip 1a (allowable values for determining whether a print is normal (OK) or abnormal (NG)) are set (steps T73 to T96 and T283 to T301).

In this embodiment, for inside the motion thread area A, the allowable values of R, G, and B for the inspection of the print quality are set to the normal values when the color of inside the motion thread area A is the same hue as the color of the motion thread 1b, while they are set to the maximum values when the color of inside the motion thread area A is different hue from the color of the motion thread 1b to inhibit the substantial inspection. For a portion outside the motion thread area A, the allowable values of R, G, and B are set to the normal values, and usual inspection is carried out.

Next, in a fifth process, the allowable values regarding the print quality inspection of the RGB of the pixels in the strip 1a set in the fourth process are extended for each strip 1a in the large printing product 1, and allowable values of each of the RGB of each pixel in the large printing product 1 are set (steps T97 to T128). Since arrangement of the strips 1a in the large printing product 1 is already known, this is used for setting allowable values that respectively correspond to the motion thread area A and an area outside the motion thread area A in each strip 1a.

Next, in a sixth process, based on the allowable value regarding the print quality inspection for each of the RGB of each pixel in the strip 1a set in the fourth process, the allowable values for the case in which the color is the same hue as the color of the motion thread 1b are extended for each of the strips 1a in the large printing product 1 to set an allowable value of the monochrome camera 34A of each pixel in the large printing product 1. As described above, since the arrangement of the strips 1a in the large printing product 1 is already known, this is used for setting allowable values that correspond to each strip 1a (steps T129 to T158 and T302 to T358). Once the allowable values of the monochrome camera 34A of each pixel in the large printing product 1 are set, the reference image data reading switch 30 is turned on by the worker.

Next, in a seventh process, images of the large printing product 1 printed by the securities printing press 100 are captured by the color camera 34B and the monochrome camera 34A, and the images of the normally printed large printing product 1 are stored as the reference images (steps T159 to T194 and T359 to T361). Once the reference image is stored, the inspection start switch 31 is turned on by the worker.

Next, in an eighth process, an image of the large printing product 1 printed by the securities printing press 100 is captured by the color camera 34B, and the obtained image is stored as the inspection image (steps T195 to T213).

In a ninth process, the image data of the color of different hue from the color of the motion thread 1b of each pixel of the inspection image captured by the color camera 34B in the eighth process and the image data of the color of different hue from the color of the motion thread 1b of the corresponding pixel of the reference image stored in the seventh process are compared, and differences of the corresponding colors of the pixels between the inspection image and the reference image are obtained. In a tenth process, the differences of the corresponding colors of the pixels between the inspection image and the reference image obtained in the ninth process and the allowable values of the colors of the pixels in the large printing product 1 set in the fifth process are compared, and OK/NG is determined (steps T214 to T247).

In short, no print quality inspection is performed on the image data of the color of the same hue as the color of the motion thread 1b.

In addition, since the allowable values of the color of different hue from the color of the motion thread 1b are set to the maximum values for the motion thread area A in the fourth process, the image captured by the color camera 34B is used only for the inspection of the portion outside the motion thread area A.

Next, in an eleventh process, an image of the large printing product 1 printed by the securities printing press 100 is captured by the monochrome camera 34A, and the obtained image is stored as the inspection image (steps T248 to T262).

Next, in a twelfth process, the image data of the pixels of the inspection image captured by the monochrome camera 34A in the eleventh process and the image data of the corresponding pixels of the reference image captured by the monochrome camera 34A stored in the seventh process are compared, and differences of the pixels between the inspection image and the reference image are obtained. In a thirteenth process, the differences of the pixels between the inspection image and the reference image obtained in the twelfth process and the allowable values of the pixels in the large printing product 1 set in the sixth process are compared, and OK/NG is determined (steps T263 to T278 and T362).

In short, the image captured by the monochrome camera 34A is used for the print quality inspection instead of the image data of the color of the same hue as the color of the motion thread 1b captured by the color camera 34B.

The abovementioned processes are described in detail below. First, in step T1, when the R button 25 is turned on (YES), the motion thread color storing memory M11 is overwritten with 1 (R) in step T2 and the process proceeds to step T3, and when the R button 25 is turned off (NO), the process proceeds to step T279. In step T279, when the G button 26 is turned on (YES), the motion thread color storing memory M11 is overwritten with 2 (G) in step T280 and the process proceeds to step T3, and when the G button 26 is turned off (NO), the process proceeds to step T281. In step T281, when the B button 27 is turned on (YES), the motion thread color storing memory M11 is overwritten with 3 (B) in step T282 and the process proceeds to step T3, and when the B button is turned off (NO), the process proceeds to step T3.

In step T3, when the motion thread color setting completion switch 28 is turned off (NO), the process returns to step T1, and when the motion thread color setting completion switch 28 is turned on (YES), the process proceeds to step T4.

In step T4, the count value Y storing memory M12 is overwritten with 1. Subsequently, in step 15, the count value X storing memory M13 is overwritten with 1. In step T6, pixel data (RGB) at the address position of (X, Y) of the strip 1a is read from the CD drive 24, and the address position of (X, Y) in the pixel data of strip storing memory M14 is overwritten with the read data.

Subsequently, in step T7, 1 is added to the count value X, and the count value X storing memory M13 is overwritten with the obtained value. In step T8, the number of the X-direction pixels of the strip 1a is read from the memory M15. In step T9, when the count value X is equal to or smaller than the number of the X-direction pixels of the strip 1a (NO), the process returns to step T6, and when the count value X is greater than the number of the X-direction pixels of the strip 1a (YES), 1 is added to the count value Y and the count value Y storing memory M12 is overwritten with the obtained value in step T10.

Following step T10, the number of Y-direction pixels of the strip 1a is read from the memory M16 in step T11. In step T12, when the count value Y is equal to or smaller than the number of the Y-direction pixels of the strip 1a (NO), the process returns to step T5, and when the count value Y is greater than the number of the Y-direction pixels of the strip 1a (YES), the process proceeds to step T13.

In step T13, the count value Y storing memory M12 is overwritten with 1. Subsequently, in step T14, the count value X storing memory M13 is overwritten with 1. In step T15, the pixel data (RGB) at the address (X, Y) position of the strip 1a is read from the address position of (X, Y) in the pixel data of strip storing memory M14, and the read data is displayed at the address position of (X, Y) on the strip image display portion 22a of the display 22. Subsequently, in step T16, 1 is added to the count value X, and the count value X storing memory M13 is overwritten with the obtained value. In step T17, the number of the X-direction pixels of the strip 1a is read from the memory M15.

Subsequently, in step T18, when the count value X is equal to or smaller than the number of the X-direction pixels of the strip 1a (NO), the process returns to step T15, and when the count value X is greater than the number of the X-direction pixels of the strip 1a (YES), 1 is added to the count value Y and the count value Y storing memory M12 is overwritten with the obtained value in step T19. In step T20, the number of the Y-direction pixels of the strip 1a is read from the memory M16.

Subsequently, in step T21, when the count value Y is equal to or smaller than the number of the Y-direction pixels of the strip 1a (NO), the process returns to step T14, and when the count value Y is greater than the number of the Y-direction pixels of the strip 1a (YES), the process proceeds to step T22.

In step T22, whether the mouse pointer is turned on is determined. When the mouse pointer is turned off (NO), the processing of step T22 is repeated. When the mouse pointer is turned on (YES), the process proceeds to step T23.

In step T23, the cursor position (Xk, Yk) on the strip image display portion 22a of the display 22 is read, and the read information is stored into the pointer position storing memory M17. Subsequently, in step T24, whether the X-direction and Y-direction moved distance (Xd, Yd) is transmitted from the mouse 33 is determined. When the X-direction and Y-direction moved distance (Xd, Yd) is not transmitted from the mouse 33 (NO), the processing of step T24 is repeated. When the X-direction and Y-direction moved distance (Xd, Yd) is transmitted from the mouse 33 (YES), the process proceeds to step T25.

In step T25, the mouse 33 dragged distance (Xd, Yd) is received from the mouse 33, and the received information is stored into the memory M18. Subsequently, in step T26, the X-direction pointer position Xk is read from the X-direction address position in the pointer position storing memory M17.

Subsequently, in step T27, the X-direction distance Xd for which the mouse 33 is dragged is read from the X-direction address position in the mouse 33 dragged distance storing memory M18. In step T28, the X-direction distance Xd for which the mouse 33 is dragged is added to the X-direction pointer position Xk to compute the selected area X-direction end position Xe, and the obtained position Xe is stored as the X-direction address position in the selected area end position storing memory M19.

Subsequently, in step T29, the Y-direction pointer position Yk is read from the Y-direction address position in the pointer position storing memory M17. In step T30, the Y-direction distance Yd for which the mouse 33 is dragged is read from the Y-direction address position in the mouse dragged distance storing memory M18.

Subsequently, in step T31, the Y-direction distance Yd for which the mouse 33 is dragged is added to the Y-direction pointer position Yk to compute the selected area Y-direction end position Ye, and the obtained position Ye is stored as the Y-direction address position in the selected area end position storing memory M19.

Following step T31, the X-direction pointer position Xk is read from the X-direction address position in the pointer position storing memory M17 in step T32. In step T33, the count value X storing memory M13 is overwritten with the X-direction pointer position Xk.

Subsequently, in step T34, the Y-direction pointer position Yk is read from the Y-direction address position in the pointer position storing memory M17. In step T35, the count value Y storing memory M12 is overwritten with the Y-direction pointer position Yk.

Subsequently, in step T36, the count value Y is read from the memory M12. In step T37, the count value X is read from the memory M13. In step T38, the mark indicating the selected area is displayed at the (X, Y) position on the strip image display portion 22a of the display 22.

Subsequently, in step T39, 1 is added to the count value X, and the count value X storing memory M13 is overwritten with the obtained value. In step T40, the selected area X-direction end position Xe is read from the X-direction address position in the selected area end position storing memory M19.

Subsequently, in step T41, when the count value X is equal to or smaller than the selected area X-direction end position Xe (NO), the process returns to step T36, and when the count value X is greater than the selected area X-direction end position Xe (YES), the process proceeds to step T42.

In step T42, the X-direction pointer position Xk is read from the X-direction address position in the pointer position storing memory M17. Subsequently, in step T43, the count value X storing memory M13 is overwritten with the X-direction pointer position Xk.

Subsequently, in step T44, the Y-direction pointer position Yk is read from the Y-direction address position in the pointer position storing memory M17. In step T45, the count value Y storing memory M12 is overwritten with the Y-direction pointer position Yk.

Subsequently, in step T46, the count value Y is read from the memory M12. In step T47, the count value X is read from the memory M13. In step T48, the mark indicating the selected area is displayed at the (X, Y) position on the strip image display portion 22a of the display 22.

Subsequently, in step T49, 1 is added to the count value Y, and the count value Y storing memory M12 is overwritten with the obtained value. In step T50, the selected area Y-direction end position Ye is read from the Y-direction address position in the selected area end position storing memory M19.

Subsequently, in step T51, when the count value Y is equal to or smaller than the selected area Y-direction end position Ye (NO), the process returns to step T46, and when the count value Y is greater than the selected area Y-direction end position Ye (YES), the process proceeds to step T52.

In step T52, the X-direction pointer position Xk is read from the X-direction address position in the pointer position storing memory M17. Subsequently, in step T53, the count value X storing memory M13 is overwritten with the X-direction pointer position Xk.

Subsequently, in step T54, the selected area Y-direction end position Ye is read from the Y-direction address position in the selected area end position storing memory M19. In step T55, the count value Y storing memory M12 is overwritten with the selected area Y-direction end position Ye.

Subsequently, in step T56, the count value Y is read from the memory M12. In step T57, the count value X is read from the memory M13. In step T58, the mark indicating the selected area is displayed at the (X, Y) position on the strip image display portion 22a of the display 22.

Subsequently, in step T59, 1 is added to the count value X, and the count value X storing memory M13 is overwritten with the obtained value. In step T60, the selected area X-direction end position Xe is read from the X-direction address position in the selected area end position storing memory M19.

Subsequently, in step T61, when the count value X is equal to or smaller than the selected area X-direction end position Xe (NO), the process returns to step T56, and when the count value X is greater than the selected area X-direction end position Xe (YES), the process proceeds to step T62.

In step T62, the selected area X-direction end position Xe is read from the X-direction address position in the selected area end position storing memory M19. Subsequently, in step T63, the count value X storing memory M13 is overwritten with the selected area X-direction end position Xe.

Subsequently, in step T64, the Y-direction pointer position Yk is read from the Y-direction address position in the pointer position storing memory M17. In step T65, the count value Y storing memory M12 is overwritten with the Y-direction pointer position Yk.

Subsequently, in step T66, the count value Y is read from the memory M12. In step T67, the count value X is read from the memory M13. In step T68, the mark indicating the selected area is displayed at the (X, Y) position on the strip image display portion 22a of the display 22.

Subsequently, in step T69, 1 is added to the count value Y, and the count value Y storing memory M12 is overwritten with the obtained value. In step T70, the selected area Y-direction end position Ye is read from the Y-direction address position in the selected area end position storing memory M19.

Subsequently, in step T71, when the count value Y is equal to or smaller than the selected area Y-direction end position Ye (NO), the process returns to step T66, and when the count value Y is greater than the selected area Y-direction end position Ye (YES), the process proceeds to step T72.

In step T72, whether the selected area confirmation switch 29 is turned on is determined. When the selected area confirmation switch 29 is not turned on (NO), the process returns to step T22. When the selected area confirmation switch 29 is turned on (YES), the process proceeds to step T73.

In step T73, the count value Y storing memory M12 is overwritten with 1. Subsequently, in step T74, the count value X storing memory M13 is overwritten with 1. In step T75, the X-direction pointer position Xk is read from the X-direction address position in the pointer position storing memory M17.

Subsequently, in step T76, when the count value X is smaller than the X-direction pointer position Xk (NO), the address position of (X, Y) is determined as a position outside the motion thread area A, and the process proceeds to the later-described step T296, and when the count value X is equal to or greater than the X-direction pointer position Xk (YES), the selected area X-direction end position Xe is read from the X-direction address position in the selected area end position storing memory M19 in step T77, and the process proceeds to step T78.

In step T78, when the count value X is greater than the selected area X-direction end position Xe (NO), the address position of (X, Y) is determined as a position outside the motion thread area A, and the process proceeds to the later-described step T296, and when the count value X is equal to or smaller than the selected area X-direction end position Xe (YES), the Y-direction pointer position Yk is read from the Y-direction address position in the pointer position storing memory M17 in step T79, and the process proceeds to step T80.

In step T80, when the count value Y is smaller than the Y-direction pointer position Yk (NO), the address position of (X, Y) is determined as a position outside the motion thread area A, and the process proceeds to the later-described step T296, and when the count value Y is equal to or greater than the Y-direction pointer position Yk (YES), the selected area Y-direction end position Ye is read from the Y-direction address position in the selected area end position storing memory M19 in step T81, and the process proceeds to step T82.

In step T82, when the count value Y is greater than the selected area Y-direction end position Ye (NO), the address position of (X, Y) is determined as a position outside the motion thread area A, and the process proceeds to the later-described step T296, and when the count value Y is equal to or smaller than the selected area Y-direction end position Ye (YES), the address position of (X, Y) is determined as a position within the motion thread area A, and the value in the motion thread color storing memory M11 is read in step T83.

Following step T83, in step T84, when the value in the motion thread color storing memory M11 is different from 1 (R) (NO), the process proceeds to the later-described step T283, and when the value in the motion thread color storing memory M11 is 1 (R) (YES), the process proceeds to step T85.

In step T85, the normal allowable value of R is read from the memory M20. Subsequently, in step T86, the address position of (X, Y) in the allowable value of R of strip storing memory M26 is overwritten with the normal allowable value of R. In step T87, the maximum allowable value of G is read from the memory M24. In step T88, the address position of (X, Y) in the allowable value of G of strip storing memory M27 is overwritten with the maximum allowable value of G. In step T89, the maximum allowable value of B is read from the memory M25. In step T90, the address position of (X, Y) in the allowable value of B of strip storing memory M28 is overwritten with the maximum allowable value of B, and the process proceeds to the later-described step T91.

In this embodiment, the normal allowable value is an allowable value for determining whether the print is normally provided, and the maximum allowable value is an allowable value for inhibiting the determination on whether the print is normally provided. That is, since the allowable values of G and B for the motion thread area A are set to the maximum when the value in the motion thread color storing memory M11 is 1 (R), the inspection using image data of G and B of the motion thread 1b is not performed, substantially.

In a case where the process proceeds from the abovementioned step T84 to step T283, when the value in the motion thread color storing memory M11 is different from 2 (G) in step T283 (NO), the process proceeds to step T290 described later, and when the value in the motion thread color storing memory M11 is 2 (G) (YES), the process proceeds to step T284.

In step T284, the maximum allowable value of R is read from the memory M23. Subsequently, in step T285, the address position of (X, Y) in the allowable value of R of strip storing memory M26 is overwritten with the maximum allowable value of R. In step T286, the normal allowable value of G is read from the memory M21. In step T287, the address position of (X, Y) in the allowable value of G of strip storing memory M27 is overwritten with the normal allowable value of G. In step T288, the maximum allowable value of B is read from the memory M25. In step T289, the address position of (X, Y) in the allowable value of B of strip storing memory M28 is overwritten with the maximum allowable value of B, and the process proceeds to the later-described step T91. As a result, when the value in the motion thread color storing memory M11 is 2 (G), the allowable values of R and B for the motion thread area A are set to the maximum, and thus the inspection using image data of R and B of the motion thread is inhibited.

In a case where the process proceeds from the abovementioned step T283 to step T290, the maximum allowable value of R is read from the memory M23 in step T290. Subsequently, in step T291, the address position of (X, Y) in the allowable value of R of strip storing memory M26 is overwritten with the maximum allowable value of R. In step T292, the maximum allowable value of G is read from the memory M24. In step T293, the address position of (X, Y) in the allowable value of G of strip storing memory M27 is overwritten with the maximum allowable value of G. In step T294, the normal allowable value of B is read from the memory M22. In step T295, the address position of (X, Y) in the allowable value of B of strip storing memory M28 is overwritten with the normal allowable value of B, and the process proceeds to the later-described step T91. As a result, when the value in the motion thread color storing memory M11 is 3 (B), the allowable values of R and G for the motion thread area A are set to the maximum, and thus the inspection using the image data of R and G of the motion thread is inhibited.

In a case where the process proceeds from the abovementioned steps T76, T78, T80, and T82 to step T296, the normal allowable value of R is read from the memory M20 in step T296. In step T297, the address position of (X, Y) in the allowable value of R of strip storing memory M26 is overwritten with the normal allowable value of R. In step T298, the normal allowable value of G is read from the memory M21. In step T299, the address position of (X, Y) in the allowable value of G of strip storing memory M27 is overwritten with the normal allowable value of G. In step T300, the normal allowable value of B is read from the memory M22. In step T301, the address position of (X, Y) in the allowable value of B of strip storing memory M28 is overwritten with the normal allowable value of B, and the process proceeds to the later-described step T91. As a result, the allowable values for the inspection using data of all the RGB images of a portion outside the motion thread area A are set to the normal values.

In step T91, 1 is added to the count value X, and the count value X storing memory M13 is overwritten with the obtained value. In step T92, the number of the X-direction pixels of the strip 1a is read from the memory M15.

Subsequently, in step T93, when the count value X is equal to or smaller than the number of the X-direction pixels of the strip 1a (NO), the process returns to step T75, and when the count value X is greater than the number of the X-direction pixels of the strip 1a (YES), the process proceeds to step T94.

In step T94, 1 is added to the count value Y, and the count value Y storing memory M12 is overwritten with the obtained value. In step T95, the number of the Y-direction pixels of the strip 1a is read from the memory M16.

Subsequently, in step T96, when the count value Y is equal to or smaller than the number of the Y-direction pixels of the strip 1a (NO), the process returns to step T74, and when the count value Y is greater than the number of the Y-direction pixels of the strip 1a (YES), the process proceeds to the later-described step T97.

In step T97, the count value Y storing memory M12 is overwritten with 1. Subsequently, in step T98, the count value X storing memory M13 is overwritten with 1.

Subsequently, in step T99, the maximum allowable value of R is read from the memory M23, and the address position of (X, Y) in the allowable value of R of large printing product storing memory M29 is overwritten with the read value. In step T100, the maximum allowable value of G is read from the memory M24, and the address position of (X, Y) in the allowable value of G of large printing product storing memory M30 is overwritten with the read value. In step T101, the maximum allowable value of B is read from the memory M25, and the address position of (X, Y) in the allowable value of B of large printing product storing memory M31 is overwritten with the read value.

Subsequently, in step T102, 1 is added to the count value X, and the count value X storing memory M13 is overwritten with the obtained value. In step T103, the number of the X-direction pixels of the large printing product 1 is read from the memory M32.

Subsequently, in step T104, when the count value X is equal to or smaller than the number of the X-direction pixels of the large printing product 1 (NO), the process returns to step T99, and when the count value X is greater than the number of the X-direction pixels of the large printing product 1 (YES), the process proceeds to step T105.

In step T105, 1 is added to the count value Y, and the count value Y storing memory M12 is overwritten with the obtained value. Subsequently, in step T106, the number of the Y-direction pixels of the large printing product 1 is read from the memory M33.

Subsequently, in step T107, when the count value Y is equal to or smaller than the number of the Y-direction pixels of the large printing product 1 (NO), the process returns to step T98, and when the count value Y is greater than the number of the Y-direction pixels of the large printing product 1 (YES), the process proceeds to step T108.

In step T108, the count value N storing memory M34 is overwritten with 1. Subsequently, in step T109, the count value M storing memory M35 is overwritten with 1.

Subsequently, in step T110, the X-direction position at the bottom left end of the strip 1a in the N-th row and the M-th column is read from the X-direction address position of the strip 1a in the N-th row and the M-th column in the bottom left end position of each strip in large printing product storing memory M36. In step T111, the Y-direction position at the bottom left end of the strip 1a in the N-th row and the M-th column is read from the Y-direction address position of the strip 1a in the N-th row and the M-th column in the bottom left end position of each strip in large printing product storing memory M36.

Subsequently, in step T112, the count value Y storing memory M12 is overwritten with 1. In step T113, the count value X storing memory M13 is overwritten with 1.

Subsequently, in step T114, the allowable value of R at the (X, Y) position in the strip 1a is read from the address position of (X, Y) in the allowable value of R of strip storing memory M26, and the address position of (X-direction position at bottom left end of strip in N-th row and M-th column+count value X−1, Y-direction position at bottom left end of strip in N-th row and M-th column+count value Y−1) in the allowable value of R of large printing product storing memory M29 is overwritten with the read value.

Subsequently, in step T115, the allowable value of G at the (X, Y) position in the strip 1a is read from the address position of (X, Y) in the allowable value of G of strip storing memory M27, and the address position of (X-direction position at bottom left end of strip in N-th row and M-th column+count value X−1, Y-direction position at bottom left end of strip in N-th row and M-th column+count value Y−1) in the allowable value of G of large printing product storing memory M30 is overwritten with the read value.

Subsequently, in step T116, the allowable value of B at the (X, Y) position in the strip 1a is read from the address position of (X, Y) in the allowable value of B of strip storing memory M28, and the address position of (X-direction position at bottom left end of strip in N-th row and M-th column+count value X−1, Y-direction position at bottom left end of strip in N-th row and M-th column+count value Y−1) in the allowable value of B of large printing product storing memory M31 is overwritten with the read value.

Following step T116, 1 is added to the count value X and the count value X storing memory M13 is overwritten with the obtained value in step T117. In step T118, the number of the X-direction pixels of the strip 1a is read from the memory M15.

Subsequently, in step T119, when the count value X is equal to or smaller than the number of the X-direction pixels of the strip 1a (NO), the process returns to step T114, and when the count value X is greater than the number of the X-direction pixels of the strip 1a (YES), the process proceeds to step T120.

In step T120, 1 is added to the count value Y, and the count value Y storing memory M12 is overwritten with the obtained value. Subsequently, in step T121, the number of the Y-direction pixels of the strip 1a is read from the memory M16.

Subsequently, in step T122, when the count value Y is equal to or smaller than the number of the Y-direction pixels of the strip 1a (NO), the process returns to step T113, and when the count value Y is greater than the number of the Y-direction pixels of the strip 1a (YES), the process proceeds to step T123.

In step T123, 1 is added to the count value M, and the count value M storing memory M35 is overwritten with the obtained value. Subsequently, in step T124, the row number of the strip 1a in the large printing product 1 is read from the memory M37.

Subsequently, in step T125, when the count value M is equal to or smaller than the row number of the strip 1a in the large printing product 1 (NO), the process returns to step T110, and when the count value M is greater than the row number of the strip 1a in the large printing product 1 (YES), the process proceeds to step T126.

In step T126, 1 is added to the count value N, and the count value N storing memory M34 is overwritten with the obtained value. Subsequently, in step T127, the column number of the strip 1a in the large printing product 1 is read from the memory M38.

Subsequently, in step T128, when the count value N is equal to or smaller than the column number of the strip 1a in the large printing product 1 (NO), the process returns to step T109, and when the count value N is greater than the column number of the strip 1a in the large printing product 1 (YES), the process proceeds to step T129.

In step T129, the value in the motion thread color storing memory M11 is read. Subsequently, in step T130, whether the value in the motion thread color storing memory M11 is 1 (R) is determined. When the value in the motion thread color storing memory M11 is 1 (R) (YES), the process proceeds to step T131. When the value in the motion thread color storing memory M11 is different from 1 (R) (NO), the process proceeds to the later-described step T302.

In step T131, the count value Y storing memory M12 is overwritten with 1. Subsequently, in step T132, the count value X storing memory M13 is overwritten with 1. In step T133, the maximum allowable value of R is read from the memory M23, and the address position of (X, Y) in the allowable value of monochrome camera of large printing product storing memory M139 is overwritten with the read value.

Subsequently, in step T134, 1 is added to the count value X and the count value X storing memory M13 is overwritten with the obtained value. In step T135, the number of the X-direction pixels of the large printing product 1 is read from the memory M32.

Subsequently, in step T136, when the count value X is equal to or smaller than the number of the X-direction pixels of the large printing product 1 (NO), the process returns to step T133, and when the count value X is greater than the number of the X-direction pixels of the large printing product 1 (YES), 1 is added to the count value Y and the count value Y storing memory M12 is overwritten with the obtained value in step T137, and the number of the Y-direction pixels of the large printing product 1 is read from the memory M33 in step T138.

Subsequently, in step T139, when the count value Y is equal to or smaller than the number of the Y-direction pixels of the large printing product 1 (NO), the process returns to step T132, and when the count value Y is greater than the number of the Y-direction pixels of the large printing product 1 (YES), the process proceeds to step T140.

In step T140, the count value N storing memory M34 is overwritten with 1. Subsequently, in step T141, the count value M storing memory M35 is overwritten with 1. In step T142, the X-direction position at the bottom left end of the strip 1a in the N-th row and the M-th column is read from the X-direction address position of the strip 1a in the N-th row and the M-th column in the bottom left end position of each strip in large printing product storing memory M36.

Subsequently, in step T143, the Y-direction position at the bottom left end of the strip 1a in the N-th row and the M-th column is read from the Y-direction address position of the strip 1a in the N-th row and the M-th column in the bottom left end position of each strip in large printing product storing memory M36. In step T144, the count value Y storing memory M12 is overwritten with 1. In step T145, the count value X storing memory M13 is overwritten with 1.

Subsequently, in step T146, the allowable value of R at the (X, Y) position in the strip 1a is read from the address position of (X, Y) in the allowable value of R of strip storing memory M26, and the address position of (X-direction position at bottom left end of strip in N-th row and M-th column+count value X−1, Y-direction position at bottom left end of strip in N-th row and M-th column+count value Y−1) in the allowable value of monochrome camera of large printing product 1 storing memory M139 is overwritten with the read value.

Following step T146, 1 is added to the count value X and the count value X storing memory M13 is overwritten with the obtained value in step T147. In step T148, the number of the X-direction pixels of the strip 1a is read from the memory M15.

Subsequently, in step T149, when the count value X is equal to or smaller than the number of the X-direction pixels of the strip 1a (NO), the process returns to step T146, and when the count value X is greater than the number of the X-direction pixels of the strip 1a (YES), 1 is added to the count value Y and the count value Y storing memory M12 is overwritten with the obtained value in step T150, and the number of the Y-direction pixels of the strip 1a is read from the memory M16 in step T151.

Subsequently, in step T152, when the count value Y is equal to or smaller than the number of the Y-direction pixels of the strip 1a (NO), the process returns to step T145, and when the count value Y is greater than the number of the Y-direction pixels of the strip 1a (YES), 1 is added to the count value M and the count value M storing memory M35 is overwritten with the obtained value in step T153, and the row number of the strip 1a in the large printing product 1 is read from the memory M37 in step T154.

Subsequently, in step T155, when the count value M is equal to or smaller than the row number of the strip 1a in the large printing product 1 (NO), the process returns to step T142, and when the count value M is greater than the row number of the strip 1a in the large printing product 1 (YES), 1 is added to the count value N and the count value N storing memory M34 is overwritten with the obtained value in step T156, and the row number of the strip 1a in the large printing product 1 is read from the memory M38 in step T157.

Subsequently, in step T158, when the count value N is equal to or smaller than the column number of the strip 1a in the large printing product 1 (NO), the process returns to step T141, and when the count value N is greater than the column number of the strip 1a in the large printing product 1 (YES), the process proceeds to the later-described step T159.

In a case where the process proceeds from step T130 to step T302, whether the value in the motion thread color storing memory M11 is 2 (G) is determined in step T302. When the value in the motion thread color storing memory M11 is 2 (G) (YES), the process proceeds to step T303. When the value in the motion thread color storing memory M11 is different from 2 (G) (NO), the process proceeds to the later-described step T331.

In step T303, the count value Y storing memory M12 is overwritten with 1. In step T304, the count value X storing memory M13 is overwritten with 1. In step T305, the maximum allowable value of G is read from the memory M24, and the address position of (X, Y) in the allowable value of monochrome camera of large printing product storing memory M139 is overwritten with the read value.

Subsequently, in step T306, 1 is added to the count value X and the count value X storing memory M13 is overwritten with the obtained value. In step T307, the number of the X-direction pixels of the large printing product 1 is read from the memory M32.

Subsequently, in step T308, when the count value X is equal to or smaller than the number of the X-direction pixels of the large printing product 1 (NO), the process returns to step T305, and when the count value X is greater than the number of the X-direction pixels of the large printing product 1 (YES), 1 is added to the count value Y and the count value Y storing memory M12 is overwritten with the obtained value in step T309, and the number of the Y-direction pixels of the large printing product 1 is read from the memory M33 in step T310.

Subsequently, in step T311, when the count value Y is equal to or smaller than the number of the Y-direction pixels of the large printing product 1 (NO), the process returns to step T304, and when the count value Y is greater than the number of the Y-direction pixels of the large printing product 1 (YES), the process proceeds to step T312.

In step T312, the count value N storing memory M34 is overwritten with 1. Subsequently, in step T313, the count value M storing memory M35 is overwritten with 1. In step T314, the X-direction position at the bottom left end of the strip 1a in the N-th row and the M-th column is read from the X-direction address position of the strip 1a in the N-th row and the M-th column in the bottom left end position of each strip in large printing product storing memory M36.

Subsequently, in step T315, the Y-direction position at the bottom left end of the strip 1a in the N-th row and the M-th column is read from the Y-direction address position of the strip 1a in the N-th row and the M-th column in the bottom left end position of each strip in large printing product storing memory M36. In step T316, the count value Y storing memory M12 is overwritten with 1. In step T317, the count value X storing memory M13 is overwritten with 1.

Subsequently, in step T318, the allowable value of G at the (X, Y) position in the strip 1a is read from the address position of (X, Y) in the allowable value of G of strip storing memory M27, and the address position of (X-direction position at bottom left end of strip in N-th row and M-th column+count value X−1, Y-direction position at bottom left end of strip in N-th row and M-th column+count value Y−1) in the allowable value of monochrome camera of large printing product storing memory M139 is overwritten with the read value.

Following step T318, 1 is added to the count value X and the count value X storing memory M13 is overwritten with the obtained value in step T319. In step T320, the number of the X-direction pixels of the strip 1a is read from the memory M15.

Subsequently, in step T321, when the count value X is equal to or smaller than the number of the X-direction pixels of the strip 1a (NO), the process returns to step T318, and when the count value X is greater than the number of the X-direction pixels of the strip 1a (YES), 1 is added to the count value Y and the count value Y storing memory M12 is overwritten with the obtained value in step T322, and the number of the Y-direction pixels of the strip 1a is read from the memory M16 in step T323.

Subsequently, in step T324, when the count value Y is equal to or smaller than the number of the Y-direction pixels of the strip 1a (NO), the process returns to step T317, and when the count value Y is greater than the number of the Y-direction pixels of the strip 1a (YES), 1 is added to the count value M and the count value M storing memory M35 is overwritten with the obtained value in step T325, and the row number of the strip 1a in the large printing product 1 is read from the memory M37 in step T326.

Subsequently, in step T327, when the count value M is equal to or smaller than the row number of the strip 1a in the large printing product 1 (NO), the process returns to step T314, and when the count value M is greater than the row number of the strip 1a in the large printing product 1 (YES), 1 is added to the count value N and the count value N storing memory M34 is overwritten with the obtained value in step T328, and the column number of the strip 1a in the large printing product 1 is read from the memory M38 in step T329.

Subsequently, in step T330, when the count value N is equal to or smaller than the column number of the strip 1a in the large printing product 1 (NO), the process returns to step T313, and when the count value N is greater than the column number of the strip 1a in the large printing product 1 (YES), the process proceeds to the later-described step T159.

In a case where the process proceeds from step T302 to step T331, the count value Y storing memory M12 is overwritten with 1 in step T331. In step T332, the count value X storing memory M13 is overwritten with 1. In step T333, the maximum allowable value of B is read from the memory M25, and the address position of (X, Y) in the allowable value of monochrome camera of large printing product storing memory M139 is overwritten with the read value.

Subsequently, in step T334, 1 is added to the count value X and the count value X storing memory M13 is overwritten with the obtained value. In step T335, the number of the X-direction pixels of the large printing product 1 is read from the memory M32.

Subsequently, in step T336, when the count value X is equal to or smaller than the number of the X-direction pixels of the large printing product 1 (NO), the process returns to step T333, and when the count value X is greater than the number of the X-direction pixels of the large printing product 1 (YES), 1 is added to the count value Y and the count value Y storing memory M12 is overwritten with the obtained value in step T337, and the number of the Y-direction pixels of the large printing product 1 is read from the memory M33 in step T338.

Subsequently, in step T339, when the count value Y is equal to or smaller than the number of the Y-direction pixels of the large printing product 1 (NO), the process returns to step T332, and when the count value Y is greater than the number of the Y-direction pixels of the large printing product 1 (YES), the process proceeds to step T340.

In step T340, the count value N storing memory M34 is overwritten with 1. Subsequently, in step T341, the count value M storing memory M35 is overwritten with 1. In step T342, the X-direction position at the bottom left end of the strip 1a in the N-th row and the M-th column is read from the X-direction address position of the strip 1a in the N-th row and the M-th column in the bottom left end position of each strip in large printing product storing memory M36.

Subsequently, in step T343, the Y-direction position at the bottom left end of the strip 1a in the N-th row and the M-th column is read from the Y-direction address position of the strip 1a in the N-th row and the M-th column in the bottom left end position of each strip in large printing product storing memory M36. In step T344, the count value Y storing memory M12 is overwritten with 1. In step T345, the count value X storing memory M13 is overwritten with 1.

Subsequently, in step T346, the allowable value of B at the (X, Y) position in the strip 1a is read from the address position of (X, Y) in the allowable value of B of strip storing memory M28, and the address position of (X-direction position at bottom left end of strip in N-th row and M-th column+count value X−1, Y-direction position at bottom left end of strip in N-th row and M-th column+count value Y−1) in the allowable value of monochrome camera of large printing product storing memory M139 is overwritten with the read value.

Following step T346, 1 is added to the count value X and the count value X storing memory M13 is overwritten with the obtained value in step T347. In step T348, the number of the X-direction pixels of the strip 1a is read from the memory M15.

Subsequently, in step T349, when the count value X is equal to or smaller than the number of the X-direction pixels of the strip 1a (NO), the process returns to step T346, and when the count value X is greater than the number of the X-direction pixels of the strip 1a (YES), 1 is added to the count value Y and the count value Y storing memory M12 is overwritten with the obtained value in step T350, and the number of the Y-direction pixels of the strip 1a is read from the memory M16 in step T351.

Subsequently, in step T352, when the count value Y is equal to or smaller than the number of the Y-direction pixels of the strip 1a (NO), the process returns to step T345, and when the count value Y is greater than the number of the Y-direction pixels of the strip 1a (YES), 1 is added to the count value M and the count value M storing memory M35 is overwritten with the obtained value in step T353, and the row number of the strip 1a in the large printing product 1 is read from the memory M37 in step T354.

Subsequently, in step T355, when the count value M is equal to or smaller than the row number of the strip 1a in the large printing product 1 (NO), the process returns to step T342, and when the count value M is greater than the row number of the strip 1a in the large printing product 1 (YES), 1 is added to the count value N and the count value N storing memory M34 is overwritten with the obtained value in step T356, and the column number of the strip 1a in the large printing product 1 is read from the memory M38 in step T357.

Subsequently, in step T358, when the count value N is equal to or smaller than the column number of the strip 1a in the large printing product 1 (NO), the process returns to step T341, and when the count value N is greater than the column number of the strip 1a in the large printing product 1 (YES), the process proceeds to the later-described step T159.

In a case where the process proceeds from steps T158, T330, and T358 to step T159, whether the reference image data reading switch 30 is turned on is determined in step T159. When the reference image data reading switch 30 is turned off (NO), the processing of step T159 is repeated. When the reference image data reading switch 30 is turned on (YES), the input/output device 20 outputs a lighting command to the visible light illuminators 35D in step T159-1, and the process proceeds to step T160.

In step T160, the value in the motion thread color storing memory M11 is read. Subsequently, in step T161, whether the value in the motion thread color storing memory M11 is 1 (R) is determined. When the value in the motion thread color storing memory M11 is different from 1 (R) (NO), the process proceeds to the later-described step T359. When the value in the motion thread color storing memory M11 is 1 (R) (YES), the input/output device 20 outputs the lighting command to the R illuminators 35A in step T162, and the process proceeds to the later-described step T163.

In a case where the process proceeds from step T161 to step T359, whether the value in the motion thread color storing memory M11 is 2 (G) is determined in step T359. When the value in the motion thread color storing memory M11 is different from 2 (G) (NO), the process proceeds to the later-described step T361. When the value in the motion thread color storing memory M11 is 2 (G) (YES), the input/output device 20 outputs the lighting command to the G illuminators 35B in step 1360, and the process proceeds to the later-described step T163.

In a case where the process proceeds from step T359 to step T361, the input/output device 20 outputs the lighting command to the B illuminators 35C in step T361, and the process proceeds to step T163.

In step T163, the image capturing rotary phase of the color camera 34B is read from the memory M40. Subsequently, in step T164, the count value is read from the rotary phase of securities printing press detecting counter 36, and the read value is stored into the memory M141.

Subsequently, in step T165, when the count value in the rotary phase of securities printing press detecting counter 36 does not match the image capturing rotary phase of the color camera 34B (NO), the process returns to step T164, and when the count value in the rotary phase of securities printing press detecting counter 36 matches the image capturing rotary phase of the color camera 34B (YES), an input/output device 18-B outputs the image capturing command to the color camera 34B in step T166, and the input/output device 18-B outputs the image data transmission command to the color camera 34B in step T167.

Subsequently, in step T168, whether the captured image data is outputted from the color camera 34B to an input/output device 17-B is determined. When the captured image data is not outputted from the color camera 34B (NO), the processing of step T168 is repeated. When the captured image data is outputted from the color camera 34B (YES), the process proceeds to step T169.

In step T169, the count value Y storing memory M12 is overwritten with 1. Subsequently, in step T170, the count value X storing memory M13 is overwritten with 1.

Subsequently, in step T171, the pixel data of R is read from the color camera 34B, and the read data is stored as the address position of (X, Y) in the reference image data of R storing memory M142. In step T172, the pixel data of G is read from the color camera 34B, and the read data is stored as the address position of (X, Y) in the reference image data of G storing memory M143. In step T173, the pixel data of B is read from the color camera 34B, and the read data is stored as the address position of (X, Y) in the reference image data of B storing memory M144.

Subsequently, in step T174, 1 is added to the count value X, and the count value X storing memory M13 is overwritten with the obtained value. In step T175, the number of the X-direction pixels of the color camera 34B is read from the memory M145.

Subsequently, in step T176, when the count value X is equal to or smaller than the number of the X-direction pixels of the color camera 34B (NO), the process returns to step T171, and when the count value X is greater than the number of the X-direction pixels of the color camera 34B (YES), 1 is added to the count value Y and the count value Y storing memory M12 is overwritten with the obtained value in step T177, and the number of the Y-direction pixels of the color camera 34B is read from the memory M146 in step T178.

Subsequently, in step T179, when the count value Y is equal to or smaller than the number of the Y-direction pixels of the color camera 34B (NO), the process returns to step T170, and when the count value Y is greater than the number of the Y-direction pixels of the color camera 34B (YES), the process proceeds to step T180.

In step T180, the image capturing rotary phase of the monochrome camera 34A is read from the memory M147. In step T181, the count value is read from the rotary phase of securities printing press detecting counter 36, and the read value is stored into the memory M141.

Subsequently, in step T182, when the count value in the rotary phase of securities printing press detecting counter 36 does not match the image capturing rotary phase of the monochrome camera 34A (NO), the process returns to step T181, and when the count value in the rotary phase of securities printing press detecting counter 36 matches the image capturing rotary phase of the monochrome camera 34A (YES), the input/output device 18-A outputs the image capturing command to the monochrome camera 34A in step T183, and the input/output device 18-A outputs the image data transmission command to the monochrome camera 34A in step T184.

Subsequently, in step T185, whether the captured image data is outputted from the monochrome camera 34A to the input/output device 17-A is determined. When the captured image data is not outputted from the monochrome camera 34A (NO), the processing of step T185 is repeated. When the captured image data is outputted from the monochrome camera 34A (YES), the process proceeds to step T186.

In step T186, the count value Y storing memory M12 is overwritten with 1. Subsequently, in step T187, the count value X storing memory M13 is overwritten with 1.

Subsequently, in step T188, the pixel data is read from the monochrome camera 34A and the read data is stored as the address position of (X, Y) in the reference image data of monochrome camera storing memory M148. In step T189, 1 is added to the count value X, and the count value X storing memory M13 is overwritten with the obtained value. In step T190, the number of the X-direction pixels of the monochrome camera 34A is read from the memory M149.

Subsequently, in step T191, when the count value X is equal to or smaller than the number of the X-direction pixels of the monochrome camera 34A (NO), the process returns to step T188, and when the count value X is greater than the number of the X-direction pixels of the monochrome camera 34A (YES), 1 is added to the count value Y and the count value Y storing memory M12 is overwritten with the obtained value in step T192, and the number of the Y-direction pixels of the monochrome camera 34A is read from the memory M150 in step T193.

Subsequently, in step T194, when the count value Y is equal to or smaller than the number of the Y-direction pixels of the monochrome camera 34A (NO), the process returns to step T187, and when the count value Y is greater than the number of the Y-direction pixels of the monochrome camera 34A (YES), the process proceeds to step T195.

In step T195, whether the inspection start switch 31 is turned on is determined. When the inspection start switch 31 is turned off (NO), the processing of step T195 is repeated.

When the inspection start switch 31 is turned on (YES), the process proceeds to step T196.

In step T196, whether the inspection end switch 32 is turned on is determined. When the inspection end switch 32 is turned on (YES), the inspection of the print quality ends. When the inspection end switch 32 is turned off (NO), the image capturing rotary phase of the color camera 34B is read from the memory M140 in step T197, and the count value is read from the rotary phase of securities printing press detecting counter 36 and the read value is stored into the memory M141 in step T198.

Subsequently, in step T199, when the count value in the rotary phase of securities printing press detecting counter 36 does not match the image capturing rotary phase of the color camera (NO), the process returns to step T198, and when the count value in the rotary phase of securities printing press detecting counter 36 matches the image capturing rotary phase of the color camera (YES), the input/output device 18-B outputs the image capturing command to the color camera 34B in step T200, and the input/output device 18-B outputs the image data transmission command to the color camera 34B in step T201.

Subsequently, in step T202, whether the captured image data is outputted from the color camera 34B to the input/output device 17-B is determined. When the captured image data is not outputted from the color camera 34B (NO), the processing of step T202 is repeated. When the captured image data is outputted from the color camera 34B (YES), the process proceeds to step T203.

In step T203, the count value Y storing memory M12 is overwritten with 1. Subsequently, in step T204, the count value X storing memory M13 is overwritten with 1.

Subsequently, in step T205, the pixel data of R is read from the color camera 34B and the read data is stored as the address position of (X, Y) in the inspection image data of R storing memory M151. In step T206, the pixel data of G is read from the color camera 34B and the read data is stored as the address position of (X, Y) in the inspection image data of G storing memory M152. In step T207, the pixel data of B is read from the color camera 34B and the read data is stored as the address position of (X, Y) in the inspection image data of B storing memory M153.

Subsequently, in step T208, 1 is added to the count value X, and the count value X storing memory M13 is overwritten with the obtained value. In step T209, the number of the X-direction pixels of the color camera 34B is read from the memory M145.

Subsequently, in step T210, when the count value X is equal to or smaller than the number of the X-direction pixels of the color camera 34B (NO), the process returns to step T205, and when the count value X is greater than the number of the X-direction pixels of the color camera 34B (YES), 1 is added to the count value Y and the count value Y storing memory M12 is overwritten with the obtained value in step T211, and the number of the Y-direction pixels of the color camera 34B is read from the memory M146 in step T212.

Subsequently, in step T213, when the count value Y is equal to or smaller than the number of the Y-direction pixels of the color camera 34B (NO), the process returns to step T204, and when the count value Y is greater than the number of the Y-direction pixels of the color camera 34B (YES), the process proceeds to step T214.

In step T214, the count value Y storing memory M12 is overwritten with 1. Subsequently, in step T215, the count value X storing memory M13 is overwritten with 1. In step T216, the number of the X-direction ineffective pixels of the color camera 34B is read from the memory M154. In step T217, the number of the Y-direction ineffective pixels of the color camera 34B is read from the memory M155. In step T218, the value in the motion thread color storing memory M11 is read. In this embodiment, in the image data captured by the color camera 34B, the ineffective pixels are the pixels in the portion corresponding to the region 22c (illustrated as hatched region in FIG. 12) other than the portion in which the image of the large printing product 1 is captured.

Subsequently, in step T219, when the value in the motion thread color storing memory M11 is 1 (R) (YES), the process proceeds to step T226, and when the value in the motion thread color storing memory M11 is different from 1 (R) (NO), the process proceeds to step T220.

In step T220, the inspection data of R of the pixel at an address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the inspection image data of R storing memory M151.

Subsequently, in step T221, the reference data of R of the pixel at the address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the reference image data of R storing memory M142.

Subsequently, in step T222, the reference data of R of the pixel at the address position of (number of X-direction ineffective pixels of color camera+count value X, number of Y-direction ineffective pixels of color camera+count value Y) is subtracted from the inspection data of R of the pixel at the address position of (number of X-direction ineffective pixels of color camera+count value X, number of Y-direction ineffective pixels of color camera+count value Y) to compute a pixel data difference at the address position of (X, Y) of R, and the obtained value is stored into the memory M156.

Subsequently, in step T223, the absolute value of the pixel data difference at the address position of (X, Y) of R is computed based on the pixel data difference at the address position of (X, Y) of R, and the obtained value is stored into the memory M157. In step T224, the allowable value of the pixel data at the address position of (X, Y) of R is read from the address position of (X, Y) in the allowable value of R of large printing product storing memory M29.

Subsequently, in step T225, when the absolute value of the pixel data difference at the address position of (X, Y) of R is greater than the allowable value of the pixel data at the address position of (X, Y) of R (NO), the process proceeds to step T362 illustrated in FIG. 21C to display error on the display 22 and end the inspection of the print quality, and when the absolute value of the pixel data difference at the address position of (X, Y) of R is equal to or smaller than the allowable value of the pixel data at the address position of (X, Y) of R (YES), the process proceeds to step T226.

In step T226, the value in the motion thread color storing memory M11 is read. Subsequently, in step T227, when the value in the motion thread color storing memory M11 is 2 (G) (YES), the process proceeds to the later-described step T234. When the value in the motion thread color storing memory M11 is different from 2 (G) (NO), the process proceeds to step T228.

In step T228, the inspection data of G of the pixel at the address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the inspection image data of G storing memory M152.

Subsequently, in step T229, the reference data of G of the pixel at the address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the reference image data of G storing memory M143.

Subsequently, in step T230, the reference data of G of the pixel at the address position of (number of X-direction ineffective pixels of color camera+count value X, number of Y-direction ineffective pixels of color camera+count value Y) is subtracted from the inspection data of G of the pixel at the address position of (number of X-direction ineffective pixels of color camera+count value X, number of Y-direction ineffective pixels of color camera+count value Y) to compute a pixel data difference at the address position of (X, Y) of G, and the obtained value is stored into the memory M158.

Subsequently, in step T231, the absolute value of the pixel data difference at the address position of (X, Y) of G is computed based on the pixel data difference at the address position of (X, Y) of G, and the obtained value is stored into the memory M159. In step T232, the allowable value of the pixel data at the address position of (X, Y) of G is read from the address position of (X, Y) in the allowable value of G of large printing product storing memory M30.

Subsequently, in step T233, when the absolute value of the pixel data difference at the address position of (X, Y) of G is greater than the allowable value of the pixel data at the address position of (X, Y) of G (NO), the process proceeds to step T362 illustrated in FIG. 21C to display error on the display 22 and end the inspection of the print quality, and when the absolute value of the pixel data difference at the address position of (X, Y) of G is equal to or smaller than the allowable value of the pixel data at the address position of (X, Y) of G (YES), the process proceeds to step T234.

In step T234, the value in the motion thread color storing memory M11 is read. Subsequently, in step T235, when the value in the motion thread color storing memory M11 is 3 (B) (YES), the process proceeds to the later-described step T242. When the value in the motion thread color storing memory M11 is different from 3 (B) (NO), the process proceeds to step T236.

In step T236, the inspection data of B of the pixel at the address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the inspection image data of B storing memory M153.

Subsequently, in step T237, the reference data of B of the pixel at the address position of (number of X-direction ineffective pixels of color camera+count value X, number of Y-direction ineffective pixels of color camera+count value Y) is read from the address position of (number of X-direction ineffective pixels of color camera+count value X, number of Y-direction ineffective pixels of color camera+count value Y) in the reference image data of B storing memory M144.

Subsequently, in step T238, the reference data of B of the pixel at the address position of (number of X-direction ineffective pixels of color camera+count value X, number of Y-direction ineffective pixels of color camera+count value Y) is subtracted from the inspection data of B of the pixel at the address position of (number of X-direction ineffective pixels of color camera+count value X, number of Y-direction ineffective pixels of color camera+count value Y) to compute a pixel data difference at the address position of (X, Y) of B, and the obtained value is stored into the memory M160.

Subsequently, in step T239, the absolute value of the pixel data difference at the address position of (X, Y) of B is computed based on the pixel data difference at the address position of (X, Y) of B, and the obtained value is stored into the memory M161. In step T240, the allowable value of the pixel data at the address position of (X, Y) of B is read from the address position of (X, Y) in the allowable value of B of large printing product storing memory M31.

Subsequently, in step T241, when the absolute value of the pixel data difference at the address position of (X, Y) of B is greater than the allowable value of the pixel data at the address position of (X, Y) of B (NO), the process proceeds to step T362 illustrated in FIG. 21C to display error on the display 22 and end the inspection of the print quality, and when the absolute value of the pixel data difference at the address position of (X, Y) of B is equal to or smaller than the allowable value of the pixel data at the address position of (X, Y) of B (YES), the process proceeds to step T242.

In step T242, 1 is added to the count value X, and the count value X storing memory M13 is overwritten with the obtained value. Subsequently, in step T243, the number of the X-direction pixels of the large printing product 1 is read from the memory M32.

Subsequently, in step T244, when the count value X is equal to or smaller than the number of the X-direction pixels of the large printing product 1 (NO), the process returns to step T216, and when the count value X is greater than the number of the X-direction pixels of the large printing product 1 (YES), 1 is added to the count value Y and the count value Y storing memory M12 is overwritten with the obtained value in step T245, and the number of the Y-direction pixels of the large printing product 1 is read from the memory M33 in step T246.

Subsequently, in step T247, when the count value Y is equal to or smaller than the number of the Y-direction pixels of the large printing product 1 (NO), the process returns to step T215, and when the count value Y is greater than the number of the Y-direction pixels of the large printing product 1 (YES), the process proceeds to step T248.

In step T248, the image capturing rotary phase of the monochrome camera 34A is read from the memory M147. Subsequently, in step T249, the count value is read from the rotary phase of securities printing press detecting counter 36, and the read value is stored into the memory M141.

Subsequently, in step T250, when the count value in the rotary phase of securities printing press detecting counter 36 does not match the image capturing rotary phase of the monochrome camera 34A (NO), the process returns to step T249, and when the count value in the rotary phase of securities printing press detecting counter 36 matches the image capturing rotary phase of the monochrome camera 34A (YES), the process proceeds to step T251.

Subsequently, in step T251, the input/output device 18-A outputs the image capturing command to the monochrome camera 34A. In step T252, the input/output device 18-A outputs the image data transmission command to the monochrome camera 34A.

Subsequently, in step T253, whether the captured image data is outputted from the monochrome camera 34A to the input/output device 17-A is determined. When the captured image data is not outputted from the monochrome camera 34A (NO), the processing of step T253 is repeated. When the captured image data is outputted from the monochrome camera 34A (YES), the process proceeds to step T254.

Subsequently, in step T254, the count value Y storing memory M12 is overwritten with 1. In step T255, the count value X storing memory M13 is overwritten with 1. In step T256, the pixel data is read from the monochrome camera 34A, and the read data is stored as the address position of (X, Y) in the inspection image data of monochrome camera storing memory M162. In step T257, 1 is added to the count value X, and the count value X storing memory M13 is overwritten with the obtained value. In step T258, the number of the X-direction pixels of the monochrome camera 34A is read from the memory M149.

Subsequently, in step T259, when the count value X is equal to or smaller than the number of the X-direction pixels of the monochrome camera (NO), the process returns to step T256, and when the count value X is greater than the number of the X-direction pixels of the monochrome camera (YES), 1 is added to the count value Y and the count value Y storing memory M12 is overwritten with the obtained value in step T260, and the number of the Y-direction pixels of the monochrome camera 34A are read from the memory M150 in step T261.

Subsequently, in step T262, when the count value Y is equal to or smaller than the number of the Y-direction pixels of the monochrome camera 34A (NO), the process returns to step T255, and when the count value Y is greater than the number of the Y-direction pixels of the monochrome camera 34A (YES), the process proceeds to step T263.

In step T263, the count value Y storing memory M12 is overwritten with 1. Subsequently, in step T264, the count value X storing memory M13 is overwritten with 1. In step T265, the number of the X-direction ineffective pixels of the monochrome camera 34A is read from the memory M163. In step T266, the number of the Y-direction ineffective pixels of the monochrome camera 34A is read from the memory M164.

Subsequently, in step T267, the inspection data of the monochrome camera 34A of the pixel at an address position of (number of X-direction ineffective pixels of monochrome camera+count value X, number of Y-direction ineffective pixels of monochrome camera+count value Y) is read from the address position of (number of X-direction ineffective pixels of monochrome camera+count value X, number of Y-direction ineffective pixels of monochrome camera+count value Y) in the inspection image data of monochrome camera storing memory M162.

Subsequently, in step T268, the reference data of the monochrome camera 34A of the pixel at the address position of (number of X-direction ineffective pixels of monochrome camera+count value X, number of Y-direction ineffective pixels of monochrome camera+count value Y) is read from the address position of (number of X-direction ineffective pixels of monochrome camera+count value X, number of Y-direction ineffective pixels of monochrome camera+count value Y) in the reference image data of monochrome camera storing memory M148.

Following step T268, in step T269, the reference data of the monochrome camera 34A of the pixel at the address position of (number of X-direction ineffective pixels of monochrome camera+count value X, number of Y-direction ineffective pixels of monochrome camera+count value Y) is subtracted from the inspection data of the monochrome camera 34A of the pixel at the address position of (number of X-direction ineffective pixels of monochrome camera+count value X, number of Y-direction ineffective pixels of monochrome camera+count value Y) to compute a pixel data difference at the address position of (X, Y) of the monochrome camera 34A, and the obtained value is stored into the memory M165.

Subsequently, in step T270, the absolute value of the pixel data difference at the address position of (X, Y) of the monochrome camera 34A is computed based on the pixel data difference at the address position of (X, Y) of the monochrome camera 34A, and the obtained value is stored into the memory M166. In step T271, the allowable value of the pixel data at the address position of (X, Y) of the monochrome camera 34A is read from the address position of (X, Y) in the allowable value of monochrome camera of large printing product storing memory M139.

Subsequently, in step T272, when the absolute value of the pixel data difference at the address position of (X, Y) of the monochrome camera 34A is greater than the allowable value of the pixel data at the address position of (X, Y) of the monochrome camera (NO), the process proceeds to step T362 to display error on the display 22 and end the inspection of the print quality. When the absolute value of the pixel data difference at the address position of (X, Y) of the monochrome camera 34A is equal to or smaller than the allowable value of the pixel data at the address position of (X, Y) of the monochrome camera 34A (YES), the process proceeds to step T273.

In step T273, 1 is added to the count value X, and the count value X storing memory M13 is overwritten with the obtained value. In step T274, the number of the X-direction pixels of the large printing product 1 is read from the memory M32.

Subsequently, in step T275, when the count value X is equal to or smaller than the number of the X-direction pixels of the large printing product 1 (NO), the process returns to step T265, and when the count value X is greater than the number of the X-direction pixels of the large printing product 1 (YES), 1 is added to the count value Y and the count value Y storing memory M12 is overwritten with the obtained value in step T276, and the number of the Y-direction pixels of the large printing product 1 is read from the memory M33 in step T277.

Subsequently, in step T278, when the count value Y is equal to or smaller than the number of the Y-direction pixels of the large printing product 1 (NO), the process returns to step T264, and when the count value Y is greater than the number of the Y-direction pixels of the large printing product 1 (YES), the process returns to step T196.

As described above, in the print quality inspection apparatus and the print quality inspection method according to this embodiment, for the image captured by the color camera 34B, the inspection of the print quality of the portion outside the motion thread area A is performed using only the image data of the color of different hue from the color of the motion thread 1b while no inspection is performed using the image data of the color of the same hue as the color of the motion thread 1b, and instead of using the image data of the color of the same hue as the color of the motion thread 1b, the inspection of the print quality is performed with the normal allowable values by emitting light onto the large printing product 1 from the illuminators 35A, 35B, or 35C of the color of the same hue as the color of the motion thread 1b and using the image of the light-emitted large printing product 1 captured by the monochrome camera 34A.

In this embodiment, an example of the image data that is obtained by emitting light onto the large printing product 1 by the illuminators 35A, 35B, or 35C of the color of the same hue as the color of the motion thread 1b (e.g., when the motion thread 1b is the red hue, the R illuminators 35A) and capturing an image of the light-emitted large printing product 1 by the monochrome camera 34A is illustrated in FIG. 11A. Examples of the image data that is obtained by emitting light onto the large printing product 1 by a pair of the illuminators 35B and 35C, 35A and 35C, or 35A and 35B of the colors of different hue from the color of the motion thread 1b (e.g., when the motion thread 1b is the red hue, the G illuminators 35B and the B illuminators 35C) and capturing an image of the light-emitted large printing product 1 by the monochrome camera 34A are illustrated in FIGS. 11B and 11C.

As illustrated in FIGS. 11B and 11C, since the motion thread 1b is expressed in a dark color in the image data obtained by using the pair of illuminators 35B and 35C, 35A and 35C, or 35A and 35B of the color of different hue from the color of the motion thread 1b, when the allowable values are the normal values and the pattern of the motion thread 1b changes with small angle variations, the determination may be made as NG.

On the other hand, as illustrated in FIG. 11A, since the motion thread 1b has no color or is expressed in a pale color in the image data obtained by using the illuminators 35A, 35B, or 35C of the color of the same hue as the color of the motion thread 1b, it is possible to substantially ignore the motion thread 1b in the inspection using the normal allowable values.

In this embodiment, with the above configuration, it is possible to prevent the variation of the pattern of the motion thread 1b from affecting the print quality inspection and to perform the print quality inspection without being affected by the pattern of the motion thread 1b, and the quality of the print provided on the large printing product 1 provided with the motion thread 1b can be accurately inspected.

Third Embodiment

Hereinafter, a print quality inspection apparatus and a print quality inspection method according to a third embodiment of the present invention is described with reference to FIGS. 22A to 30.

Figure 23B:
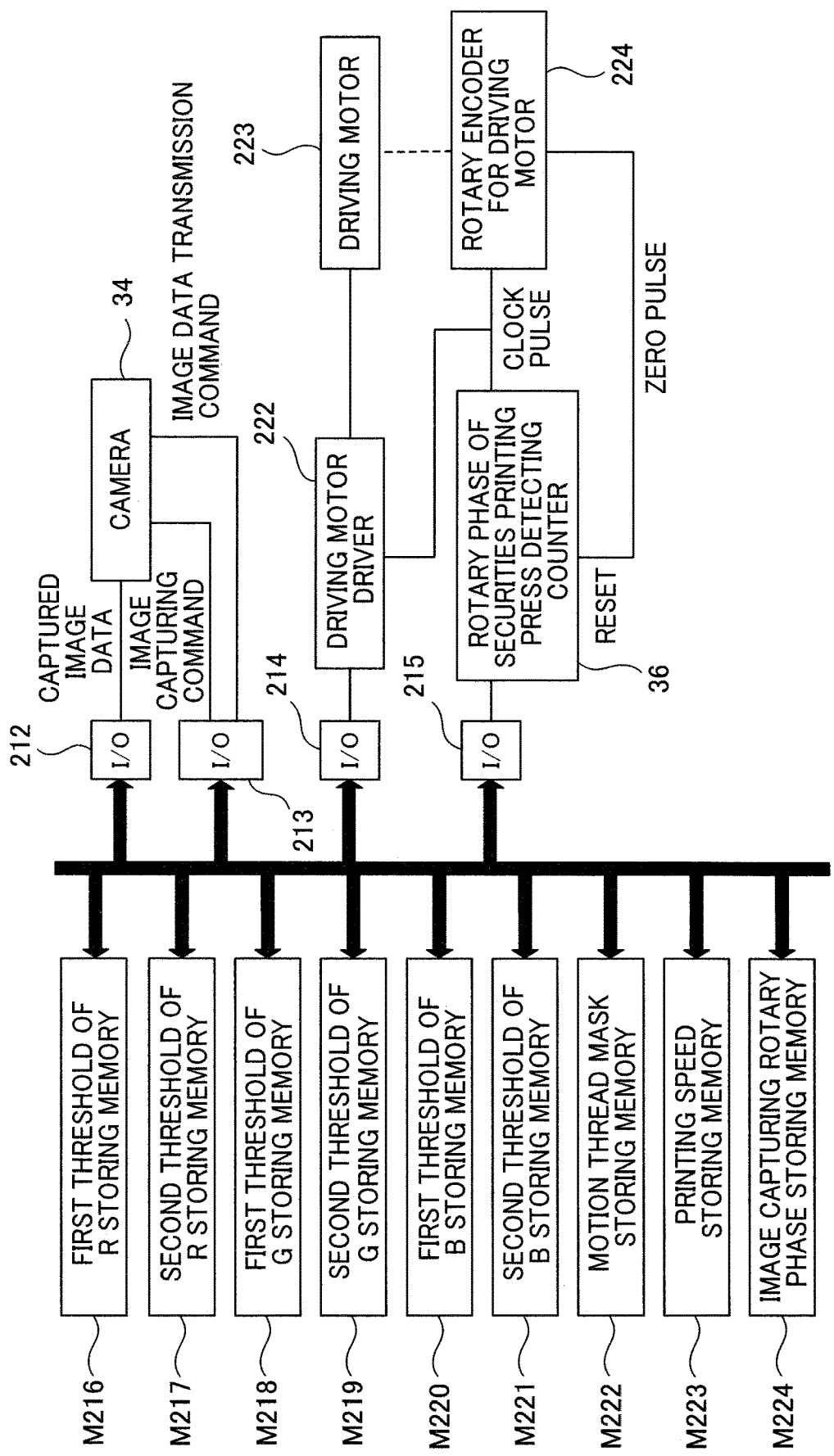
FIG. 23B is a block diagram that illustrates the configuration of the print quality inspection apparatus according to the third embodiment of the present invention.
Figure 23C:
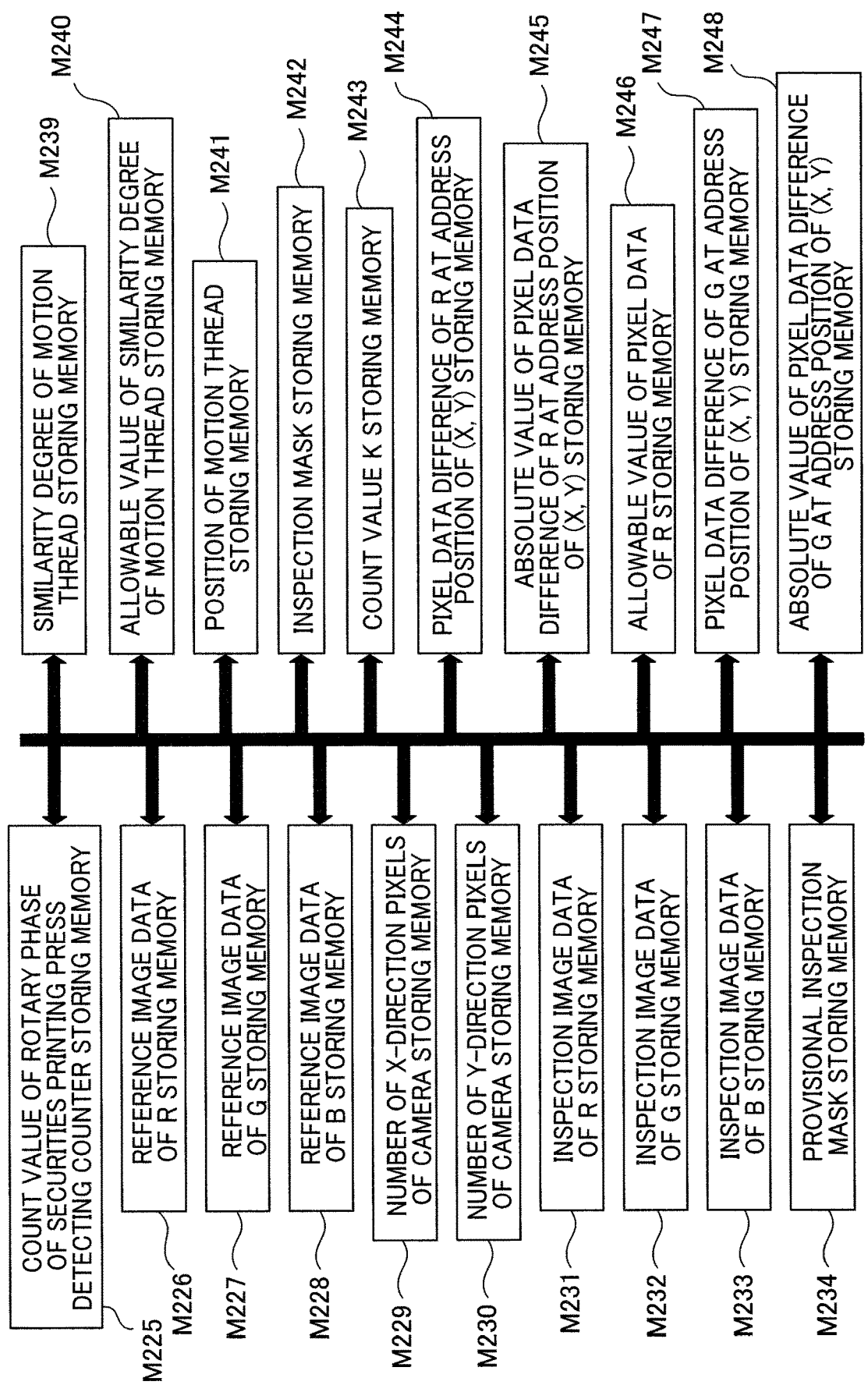
FIG. 23C is a block diagram that illustrates the configuration of the print quality inspection apparatus according to the third embodiment of the present invention.
Figure 24A:
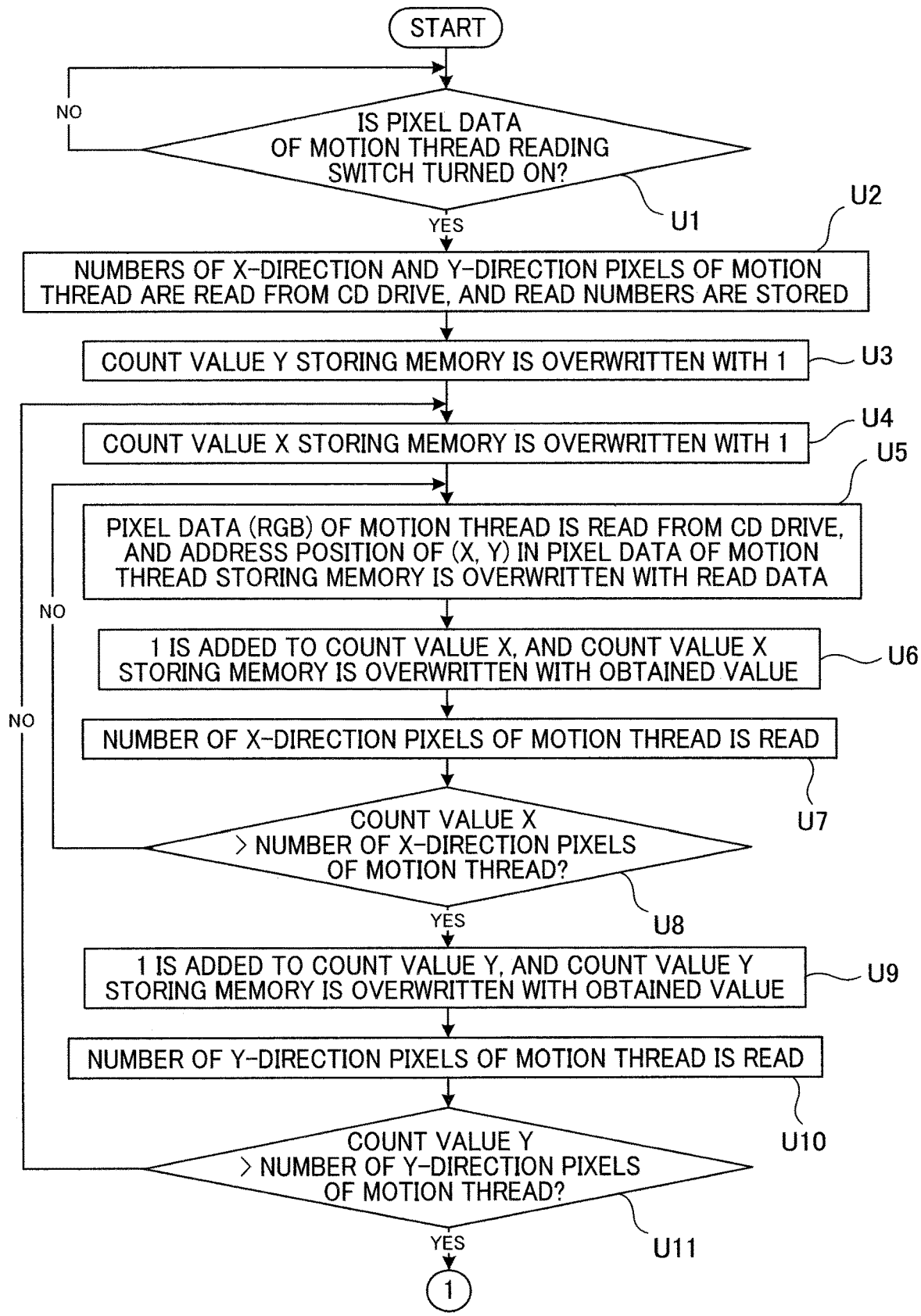
FIG. 24A is a flowchart that illustrates operations of the print quality inspection apparatus according to the third embodiment of the present invention.
Figure 24B:
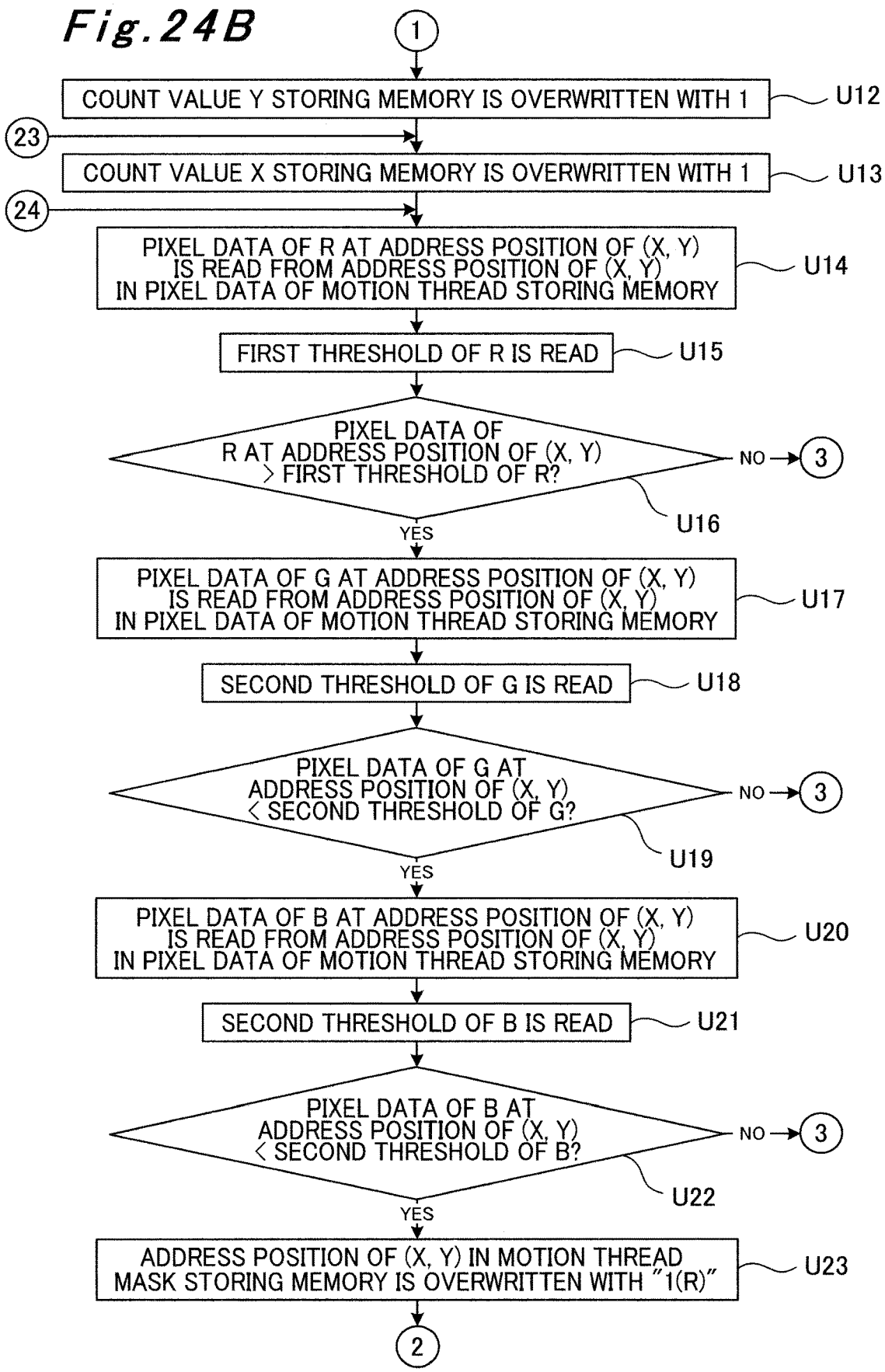
FIG. 24B is a flowchart that illustrates the operations of the print quality inspection apparatus according to the third embodiment of the present invention.
Figure 24C:
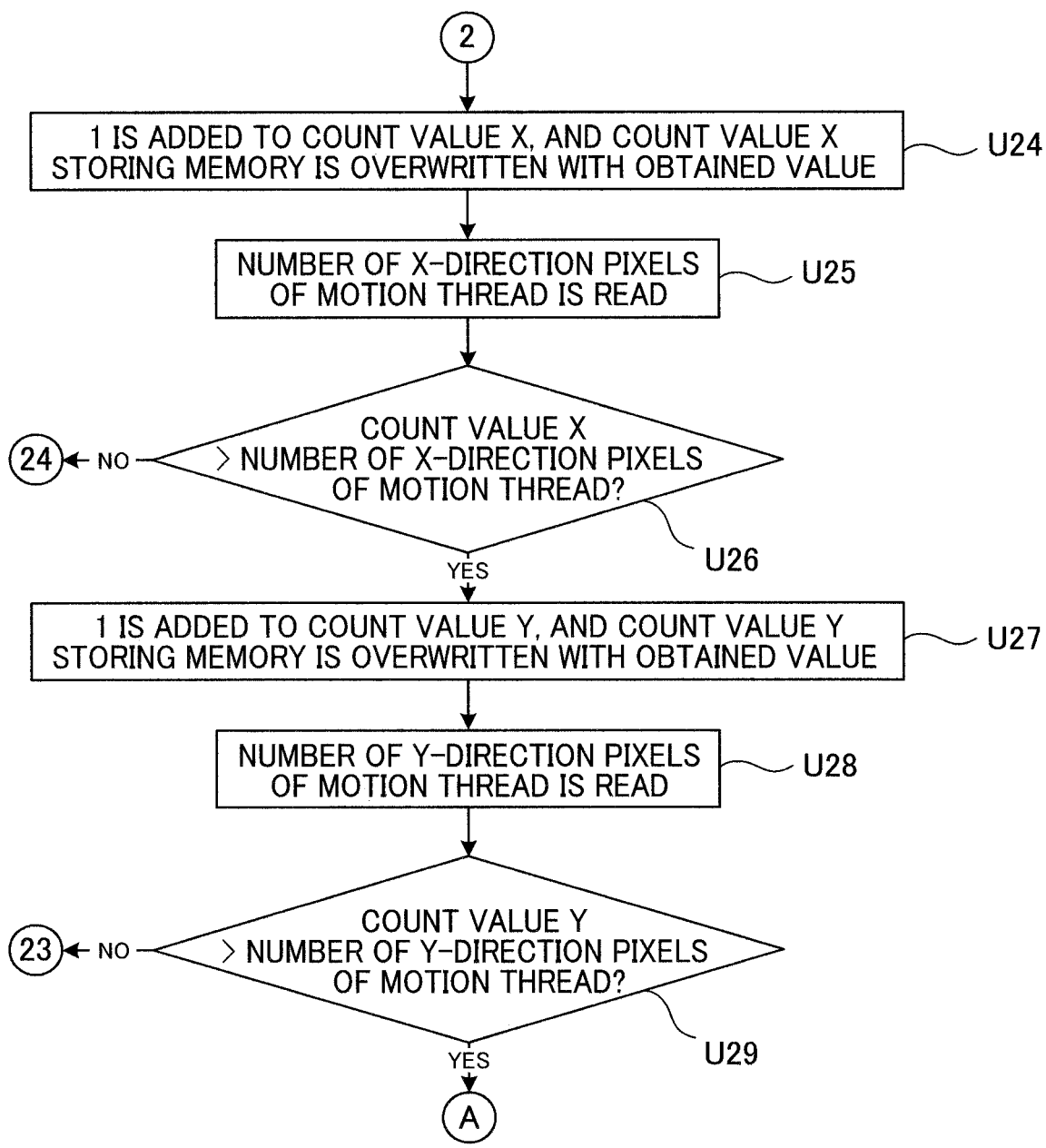
FIG. 24C is a flowchart that illustrates the operations of the print quality inspection apparatus according to the third embodiment of the present invention.
Figure 24D:
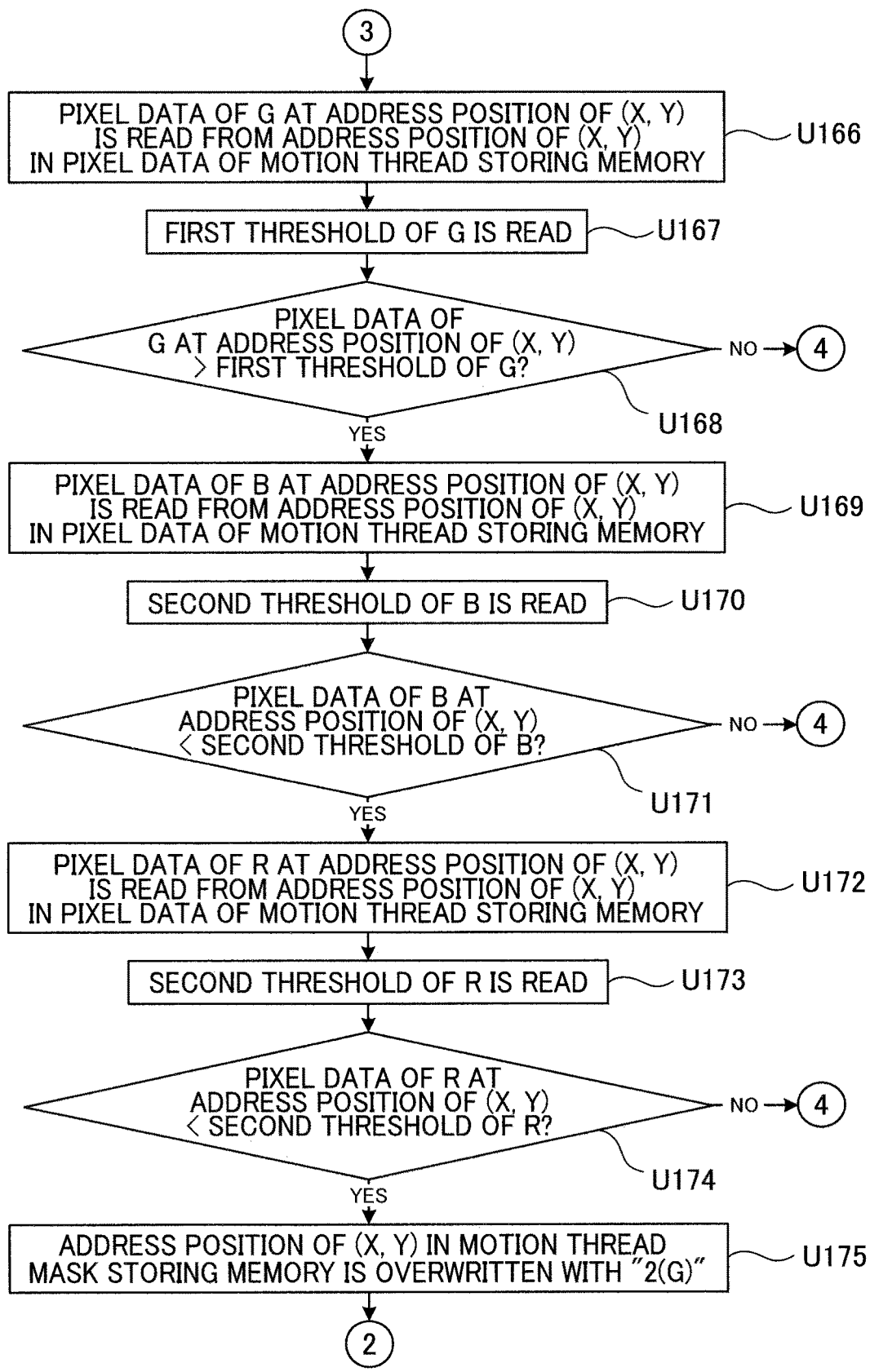
FIG. 24D is a flowchart that illustrates the operations of the print quality inspection apparatus according to the third embodiment of the present invention.
Figure 24E:
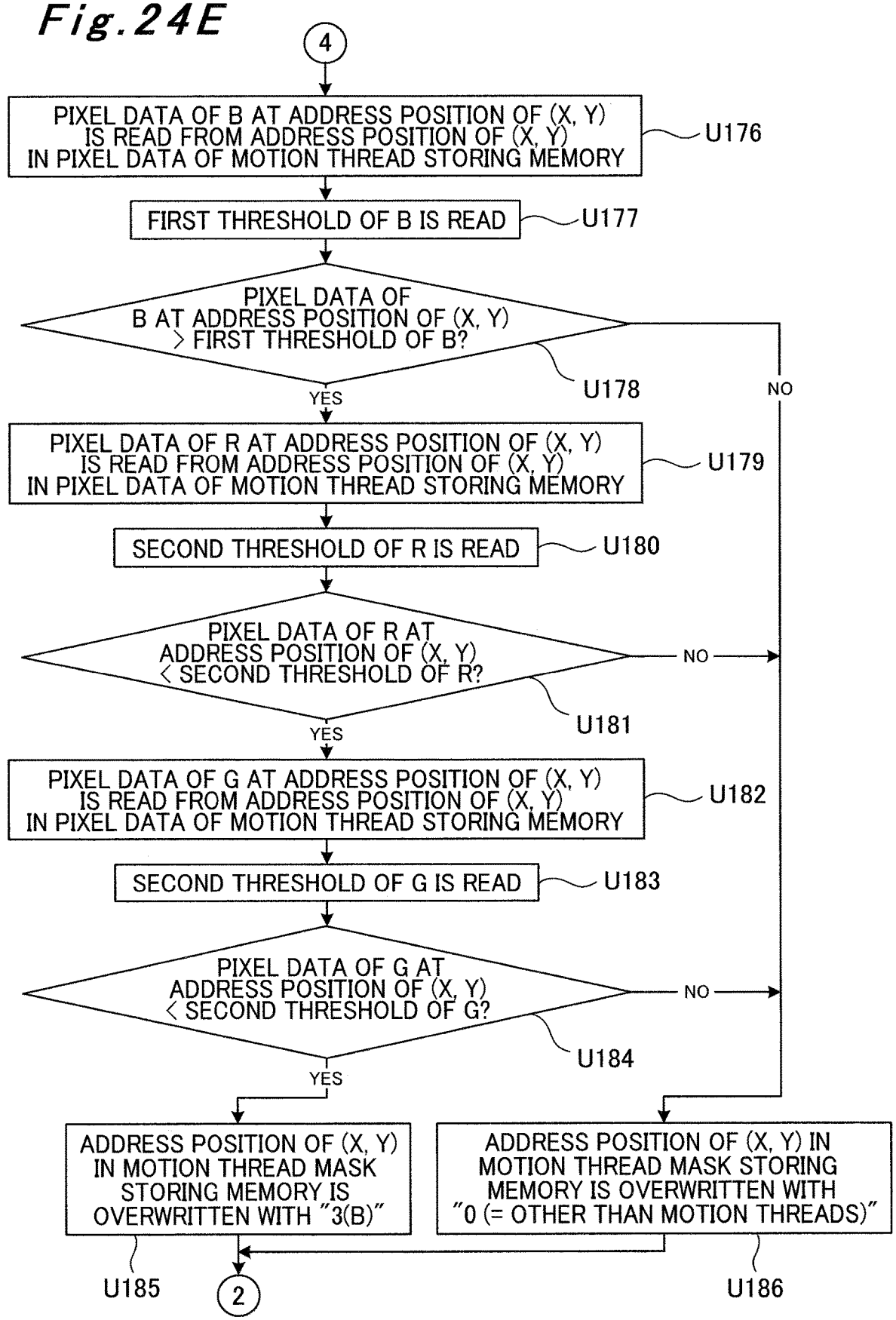
FIG. 24E is a flowchart that illustrates the operations of the print quality inspection apparatus according to the third embodiment of the present invention.
Figure 25A:
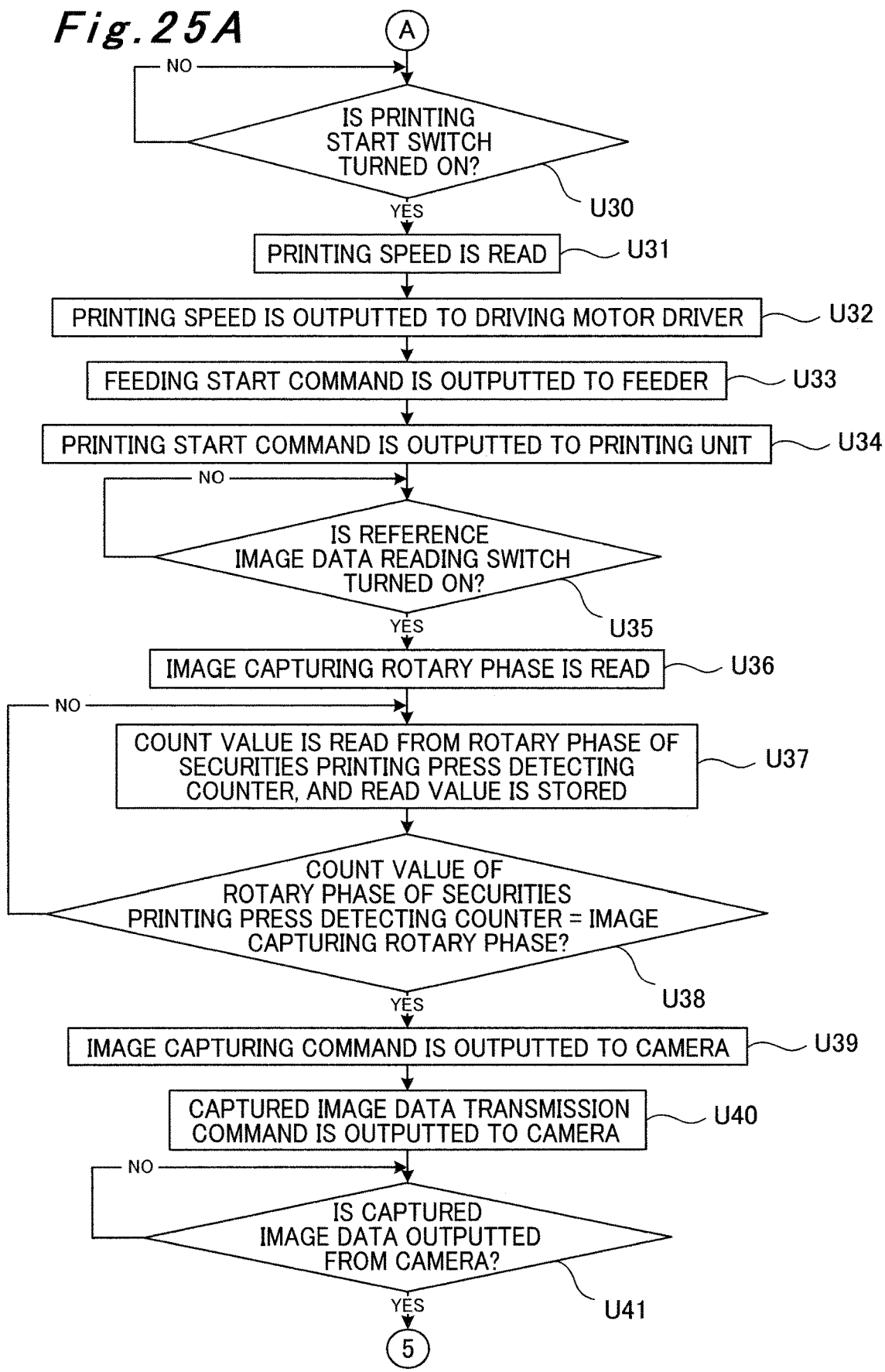
FIG. 25A is a flowchart that illustrates the operations of the print quality inspection apparatus according to the third embodiment of the present invention.
Figure 25B:
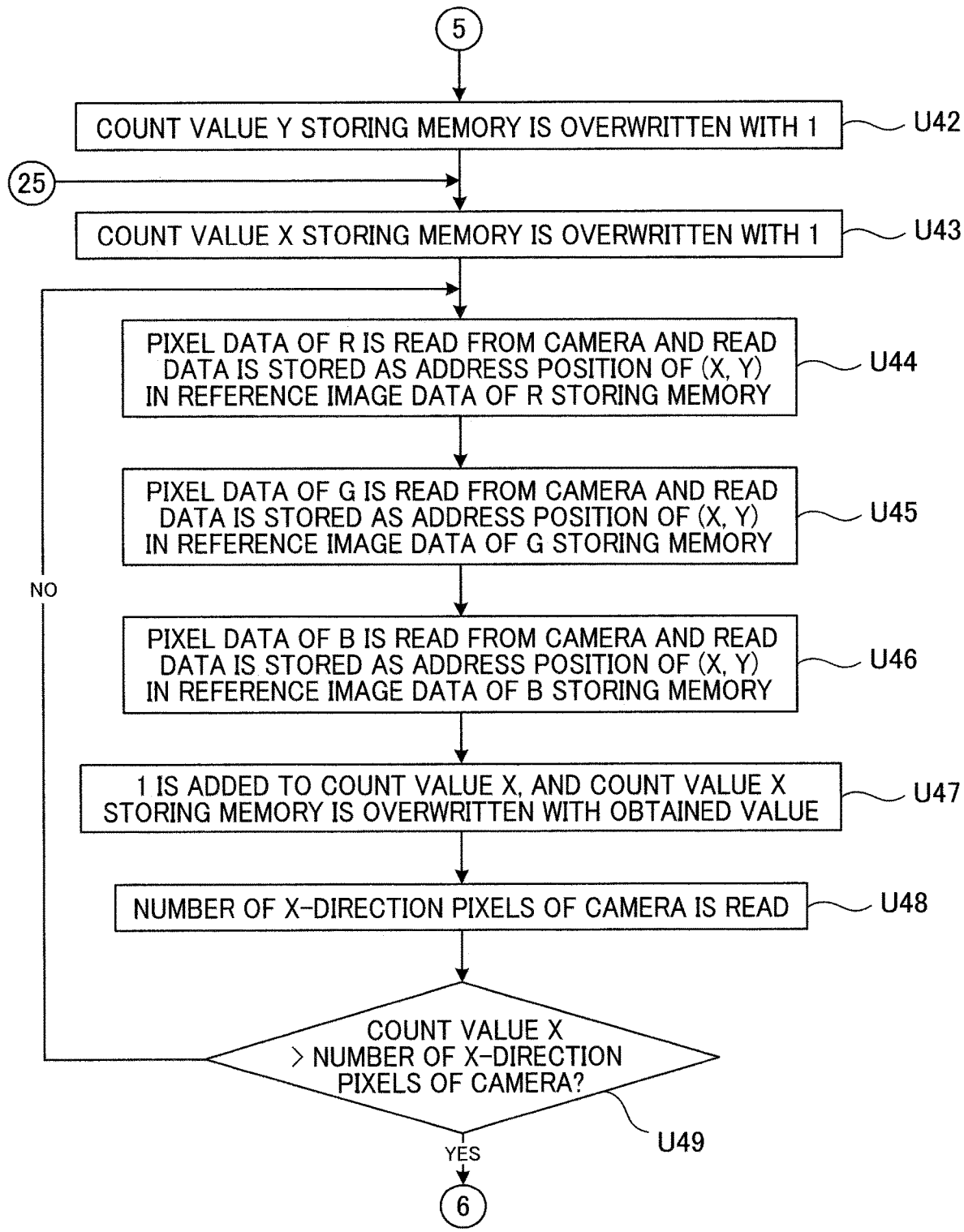
FIG. 25B is a flowchart that illustrates the operations of the print quality inspection apparatus according to the third embodiment of the present invention.
Figure 25C:
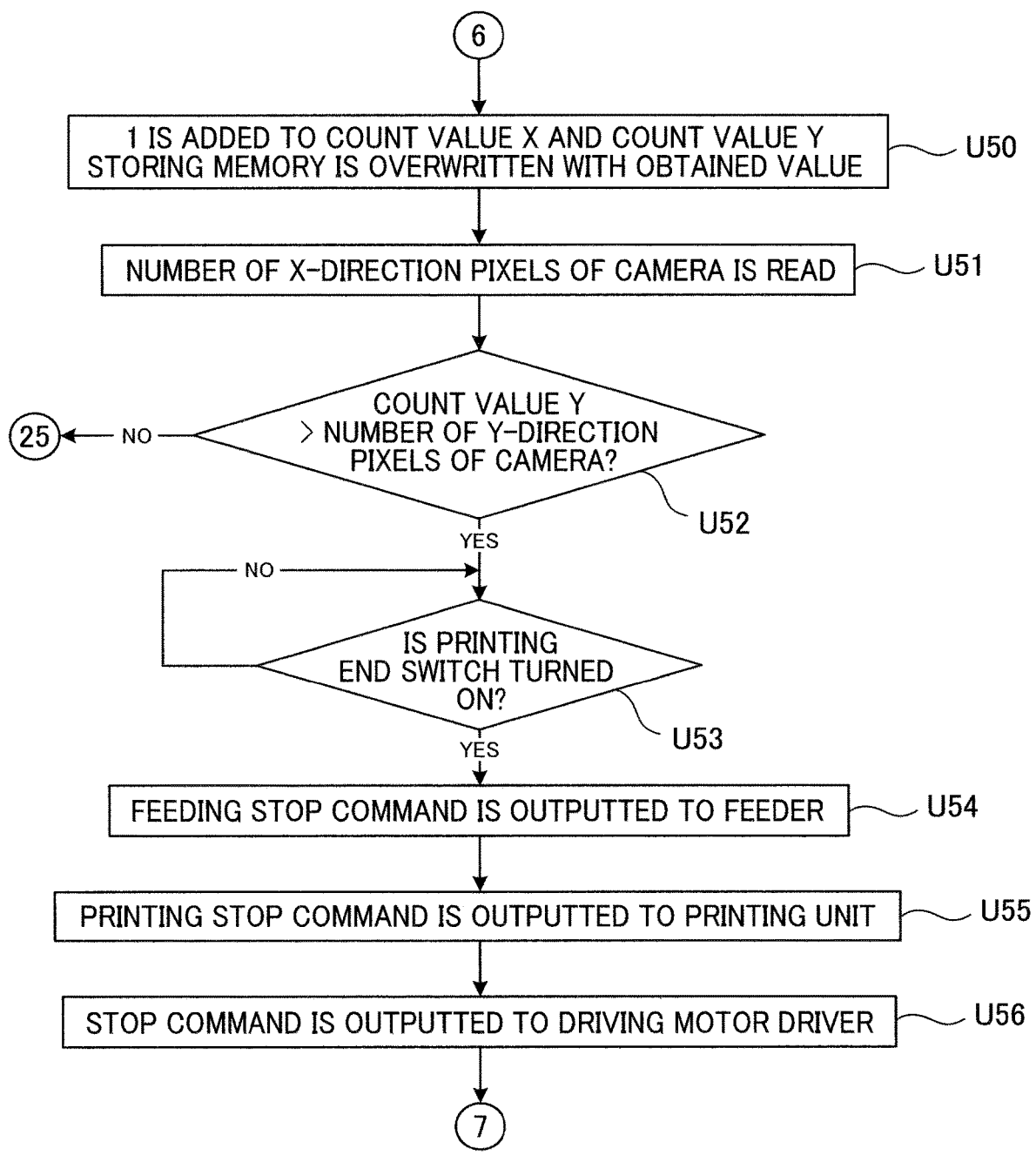
FIG. 25C is a flowchart that illustrates the operations of the print quality inspection apparatus according to the third embodiment of the present invention.
Figure 25D:
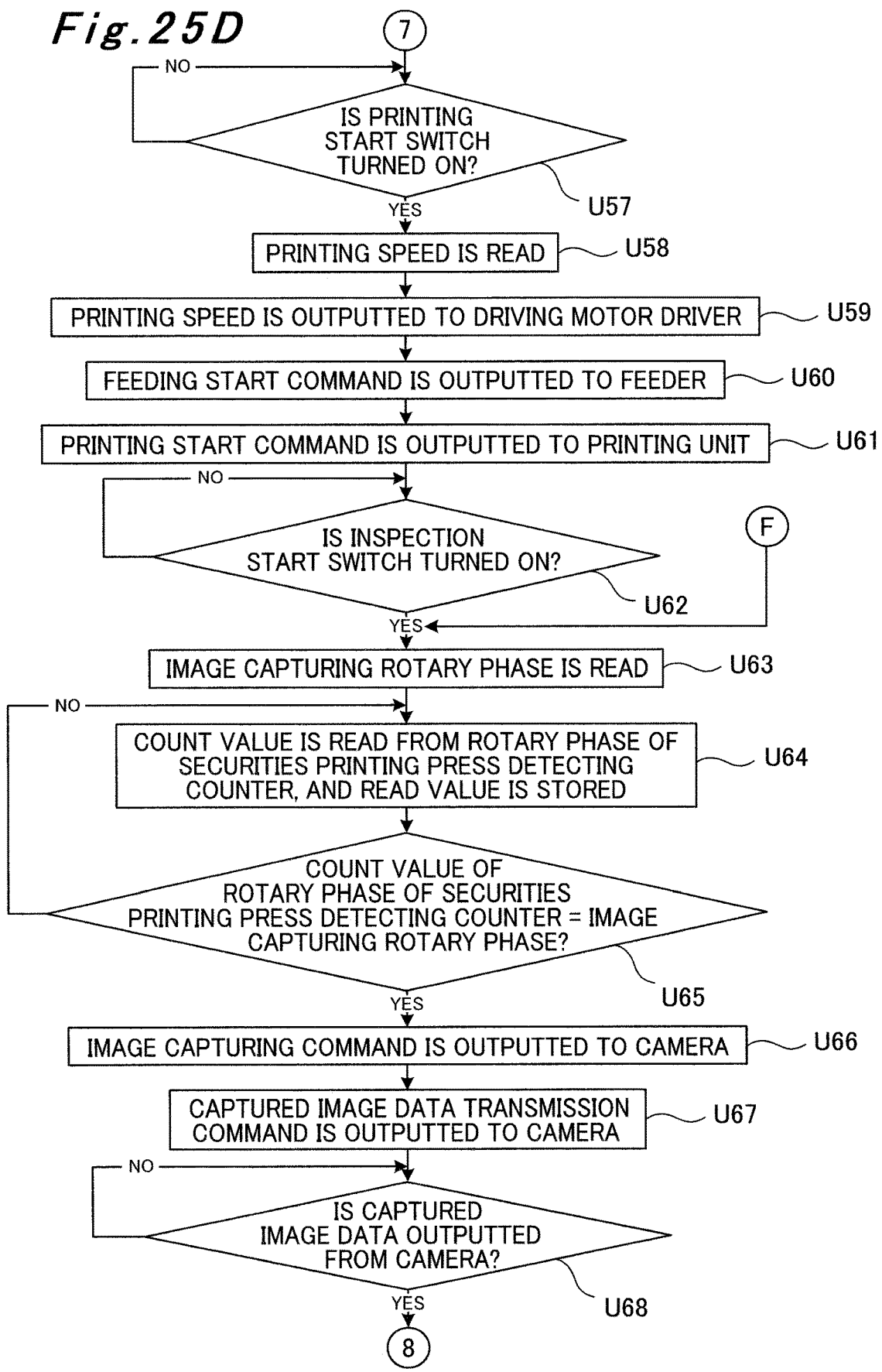
FIG. 25D is a flowchart that illustrates the operations of the print quality inspection apparatus according to the third embodiment of the present invention.
Figure 25E:
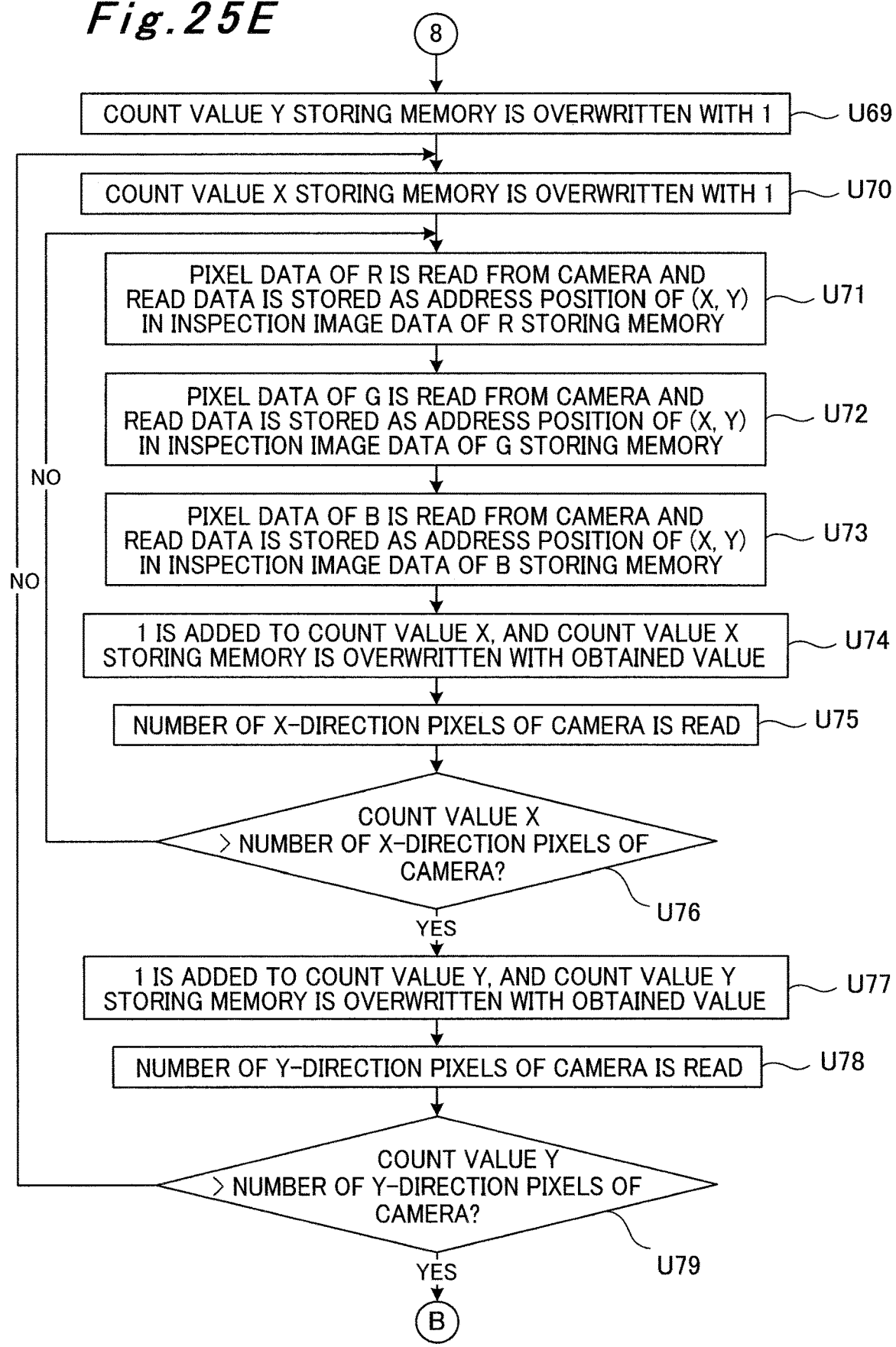
FIG. 25E is a flowchart that illustrates the operations of the print quality inspection apparatus according to the third embodiment of the present invention.
Figure 26A:
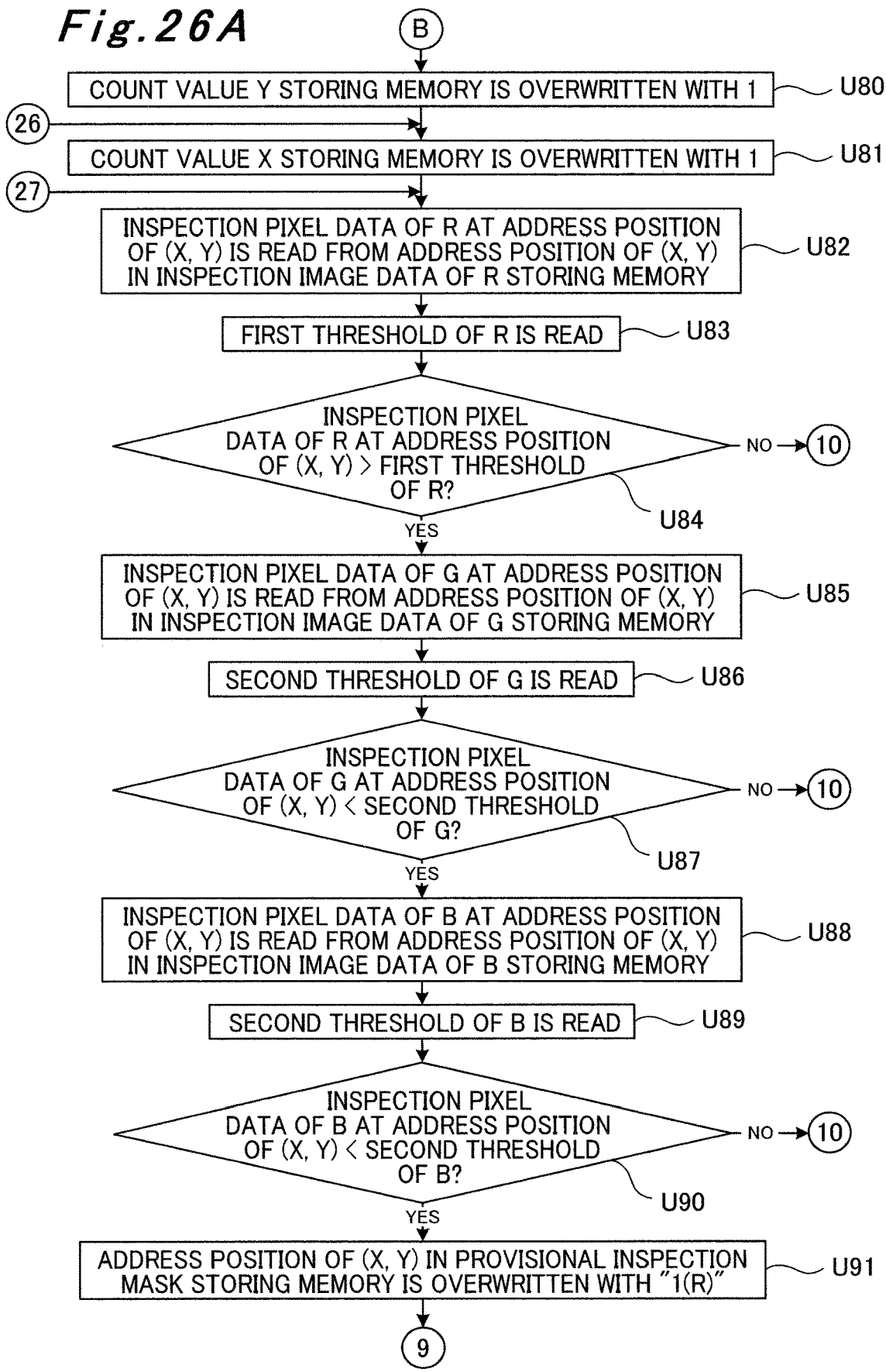
FIG. 26A is a flowchart that illustrates the operations of the print quality inspection apparatus according to the third embodiment of the present invention.
Figure 26B:
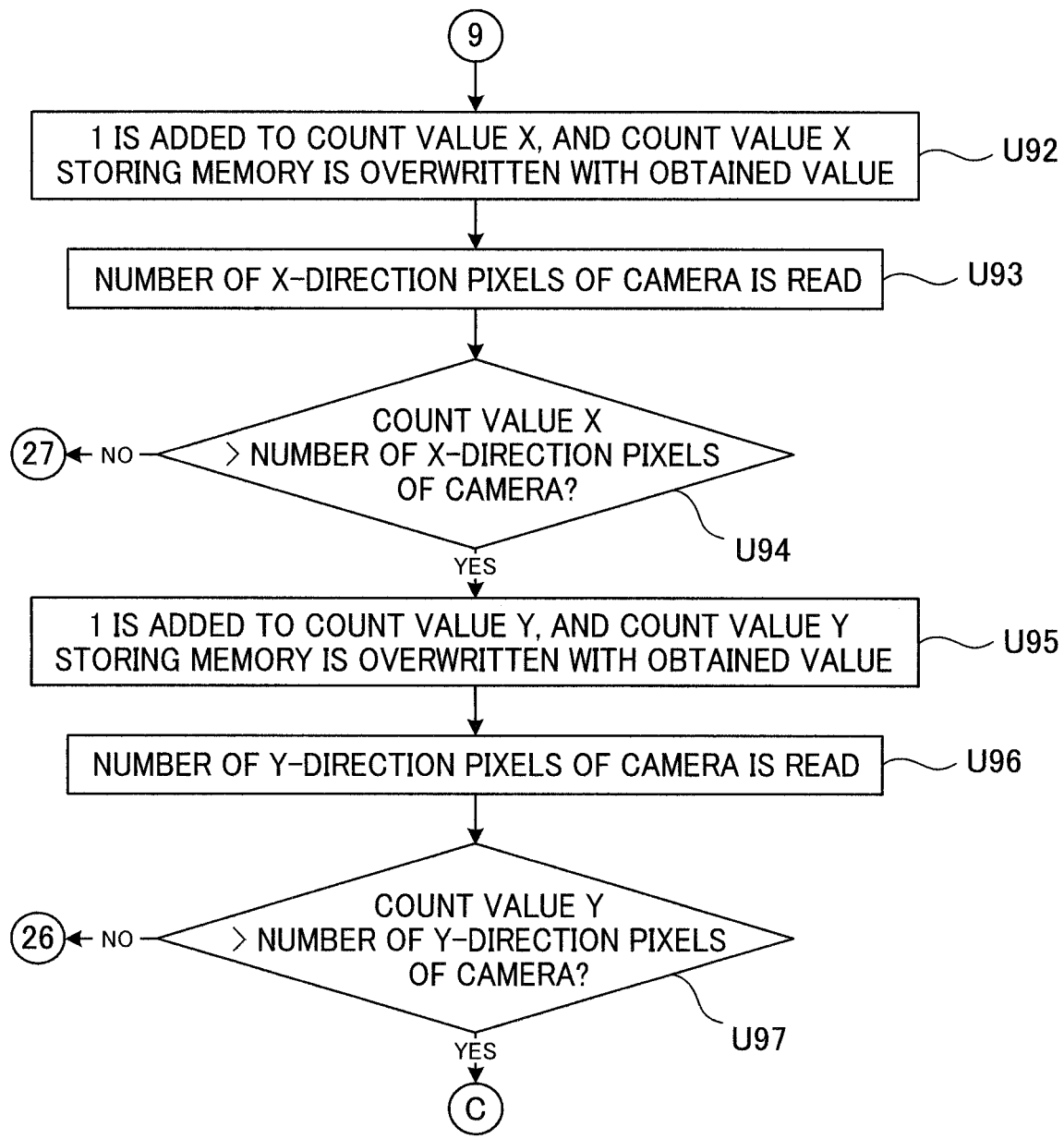
FIG. 26B is a flowchart that illustrates the operations of the print quality inspection apparatus according to the third embodiment of the present invention.
Figure 26C:
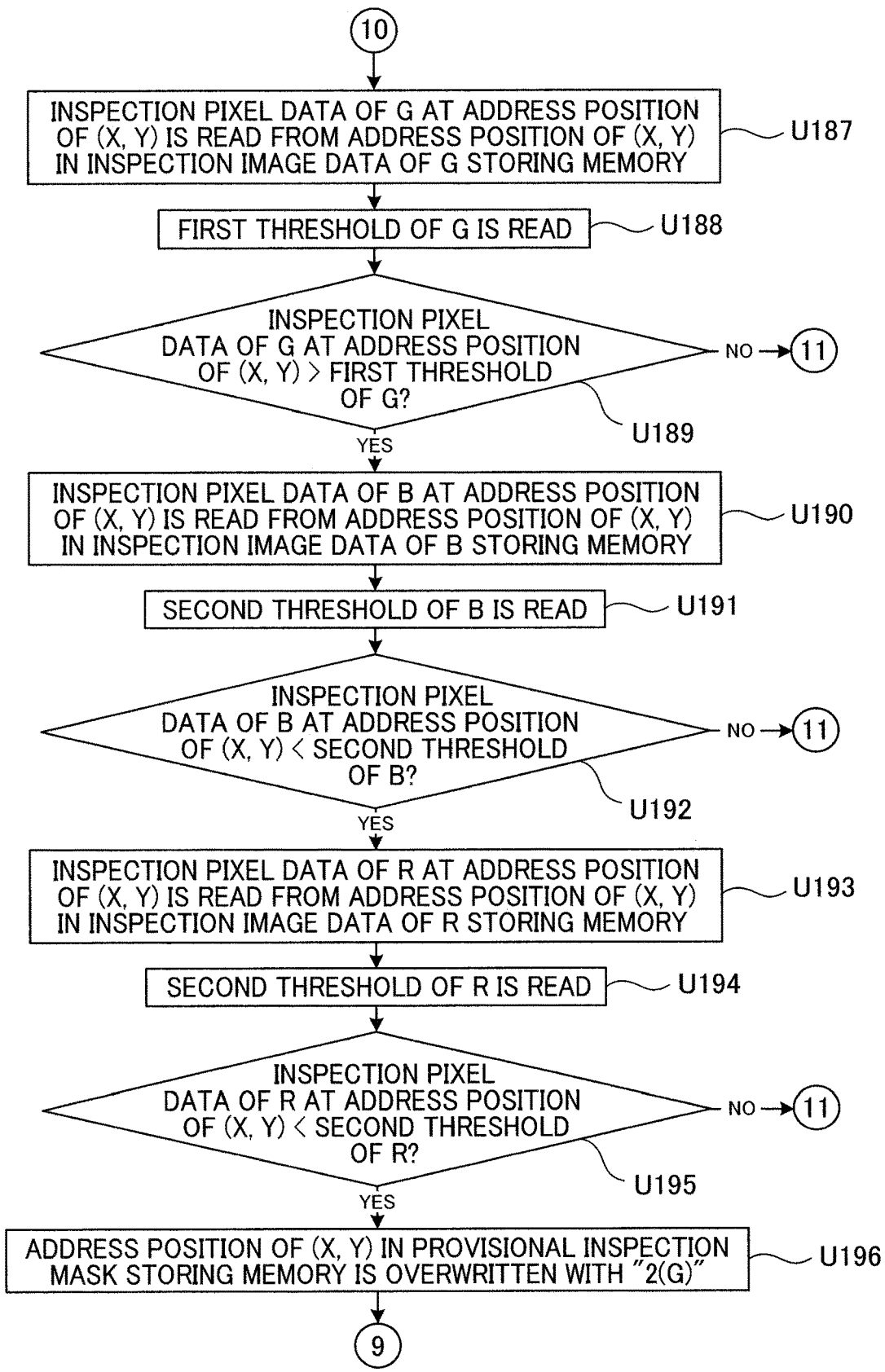
FIG. 26C is a flowchart that illustrates the operations of the print quality inspection apparatus according to the third embodiment of the present invention.
Figure 26D:
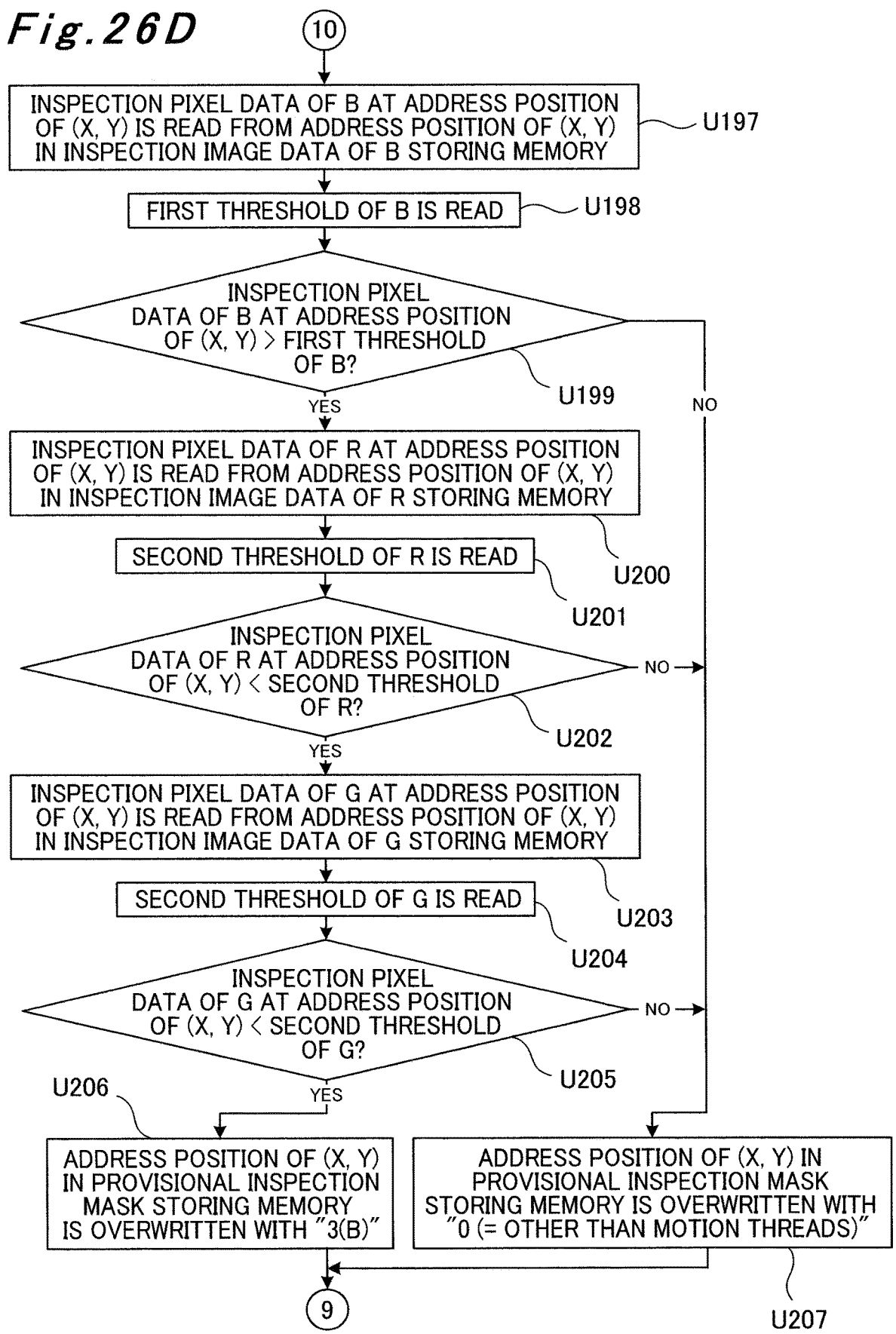
FIG. 26D is a flowchart that illustrates the operations of the print quality inspection apparatus according to the third embodiment of the present invention.
Figure 27A:
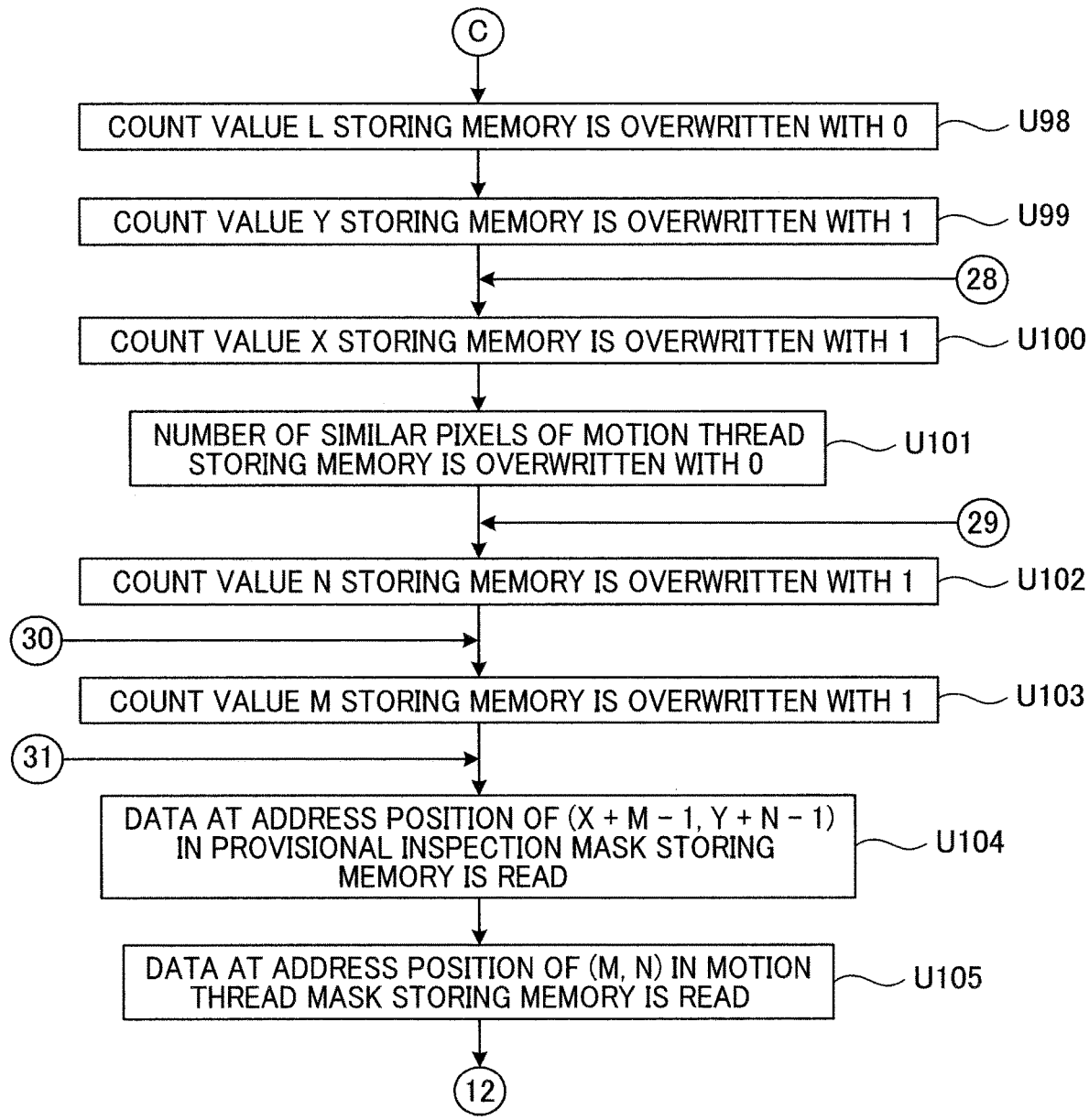
FIG. 27A is a flowchart that illustrates the operations of the print quality inspection apparatus according to the third embodiment of the present invention.
Figure 27B:
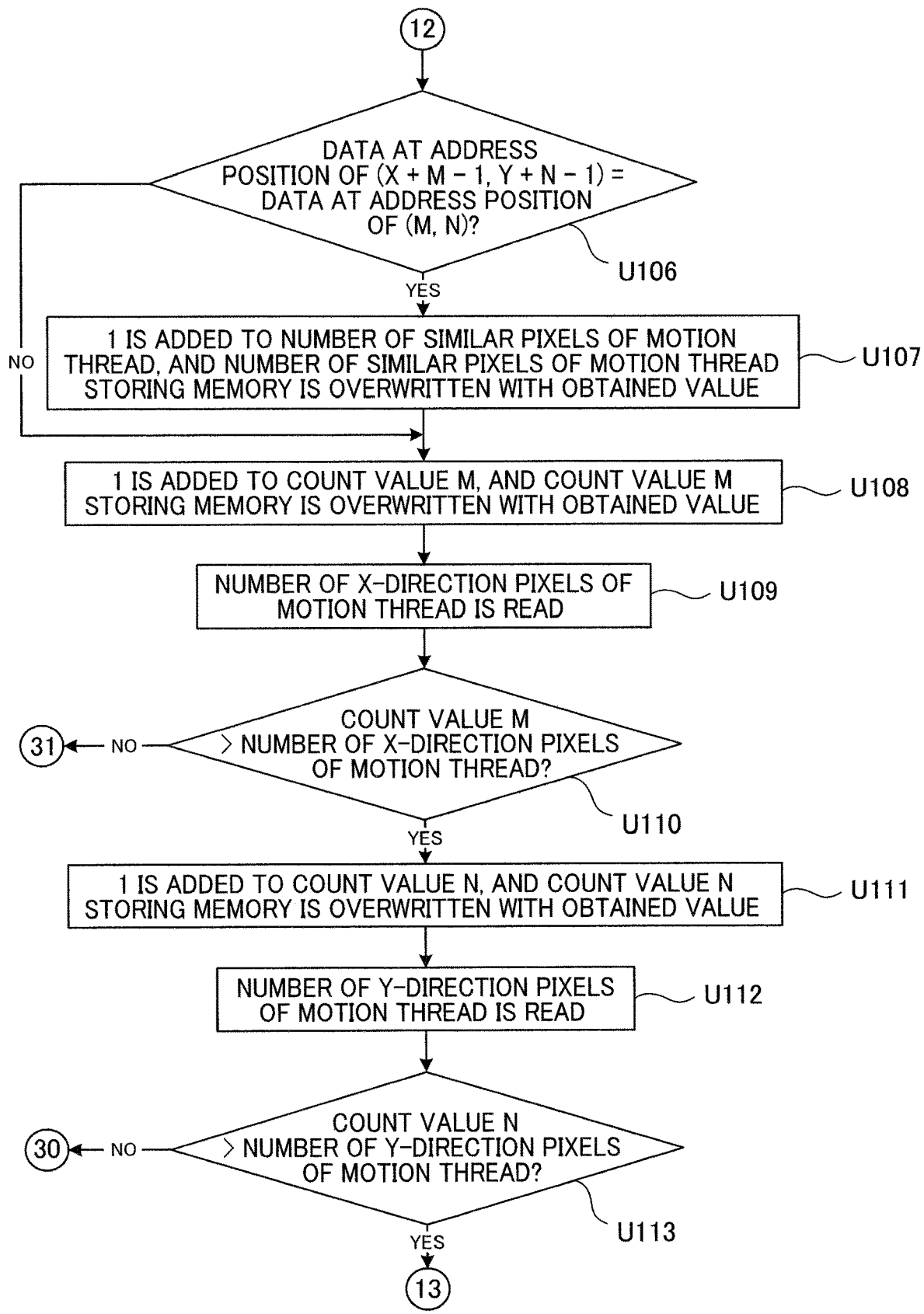
FIG. 27B is a flowchart that illustrates the operations of the print quality inspection apparatus according to the third embodiment of the present invention.
Figure 27C:
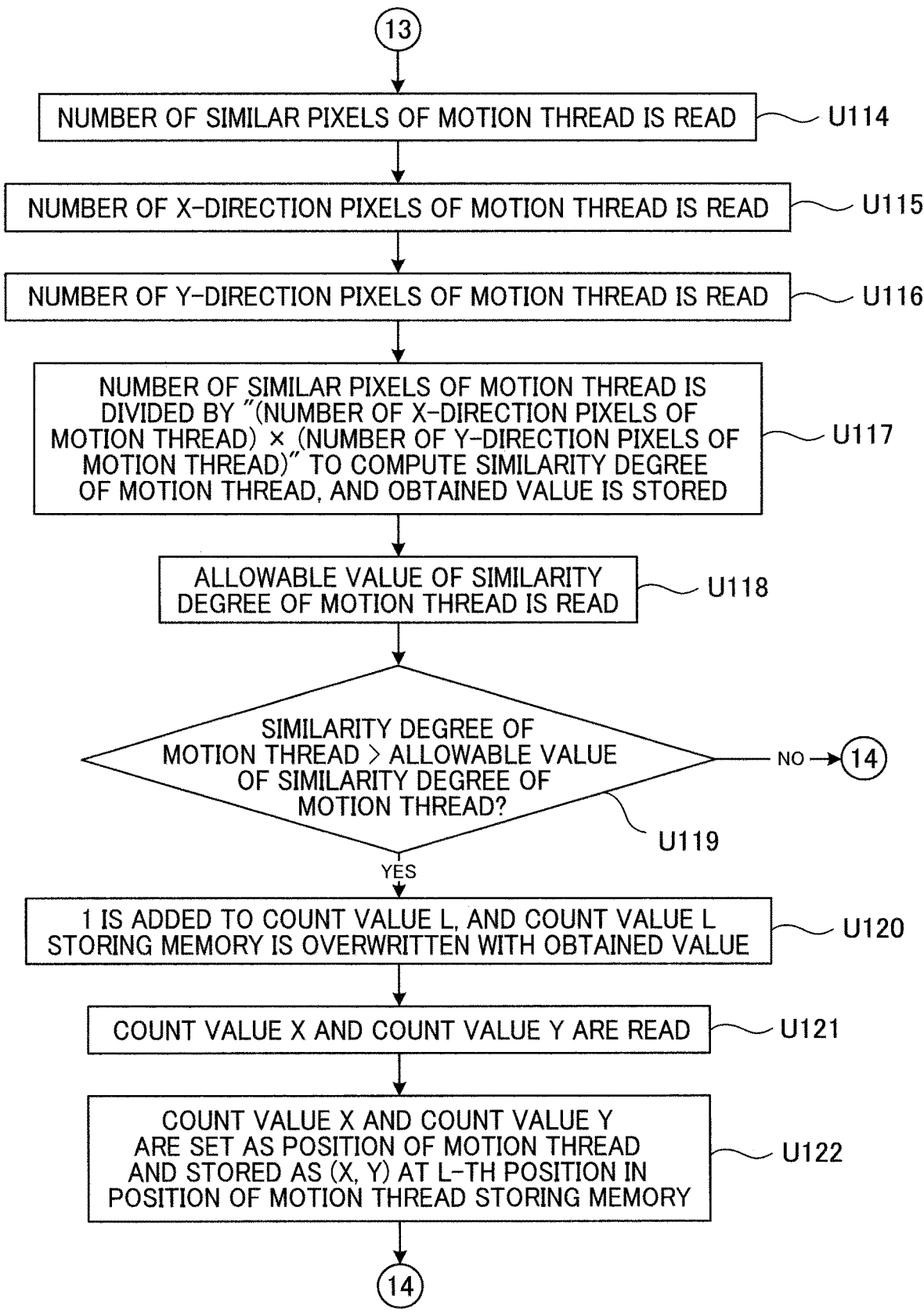
FIG. 27C is a flowchart that illustrates the operations of the print quality inspection apparatus according to the third embodiment of the present invention.
Figure 27D:
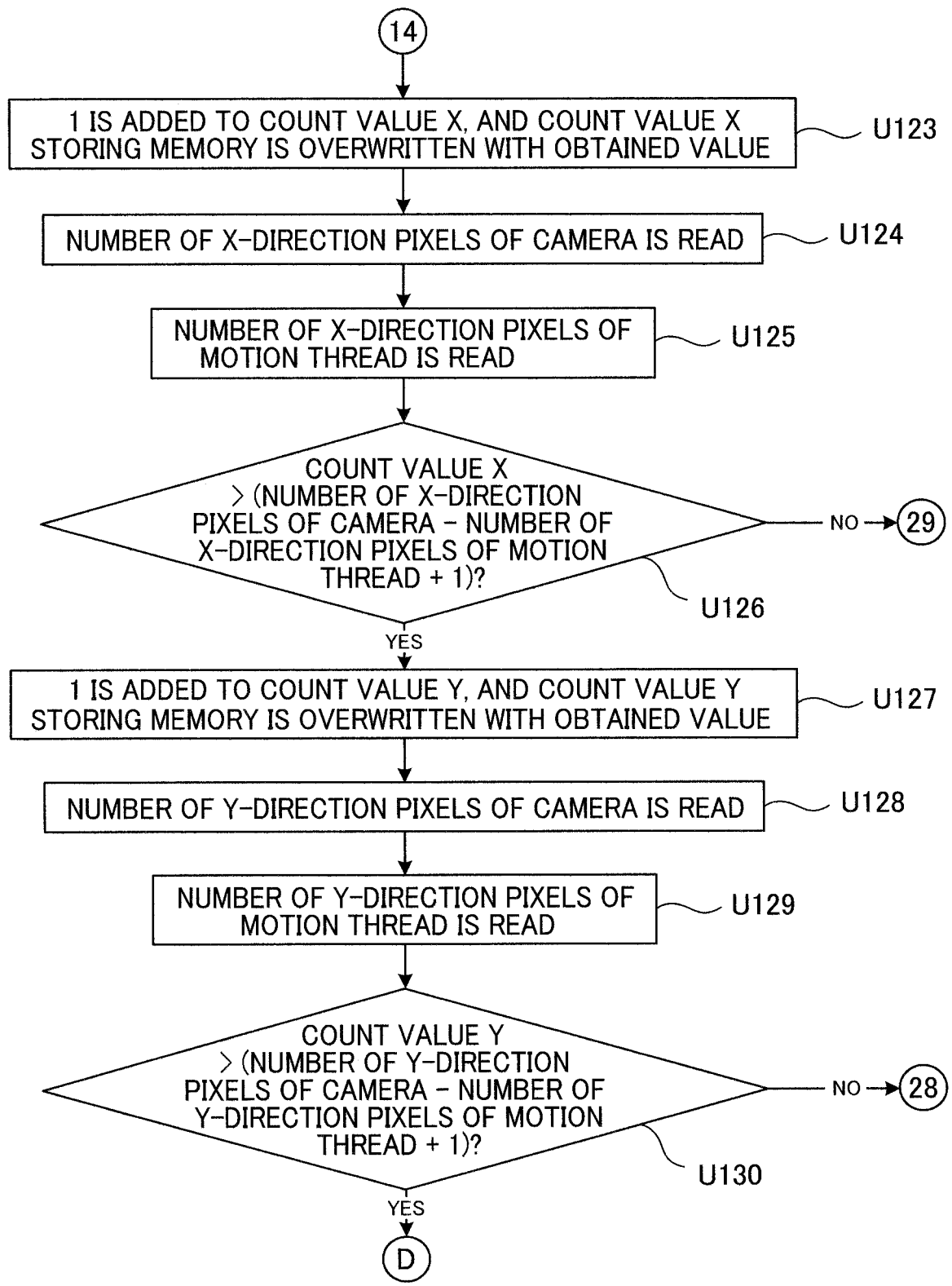
FIG. 27D is a flowchart that illustrates the operations of the print quality inspection apparatus according to the third embodiment of the present invention.
Figure 28A:
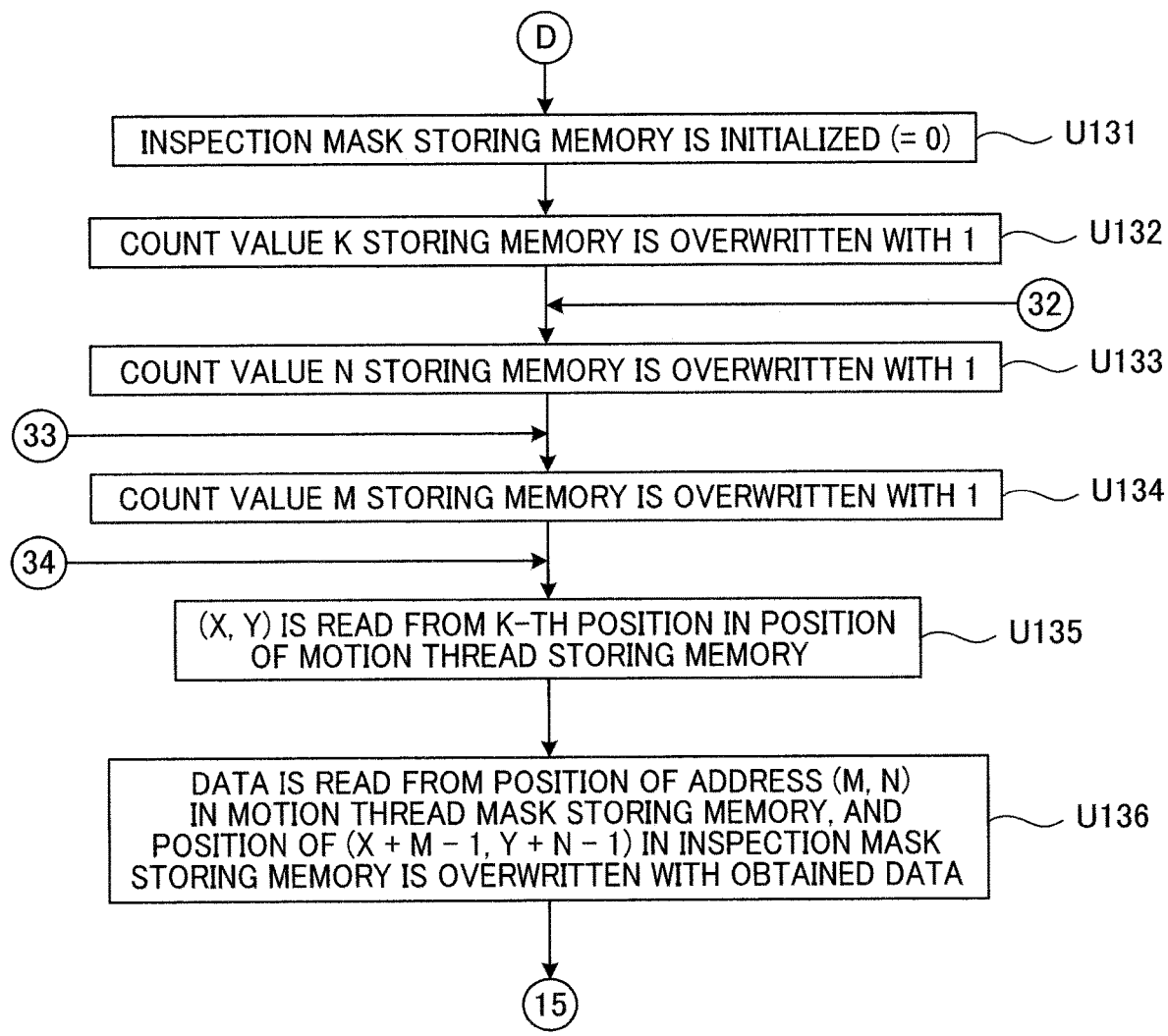
FIG. 28A is a flowchart that illustrates the operations of the print quality inspection apparatus according to the third embodiment of the present invention.
Figure 28B:
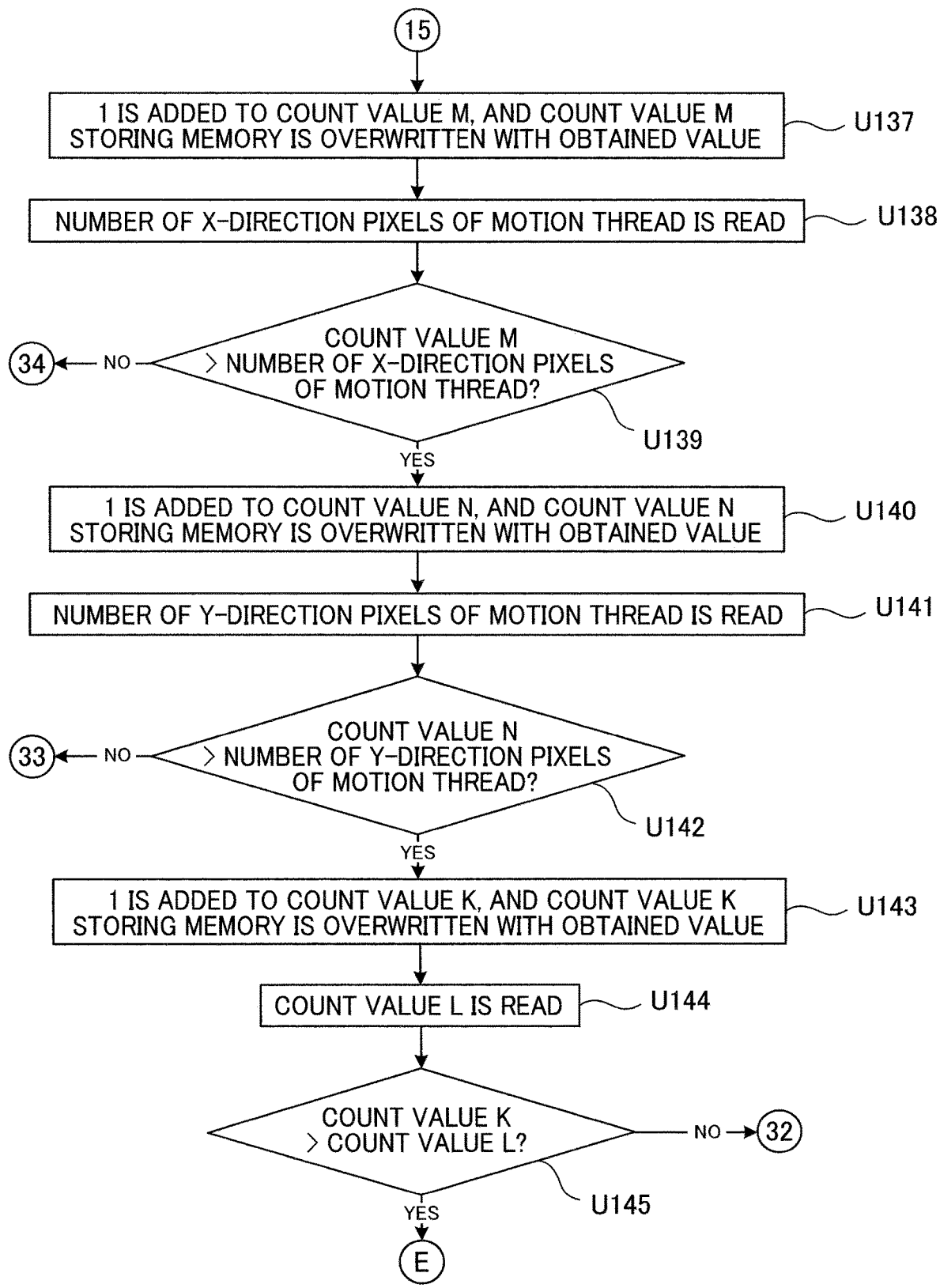
FIG. 28B is a flowchart that illustrates the operations of the print quality inspection apparatus according to the third embodiment of the present invention.
Figure 29A:
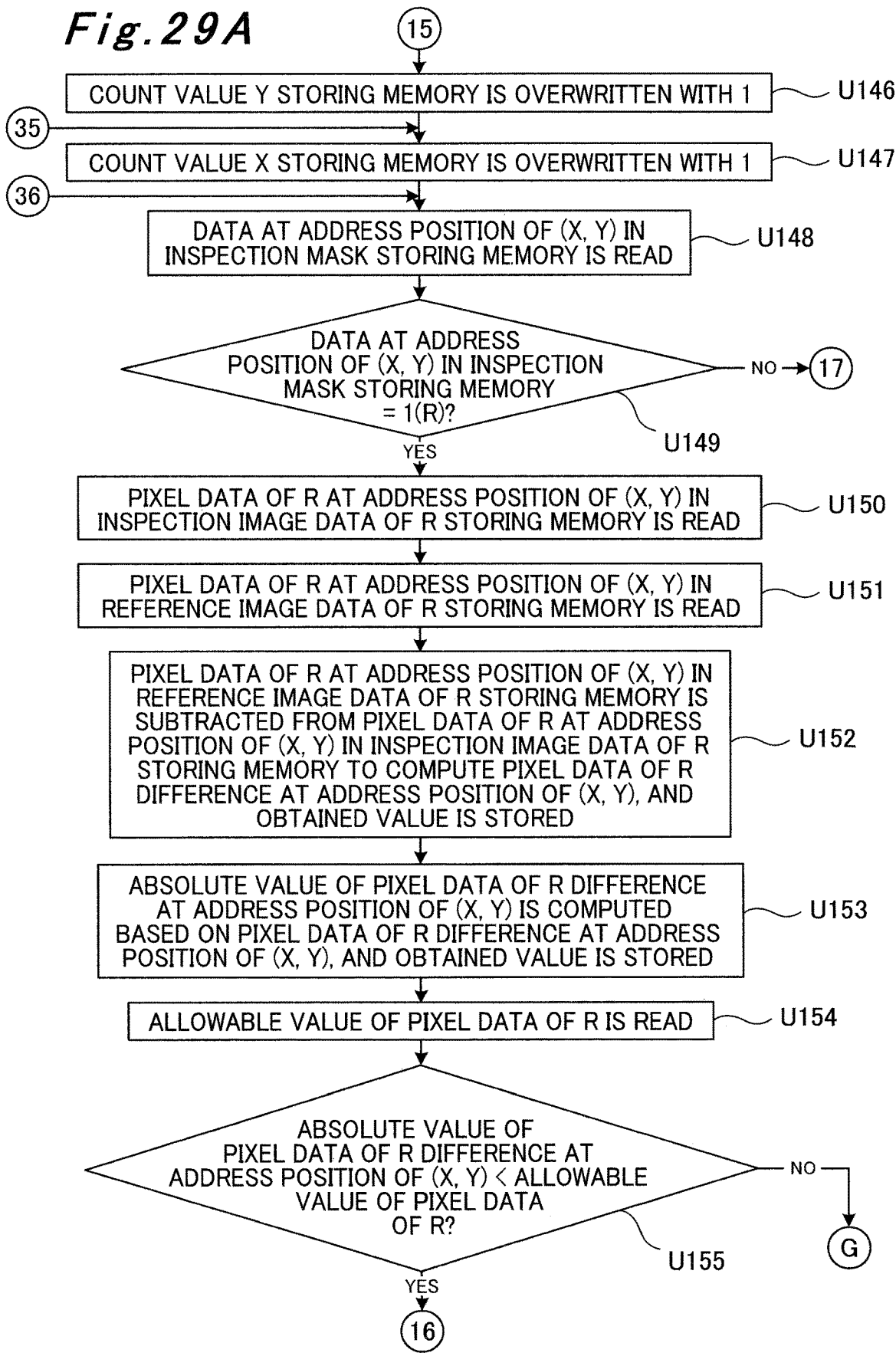
FIG. 29A is a flowchart that illustrates the operations of the print quality inspection apparatus according to the third embodiment of the present invention.
Figure 29B:
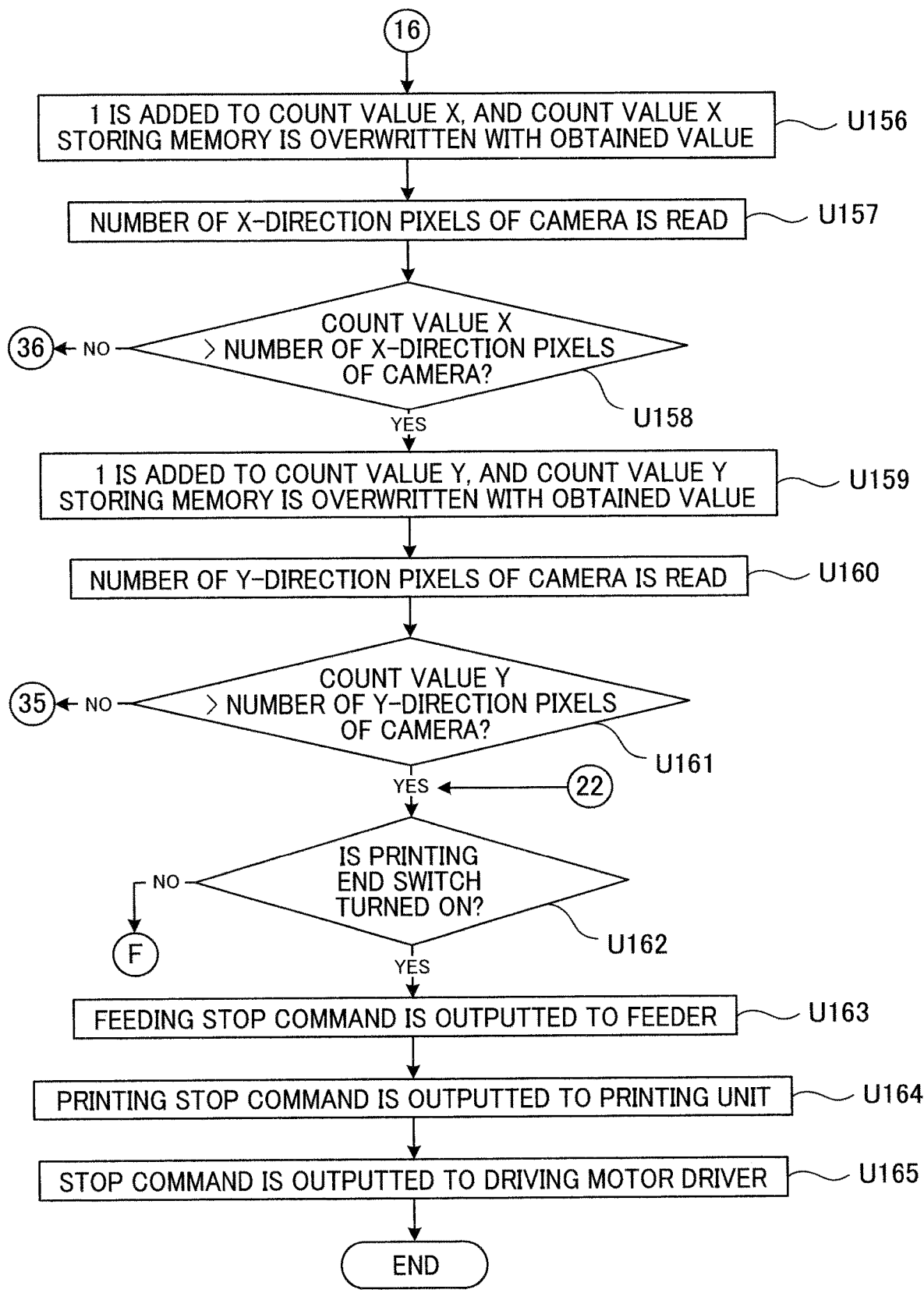
FIG. 29B is a flowchart that illustrates the operations of the print quality inspection apparatus according to the third embodiment of the present invention.
Figure 29C:
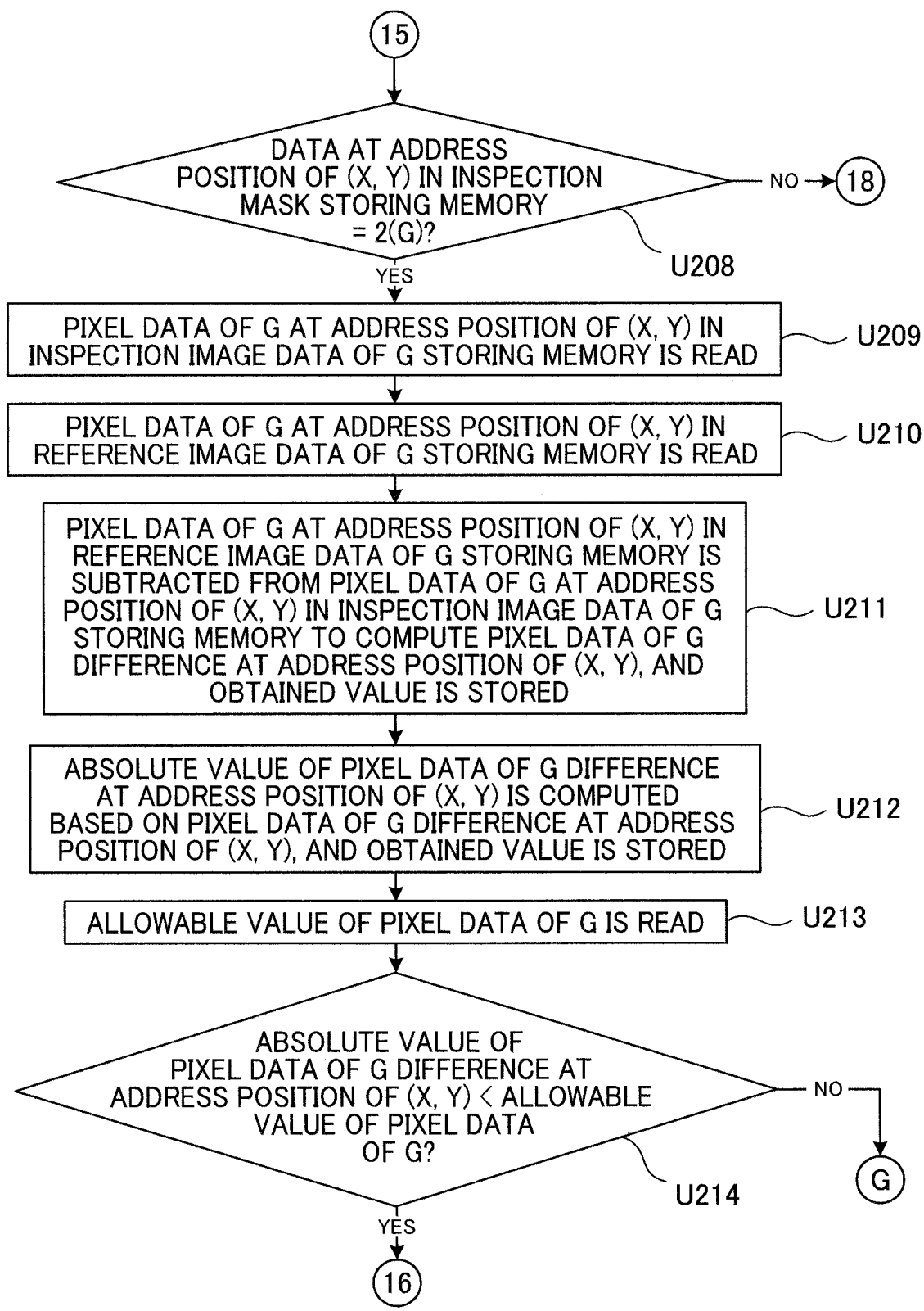
FIG. 29C is a flowchart that illustrates the operations of the print quality inspection apparatus according to the third embodiment of the present invention.
Figure 29D:
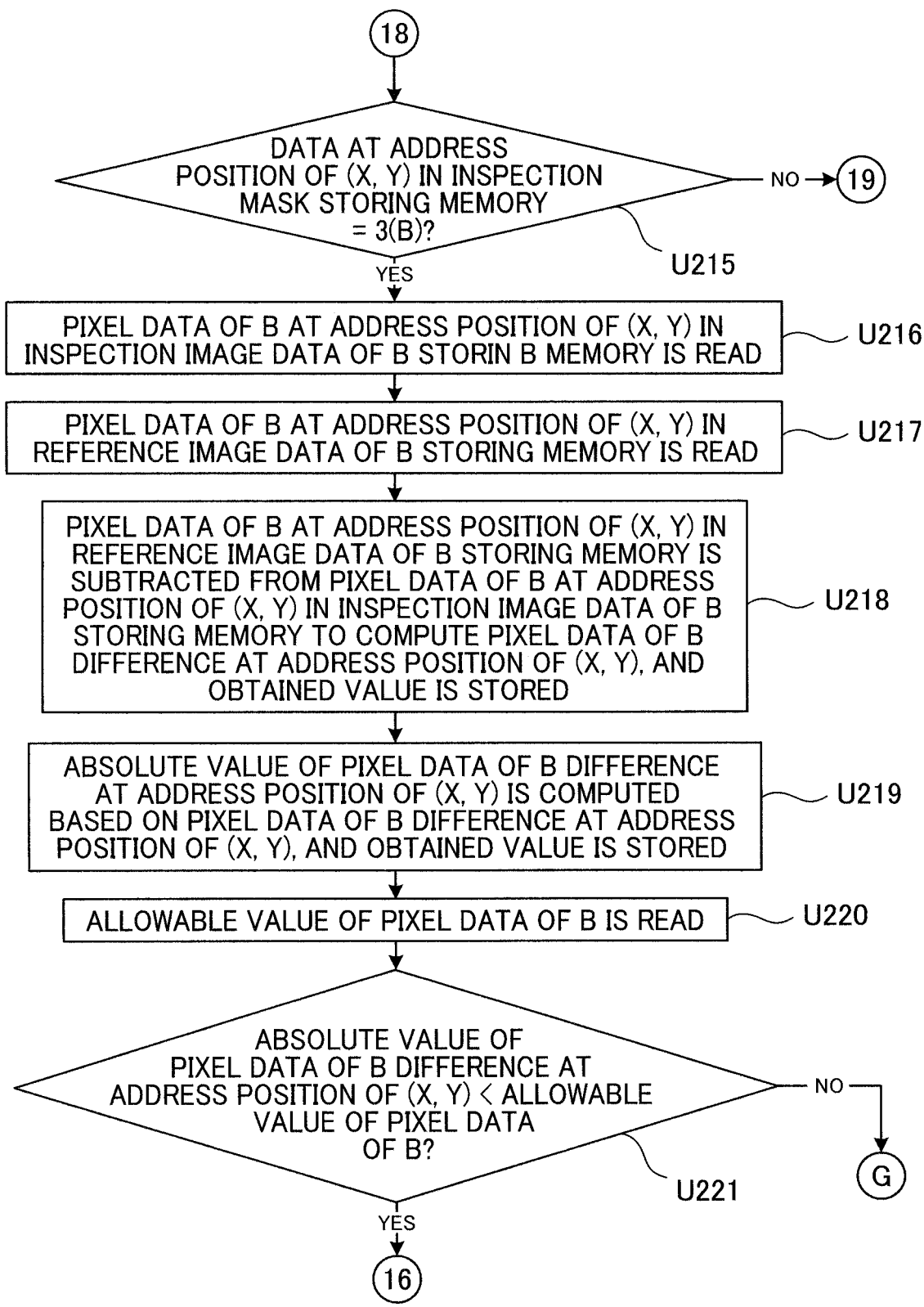
FIG. 29D is a flowchart that illustrates the operations of the print quality inspection apparatus according to the third embodiment of the present invention.
Figure 29E:
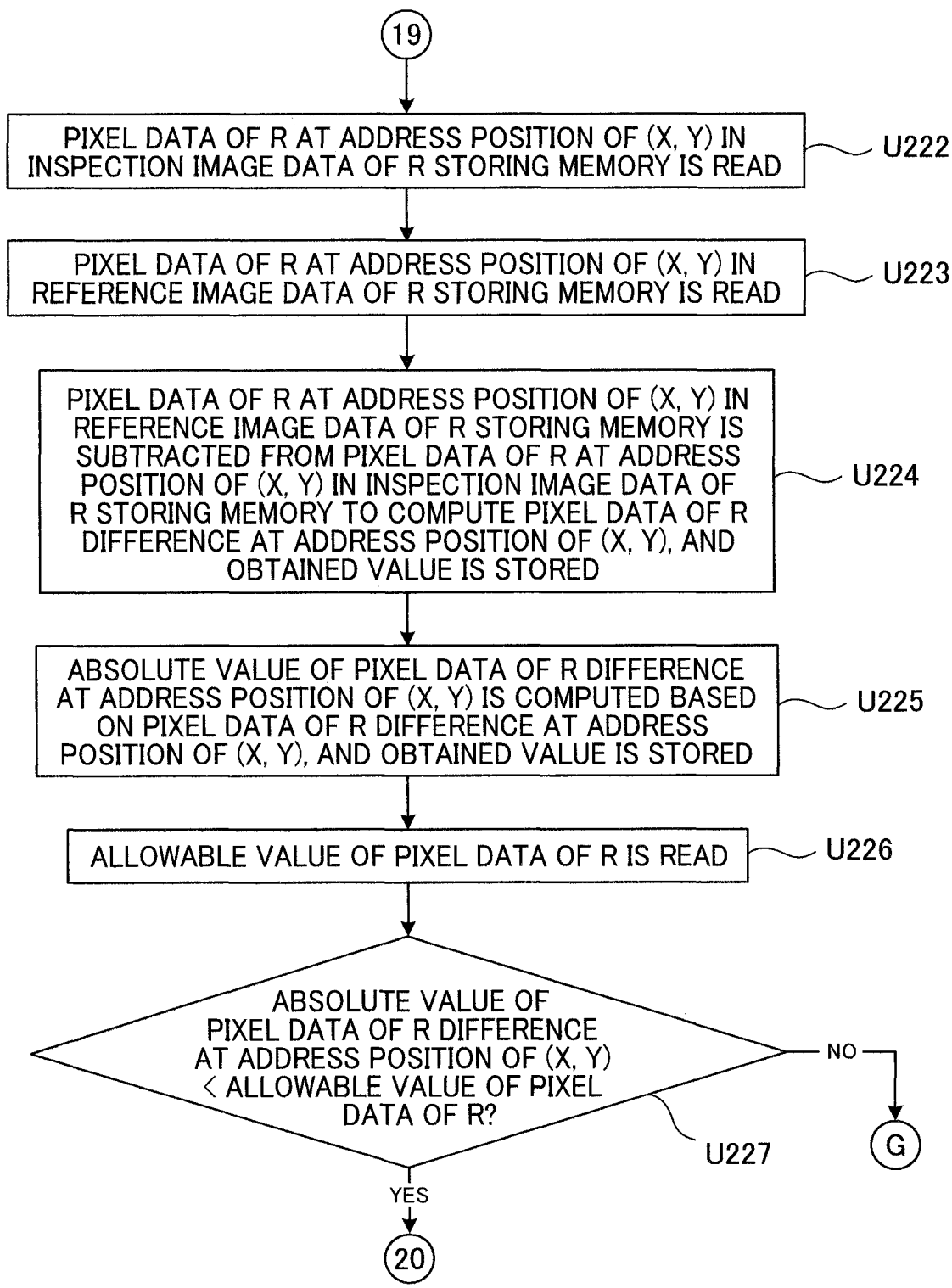
FIG. 29E is a flowchart that illustrates the operations of the print quality inspection apparatus according to the third embodiment of the present invention.
Figure 29F:
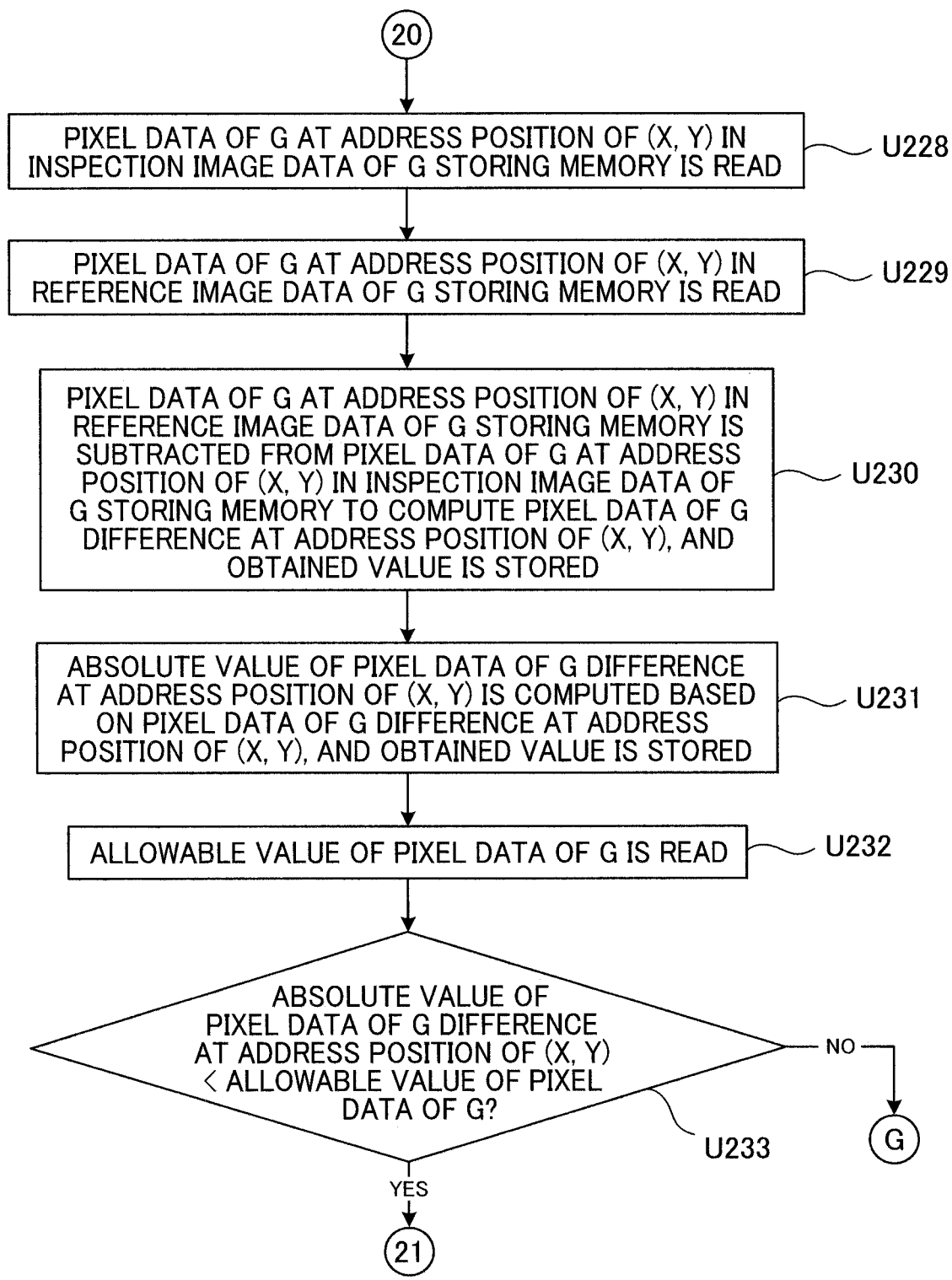
FIG. 29F is a flowchart that illustrates the operations of the print quality inspection apparatus according to the third embodiment of the present invention.
Figure 29G:
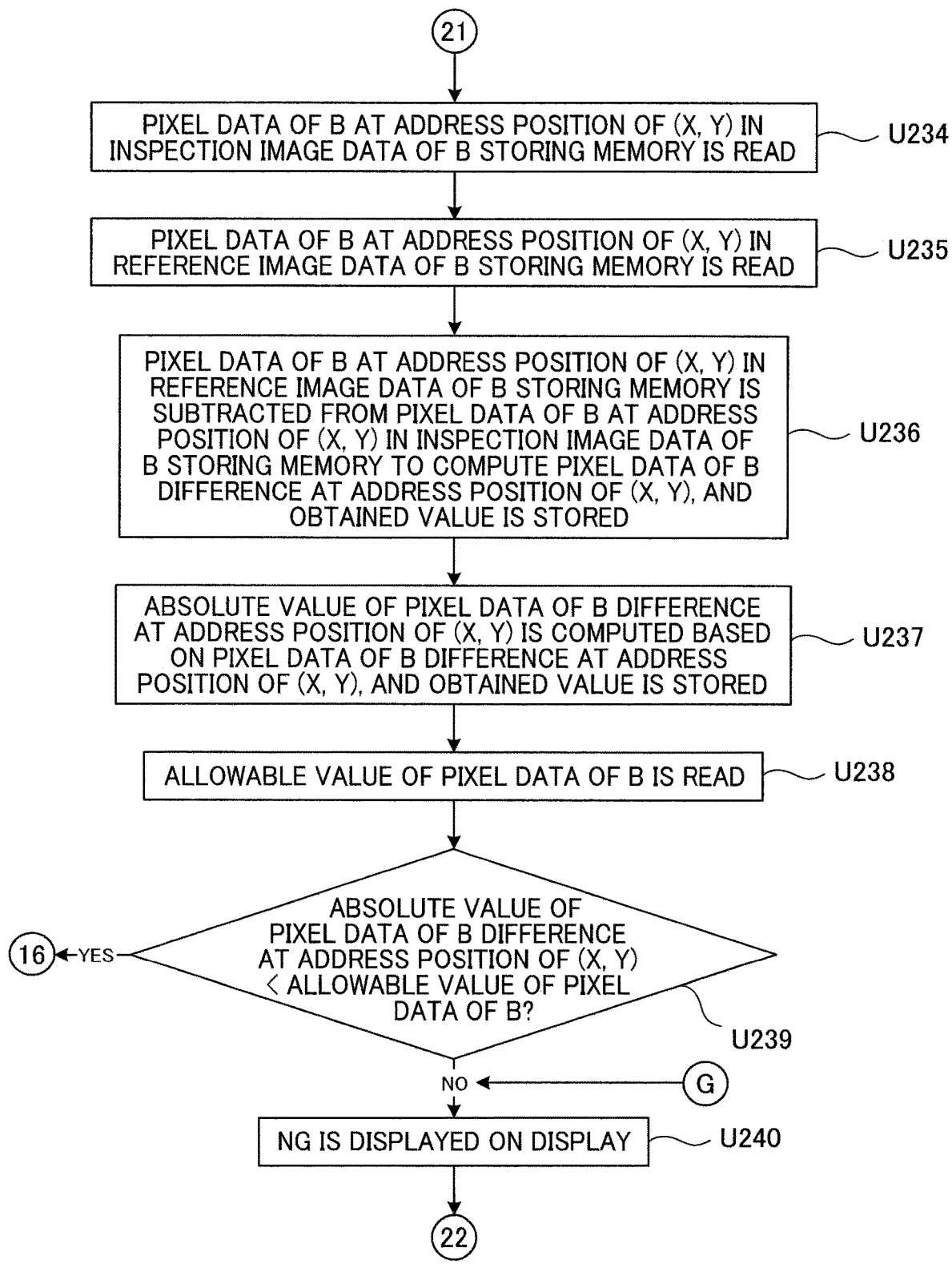
FIG. 29G is a flowchart that illustrates the operations of the print quality inspection apparatus according to the third embodiment of the present invention.

In this embodiment, the configuration of the print quality inspection unit 10 illustrated in FIGS. 23A to 23C and the processing by the print quality inspection unit 10 are different from those of the abovementioned first embodiment. Other configurations are almost same as those described in the first embodiment, and, hereinafter, the members that make the similar effects as the abovementioned members illustrated in FIGS. 1 to 12 are denoted by the same reference numerals, and the duplicated descriptions are properly omitted.

In this embodiment, in the securities printing press 100, patterns of multiple security printing products in, for example, five rows×nine columns are simultaneously printed by the so-called step and repeat imposition printing on the large printing product 1 previously provided with multicolor motion threads (hereinafter, simply referred to as motion thread) 1c, as illustrated in FIG. 22A.

Figure 22B:
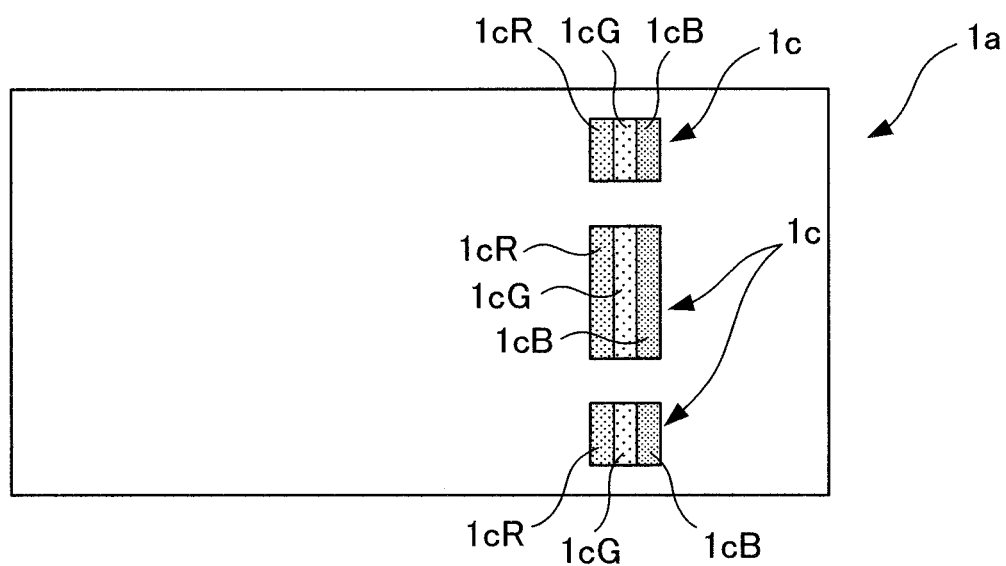
FIG. 22B is a schematic diagram that illustrates an example of a strip provided with the multicolor motion threads.

As illustrated in FIG. 22B, the motion thread 1c includes, for example, multiple single color motion threads (in the example illustrated in FIG. 22B, red color motion threads 1cR, green color motion threads 1cG, and blue color motion threads 1cB) arranged in rows.

As illustrated in FIGS. 23A to 23D, the print quality inspection unit 10 includes the CPU 11, the ROM 12, the RAM 13, input/output devices 14 and 211 to 215, and an interface 216 connected with each other by the BUS line.

A number of X-direction pixels of motion thread storing memory M211, a number of Y-direction pixels of motion thread storing memory M212, a count value Y storing memory M213, a count value X storing memory M214, and a pixel data of motion thread storing memory M215 are connected to the BUS line.

A first threshold of R storing memory M216, a second threshold of R storing memory M217, a first threshold of G storing memory M218, a second threshold of G storing memory M219, a first threshold of B storing memory M220, a second threshold of B storing memory M221, a motion thread mask storing memory M222, a printing speed storing memory M223, and an image capturing rotary phase storing memory M224 are connected to the BUS line.

In addition, a count value of rotary phase of securities printing press detecting counter storing memory M225, a reference image data of R storing memory M226, a reference image data of G storing memory M227, a reference image data of B storing memory M228, a number of X-direction pixels of camera storing memory M229, a number of Y-direction pixels of camera storing memory M230, an inspection image data of R storing memory M231, an inspection image data of G storing memory M232, an inspection image data of B storing memory M233, and a provisional inspection mask storing memory M234 are connected to the BUS line.

Moreover, a count value L storing memory M235, a number of similar pixels of motion thread storing memory M236, a count value N storing memory M237, and a count value M storing memory M238 are connected to the BUS line.

Furthermore, a similarity degree of motion thread storing memory M239, an allowable value of similarity degree of motion thread storing memory M240, a position of motion thread storing memory M241, an inspection mask storing memory M242, a count value K storing memory M243, a pixel data difference of R at address position of (X, Y) storing memory M244, an absolute value of pixel data difference of R at address position of (X, Y) storing memory M245, an allowable value of pixel data of R storing memory M246, a pixel data difference of G at address position of (X, Y) storing memory M247, and an absolute value of pixel data difference of G at address position of (X, Y) storing memory M248 are connected to the BUS line.

In addition, an allowable value of pixel data of G storing memory M249, a pixel data difference of B at address position of (X, Y) storing memory M250, an absolute value of pixel data difference of B at address position of (X, Y) storing memory M251, and an allowable value of pixel data of B storing memory M252 are connected to the BUS line.

Moreover, the input device 21 such as a keyboard and any kind of switch or button, the display 22 such as a CRT and a lamp, the output device 23 such as a printer, and the CD drive 24 are connected to the input/output device 14.

Furthermore, a pixel data of motion thread reading switch 217, a printing start switch 218, a printing end switch 219, a reference image data reading switch 220, and an inspection start switch 221 are connected to the input/output device 211.

In addition, the camera (color camera) 34 is connected to the input/output devices 212 and 213. The input/output device 213 transmits the image capturing command and the image data transmission command to the camera 34, and the captured image data captured by the camera 34 is outputted to the input/output device 212.

Moreover, a driving motor driver 222 is connected to the input/output device 214, and a driving motor 223 and a rotary encoder for driving motor 224 are connected to the driving motor driver 222.

The rotary phase of securities printing press detecting counter 36 is connected to the input/output device 215, and this rotary phase of securities printing press detecting counter 36 is connected to the rotary encoder for driving motor 224. In this case, the rotary encoder for driving motor 224 is, for example, directly attached on a rear end portion of an output shaft of the driving motor 223, so as to make one revolution every time the printing units 3A to 3F perform printing on a single print paper sheet W, output the zero pulse in every revolution to reset the rotary phase of securities printing press detecting counter 36, and output the clock pulse to the driving motor driver 222 and the rotary phase of securities printing press detecting counter 36 every time the driving motor 223 revolves at a predetermined angle.

In addition, the interface 216 is connected to the feeder 2 and the printing unit 3.

Hereinafter, processing by the print quality inspection unit 10 is described in detail in accordance with operation flows illustrated in FIGS. 24A to 24E, FIGS. 25A to 25E, FIGS. 26A to 26D, FIGS. 27A to 27D, FIGS. 28A and 28B, and FIGS. 29A to 29G.

The processing by the print quality inspection unit 10 in this embodiment is simply described. In the print quality inspection unit 10, in a first process, the image data of each of the RGB of the motion thread 1c is firstly read (steps U1 to U11). For the image data of the RGB of the motion thread 1c, for example, image data including only the motion threads, which corresponds to a multicolor motion thread area 1cM surrounded by a broken line and illustrated in FIG. 22A, is created based on the shapes and the color combination of the already known motion threads 1c.

Next, in a second process, a motion thread mask is created based on the image data of the RGB of the motion thread 1c obtained in the first process (steps U12 to U29 and U166 to U186). The motion thread mask is created while setting a red portion (R>first threshold SR1, G<second threshold SG2, B<second threshold SB2)=1, a green portion (R<second threshold SR2, G>first threshold SG1, B<second threshold SB2)=2, a blue portion (R<second threshold SR2, G<second threshold SG2, B>first threshold SB1)=3, and others=0.

Figure 30:
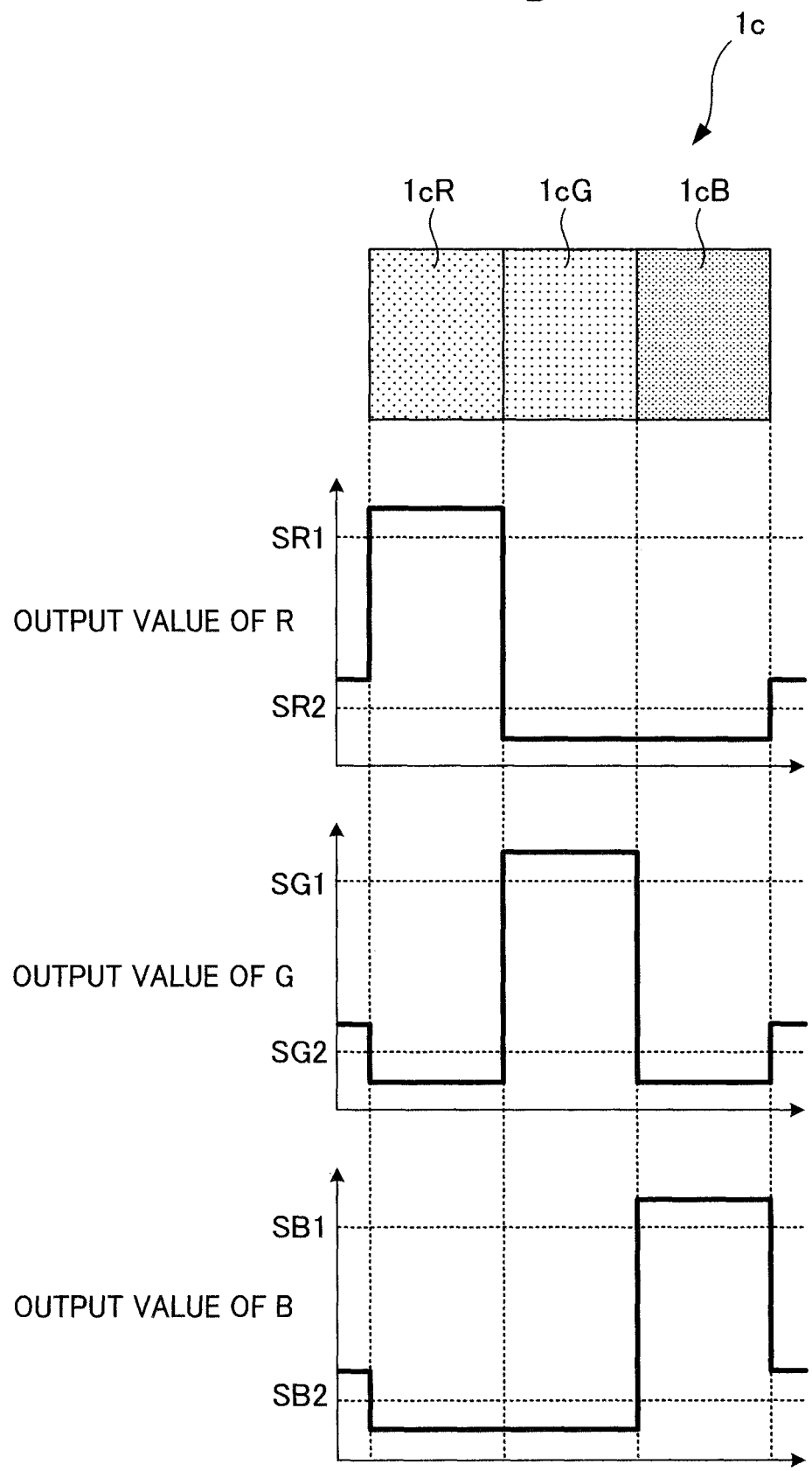
FIG. 30 is an explanatory diagram that illustrates an example of output values of the RGB of the multicolor motion thread.

That is, as illustrated in FIG. 30, in the image data of the RGB, the motion thread mask is created such that: a portion where an output value of R is greater than a first threshold of R SR1 and an output value of G and an output value of B are respectively smaller than a second threshold of G SG2 and a second threshold of B SB2 is set as a red portion; a portion where the output value of G is greater than a first threshold of G SG1 and the output value of R and the output value of B are respectively smaller than a second threshold of R SR2 and the second threshold of B SB2 is set as a green portion; a portion where the output value of B is greater than a first threshold of B SB1 and the output value of R and the output value of G are respectively smaller than the second threshold of R SR2 and the second threshold of G SG2 is set as a blue portion; and another portion is set as a portion other than the red portion, green portion, and blue portion.

Next, in a third process, printing using a sheet (large sheet) not provided with the motion threads 1c is started. In a fourth process, whether the "reference data reading switch" is turned on is determined. When the "reference data reading switch" is turned on, an image of the large sheet (with no motion threads) is captured by the camera 34 once the timing of the rotary phase of the securities printing press 100 and the image capturing by the camera 34 matches in a fifth process, and the image data of R, G, and B obtained by capturing the image of the large sheet (with no motion threads) by the camera 34 is stored as the reference image data of R, G, and B in a sixth process (steps U30 to U56). That is, in the third to sixth processes, the reference image data of only the pattern other than the motion threads is obtained. The printing on the sheet (large sheet) not provided with the motion threads 1c is performed at least on one sheet. In addition, the image capturing by the camera 34 is performed under white light emitted from the illuminator 35.

Subsequently, in a seventh process, printing using a sheet (large sheet) provided with the motion threads 1c is started. In an eighth process, an image of the large sheet (with motion threads) is captured by the camera 34 when the timing of the rotary phase of the securities printing press 100 and the image capturing timing of the camera 34 matches. In a ninth process, the image data of the R, G, and B obtained by capturing the image of the large sheet (with motion threads) by the camera 34 is stored as the inspection image data of the R, G, and B (steps U57 to U79).

Next, in a tenth process, a provisional inspection mask is created based on the inspection image data of the RGB of the image-captured large sheet (steps U80 to U97 and U187 to U207). The provisional inspection mask is created while setting a virtual red portion (R>first threshold SR1, G<second threshold SG2, B<second threshold SB2)=1, a virtual green portion (R<second threshold SR2, G>first threshold SG1, B<second threshold SB2)=2, a virtual blue portion (R<second threshold SR2, G<second threshold SG2, B>first threshold SB1)=3, and others=0.

That is, likewise the creation of the motion thread mask, in the image data of the RGB, the provisional inspection mask is created such that: a portion where the output value of R is greater than the first threshold of R SR1 and the output value of G and the output value of B are respectively smaller than the second threshold of G SG2 and the second threshold of B SB2 is set as the red portion; a portion where the output value of G is greater than the first threshold of G SG1 and the output value of R and the output value of B are respectively smaller than the second threshold of R SR2 and the second threshold of B SB2 is set as the green portion; a portion where the output value of B is greater than the first threshold of B SB1 and the output value of R and the output value of G are respectively smaller than the second threshold of R SR2 and the second threshold of G SG2 is set as the blue portion; and another portion is set as a portion other than the red portion, green portion, and blue portion.

Next, in an eleventh process, pattern matching is performed using the pixel data of the motion thread mask created in the second process on the pixel data in the provisional inspection mask created in the tenth process to obtain the similarity degree between the positions in the provisional inspection mask and the motion thread mask, and a position having the similarity degree of equal to or greater than an allowable value is stored as a portion corresponding to the motion thread 1c (steps U98 to U130).

That is, the positions of the motion threads 1c in the inspection mask are specified by obtaining the similarity degree (different number of pixels) of the positions using the pattern matching method while displacing the motion thread mask in the X-direction and the Y-direction with respect to the provisional inspection mask. With such a processing, the motion threads 1c in the inspection mask are reliably extracted regardless of arrangement and state of the motion threads 1c provided on the large sheet.

Next, in a twelfth process, an inspection mask is created by writing the pixel data of the motion thread mask created in the second process in the positions of the motion thread portions obtained in the eleventh process (steps U131 to U145).

Next, in a thirteenth process, the inspection mask created in the twelfth process is referenced. For the red portion of the motion thread, only the reference image data of R stored in the sixth process and the inspection image data of R stored in the ninth process are compared. For the green portion of the motion thread, only the reference image data of G stored in the sixth process and the inspection image data of G stored in the ninth process are compared. For the blue portion of the motion thread, only the reference image data of B stored in the sixth process and the inspection image data of B stored in the ninth process are compared. For the portion other than the motion threads, the image data of R, the image data of G, and the image data of B of the reference image data stored in the sixth process are respectively compared with the image data of R, the image data of G, and the image data of B of the inspection image data stored in the ninth process in a conventional manner. OK/NG of the inspection target large sheet (with motion thread) is thus determined (steps U146 to U165 and U208 to U240).

The abovementioned processes are described in detail. In step U1, whether the pixel data of motion thread reading switch 217 is turned on is determined. When the pixel data of motion thread reading switch 217 is turned off (NO), the processing of step U1 is repeated. When the pixel data of motion thread reading switch 217 is turned on (YES), the numbers of the X-direction and Y-direction pixels of the motion thread 1c are read from the CD drive 24 and the read numbers are respectively stored into the memories M211 and M212 in step U2.

Following step U2, the count value Y storing memory M213 is overwritten with 1 in step U3. In step U4, the count value X storing memory M214 is overwritten with 1. Subsequently, in step U5, the pixel data (RGB) of the motion thread 1c is read from the CD drive 24, and the address position of (X, Y) in the pixel data of motion thread storing memory M215 is overwritten with the read data.

Subsequently, in step U6, 1 is added to the count value X, and the count value X storing memory M214 is overwritten with the obtained value. In step U7, the number of the X-direction pixels of the motion thread 1c is read from the memory M211.

Subsequently, in step U8, when the count value X is equal to or smaller than the number of the X-direction pixels of the motion thread 1c (NO), the process returns to step U5, and when the count value X is greater than the number of the X-direction pixels of the motion thread 1c (YES), the process proceeds to step U9.

In step U9, 1 is added to the count value Y and the count value Y storing memory M213 is overwritten with the obtained value. Subsequently, in step U10, the number of the Y-direction pixels of the motion thread 1c is read from the memory M212.

Subsequently, in step U11, when the count value Y is equal to or smaller than the number of the Y-direction pixels of the motion thread 1c (NO), the process returns to step U4, and when the count value Y is greater than the number of the Y-direction pixels of the motion thread 1c (YES), the process proceeds to step U12.

In step U12, the count value Y storing memory M213 is overwritten with 1. Subsequently, in step U13, the count value X storing memory M214 is overwritten with 1. Subsequently, in step U14, the pixel data of R (output value of R) at the address position of (X, Y) is read from the address position of (X, Y) in the pixel data of motion thread storing memory M215. In step U15, the first threshold of R SR1 is read from the memory M216.

Subsequently, in step U16, when the pixel data of R at the address position of (X, Y) is greater than the first threshold of R SR1 (YES), it is assumed that the pixel data at the address position may be the red hue and the process proceeds to step U17, and when the pixel data of R at the address position of (X, Y) is equal to or smaller than the first threshold of R SR1 (NO), it is assumed that the pixel data at the address position is other than the red hue and the process proceeds to the later-described step U166.

In step U17, the pixel data of G (output value of G) at the address position of (X, Y) is read from the address position of (X, Y) in the pixel data of motion thread storing memory M215. Subsequently, in step U18, the second threshold of G SG2 is read from the memory M219.

Subsequently, in step U19, when the pixel data of G at the address position of (X, Y) is smaller than the second threshold of G SG2 (YES), it is assumed that the pixel data at the address position may be the red hue and the process proceeds to step U20, and when the pixel data of G at the address position of (X, Y) is equal to or greater than the second threshold of G SG2 (NO), it is assumed that the pixel data at the address position is other than the red hue and the process proceeds to the later-described step U166.

In step U20, the pixel data of B (output value of B) at the address position of (X, Y) is read from the address position of (X, Y) in the pixel data of motion thread storing memory M215. Subsequently, in step U21, the second threshold of B SB2 is read from the memory M221.

Subsequently, in step U22, when the pixel data of B at the address position of (X, Y) is smaller than the second threshold of B SB2 (YES), it is assumed that the pixel data at the address position is the red hue and the process proceeds to step U23, and when the pixel data of B at the address position of (X, Y) is equal to or greater than the second threshold of B SB2 (NO), it is assumed that the pixel data at the address position is other than the red hue and the process proceeds to the later-described step U166.

In step U23, the address position of (X, Y) in the motion thread mask storing memory M222 is overwritten with "1 (R)."

Subsequently, in step U24, 1 is added to the count value X, and the count value X storing memory M214 is overwritten with the obtained value. In step U25, the number of the X-direction pixels of the motion thread 1c is read from the memory M211.

Subsequently, in step U26, when the count value X is equal to or smaller than the number of the X-direction pixels of the motion thread 1c (NO), the process returns to step U14, and when the count value X is greater than the number of the X-direction pixels of the motion thread 1c (YES), the process proceeds to step U27.

In step U27, 1 is added to the count value Y and the count value Y storing memory M213 is overwritten with the obtained value. Subsequently, in step U28, the number of the Y-direction pixels of the motion thread 1c is read from the memory M212.

Subsequently, in step U29, when the count value Y is equal to or smaller than the number of the Y-direction pixels of the motion thread 1c (NO), the process returns to step U13, and when the count value Y is greater than the number of the Y-direction pixels of the motion thread 1c (YES), the process proceeds to the later-described step U30.

In a case where the process proceeds from the abovementioned steps U16, U19, and U22 to step U166, the pixel data of G at the address position of (X, Y) is read from the address position of (X, Y) in the pixel data of motion thread storing memory M215 in step U166. Subsequently, in step U167, the first threshold of G SG1 is read from the memory M218.

Subsequently, in step U168, when the pixel data of G at the address position of (X, Y) is greater than the first threshold of G SG1 (YES), it is assumed that the pixel data at the address position may be the green hue and the process proceeds to step U169, and when the pixel data of G at the address position of (X, Y) is equal to or smaller than the first threshold of G SG1 (NO), it is assumed that the pixel data at the address position is other than the green hue and the process proceeds to the later-described step U176.

In step U169, the pixel data of B at the address position of (X, Y) is read from the address position of (X, Y) in the pixel data of motion thread storing memory M215. Subsequently, in step U170, the second threshold of B SB2 is read from the memory M221.

Subsequently, in step U171, when the pixel data of B at the address position of (X, Y) is smaller than the second threshold of B SB2 (YES), it is assumed that the pixel data at the address position may be the green hue and the process proceeds to step U172, and when the pixel data of B at the address position of (X, Y) is equal to or greater than the second threshold of B SB2 (NO), it is assumed that the pixel data at the address position is other than the green hue and the process proceeds to the later-described step U176.

In step U172, the pixel data of R at the address position of (X, Y) is read from the address position of (X, Y) in the pixel data of motion thread storing memory M215. Subsequently, in step U173, the second threshold of R SR2 is read from the memory M217.

Subsequently, in step U174, when the pixel data of R at the address position of (X, Y) is smaller than the second threshold of R SR2 (YES), it is assumed that the pixel data at the address position is the green hue and the process proceeds to step U175, and when the pixel data of R at the address position of (X, Y) is equal to or greater than the second threshold of R SR2 (NO), it is assumed that the pixel data at the address position is other than the green hue and the process proceeds to the later-described step U176.

In step U175, the address position of (X, Y) in the motion thread mask storing memory M222 is overwritten with "2 (G)," and the process proceeds to the abovementioned step U24.

In a case where the process proceeds from the abovementioned steps U168, U171, and U174 to step U176, the pixel data of B at the address position of (X, Y) is read from the address position of (X, Y) in the pixel data of motion thread storing memory M215 in step U176. Subsequently, in step U177, the first threshold of B SB1 is read from the memory M220.

Subsequently, in step U178, when the pixel data of B at the address position of (X, Y) is greater than the first threshold of B SB1 (YES), it is assumed that the pixel data at the address position may be the blue hue and the process proceeds to step U179, and when the pixel data of B at the address position of (X, Y) is equal to or smaller than the first threshold of B SB1 (NO), it is assumed that the pixel data at the address position is other than the blue hue and the process proceeds to the later-described step U186.

In step U179, the pixel data of R at the address position of (X, Y) is read from the address position of (X, Y) in the pixel data of motion thread storing memory M215. Subsequently, in step U180, the second threshold of R SR2 is read from the memory M217.

Subsequently, in step U181, when the pixel data of R at the address position of (X, Y) is smaller than the second threshold of R SR2 (YES), it is assumed that the pixel data at the address position may be the blue hue and the process proceeds to step U182, and when the pixel data of R at the address position of (X, Y) is equal to or greater than the second threshold of R SR2 (NO), it is assumed that the pixel data at the address position is other than the blue hue and the process proceeds to the later-described step U186.

In step U182, the pixel data of G at the address position of (X, Y) is read from the address position of (X, Y) in the pixel data of motion thread storing memory M215. Subsequently, in step U183, the second threshold of G SG2 is read from the memory M219.

Subsequently, in step U184, when the pixel data of G at the address position of (X, Y) is smaller than the second threshold of G SG2 (YES), it is assumed that the pixel data at the address position is the blue hue and the process proceeds to step U185, and when the pixel data of G at the address position of (X, Y) is equal to or greater than the second threshold of G SG2 (NO), it is assumed that the pixel data at the address position is other than the blue hue and the process proceeds to the later-described step U186.

In step U185, the address position of (X, Y) in the motion thread mask storing memory M222 is overwritten with "3 (B)," and the process proceeds to the abovementioned step U24.

In a case where the process proceeds from the abovementioned steps U178, U181, and U184 to step U186, the address position of (X, Y) in the motion thread mask storing memory M222 is overwritten with "0 (=other than motion threads)" in step U186, and the process proceeds to the abovementioned step U24.

In step U30, whether the printing start switch 218 is turned on is determined. When the printing start switch 218 is turned off (NO), the processing of the step U30 is repeated. When the printing start switch 218 is turned on (YES), the process proceeds to step U31.

In step U31, the printing speed is read from the memory M223. Subsequently, in step U32, the printing speed is outputted to the driving motor driver 222. In step U33, a feeding start command is outputted to the feeder 2. In step U34, a printing start command is outputted to the printing unit 3. Printing on the large sheet 1 not provided with the motion threads 1c is thus started.

Subsequently, in step U35, when the reference image data reading switch 220 is turned off (NO), the processing of the step U35 is repeated, and when the reference image data reading switch 220 is turned on (YES), the process proceeds to step U36. The reference image data reading switch 220 is pressed when the operator of the securities printing press 100 visually checks the printed printing product and determines that the normal printing product is printed.

In step U36, the image capturing rotary phase is read from the memory M224. Subsequently, in step U37, the count value is read from the rotary phase of securities printing press detecting counter 36, and the read value is stored into the memory M225.

Subsequently, in step U38, when the count value in the rotary phase of securities printing press detecting counter 36 does not match the image capturing rotary phase (NO), the process returns to processing of step U37. In step U38, when the count value in the rotary phase of securities printing press detecting counter 36 matches the image capturing rotary phase (YES), the process proceeds to step U39, and the input/output device 213 outputs the image capturing command to the camera 34. The image of the large sheet 1 (with no motion threads 1*c*) provided with the prints is thus captured by the camera 34.

Following step U39, the input/output device 213 outputs the image data transmission command to the camera 34 in step U40. Subsequently, in step U41, when the captured image data is not outputted from the camera 34 to the input/output device 212 (NO), the processing of the step U41 is repeated, and when the captured image data is outputted from the camera 34 to the input/output device 212 (YES), the process proceeds to step U42.

In step U42, the count value Y storing memory M213 is overwritten with 1. Subsequently, in step U43, the count value X storing memory M214 is overwritten with 1.

Subsequently, in step U44, the pixel data of R is read from the camera 34 and the read data is stored as the address position of (X, Y) in the reference image data of R storing memory M226. In step U45, the pixel data of G is read from the camera 34 and the read data is stored as the address position of (X, Y) in the reference image data of G storing memory M227. In step U46, the pixel data of B is read from the camera 34 and the read data is stored as the address position of (X, Y) in the reference image data of B storing memory M228.

Subsequently, in step U47, 1 is added to the count value X, and the count value X storing memory M214 is overwritten with the obtained value. In step U48, the number of the X-direction pixels of the camera 34 is read from the memory M229.

Subsequently, in step U49, when the count value X is equal to or smaller than the number of the X-direction pixels of the camera 34 (NO), the process returns to step U44, and when the count value X is greater than the number of the X-direction pixels of the camera 34 (YES), the process proceeds to step U50.

In step U50, 1 is added to the count value Y and the count value Y storing memory M213 is overwritten with the obtained value. Subsequently, in step U51, the number of the Y-direction pixels of the camera 34 is read from the memory M230 in step U51.

Subsequently, in step U52, when the count value Y is equal to or smaller than the number of the Y-direction pixels of the camera 34 (NO), the process returns to step U43, and when the count value Y is greater than the number of the Y-direction pixels of the camera 34 (YES), the process proceeds to step U53.

In step U53, whether the printing end switch 219 is turned on is determined. When the printing end switch 219 is turned off (NO), the processing of step U53 is repeated. When the printing end switch is turned on (YES), the process proceeds to step U54.

In step U54, a feeding stop command is outputted to the feeder 2. Subsequently, in step U55, a printing stop command is outputted to the printing unit 3. In step U56, a stop command is outputted to the driving motor driver 222. The securities printing press 100 is thus stopped.

Following step U56, whether the printing start switch 218 is turned on is determined. When the printing start switch 218 is turned off (NO), the processing of step U57 is repeated. When the printing start switch 218 is turned on (YES), the process proceeds to step U58.

In step U58, the printing speed is read from the memory M223. Subsequently, in step U59, the printing speed is outputted to the driving motor driver 222. Subsequently, in step U60, the feeding start command is outputted to the feeder 2. In step U61, the printing start command is outputted to the printing unit 3. Printing on the large sheet 1 provided with the motion threads 1*c* is thus started.

Subsequently, in step U62, whether the inspection start switch 221 is turned on is determined. When the inspection start switch 221 is turned off (NO), the processing of the step U62 is repeated. When the inspection start switch 221 is turned on (YES), the process proceeds to step U63.

In step U63, the image capturing rotary phase is read from the memory M224. Subsequently, in step U64, the count value is read from the rotary phase of securities printing press detecting counter 36, and the read value is stored into the memory M225.

Subsequently, in step U65, when the count value in the rotary phase of securities printing press detecting counter 36 does not match the image capturing rotary phase (NO), the process returns to step U64, and when the count value in the rotary phase of securities printing press detecting counter 36 matches the image capturing rotary phase (YES), the process proceeds to step U66, and the input/output device 213 outputs the image capturing command to the camera 34. The image of the large sheet 1 (with no motion threads 1*c*) provided with prints is thus captured by the camera 34.

Following step U66, the input/output device 213 outputs the image data transmission command to the camera 34 in step U67. Subsequently, in step U68, when the captured image data is not outputted from the camera 34 to the input/output device 212 (NO), the processing of the step U68 is repeated, and when the captured image data is outputted from the camera 34 to the input/output device 212 (YES), the process proceeds to step U69.

In step U69, the count value Y storing memory M213 is overwritten with 1. Subsequently, in step U70, the count value X storing memory M214 is overwritten with 1.

Subsequently, in step U71, the pixel data of R is read from the camera 34 and the read data is stored as the address position of (X, Y) in the inspection image data of R storing memory M231. In step U72, the pixel data of G is read from the camera 34 and the read data is stored as the address position of (X, Y) in the inspection image data of G storing memory M232. In step U73, the pixel data of B is read from the camera 34 and the read data is stored as the address position of (X, Y) in the inspection image data of B storing memory M233.

Subsequently, in step U74, 1 is added to the count value X, and the count value X storing memory M214 is overwritten with the obtained value. In step U75, the number of the X-direction pixels of the camera 34 is read from the memory M229.

Subsequently, in step U76, when the count value X is equal to or smaller than the number of the X-direction pixels of the camera 34 (NO), the process returns to step U71, and when the count value X is greater than the number of the X-direction pixels of the camera 34 (YES), the process proceeds to step U77.

In step U77, 1 is added to the count value Y and the count value Y storing memory M213 is overwritten with the obtained value. Subsequently, in step U78, the number of the Y-direction pixels of the camera 34 is read from the memory M230 in step U78.

Subsequently, in step U79, when the count value Y is equal to or smaller than the number of the Y-direction pixels of the camera (NO), the process returns to step U70, and when the count value Y is greater than the number of the Y-direction pixels of the camera (YES), the process proceeds to step U80.

In step U80, the count value Y storing memory M213 is overwritten with 1. In step U81, the count value X storing memory M214 is overwritten with 1.

Subsequently, in step U82, the inspection pixel data of R at the address position of (X, Y) is read from the address position of (X, Y) in the inspection image data of R storing memory M231. In step U83, the first threshold of R SR1 is read from the memory M216.

Subsequently, in step U84, when the inspection pixel data of R at the address position of (X, Y) is greater than the first threshold of R SR1 (YES), it is assumed that the inspection pixel data at the address position may be the red hue and the process proceeds to step U85, and when the inspection pixel data of R at the address position of (X, Y) is equal to or smaller than the first threshold of R SR1 (NO), it is assumed that the inspection pixel data at the address position is other than the red hue and the process proceeds to the later-described step U187.

In step U85, the inspection pixel data of G at the address position of (X, Y) is read from the address position of (X, Y) in the inspection image data of G storing memory M232. In step U86, the second threshold of G SG2 is read from the memory M219.

Subsequently, in step U87, when the inspection pixel data of G at the address position of (X, Y) is smaller than the second threshold of G SG2 (YES), it is assumed that the inspection pixel data at the address position may be the red hue and the process proceeds to step U88, and when the inspection pixel data of G at the address position of (X, Y) is equal to or greater than the second threshold of G SG2 (NO), it is assumed that the inspection pixel data at the address position is other than the red hue and the process proceeds to the later-described step U187.

In step U88, the inspection pixel data of B at the address position of (X, Y) is read from the address position of (X, Y) in the inspection image data of B storing memory M233. In step U89, the second threshold of B SB2 is read from the memory M221.

Subsequently, in step U90, when the inspection pixel data of B at the address position of (X, Y) is smaller than the second threshold of B SB2 (YES), it is assumed that the inspection pixel data at the address position is the red hue and the process proceeds to step U91 to allow the address position of (X, Y) in the provisional inspection mask storing memory M234 to be overwritten with "1 (R)," and when the inspection pixel data of B at the address position of (X, Y) is equal to or greater than the second threshold of B SB2 (NO), it is assumed that the inspection pixel data at the address position is other than the red hue and the process proceeds to the later-described step U187.

Following step U91, 1 is added to the count value X and the count value X storing memory M214 is overwritten with the obtained value in step U92. In step U93, the number of the X-direction pixels of the camera 34 is read from the memory M229.

Subsequently, in step U94, when the count value X is equal to or smaller than the number of the X-direction pixels of the camera (NO), the process returns to step U82, and when the count value X is greater than the number of the X-direction pixels of the camera (YES), the process proceeds to step U95.

In step U95, 1 is added to the count value Y and the count value Y storing memory M213 is overwritten with the obtained value. Subsequently, in step U96, the number of the Y-direction pixels of the camera 34 is read from the memory M230.

Subsequently, in step U97, when the count value Y is equal to or smaller than the number of the Y-direction pixels of the camera 34 (NO), the process returns to step U81, and when the count value Y is greater than the number of the Y-direction pixels of the camera 34 (YES), the process proceeds to step U98.

In a case where the process proceeds from the abovementioned steps U84, U87, and U90 to step U187, the inspection pixel data of G at the address position of (X, Y) is read from the address position of (X, Y) in the inspection image data of G storing memory M232 in step U187. Subsequently, in step U188, the first threshold of G SG1 is read from the memory M218.

Subsequently, in step U189, when the inspection pixel data of G at the address position of (X, Y) is greater than the first threshold of G SG1 (YES), it is assumed that the pixel data at the address position may be the green hue and the process proceeds to step U190, and when the inspection pixel data of G at the address position of (X, Y) is equal to or smaller than the first threshold of G SG1 (NO), it is assumed that the inspection pixel data at the address position is other than the green hue and the process proceeds to the later-described step U197.

In step U190, the inspection pixel data of B at the address position of (X, Y) is read from the address position of (X, Y) in the inspection image data of B storing memory M233. Subsequently, in step U191, the second threshold of B SB2 is read from the memory M221.

Subsequently, in step U192, when the inspection pixel data of B at the address position of (X, Y) is smaller than the second threshold of B SB2 (YES), it is assumed that the inspection pixel data at the address position may be the green hue and the process proceeds to step U193, and when the inspection pixel data of B at the address position of (X, Y) is equal to or greater than the second threshold of B SB2 (NO), it is assumed that the inspection pixel data at the address position is other than the green hue and the process proceeds to the later-described step U197.

In step U193, the inspection pixel data of R at the address position of (X, Y) is read from the address position of (X, Y) in the inspection image data of R storing memory M231. Subsequently, in step U194, the second threshold of R SR2 is read from the memory M217.

Subsequently, in step U195, when the inspection pixel data of R at the address position of (X, Y) is smaller than the second threshold of R SR2 (YES), it is assumed that the inspection pixel data at the address position is the green hue and the process proceeds to step U196, and when the inspection pixel data of R at the address position of (X, Y) is equal to or greater than the second threshold of R SR2 (NO), it is assumed that the inspection pixel data at the address position may be other than the green hue and the process proceeds to the later-described step U197.

In step U196, the address position of (X, Y) in the provisional inspection mask storing memory M234 is overwritten with "2 (G)," and the process proceeds to the abovementioned step U92.

In a case where the process proceeds from the abovementioned steps U189, U192, and U195 to step U197, the inspection pixel data of B at the address position of (X, Y) is read from the address position of (X, Y) in the inspection image data of B storing memory M233 in step U197. Subsequently, in step U198, the first threshold of B SB1 is read from the memory M220.

Subsequently, in step U199, when the inspection pixel data of B at the address position of (X, Y) is greater than the first threshold of B SB1 (YES), it is assumed that the inspection pixel data at the address position may be the blue hue and the process proceeds to step U200, and when the inspection pixel data of B at the address position of (X, Y) is equal to or smaller than the first threshold of B SB1 (NO), it is assumed that the inspection pixel data at the address position is other than the blue hue and the process proceeds to the later-described step U207.

In step U200, the inspection pixel data of R at the address position of (X, Y) is read from the address position of (X, Y) in the inspection image data of R storing memory M231. Subsequently, in step U201, the second threshold of R SR2 is read from the memory M217.

Subsequently, in step U202, when the inspection pixel data of R at the address position of (X, Y) is smaller than the second threshold of R SR2 (YES), it is assumed that the inspection pixel data at the address position may be the blue hue and the process proceeds to step U203, and when the inspection pixel data of R at the address position of (X, Y) is equal to or greater than the second threshold of R SR2 (NO), it is assumed that the inspection pixel data at the address position is other than the blue hue and the process proceeds to the later-described step U207.

In step U203, the inspection pixel data of G at the address position of (X, Y) is read from the address position of (X, Y) in the inspection image data of G storing memory M232. Subsequently, in step U204, the second threshold of G SG2 is read from the memory M219.

Subsequently, in step S205, when the inspection pixel data of G at the address position of (X, Y) is smaller than the second threshold of G SG2 (YES), it is assumed that the inspection pixel data at the address position is the blue hue and the process proceeds to step U206, and when the inspection pixel data of G at the address position of (X, Y) is equal to or greater than the second threshold of G SG2 (NO), it is assumed that the inspection pixel data at the address position is other than the blue hue and the process proceeds to the later-described step U207.

In step U206, the address position of (X, Y) in the provisional inspection mask storing memory M234 is overwritten with "3 (B)," and the process proceeds to the abovementioned step U92.

In a case where the process proceeds from the abovementioned steps U199, U202, and U205 to step U207, the address position of (X, Y) in the provisional inspection mask storing memory M234 is overwritten with "0 (=other than motion threads)" in step U207, and the process proceeds to the abovementioned step U92. The provisional inspection mask is thus created.

In step U98 following step U97, the count value L storing memory M235 is overwritten with 0. Subsequently, in step U99, the count value Y storing memory M213 is overwritten with 1. In step U100, the count value X storing memory M214 is overwritten with 1.

Subsequently, in step U101, the number of similar pixels of motion thread storing memory M236 is overwritten with 0. In step U102, the count value N storing memory M237 is overwritten with 1. In step U103, the count value M storing memory M238 is overwritten with 1.

Subsequently, in step U104, data at an address position of (X+M−1, Y+N−1) in the provisional inspection mask storing memory M234 is read. In step U105, data at an address position of (M, N) in the motion thread mask storing memory M222 is read.

Subsequently, in step U106, when the data at the address position of (X+M−1, Y+N−1) matches the data at the address position of (M, N) (YES), the process proceeds to step U107, and when the data at the address position of (X+M−1, Y+N−1) does not match the data at the address position of (M, N) (NO), the process proceeds to the later-described step U108.

In step U107, 1 is added to the number of the similar pixels of the motion thread 1c, and the number of similar pixels of motion thread storing memory M236 is overwritten with the obtained value. In step U108, 1 is added to the count value M, and the count value M storing memory M238 is overwritten with the obtained value. In step U109, the number of the X-direction pixels of the motion thread 1c is read from the memory M211.

Subsequently, in step U110, when the count value M is equal to or smaller than the number of the X-direction pixels of the motion thread 1c (NO), the process returns to the abovementioned step U104, and when the count value M is greater than the number of the X-direction pixels of the motion thread 1c (YES), the process proceeds to step U111.

In step U111, 1 is added to the count value N, and the count value N storing memory M237 is overwritten with the obtained value. In step U112, the number of the Y-direction pixels of the motion thread 1c is read from the memory M212.

Subsequently, in step U113, when the count value N is equal to or smaller than the number of the Y-direction pixels of the motion thread 1c (NO), the process returns to the abovementioned step U103, and when the count value N is greater than the number of the Y-direction pixels of the motion thread 1c (YES), the process proceeds to step U114.

In step U114, the number of the similar pixels of the motion thread 1c is read from the memory M236. In step U115, the number of the X-direction pixels of the motion thread 1c is read from the memory M211. In step U116, the number of the Y-direction pixels of the motion thread 1c is read from the memory M212.

Subsequently, in step U117, the number of the similar pixels of the motion thread 1c is divided by "(number of X-direction pixels of motion thread)×(number of Y-direction pixels of motion thread)" to compute the similarity degree of the motion thread 1c, and the obtained value is stored into the memory M239.

Subsequently, in step U118, the allowable value of the similarity degree of the motion thread 1c is read from the memory M240. In step U119, when the similarity degree of the motion thread 1c is greater than the allowable value of the similarity degree of the motion thread 1c (YES), the process proceeds to step U120. When the similarity degree of the motion thread 1c is equal to or smaller than the allowable value of the similarity degree of the motion thread 1c (NO), the process proceeds to the later-described step U123.

In step U120, 1 is added to the count value L, and the count value L storing memory M235 is overwritten with the obtained value. In step U121, the count value X and the count value Y are respectively read from the memories M214 and M213. In step U122, the count value X and count value Y are set as the position of the motion thread 1c and stored as (X, Y) at the L-th position in the position of motion thread storing memory M241.

Subsequently, in step U123, 1 is added to the count value X, and the count value X storing memory M214 is overwritten with the obtained value. In step U124, the number of the X-direction pixels of the camera 34 is read from the memory M229. In step U125, the number of the X-direction pixels of the motion thread 1c is read from the memory M211.

Subsequently, in step U126, when the count value X is equal to or smaller than (number of X-direction pixels of camera 34−number of X-direction pixels of motion thread 1c+1) (NO), the process returns to the abovementioned step U102, and when the count value X is greater than (number of X-direction pixels of camera 34−number of X-direction pixels of motion thread 1c+1) (YES), the process proceeds to step U127.

In step U127, 1 is added to the count value Y, and the count value Y storing memory M213 is overwritten with the obtained value. Subsequently, in step U128, the number of the Y-direction pixels of the camera is read from the memory M230. In step U129, the number of the Y-direction pixels of the motion thread 1c is read from the memory M212.

Subsequently, in step U130, when the count value Y is equal to or smaller than (number of Y-direction pixels of camera 34−number of Y-direction pixels of motion thread 1c+1) (NO), the process returns to the abovementioned step U100, and when the count value Y is greater than (number of Y-direction pixels of camera 34−number of Y-direction pixels of motion thread 1c+1) (YES), the process proceeds to step U131.

In step U131, the inspection mask storing memory M242 is initialized (=0). In step U132, the count value K storing memory M243 is overwritten with 1. In step U133, the count value N storing memory M237 is overwritten with 1. In step U134, the count value M storing memory M238 is overwritten with 1.

Subsequently, in step U135, (X, Y) is read from the K-th position in the position of motion thread storing memory M241. In step U136, the pixel data is read from the position of the address (M, N) in the motion thread mask storing memory M222, and the position of (X+M−1, Y+N−1) in the inspection mask storing memory M242 is overwritten with the obtained data.

Subsequently, in step U137, 1 is added to the count value M, and the count value M storing memory M238 is overwritten with the obtained value. In step U138, the number of the X-direction pixels of the motion thread 1c is read from the memory M211.

Subsequently, in step U139, when the count value M is equal to or smaller than the number of the X-direction pixels of the motion thread 1c (NO), the process returns to the abovementioned step U135, and when the count value M is greater than the number of the X-direction pixels of the motion thread 1c (YES), the process proceeds to step U140.

In step U140, 1 is added to the count value N, and the count value N storing memory M237 is overwritten with the obtained value. Subsequently, in step U141, the number of the Y-direction pixels of the motion thread 1c is read from the memory M212.

Subsequently, in step U142, when the count value N is equal to or smaller than the number of the Y-direction pixels of the motion thread 1c (NO), the process returns to the abovementioned step U134, and when the count value N is greater than the number of the Y-direction pixels of the motion thread 1c (YES), the process proceeds to step U143.

In step U143, 1 is added to the count value K, and the count value K storing memory M243 is overwritten with the obtained value. Subsequently, in step U144, the count value L is read from the memory M235.

Subsequently, in step U145, when the count value K is equal to or smaller than the count value L (NO), the process returns to the abovementioned step U133, and when the count value K is greater than the count value L (YES), the process proceeds to step U146.

In step U146, the count value Y storing memory M213 is overwritten with 1. Subsequently, in step U147, the count value X storing memory M214 is overwritten with 1. In step U148, data at the address position of (X, Y) in the inspection mask storing memory M242 is read.

Subsequently, in step U149, when the data at the address position of (X, Y) in the inspection mask storing memory M242 is 1 (R) (YES), the process proceeds to step U150, and when the data at the address position of (X, Y) in the inspection mask storing memory M242 is not 1 (R) (NO), the process proceeds to the later-described step U208.

In step U150, the pixel data of R at the address position of (X, Y) in the inspection image data of R storing memory M231 is read. In step U151, the pixel data of R at the address position of (X, Y) in the reference image data of R storing memory M226 is read.

Subsequently, in step U152, the pixel data of R at the address position of (X, Y) in the reference image data of R storing memory M226 is subtracted from the pixel data of R at the address position of (X, Y) in the inspection image data of R storing memory M231 to compute a pixel data of R difference at the address position of (X, Y), and the obtained value is stored into the memory M244.

Subsequently, in step U153, an absolute value of the pixel data of R difference at the address position of (X, Y) is computed based on the pixel data of R difference at the address position of (X, Y), and the obtained value is stored into the memory M245. In step U154, the allowable value of the pixel data of R is read from the memory M246.

Subsequently, in step U155, when the absolute value of the pixel data of R difference at the address position of (X, Y) is smaller than the allowable value of the pixel data of R (YES), the process proceeds to step U156, and when the absolute value of the pixel data of R difference at the address position of (X, Y) is equal to or greater than the allowable value of the pixel data of R (NO), the process proceeds to step U240 to display NG on the display 22 and the process proceeds to the later-described step U162.

In step U156, 1 is added to the count value X, and the count value X storing memory M214 is overwritten with the obtained value. Subsequently, in step U157, the number of the X-direction pixels of the camera 34 is read from the memory M229.

Subsequently, in step U158, when the count value X is equal to or smaller than the number of the X-direction pixels of the camera 34 (NO), the process returns to the abovementioned step U148, and when the count value X is greater than the number of the X-direction pixels of the camera 34 (YES), the process proceeds to step U159.

In step U159, 1 is added to the count value Y, and the count value Y storing memory M213 is overwritten with the obtained value. Subsequently, in step U160, the number of the Y-direction pixels of the camera 34 is read from the memory M230.

Subsequently, when the count value Y is equal to or smaller than the number of the Y-direction pixels of the camera 34 (NO), the process returns to the abovementioned step U147, and when the count value Y is greater than the number of the Y-direction pixels of the camera 34 (YES), the process proceeds to step U162.

In step U162, whether the printing end switch 219 is turned on is determined. When the printing end switch 219 is turned off (NO), the process returns to the abovementioned step U63. When the printing end switch 219 is turned on (YES), the process proceeds to step U163.

In step U163, the feeding stop command is outputted to the feeder 2. In step U164, the printing stop command is outputted to the printing unit 3. In step U165, the stop command is outputted to the driving motor driver 222. The securities printing press 100 is thus stopped.

In a case where the process proceeds from step U149 to step U208, when the data at the address position of (X, Y) in the inspection mask storing memory M242 is 2 (G) in step U208 (YES), the process proceeds to step U209, and when the pixel data at the address position of (X, Y) in the inspection mask storing memory M242 is not 2 (G) (NO), the process proceeds to the later-described step U215.

In step U209, the pixel data of G at the address position of (X, Y) in the inspection image data of G storing memory M232 is read. In step U210, the pixel data of G at the address position of (X, Y) in the reference image data of G storing memory M227 is read.

Subsequently, in step U211, the pixel data of G at the address position of (X, Y) in the reference image data of G storing memory M227 is subtracted from the pixel data of G at the address position of (X, Y) in the inspection image data of G storing memory M232 to compute a pixel data of G difference at the address position of (X, Y), and the obtained value is stored into the memory M247.

Subsequently, in step U212, an absolute value of the pixel data of G difference at the address position of (X, Y) is computed based on the pixel data of G difference at the address position of (X, Y), and the obtained value is stored into the memory M248. In step U213, the allowable value of the pixel data of G is read from the memory M249.

Subsequently, in step U214, when the absolute value of the pixel data of G difference at the address position of (X, Y) is smaller than the allowable value of the pixel data of G (YES), the process proceeds to the abovementioned step U156, and when the absolute value of the pixel data of G difference at the address position of (X, Y) is equal to or greater than the allowable value of the pixel data of G (NO), the process proceeds to the abovementioned step U240.

In a case where the process proceeds from step U208 to step U215, when the data at the address position of (X, Y) in the inspection mask storing memory M242 is 3 (B) in step U215 (YES), the process proceeds to step U216, and when the pixel data at the address position of (X, Y) in the inspection mask storing memory M242 is not 3 (B) (NO), the process proceeds to the later-described step U222.

In step U216, the pixel data of B at the address position of (X, Y) in the inspection image data of B storing memory M233 is read. Subsequently, in step U217, the pixel data of B at the address position of (X, Y) in the reference image data of B storing memory M228 is read.

Subsequently, in step U218, the pixel data of B at the address position of (X, Y) in the reference image data of B storing memory M228 is subtracted from the pixel data of B at the address position of (X, Y) in the inspection image data of B storing memory M233 to compute a pixel data of B difference at the address position of (X, Y), and the obtained value is stored into the memory M250.

Subsequently, in step U219, an absolute value of the pixel data of B difference at the address position of (X, Y) is computed based on the pixel data of B difference at the address position of (X, Y), and the obtained value is stored into the memory M251. In step U220, the allowable value of the pixel data of B is read from the memory M252.

Subsequently, in step U221, when the absolute value of the pixel data of B difference at the address position of (X, Y) is smaller than the allowable value of the pixel data of B (YES), the process proceeds to the abovementioned step U156, and when the absolute value of the pixel data of B difference at the address position of (X, Y) is equal to or greater than the allowable value of the pixel data of B (NO), the process proceeds to the abovementioned step U240.

In a case where the process proceeds from step U215 to step U222, the pixel data of R at the address position of (X, Y) in the inspection image data of R storing memory M231 is read in step U222. Subsequently, in step U223, the pixel data of R at the address position of (X, Y) in the reference image data of R storing memory M226 is read.

Subsequently, in step U224, the pixel data of R at the address position of (X, Y) in the reference image data of R storing memory M226 is subtracted from the pixel data of R at the address position of (X, Y) in the inspection image data of R storing memory M231 to compute a pixel data of R difference at the address position of (X, Y), and the obtained value is stored into the memory M244.

Subsequently, in step U225, an absolute value of the pixel data of R difference at the address position of (X, Y) is computed based on the pixel data of R difference at the address position of (X, Y), and the obtained value is stored into the memory M245. In step U226, the allowable value of the pixel data of R is read from the memory M246.

Subsequently, in step U227, when the absolute value of the pixel data of R difference at the address position of (X, Y) is smaller than the allowable value of the pixel data of R (YES), the process proceeds to step U228, and when the absolute value of the pixel data of R difference at the address position of (X, Y) is equal to or greater than the allowable value of the pixel data of R (NO), the process proceeds to the abovementioned step U240.

In step U228, the pixel data of G at the address position of (X, Y) in the inspection image data of G storing memory M232 is read. In step U229, the pixel data of G at the address position of (X, Y) in the reference image data of G storing memory M227 is read.

Subsequently, in step U230, the pixel data of G at the address position of (X, Y) in the reference image data of G storing memory M227 is subtracted from the pixel data of G at the address position of (X, Y) in the inspection image data of G storing memory M232 to compute a pixel data of G difference at the address position of (X, Y), and the obtained value is stored into the memory M247.

Subsequently, in step U231, an absolute value of the pixel data of G difference at the address position of (X, Y) is computed based on the pixel data of G difference at the address position of (X, Y), and the obtained value is stored into the memory M248. In step U232, the allowable value of the pixel data of G is read from the memory M249.

Subsequently, in step U233, when the absolute value of the pixel data of G difference at the address position of (X, Y) is smaller than the allowable value of the pixel data of G (YES), the process proceeds to step U234, and when the absolute value of the pixel data of G difference at the address position of (X, Y) is equal to or greater than the allowable value of the pixel data of G (NO), the process proceeds to the abovementioned step U240.

In step U234, the pixel data of B at the address position of (X, Y) in the inspection image data of B storing memory M233 is read. In step U235, the pixel data of B at the address position of (X, Y) in the reference image data of B storing memory M228 is read.

Subsequently, in step U236, the pixel data of B at the address position of (X, Y) in the reference image data of B storing memory M228 is subtracted from the pixel data of B at the address position of (X, Y) in the inspection image data of B storing memory M233 to compute a pixel data of B difference at the address position of (X, Y), and the obtained value is stored into the memory M250.

Subsequently, in step U237, an absolute value of the pixel data of B difference at the address position of (X, Y) is computed based on the pixel data of B difference at the address position of (X, Y), and the obtained value is stored into the memory M251. In step U238, the allowable value of the pixel data of B is read from the memory M252.

Subsequently, in step U239, when the absolute value of the pixel data of B difference at the address position of (X, Y) is smaller than the allowable value of the pixel data of B (YES), the process proceeds to the abovementioned step U156, and when the absolute value of the pixel data of B difference at the address position of (X, Y) is equal to or greater than the allowable value of the pixel data of B (NO), the process proceeds to the abovementioned step U240.

With the abovementioned print quality inspection apparatus and print quality inspection method according to this embodiment, the position of the motion thread 1c is obtained, the inspection of the print quality of the motion thread 1c portion is performed using only the image data of the color of the same hue as the color of the motion thread 1c (1cR, 1cG, 1cB) out of the image data of each of the RGB captured by the camera 34, while the inspection of the print quality of the portion other than the motion thread 1c is performed using the data of all the RGB images.

In this case, as described in the abovementioned first embodiment, for example, since each color motion thread 1cR, 1cG, or 1cB is expressed in a dark color in the image data of the color of different hue from the color of each color motion thread 1cR, 1cG, or 1cB, when the allowable values are the normal values and the pattern of the motion thread 1c changes with small angle variations, the determination may be made as NG. Thus, also in this embodiment, the inspection using the image data of the color of different hue is not performed on the portions of each color motion thread 1cR, 1cG, or 1cB.

On the other hand, since each color motion thread 1cR, 1cG, or 1cB has no color or is expressed in a pale color in the image data of the color of the same hue as the color of each color motion thread 1cR, 1cG, or 1cB, it is possible to substantially ignore the motion thread 1c in the inspection using the normal allowable values. Thus, for the motion thread 1c portion, only the image data of the color of the same hue as the color of each color motion thread 1cR, 1cG, or 1cB is used for the determination of OK/NG based on the reference image data.

As a result, in this embodiment, it is possible to prevent the variation of the pattern of the motion thread 1c from affecting the print quality inspection and to perform the print quality inspection without being affected by the pattern of the motion thread 1c, and the quality of the print provided on the large printing product 1 provided with the motion thread 1c can be accurately inspected.

EXPLANATION OF REFERENCE NUMERALS

1 ... large printing product, 1a ... strip, 1b ... single color motion thread, 1c ... multicolor motion thread, 1cR ... red color motion thread, 1cG ... green color motion thread, 1cB ... blue color motion thread, 1cM ... multicolor motion thread area, 2 ... feeder, 3 ... printing unit, 3A to 3F ... printing unit, 4 ... coating unit, 5 ... delivery pile, 6 ... delivery device, 7 ... coater cylinder, 8 ... impression cylinder, 10 ... print quality inspection unit, 11 ... CPU, 12 ... ROM, 13 ... RAM, 14 to 20, 211 to 215 ... input/output device, 21 ... input device, 22 ... display, 22a ... strip image display portion, 22b ... large printing product display portion, 22c ... region other than portion in which image of large printing product is captured, 23 ... output device, 24 ... CD drive, 25 ... R button, 26 ... G button, 27 ... B button, 28 ... motion thread color setting completion switch, 29 ... selected area confirmation switch, 30 ... reference image data reading switch, 31 ... inspection start switch, 32 ... inspection end switch, 33 ... mouse, 34, 34B ... color camera, 34A ... monochrome camera, 35, 35D ... visible light illuminator, 35A ... R illuminator, 35B ... G illuminator, 35C ... B illuminator, 36 ... rotary phase of securities printing press detecting counter, 37 ... rotary encoder for securities printing press drive motor, 38 ... light blocking plate, 100 ... securities printing press, 216 ... interface, 217 ... pixel data of motion thread reading switch, 218 ... printing start switch, 219 ... printing end switch, 220 ... reference image data reading switch, 221 ... inspection start switch, 222 ... driving motor driver, 223 ... driving motor, 224 ... rotary encoder for driving motor, A ... motion thread area, M11 to M56, M139 to M166, M211 to M252 ... memory

The invention claimed is:

1. A print quality inspection apparatus, comprising:
an illuminator that emits light onto a printing product provided with a motion thread;
an image capturing device that captures an image of the printing product; and
a print quality inspection unit, including a processor and a memory, that inspects print quality of the printing product based on image data captured by the image capturing device, wherein
the image capturing device captures RGB images of the printing product and the print quality inspection unit performs inspection of print quality of an area including the motion thread based on image data of a color of the same hue as a color of the motion thread,
wherein when inspecting print quality of the area including the motion thread, the print quality inspection unit carries out inspection using image data of a color of different hue from the color of the motion thread while setting an allowable value for determining whether a print is normal as a value for inhibiting the inspection.

2. The print quality inspection apparatus according to claim 1, wherein
the print quality inspection unit uses data of all the RGB images to perform inspection of print quality of a region outside the area including the motion thread.

3. The print quality inspection apparatus according to claim 2, wherein
the print quality inspection unit obtains a position of the motion thread based on data of all the RGB images captured by the image capturing device.

4. The print quality inspection apparatus according to claim 2, wherein
the print quality inspection unit obtains a position of the motion thread based on data of all the RGB images captured by the image capturing device.

5. The print quality inspection apparatus according to claim 1, wherein the print quality inspection unit obtains a position of the motion thread based on data of all the RGB images captured by the image capturing device.

6. The print quality inspection apparatus according to claim 5, wherein
the print quality inspection unit obtains the position of the motion thread by pattern matching between the data of all the RUB images captured by the image capturing device and the image data of the motion thread obtained in advance.

7. A print quality inspection method, comprising:
emitting light by an illuminator onto a printing product provided with a motion thread;
capturing an image of the printing product provided with the motion thread by an image capturing device; and
inspecting print quality of the printing product by a print quality inspection unit based on image data captured by the image capturing device, wherein
the image capturing device captures RUB images of the printing product and the print quality inspection unit performs inspection of print quality of an area including the motion thread based on image data of a color of the same hue as a color of the motion thread,
wherein when inspecting print quality of the area including the motion thread, the print quality inspection unit carries out inspection using image data of a color of different hue from the color of the motion thread while setting an allowable value for determining whether a print is normal as a value for inhibiting the inspection.

8. The print quality inspection method according to claim 7, wherein
the print quality inspection unit uses data of all the RGB images to perform inspection of print quality of a region outside the area including the motion thread.

9. The print quality inspection method according to claim 8, wherein
the print quality inspection unit obtains a position of the motion thread based on data of all the RGB images captured by the image capturing device.

10. The print quality inspection method according to claim 7, wherein
the print quality inspection unit obtains a position of the motion thread based on data of all the RGB images captured by the image capturing device.

11. The print quality inspection method according to claim 10, wherein
the print quality inspection unit obtains the position of the motion thread by pattern matching between the data of all the RGB images captured by the image capturing device and the image data of the motion thread obtained in advance.

12. The print quality inspection method according to claim 7, wherein
the print quality inspection unit obtains a position of the motion thread based on data of all the RGB images captured by the image capturing device.

* * * * *